United States Patent
Cuthbertson et al.

(10) Patent No.: US 10,922,900 B2
(45) Date of Patent: *Feb. 16, 2021

(54) SYSTEMS AND METHODS FOR COMPETITIVE SCENE COMPLETION IN AN APPLICATION

(71) Applicant: Glu Mobile Inc., San Francisco, CA (US)

(72) Inventors: Scott Cuthbertson, San Francisco, CA (US); Barlow Gilmore, San Francisco, CA (US); Martin Robaszewski, San Francisco, CA (US); Brandon Jones, San Francisco, CA (US); Jakub Fiedorowicz, San Francisco, CA (US); Christianne Amodio, San Francisco, CA (US); Ngan Vu, San Francisco, CA (US); Chris McGill, San Francisco, CA (US); Chris Hosking, San Francisco, CA (US); Jeff Tseng, San Francisco, CA (US); Jose Estuardo Avila, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/442,245

(22) Filed: Jun. 14, 2019

(65) Prior Publication Data
US 2019/0304201 A1  Oct. 3, 2019

Related U.S. Application Data

(63) Continuation of application No. 16/035,479, filed on Jul. 13, 2018, now Pat. No. 10,504,297.

(Continued)

(51) Int. Cl.
*G06T 19/20* (2011.01)
*G06Q 10/06* (2012.01)
(Continued)

(52) U.S. Cl.
CPC ............ *G06T 19/20* (2013.01); *A63F 13/792* (2014.09); *G06Q 10/06* (2013.01); *G06Q 30/00* (2013.01);
(Continued)

(58) Field of Classification Search
None
See application file for complete search history.

(56) References Cited

U.S. PATENT DOCUMENTS 5,601,431 A * 2/1997 Howard ................. G09B 25/00
434/79
9,552,674 B1  1/2017 Jayadevaprakash et al.
(Continued)

FOREIGN PATENT DOCUMENTS

JP     2002092041 A    3/2002
WO    WO 2015075705 A2  5/2015

OTHER PUBLICATIONS

"5 Best Home Décor Apps for 2016", Jun. 10, 2016, Fairfield Residential, Apartmentality, {https://www.fairfieldresidential.com/apartmentality/5-best-home-decor-apps/}, accessed Sep. 12, 2018.

(Continued)

*Primary Examiner* — Zhengxi Liu
(74) *Attorney, Agent, or Firm* — Morgan, Lewis & Bockius LLP

(57) ABSTRACT

In the disclosed systems and methods for competitive scene completion, a user selects a first scene completion challenge that comprises an image of an initial scene and a plurality of markers. Each marker has a designated set of coordinates within the initial scene and corresponds to a furnishing unit type. For each user marker selection, virtual furnishing units corresponding to the unit type are displayed. User unit selection results in display of a three-dimensional graphic of the selected virtual furnishing unit at the corresponding (Continued)

coordinates within the scene, thereby creating an augmented scene that comprises the initial scene with three-dimensional graphics of selected virtual furnishing units. The augmented scene or user selections of virtual furnishing units is submitted to a remote server. The user is provided with a reward.

28 Claims, 68 Drawing Sheets

Related U.S. Application Data

(60) Provisional application No. 62/532,790, filed on Jul. 14, 2017.

(51) Int. Cl.
*G06Q 30/00* (2012.01)
*A63F 13/792* (2014.01)
*G06T 19/00* (2011.01)

(52) U.S. Cl.
CPC ........ *G06T 19/006* (2013.01); *A63F 2300/57* (2013.01); *A63F 2300/61* (2013.01); *G06T 2200/24* (2013.01); *G06T 2210/04* (2013.01); *G06T 2219/2016* (2013.01); *G06T 2219/2024* (2013.01)

(56) References Cited

U.S. PATENT DOCUMENTS

| | | | |
|---|---|---|---|
| 10,026,229 | B1 | 7/2018 | Yalniz et al. |
| 2001/0019332 | A1 | 9/2001 | Fisher |
| 2002/0188582 | A1 | 12/2002 | Jannarone |
| 2003/0072501 | A1 | 4/2003 | Enomoto |
| 2004/0113945 | A1* | 6/2004 | Park .................. G06F 9/451 715/765 |
| 2005/0081161 | A1 | 4/2005 | Macinnes |
| 2005/0251440 | A1 | 11/2005 | Bednarek |
| 2008/0027878 | A1 | 1/2008 | Street et al. |
| 2009/0113349 | A1 | 4/2009 | Zohar et al. |
| 2012/0321199 | A1* | 12/2012 | Lim .................. G06K 9/00664 382/199 |
| 2013/0024371 | A1 | 1/2013 | Hariramani |
| 2013/0030945 | A1 | 1/2013 | Pait |
| 2014/0025537 | A1 | 1/2014 | Venkataramu |
| 2014/0100903 | A1 | 4/2014 | Yuan |
| 2015/0363849 | A1* | 12/2015 | As .................. G06Q 30/0611 705/26.4 |
| 2016/0180270 | A1 | 6/2016 | Sun |
| 2017/0091685 | A1 | 3/2017 | Karabin |

OTHER PUBLICATIONS

Anuman Interactive, "*Home Design 3D*", Version 4.2.3, Computer Software, Amazon.com, {https://www.amazon.com/ANUMAN-INTERACTIVE-Home-Design-3D/dp/B013EMF0NW} App Store Preview accessed Sep. 12, 2018.
Anuman Interactive, "*Home Design 3D*", Version 4.2.3, Computer Software, Apple App Store, {https://itunes.apple.com/in/app/home-design~3d/id463768717?mt=8} App Store Preview accessed Sep. 12, 2018.
Conry, J., "*Our Favorite Home Design Apps*", The Boston Globe, Jan. 10, 2015, {https://www.bostonglobe.com/lifestyle/real-estate/2015/01/10/our-favorite-home-design-apps/CVBOsOhRFPjGNHoXwpW36M/story.html}, accessed Sep. 12, 2018.
"*Design Your Home with Autodesk Homestyler*", Feb. 14, 2016, Raspberry Pi Projects {https://projects-raspberry.com/design-your-home-with-autodesk-homestyler/}, accessed Sep. 12, 2018.
Ghiciuc, I., "*3 Apps for Interior Design*", May 5, 2014, Thin Slices, Blog, {https://www.thinslices.com/blog/mobile-apps-for-interior-design }, accessed Sep. 12, 2018.
Home Design, "*Since 2011 we help ;your home ideas become real!*", 2017, Home Design 3D {https://en.homedesign3d.net/accueil/about-home-design-3d/}, accessed Sep. 12, 2018.
"*Home design 3D for Dummies*", 2015, Appfelstrudel—iPhone & iPad App Discovery, {https://appfelstrudel.com/id/740588884/home-design-3d-for-dummies.html}, accessed Sep. 12, 2018.
Layton, T., "*Getting to Know Autodesk Homestyler 3D Floor Planner*", Popular Mechanics, Sep. 16, 2013 {https://www.popularmechanics.com/home/a9475/getting-to-know-autodesk-homestyler-3d-floor-planner-159313521/}, accessed Sep. 12, 2018.
Musil, S., "*Zillow's New Digs App Offers Remodeling Ideas, Advice*", clnet, Feb. 5, 2013, {https://www.cnet.com/news/zillows-new-digs-app-offers-remodeling-ideas-advice/}, accessed Sep. 12, 2018.
Takahashi, D., "*CrowdStar Launches Design Home in Pursuit of Female Mobile Gamers*", Nov. 15, 2016, Venturebeat {https://venturebeat.com/2016/11/15/crowdstar-launches-design-home-in-pursuit-of-female-mobile-gamers/ }, accessed Sep. 12, 2018.
Telfer, A., "*Design Home and the Art of Monopoly*", Deconstructor of Fun, Blog {https://www.deconstructoroffun.com/blog/2017/12/12/following-the-crowdstar-how-one-studio-ripped-up-the-female-first-gaming-rulebook }, accessed Sep. 12, 2018.
"*Zillow Digs App Available for First Time on iPhone and iPod Touch*", Oct. 17, 2013, Zillow {http://zillow.mediaroom.com/2013-10-17-Zillow-Digs-App-Available-for-First-Time-on-iPhone-and-iPod-Touch}, accessed Sep. 12, 2018.
Covert Fashion (Release Date: Nov. 12, 2013) Apr. 3, 2015 Article: https://digiday.com/marketing/move-kardashian-mobile-game-striking-chord-women-retailers/.
Kim Kardashian: Hollywood (Release Date: Jun. 24, 2014) Jul. 24, 2014 Article: https://www.pcmag.com/reviews/kim-kardashian-hollywood-for-android.
Kendall & Kylie (Release Date: Feb. 17, 2016) Feb. 17, 2016 Article: https://www.cosmopolitan.com/entertainment/celebs/news/g5425/kendall-kylie-jenner-app-game-review-walkthrough/.
Nicki Minaj: The Empire (Release Date: Dec. 8, 2016) Dec. 14, 2016 Article: https://www.cosmopolitan.com/entertainment/celebs/a8483254/nicki-minaj-app-mobile-game-the-empire-review/.
Britney Spears: American Dream (Release Date: May 18, 2016) May 23, 2016 Article: https://ew.com/article/2016/05/23/britney-spears-american-dream-game/.
The Sims Mobile (Release Date: Feb. 2, 2010) Oct. 12, 2014 Review: https://www.platinumsimmers.com/articles/the-sims-4-review-in-a-nutshell/.
Love Nikki (Release Date: Apr. 20, 2017) Jun. 14, 2017 Blog Post: http://geekysweetie.com/love-nikki-dress-queen-anime-mobile-dressup-game-review/.
Anime Dress Up (Release Date: Jun. 19, 2015) Undated Webpage: https://www.apkmonk.com/app/com.animgeek.animedressup/.
Shopping Mall Girl (Release Date: Aug. 3, 2016) Oct. 3, 2016 Blog Post: https://aminoapps.com/c/video-games/page/blog/shopping-mall-girl-professional-review/kRSG_uN3dRYdaZB7V40JqlZPMXjWo.
Covet Fashion: The Basics [Mobile Game], https://www.youtube.com/watch?y=QrBg-F-Npp8 last accessed Dec. 2, 2020, sampled approximately every 4 seconds.

\* cited by examiner

Method 500

502 — A method is performed at a client device 102 comprising a display 408, one or more processors 402 and memory 407, in an application 44 running on the client device. The application 44 is associated with a first user.

504 — Provide the first user with one or more affordances 344. Each affordance 344 in the one or more affordances corresponds to a different respective challenge 50 in a set of one or more challenges. Each challenge in the set of one or more challenges comprises: (i) an image 52 of a respective scene and (ii) a first plurality of markers. Each marker 56 has a different designated set of coordinates within the respective scene and corresponds to a type within a plurality of types.

506 — The scene is of a single room in a building.

508 — The scene is of an outdoor location.

510 — Each respective marker 56 in the first plurality of markers is in the form of a closed form shape that is overlayed on the respective scene at the corresponding different designated set of coordinates within the respective scene. Each respective marker 56 includes a generalized depiction of the type 70 of the respective marker.

512 — The type 70 of the respective marker 56 is one of single seat seating, multiple seats seating, bed, entertainment center, table, storage furniture, mirror, rug, lamp, wall décor, and home accent.

514 — The closed form shape is a colored circle.

516 — The one or more challenges is a first plurality of challenges that each further comprises: (iii) a countdown clock 362 showing an amount of time remaining for the respective challenge to be completed by the first user within the application 44.

517 — A first amount of time remaining for the first challenge to be completed by the first user within the application is different than a second amount of time remaining for a second challenge in the plurality of challenges to be completed by the first user within the application 44.

518 — The first amount of time is one day, the first challenge is free of constraints, and the second amount of time is two days.

608

The application is run over a plurality of epics (e.g., each epic in the plurality of epics is a twelve hour period, one day, two days, or a week) and the one or more challenges is a first plurality of challenges. A subset of the first plurality of challenges is constrained to a first epic in the plurality of epics. During a second epic in the plurality of epics the first user is provided with a second plurality of affordances, each affordance in the second plurality of affordances corresponding to a different respective challenge in a second plurality of challenges. One or more challenges in the second plurality of challenges is not found in the first plurality of challenges. Each challenge in the second plurality of challenges comprises: (i) an image of a respective scene and (ii) a second plurality of markers, each marker having different designated set of coordinates within the respective scene and corresponding to a type within a plurality of types. Responsive to selection of a first affordance in the second plurality of affordances, displaying the image of the respective scene and the second plurality of markers of a first challenge in the second plurality of challenges that corresponds to the first affordance. For each sequential user selection of a respective marker in the second plurality of markers of the challenge corresponding to the first affordance in a first plurality of user selections, a second procedure is performed. The second procedure comprises displaying a second plurality of virtual furnishing units corresponding to the respective marker comprising (i) one or more first virtual furnishing units retained by the first user that match the type of the respective marker and (ii) one or more second virtual furnishing units not retained by the first user that match the type of the respective marker, wherein the displaying further comprises removing from display any virtual furnishing units that do not qualify for populating the respective marker. A user selection of a selected virtual furnishing unit in the second plurality of virtual furnishing units is received. A three-dimensional graphic of the selected virtual furnishing unit is displayed at the different designated set of coordinates within the respective scene, thereby populating the respective scene with a second plurality of three-dimensional graphics each respective three-dimensional graphic in the second plurality of three-dimensional graphics at a corresponding designated set of coordinates within the respective scene specified by the different designated set of coordinates within the respective scene of the corresponding marker. The second procedure enables the first user to submit the respective scene with the second plurality of graphics when a second completion criterion associated with the second challenge has been satisfied. The second completion criterion specifies (i) which corresponding designated sets of coordinates within the respective scene must be populated and (ii) a second amount, in units of the first application counter, required to submit the respective scene. Responsive to submitting the respective scene with the second plurality of graphics (i) the user selection of virtual furnishing units for the second challenge (the respective scene with the second plurality of three-dimensional graphics) to is communicated to the remote server and (ii) the first user is provided with a third amount in units of the second application counter. There is received from the remote server a second community vote on the user selection of virtual furnishing units for the second challenge by the first user (the submitted respective scene with the second plurality of three-dimensional graphics for the second challenge). The first user is notified of the second community vote on the user selection of virtual furnishing units for the second challenge.

US 10,922,900 B2

SYSTEMS AND METHODS FOR COMPETITIVE SCENE COMPLETION IN AN APPLICATION

RELATED APPLICATIONS

This application is a continuation of and claims priority to U.S. application Ser. No. 16/035,479, filed on Jul. 13, 2018, entitled "Systems and Methods for Competitive Scene Completion in an Application," which claims priority to U.S. Provisional Patent Application No. 62/532,790, filed on Jul. 14, 2017, entitled "Methods and Systems for Competitive Scene Completion in an Application," all of which are incorporated by reference herein in their entirety.

TECHNICAL FIELD

The disclosed implementations relate generally to improved systems and methods for competitive scene completion in an application.

BACKGROUND

Competitive scene completion, for instance, the population of a room with suitable furnishings, that are designed without any aids often do not look as good as contemplated in the design stage. For instance, a bed for a particular bedroom may not look quite like imagined once the bed is actually placed in the room. With the many options available for furniture, window treatments, and the large array of kitchen and bath possibilities, navigating the marketplace in order to furnish even a single room in a home or outdoor area associated with a home can be overwhelming. Such scene completion is made even more complicated in competitive scene completion, where the scene for instance must adhere to one or more constraints such as a particular design style and/or total budget.

Houzz View in My Room 3D, available on the Internet as referenced at Houzz.com, allows a user to preview different pieces of furniture and other decor products in images taken of rooms within their home before they purchase such items. The application transplants three-dimensional models of such furnishing into pictures of rooms taken by a user of their home, and represents the details of such furnishing such as the materials and textures they are made of, to offer a visualization of how the physical items will look. More than one object can be added to the same view for those users that would like to completely refurnish a particular room. Such users can then capture what is on screen as a sketch, which is added to their Houzz ideabook, and later shared with others. Alternatively, the user can purchase the selected items immediately, directly from the application. The application also has lists of products for sale and professionals who can help realize the design. One drawback with Houzz View in My Room 3D is that it does not provide a realistic basis for competitive design. That is, safeguards for preventing a user from exceeding a certain budget are lacking. Moreover, while a user may share their designs with friends, there is no objective quantitative basis for obtaining community feedback on shared designs.

Another such application is Homestyler, available on the Internet as referenced at homestyler.com. Homestyler allows a user to change the wallpaper, paint walls, and replace furniture within scenes of rooms within their home without actually buying them. A user starts by taking a photograph of their room. They then upload the photograph, and drop in furnishings from a catalog of real items that is constantly updated. Walls can be repainted with swipes of your finger. The application provides detailed product descriptions with prices and availability. One drawback with Homestyler is that it also does not provide a realistic basis for competitive design. That is, safeguards for preventing a user from exceeding a certain budget are lacking. Moreover, while a user may share their designs with others, there is no objective quantitative basis for obtaining community feedback on shared designs.

Still another application is Zillow Digs, available on the Internet as referenced at zillow.com. Online real estate database Zillow launched Zillow Digs as a hub for home remodeling ideas and to give users an understanding of how much specific projects cost. Users can browse and save images relating to rooms, styles, and specific elements. The application provides users with remodel estimates on the kitchens and baths that inspire them. Estimates are based on location and are broken down by materials and labor costs. The application helps the user find professionals to do the work, and the user can follow, and comment on, other users' projects. However, the application does not permit a user to paste in particular items into a room. That is, the application does not permit a user to virtually customize a scene.

Still another application is RoomReveal—Home Design, available on the Internet as referenced at roomreveal.com. RoomReveal provides tools that allow a user to show the progression of their home improvement projects. Users upload photos and provide a narrative. The application therefore serves as a personal scrapbook, in which a user can track their own projects as well as and offer comments on projects of other users. The catalog of projects changes daily. Users can also search by room, follow their favorite users, and seek out designers and architects. However, the application does not permit a user to paste in particular items into a room. That is, the application does not permit a user to virtually customize a scene.

Still another application is Home Design 3D, available on the Internet as referenced at homedesign3d.net. Starting in two-dimensional construction mode, a user picks a floor plan, draws rooms, and adjusts the height or thickness of walls. It is possible to drop in furnishings and lighting from a database of hundreds of objects and to select door and window styles, floor coverings, and wallpapers. When the design is done, a click of a button turns the design into a three dimensional version. A user can experiment with redesigns and then take a tour of the new look with a three dimensional walk-through. One drawback with Home Design 3D is that it does not provide a realistic basis for competitive design. That is, safeguards for preventing a user from exceeding a certain budget are lacking. Moreover, there is no objective quantitative basis for obtaining community feedback on designs.

Given the above background, what is needed in the art is improved systems and methods for scene completion in an application.

SUMMARY

The present disclosure addresses the above-identified need in the art by providing systems and methods for competitive scene completion. A user selects from among affordances, each representing a different challenge and comprising a scene image and a plurality of markers. Each marker has independent scene coordinates and type. The scene and markers of the selected challenge is displayed. For each user marker selection, corresponding furnishing units are displayed. The units match the marker type and include units retained and not retained by the user. A selection of the furnishing unit by user results in display of a graphic of the selected unit at the corresponding coordinates within the scene. The scene is thereby populated with graphics. The unit selections are submitted upon satisfaction of a challenge completion criterion that specifies which scene coordinates must be populated. Responsive to submission, the user unit selections are subjected to community vote on a remote server and the results are provided to the user.

One aspect of the present disclosure provides a method comprising, at a client device comprising a display, one or more processors and memory, in an application running on the client device associated with a first user, providing the first user with one or more affordances. Each affordance in the one or more affordances corresponds to a different respective challenge in a first plurality of challenges. Each challenge in the one or more challenges comprises (i) an image of a respective scene (e.g., a single room in a building, an outdoor location, etc.) and (ii) an independent first plurality of markers (e.g., five markers or more markers, eight or more markers, etc.), each marker having a different designated set of coordinates within the respective scene and corresponding to a type within a plurality of types. That is, each challenge has its own unique plurality of markers.

Responsive to selection of a first affordance in the one or more affordances, the image of the respective scene and the first plurality of markers of a first challenge in the first plurality of challenges that corresponds to the first affordance is displayed.

For each sequential user selection of a respective marker in the first plurality of markers of the challenge corresponding to the first affordance in a first plurality of user selections, a first procedure is performed. This first procedure comprises displaying a first plurality of virtual furnishing units corresponding to the respective marker. The first plurality of virtual furnishing units comprises (i) one or more first virtual furnishing units retained by the first user that match the type of the respective marker and (ii) one or more second virtual furnishing units not retained by the first user that match the type of the respective marker. In some embodiments, the first user is limited to using a first virtual furnishing unit retained by the first user in a predetermined number of challenges before the first virtual furnishing unit is no longer retained by the first user. In some embodiments, the first user is permitted to use a first virtual furnishing unit retained by the first user in an unlimited number of challenges without incurring any further cost for using the virtual furnishing unit.

The displaying further comprises removing from display any virtual furnishing units that do not qualify for populating the respective marker. In other words, virtual furnishing units that do not correspond to the type of marker will not be displayed. For example, if the marker type corresponds to a lamp, only virtual furnishing units of lamps will be displayed. Virtual furnishing units (e.g., sofas or tables) that do not qualify for populating the lamp marker will be removed from display. A user selection of a virtual furnishing unit in the first plurality of virtual furnishing units is received, and responsive thereto there is displayed a three-dimensional graphic of the selected virtual furnishing unit at the different designated set of coordinates within the respective scene. In this way, the respective scene is populated with a first plurality of three-dimensional graphics, where each respective three-dimensional graphic in the first plurality of three-dimensional graphics is displayed at the corresponding designated set of coordinates of the corresponding marker within the respective scene.

The first user is enabled to submit the respective scene with the first plurality of graphics when a first completion criterion associated with the first challenge has been satisfied. The first completion criterion specifies (i) which corresponding markers within the respective scene must be populated and (ii) a first amount, in units of a first application counter, required to submit the respective scene.

Responsive to submitting the respective scene with the first plurality of three-dimensional graphics, the user selection of virtual furnishing units for the first challenge is communicated to a remote server. In some embodiments, the scene and the three-dimensional graphics are not communicated in this submission. Rather, the respective scene with the first plurality of three-dimensional graphics is submitted by communicating the virtual furnishing unit selection, if any, for each marker in the plurality of markers associated with the challenge. Further, as a reward for successfully completing and submitting the challenge to the remote server, the first user is provided with a second amount in units of a second application counter.

There is received, from the remote server, a first community vote on the submitted respective scene with the first plurality of three-dimensional graphics (user selection of virtual furnishing units for the first challenge) by the first user. The first user is notified of the first community vote on the user selection of virtual furnishing units for the first challenge.

In some embodiments, the method further comprises, prior to submission of the respective scene with the first plurality of graphics when the first completion criterion associated with the first challenge has been satisfied: receiving a deletion selection of a first three-dimensional graphic in the first plurality of three-dimensional graphics displayed in the respective scene and responsive to the deletion selection of the first three-dimensional graphic, removing the first three-dimensional graphic from the first plurality of three-dimensional graphics.

In some embodiments, the method further comprises, prior to submission of the respective scene with the first plurality of graphics when the first completion criterion associated with the first challenge has been satisfied: receiving a change selection of a first three-dimensional graphic in the first plurality of three-dimensional graphics displayed in the respective scene, and responsive to the change selection of the first three-dimensional graphic: removing the first three-dimensional graphic from the first plurality of three-dimensional graphics, displaying a plurality of virtual furnishing units corresponding to a first marker associated with the first three-dimensional graphic comprising (i) one or more first virtual furnishing units retained by the first user that match the type of the first marker and (ii) one or more second virtual furnishing units not retained by the first user that match the type of the first marker, receiving a user selection of a selected virtual furnishing unit in the plurality of virtual furnishing units, and displaying a three-dimensional graphic of the selected virtual furnishing unit at the different designated set of coordinates within the respective scene corresponding to the first marker.

In some embodiments, each respective marker in the first plurality of markers is in the form of a closed form shape (e.g., colored circle) that is overlaid on the respective scene at the corresponding different designated set of coordinates within the respective scene, and each respective marker in the first plurality of markers includes a generalized depiction of the type (e.g., single seat seating, multiple seats seating, bed, entertainment center, table, storage furniture, mirror, rug, lamp, wall décor, and home accent, etc.) of the respective marker.

In some embodiments, the first user has a first balance of the first application counter, a second balance of the second application counter, and a third balance of a third application counter, and each virtual furnishing unit in the one or more second virtual furnishing units not retained by the first user is associated with a cost in in units of the second application counter or the third application counter. In some such embodiments, the receiving the user selection of the selected virtual furnishing unit in the first plurality of virtual furnishing units in the first procedure comprises debiting the cost in units of the second application counter or the third application counter against the respective second or third balance when the selected virtual furnishing unit is in the one or more second virtual furnishing units. In some embodiments, the first user is barred from choosing the selected virtual furnishing unit in the one or more second virtual furnishing units when the first user has an insufficient respective second or third balance to pay for the selected virtual furnishing unit. In alternative embodiments, the user is notifying that the application is unable to display the three-dimensional graphic of the selected virtual furnishing unit within the respective scene when the first user has an insufficient respective second or third balance to pay for the selected virtual furnishing unit in the one or more second virtual furnishing units.

In some embodiments, the receiving the user selection of the selected virtual furnishing unit in the first plurality of virtual furnishing units in the first procedure comprises displaying a price tag on the three-dimensional graphic of the selected virtual furnishing unit when the selected virtual furnishing unit is in the one or more second virtual furnishing units, and when the selected virtual furnishing unit is purchased by the first user, (i) the cost in units of the second application counter or the third application counter is debited against the respective second or third balance and (ii) the price tag is removed. In such embodiments, the first user is barred from purchasing the selected virtual furnishing unit in the one or more second virtual furnishing units when the first user has an insufficient respective second or third balance to pay for the selected virtual furnishing unit.

In some embodiments, the first community vote on the user selection of virtual furnishing units for the first challenge is from a plurality of users that each makes one to one comparisons of (i) the user selection of virtual furnishing units for the first challenge by the first user and (ii) the user selection of virtual furnishing units for the first challenge from a user other than the first user. In some embodiments, each vote by a user counts as a single vote. Accordingly, if 100 users vote for the submitted scene of a first user, and 50 users vote for the submitted scene of a second user, in a given challenge, the first user will have a first community vote of 100 and the second user will have a community vote of 50 for the given challenge, in typical embodiments.

In some embodiments, the method further comprises awarding the first user a prize (e.g., an amount of a third application counter or a virtual furnishing unit, etc.) when the first community vote on the submitted respective scene (user selection of virtual furnishing units for the first challenge by the first user) exceeds a threshold value. For instance, in some such embodiments, the first community vote on the user selection of virtual furnishing units for the first challenge by the first user exceeds the threshold value when the first community vote is larger than a vote received by any other user that participated in the first challenge.

In some embodiments, a first subset of the first plurality of markers must be populated with a virtual furnishing unit in order to satisfy the completion criterion of the first challenge, a second subset of the first plurality of markers do not need to be populated with a virtual furnishing unit in order to satisfy the completion criterion of the first challenge, each respective marker in the first subset of markers is in the form of a first closed form shape (e.g., a balloon of a first color) that is overlaid on the respective scene at the corresponding different designated set of coordinates within the respective scene, and each respective marker in the second subset of markers is in the form of a second closed form shape (e.g., a balloon of a second color that is other than the first color) that is overlaid on the respective scene at the corresponding different designated set of coordinates within the respective scene.

In some embodiments, the first challenge has one or more constraints on the virtual furnishing units that can be used. In some such embodiments, the method further comprises displaying each of the one or more constraints within the application. Upon first user selection of a first constraint in the one or more constraints, there is highlighted within the image of the respective scene the first marker that is associated with the first constraint. A plurality of virtual furnishing units corresponding to the first marker that satisfy the first constraint are then displayed. In some embodiments, each virtual furnishing unit in the first plurality of virtual furnishing units corresponds to a furnishing unit from a vendor in a plurality of vendors and the constraint is a requirement that at least one virtual furnishing unit used in the first challenge correspond to a furnishing unit from a first predetermined vendor in the plurality of vendors. In some embodiments, each virtual furnishing unit in the first plurality of virtual furnishing units corresponds to a furnishing unit from a vendor in a plurality of vendors and the constraint is a requirement that at least two virtual furnishing units used in the first challenge correspond to furnishing units from a first predetermined vendor in the plurality of vendors. In some embodiments, each virtual furnishing unit in the first plurality of virtual furnishing units is associated with a décor type (e.g., a predetermined color, a predetermined style, or a requirement that a virtual furnishing unit in the first plurality of virtual furnishing units corresponds to a furnishing unit of a predetermined brand) and the constraint is a requirement that at least one virtual furnishing unit used in the first challenge be of a first décor type in the plurality of décor types.

In some embodiments, the second amount of the second application counter that is awarded to the first user is dependent upon a level of difficulty of the first challenge.

In some embodiments, each user that contributes to the first community vote receives credit toward an allocation in units of the first application counter.

In some embodiments, the application is run over a plurality of epics (e.g., each epic being a twelve-hour period, one day, two days, or a week, etc.). A subset of the first plurality of challenges is constrained to a first epic in the plurality of epics, and during a second epic in the plurality of epics the first user is provided with a second plurality of affordances, each affordance in the second plurality of affordances corresponding to a different respective challenge in a second plurality of challenges. One or more challenges in the second plurality of challenges is not found in the first plurality of challenges. Each challenge in the second plurality of challenges comprises: (i) an image of a respective scene and (ii) a second plurality of markers, each marker having different designated set of coordinates within the respective scene and corresponding to a type within a plurality of types. Responsive to selection of a first affordance in the second plurality of affordances, the image of the respective scene and the second plurality of markers of a first challenge in the second plurality of challenges that corresponds to the first affordance is displayed. For each sequential user selection of a respective marker in the second plurality of markers of the challenge corresponding to the first affordance in a second plurality of user selections, a second procedure is performed. The second procedure comprises displaying a second plurality of virtual furnishing units corresponding to the respective marker comprising (i) one or more first virtual furnishing units retained by the first user that match the type of the respective marker and (ii) one or more second virtual furnishing units not retained by the first user that match the type of the respective marker. The displaying further comprises removing from display any virtual furnishing units that do not qualify for populating the respective marker.

In some embodiments, the second procedure further comprises, in response to receiving a user selection of a selected virtual furnishing units in the second plurality of virtual furnishing units, a three-dimensional graphic of the selected virtual furnishing unit is displayed at the different designated set of coordinates within the respective scene, thereby populating the respective scene with a second plurality of three-dimensional graphics, each respective three-dimensional graphic in the second plurality of three-dimensional graphics at a corresponding designated set of coordinates within the respective scene specified by the different designated set of coordinates within the respective scene of the corresponding marker. In some embodiments, the method further comprises, the first user is enabled to submit the respective scene with the second plurality of graphics when a second completion criterion associated with the second challenge has been satisfied. The second completion criterion specifies (i) which corresponding designated sets of coordinates within the respective scene must be populated and (ii) a second amount, in units of the first application counter, required to submit the respective scene. Responsive to submitting the respective scene with the second plurality of graphics, the user selection of virtual furnishing units for the second challenge is communicated to the remote server and the first user is provided with a third amount in units of the second application counter. In the method, there is received from the remote server a second community vote on the user selection of virtual furnishing units for the second challenge by the first user and the first user is notified of the second community vote on the user selection of virtual furnishing units for the second challenge.

In some such embodiments, the method further comprises, prior to submission of the respective scene with the second plurality of graphics when a second completion criterion associated with the second challenge has been satisfied, receiving a deletion selection of a first three-dimensional graphic in the second plurality of three-dimensional graphics displayed in the respective scene, and responsive to the deletion selection of the first three-dimensional graphic: removing the first three-dimensional graphic from the second plurality of three-dimensional graphics, and crediting the cost in units of the second application counter or the third application counter towards the respective second or third balance when the virtual furnishing unit corresponding to the first three-dimensional graphic is in the one or more second virtual furnishing units.

In some such embodiments, the method further comprises, prior to submission of the respective scene with the second plurality of graphics when a second completion criterion associated with the second challenge has been satisfied, receiving a change selection of a first three-dimensional graphic in the second plurality of three-dimensional graphics displayed in the respective scene and responsive to the change selection of the first three-dimensional graphic: removing the first three-dimensional graphic from the second plurality of three-dimensional graphics, crediting the cost in units of the second application counter or the third application counter towards the respective second or third balance when the virtual furnishing unit corresponding to the first three-dimensional graphic is in the one or more second virtual furnishing units, displaying a plurality of virtual furnishing units corresponding to a first marker associated with the first three-dimensional graphic comprising (i) one or more first virtual furnishing units retained by the first user that match the type of the first marker and (ii) one or more second virtual furnishing units not retained by the first user that match the type of the first marker, receiving a user selection of a selected virtual furnishing unit in the plurality of virtual furnishing units, and displaying a three-dimensional graphic of the selected virtual furnishing unit at the different designated set of coordinates within the respective scene corresponding to the first marker.

In some embodiments, the application is run over a plurality of epics (e.g., each epic being a twelve-hour period, one day, two days, or a week) and each epic in the plurality of epics consists of a different plurality of challenges.

In some embodiments, the method further comprises receiving a voting request from the first user, and concurrently displaying on the display (i) a first image comprising a candidate scene populated with a first set of three-dimensional graphics at corresponding designated sets of coordinates within the candidate scene that has been submitted by a second user in a plurality of users other than the first user, and (ii) a second image comprising the candidate scene populated with a second set of three-dimensional graphics at corresponding designated sets of coordinates within the candidate scene that has been submitted by a third user in the plurality of users other than the first user and the second user. A selection by the first user is received of the first image or the second image thereby receiving from the first user a vote for the second user or the third user. Responsive to the vote for the second user or the third user by the first user, the first user is provided with credit towards an amount in units of the first application counter.

In some embodiments, the method further comprises, in response to receiving a request to purchase application credit from the first user, providing the first user with an option to purchase an amount in units of a third application counter, in which the first user provides a government backed tender in exchange for the amount in units of the third application counter.

In some embodiments, the application is run over a plurality of epics (e.g., each epic is a twelve-hour period, one day, two days, or a week) and the first plurality of challenges is constrained to a first epic in the plurality of epics. In some such embodiments, the first user is allocated an allowance of the first application counter during each epic in the plurality of epics. Additionally, or alternatively, the first user is allocated an allowance of a third application counter during each epic in the plurality of epics In some embodiments, the first application counter, the second application counter, and the third application counter are exchangeable (e.g., interchangeable). For example, an amount in units of the third application counter is exchangeable by the first user within the application for a corresponding amount in units of the first application counter, an amount in units of the third application counter is exchangeable by the first user within the application for a corresponding amount in units of the second application counter, the first application counter is not exchangeable by the first user within the application for the third application counter, and the second application counter is not exchangeable by the first user within the application for the third application counter.

In some embodiments, a star score is uniquely associated with the first user, and the star score is determined, in part, by the first community vote on the user selection of virtual furnishing units for the first challenge by the first user (submitted respective scene for the first challenge by the first user). In some such embodiments, the method further comprises displaying the star score within the application on the display.

In some embodiments, a design value is uniquely associated with the first user, and the design value is determined, in part, by a value of each virtual furnishing unit in the respective scene submitted by the first user in the first challenge.

In some embodiments, each respective challenge in the first plurality of challenges further comprises a countdown clock showing an amount of time remaining for the respective challenge to be completed by the first user within the application. In some embodiments, a first amount of time remaining for the first challenge to be completed by the first user within the application is different than a second amount of time remaining for a second challenge in the plurality of challenges to be completed by the first user within the application. In some such embodiments, the first amount of time is one day, the first challenge is free of constraints, and the second amount of time is two days.

In some embodiments, the one or more challenges is a plurality of challenges and a first subset of the plurality of challenges is available to the first user for user selection, a second subset of the plurality of challenges is closed and no longer available to the first user for user selection, and a third subset of the plurality of challenges is closed and no longer available to the first user for user selection. In such embodiments, each challenge in the second subset of the plurality of challenges is presently being voted on by a community of users. In such embodiments, each challenge in the third subset of the plurality of challenges has been voted on by a community of users.

In some embodiments, the method further comprises providing a filter against the first plurality of virtual furnishing units corresponding to the respective marker within the first procedure thereby limiting a number of virtual furnishing units in the first plurality of the virtual furnishing units that are displayed upon user selection of the filter. In some embodiments, the filter comprises any combination of a limitation on brand of the virtual furnishing unit, a limitation on color of the virtual furnishing unit, a limitation on material represented by the virtual furnishing unit, a limitation on pattern used by the virtual furnishing unit, or a limitation on the style of the virtual unit. In some embodiments, the filter comprises a limitation on the color of the virtual furnishing unit and wherein the limitation on color is any combination of beige, black, blue, brown, clear, copper, dark grey, gold, green, grey, light grey, lime, metallic, mint, mirror, multi, navy, off white, orange, pink, purple, red, silver, tan, turquoise, white, and yellow. In some embodiments, the filter comprises a limitation on the material represented by the virtual furnishing unit and wherein the limitation on material is any combination of acrylic, bone, burl, ceramic, concrete, cork, fabric, fiberglass, furry, glass, hide, lacquer, leather, marble, metal, natural, poly, rattan, shell, silk, skin, stone, velvet, wire, wood, and wool. In some embodiments, the filter comprises a limitation on the pattern used by the virtual furnishing unit and wherein the limitation on pattern is any combination of animal print antique, Chevron, Chinoiserie, Damask, distressed, floral, geometric, houndstooth, ikat, motif, nailhead, patchwork, plaid, quatrefoil, striped, toile, tufted, wash, and weathered. In some embodiments, the filter comprises a limitation on the style of the virtual unit and wherein the style limitation is any combination of coastal, contemporary, French, global, industrial, kids, luxury, modern, outdoor, renaissance, rustic, and traditional.

In some embodiments, the method further comprises providing within the application a toggle affordance, where upon successive user selection of the toggle affordance the first plurality of markers of the first challenge is toggled between (i) a first state in which the first plurality of markers of the first challenge are displayed in the respective scene and (ii) a second state in which the first plurality of markers of the first challenge are not displayed in the respective scene.

In some embodiments, the method further comprises providing the first user with an affordance that allows the first user to invite one or more friends. For example, the affordance allows the first user to link the application with one or more social media accounts of the first user, and to invite one or more friends through the first user's social media accounts. The application identifies, from the first user's social media accounts, a list of friends who are current users of the application, and sends invitations to the one or more friends to join in the first user's challenge and provide virtual furnishing units for loan to the first user. In some such embodiments the first plurality of virtual furnishing units further comprises one or more third virtual furnishing units that are not retained by the first user but are retained by a friend in the one or more friends, where the one or more third virtual furnishing units match the type of the respective marker. The first user is enabled to select the one or more third virtual furnishing units that are retained by the friend, for use in the challenge (e.g., "borrow" the one or more third virtual furnishing units from the friend).

In another example, the affordance described above allows the first user to link the application with one or more E-mail address provided by the first user, and to invite one or more friends through these E-mail address provided by the user.

In some embodiments, the display is a touch-sensitive surface and the selection of the first affordance is detected by the application using a gesture recognizer responsive to a touch of the touch-sensitive surface by the first user.

In some embodiments, the one or more challenges includes a series challenge. A series challenge comprises a set of challenges (e.g., a set of three, five, or seven challenges) that are linked to each other (e.g., by having a common theme). In some embodiments, only one challenge in the series challenge is available to the user each time. For example, a second challenge in the series challenge is available to the user only after the user has completed the first challenge in the series challenge. Responsive to meeting the completion criterion associated with the series challenge, the user is awarded an item (e.g., in units of an application counter or a virtual furnishing unit).

In some embodiments, the first user can revisit previously completed challenges that have been submitted for voting by the first community. In some embodiments, affordances are provided that enable a first user to edit the images of the previously completed challenges (e.g., by changing an effect on the image, such as changing a color, brightness, flare of the image), and to create a virtual scrap book comprising images (e.g., edited images) of previously completed challenges. Furthermore, in some embodiments, affordances (e.g., links to external vendors) are provided that facilitate the creation of a tangible book based on the first user's previously completed challenges.

In some embodiments, "real" data is integrated by offering virtual furnishing units that are renditions of actual (e.g., real) furnishing units provided by third-party licensed vendors/manufacturers. In some embodiments, the application provides affordances that allow a first user to visit the online stores of the third-party providers to purchase the actual (e.g., real) furnishing units, for example by enabling the user to access the websites of the third-party licensed vendors/manufacturers. In some embodiments, the stores of the third-party vendors/manufacturers are located within the application, thereby allowing a first user to purchase a real furnishing unit within the application. Thus, in addition to providing systems and methods for competitive scene analysis, the application also interactively provides third-party (furnishing) providers with marketing opportunities for effective and increased customer reach and awareness.

In some embodiments, the application provides a fourth application counter in the form of virtual style cards. Essentially, different types of furnishing units have different styles, e.g., modern, Traditional English, $18^{th}$ Century English furniture style, and the like. In some embodiments, the way to earn those cards is initially unknown to a first user, and as the first user pieces together a particular style—either by random or by knowing about the style—the user is able to collect a style card. In some implementations, when a certain amount (e.g., a number and/or types) of style cards are collected, the first user is able to gain additional rewards based on a set of style cards. For example, when the first user collects a set of five style cards associated with the modern furnishing style, the first user may be able to earn a rare piece of virtual furnishing unit that could be used in the future. Thus, virtual style cards are a type of tool to get users to learn about particular styles, and how the different pieces fit together to form a particular style. Virtual style cards are also a type of reward. In particular, a user is awarded a virtual style card for a particular style for which the user has demonstrated proficiency. In some embodiments, the first user is able to piece together a particular style by using furnishing units with the same style in the same scene.

In some embodiments, affordances to associate (e.g., tag) users as having demonstrated proficiency at particular design styles are further provided. For example, a first user may register himself as an expert at particular design styles. Likewise, a first user can let other users know that the first user is an expert in a different design/style (e.g., by tagging the first user in the application). Accordingly, the application also functions as a resource for users to locate and connect with experts of interior decorating for particular furnishing styles/designs, and to engage them both within the application and in real life settings. As noted earlier, the virtual furnishing units are three-dimensional graphical renditions of actual (e.g., real and commercially available) furnishing units provided by third-party licensed vendors/manufacturers.

In some embodiments, the client device of a first user is used to capture the background (e.g., the environment) of the user. In some such embodiments, the background is a live picture captured using a camera on the client device. In some such embodiments, the background is a picture that is found on the client device. The first user may then select a virtual furnishing unit that they already own or are interested in owning, and project (e.g., augments) the virtual furnishing unit over the background, to visualize how the virtual furnishing unit looks in the environment. Thus, the augmented reality capability increases potential realism by enabling a user to visualize how the real furnishing items will look and fit in the environment of the user, before a user commits to purchasing the item.

In some embodiments, the application further includes premises-related challenges having respective completion criteria. In short, a first user may design (e.g., decorate) an entire premise (e.g., house) that includes two or more rooms with a plurality of virtual furnishing units and invite one or more friends to visit their premise. The invited users may be enabled to decorate the premises of the first user as well. In some embodiments, the premise initially starts with a single room unlocked and then, as the first user progresses in the premises-related challenges, additional rooms are unlocked, each unlocking process is associated with respective challenges and including respective completion criteria. In some embodiments, the premise is displayed a blueprint (e.g., a layout or a floor plan) that provides an overall view of the premise and allows the first user to navigate the rooms within the premises using the blueprint.

In some embodiments, after completing one or more premises-related challenges, the user is enabled to submit the premise including the respective room scenes and the associated virtual furnishing units to a remote server, for voting by a community of users. Responsive to submitting the premise including the respective room scenes and associated virtual furnishing units for voting, the user is provided with an amount in units of an application counter.

In some embodiments, the premise can be expanded as the design level of the user increases. For example, when the user has collected a threshold amount of virtual furnishing units, completed a certain number of premises-related challenges, or when their premise has (e.g., contains) a threshold level of furnishing units, the user is provided with house expansion options, which may include adding a second floor, or adding an additional wing to the house (e.g., a porch area or a backyard). In other embodiments, the user can further expand on an existing premise, or earn (acquire) more premises.

In some embodiments, the premise is a house. In other embodiments, the premises are licensed images and scenes associated with well-known landmark locations such as the West Wing of the White House, Buckingham Palace, Hearst Castle and the Winchester Mystery House.

Furthermore, in some embodiments, after populating a room scene with virtual furnishing units, the first user is enabled to decorate small details of the premise with virtual accessory units, a process known as "micro-decorating." For example, the first user may micro-decorate a premise by adding kitchen appliances on the kitchen counter and placing picture frames in the hallways of rooms that have been populated with virtual furnishing units. Specifically, the user may be offered a zoomed-in view of a particular virtual furnishing unit (e.g., the kitchen counter) that they have selected, and then place virtual accessory units on the particular virtual furnishing units.

In some embodiments, the application determines (e.g., calculates) a level of the premise. The level of the premise is determined in part by the total value of the virtual furnishing units with which the premise is populated, and increases with the quantity (and amount) of virtual furnishing units. In some embodiments, when the value of the virtual furnishing units increases to a certain level, then the premise goes up a level, enabling the user to gain additional rewards.

In some embodiments, the first user is enabled to invite their friends, or people on their contacts' list, to visit their premise. Responsive to the invitation to visit, the first user receives gifts (e.g., housewarming gifts) from their friends, in the form of units of respective application counters and/or virtual furnishing units, thus increasing the value of the premise. In some implementations, the gifts are virtual accessory units. In such instances, the application may provide additional affordances to enable friends of the user to decorate the premises of the user with the virtual accessory gifts.

In some embodiments, the application enables a community of premises to be established. Essentially, a community of premises comprises a guild/neighborhood (e.g., a gated community) of premises formed by a first user and a plurality of other users. In some embodiments, the community includes a total of between 20 and 30 premises. In some embodiments, the community may participate in community-related challenges.

In some embodiments, the community has a first community level. The community advances to higher levels by engaging in (e.g., completing) community-related challenges, such as designing a common area, or improving a landscape of the community. In some embodiments, the community may compete with other communities on premises-related and/or community-related challenges, to see who can decorate the houses and the communities better. In some embodiments, a community organizes "open house" events that encourage users to visit the community (including the houses and common areas of the community). In some embodiments, as part of the open house event, the community receives gifts from the visitors, in the form of an application counter, furnishing units and/or real world promotions.

In one aspect, some embodiments include a method for competitive scene completion. The method is performed at a client device comprising a camera, a display, one or more processors and memory, in an application running on the client device associated with a user. The method comprises providing the user with an affordance corresponding to a challenge, where the challenge is associated with a scene (such as a corner of a room in the user's premises, in the backyard, in a garden, etc.) obtained by activation of the camera and includes a completion criterion (e.g., place up to two items). Further in the method, responsive to selection of the affordance: (a) the scene obtained by the camera is displayed, (b) a plurality of virtual furnishing units overlaid on (e.g., superimposed over) the scene is displayed; (c) a selection of a first virtual furnishing unit in the plurality of virtual furnishing units is received; and (d) a selection of a first location (e.g., on a countertop, on a table, on the floor) in the scene is received. Further in the method, responsive to the selection of the first location, a three-dimensional graphic of the first virtual furnishing unit (e.g., a three-dimensional rendering of a real furnishing unit) is displayed at the first location, thereby populating the first location of the scene with the first virtual furnishing unit. When the completion criterion associated with the challenge is satisfied the method provides for capturing an image of the scene including the three-dimensional graphic of the first virtual furnishing unit populating the first location of the scene and, responsive to the capturing, providing the user with a first amount in units of an application counter. In some implementations, the camera includes one or more (optical) image sensors having a field of view and being configured to capture (live) images and (live) video within the field of view.

In another aspect, some implementations include a method for competitive scene completion. The method is performed at a client device comprising a display, one or more processors and memory, in an application running on the client device associated with a first user. The method comprises providing a first user with one or more affordances, each affordance in the one or more affordances corresponding to a different respective challenge in a set of one or more challenges, each challenge in the set of one or more challenges comprising: (i) an image of a respective scene and (ii) an independent first plurality of markers, each marker in the independent first plurality of markers having a different designated set of coordinates within the respective scene and corresponding to a type within a plurality of types. In the method, responsive to selection of a first affordance in the one or more affordances, the image of the respective scene and the first plurality of markers of a first challenge in the one or more challenges that corresponds to the first affordance is displayed. Further in the method, for each sequential user selection in a first plurality of user selections, of a respective marker in the first plurality of markers, of the challenge corresponding to the first affordance, a procedure is performed. The procedure comprises: (a) displaying a first plurality of virtual furnishing units corresponding to the respective marker, (b) receiving a user selection of a selected virtual furnishing unit in the first plurality of virtual furnishing units; and (c) displaying a three-dimensional graphic of the selected virtual furnishing unit at the different designated set of coordinates within the respective scene, thereby populating the respective scene with a first plurality of three-dimensional graphics, each respective three-dimensional graphic in the first plurality of three-dimensional graphics at the corresponding designated set of coordinates within the respective scene specified by the different designated set of coordinates within the respective scene of the corresponding marker. Further in the method, responsive to the first plurality of user selections of the virtual furnishing units, there is identified a first furnishing style associated with the virtual furnishing units. Further, there is provided (e.g., awarded, offered to) the first user a first unit of a virtual currency. In some embodiments, the identifying a first furnishing style associated with the virtual furnishing units comprises using a nearest neighbor algorithm (or other form of classifier) against a search space that is defined by (i) a first location within the scene identified by the first user (e.g., using the coordinates of the scene) and (ii) furnishing styles that other users have selected for the first location or locations within the vicinity of the first location. In some embodiments, the virtual currency is in the form of a first application counter, a second application counter, a third application counter, or a fourth application counter. In some implementations, the fourth application counter is in the form of a virtual style card.

In another aspect, some implementations include a method for competitive scene completion. The method is performed at a client device comprising a display, one or more processors and memory, in an application running on the client device associated with a first user. The method comprises providing the first user with a first plurality of affordances. Responsive to selection of a first affordance in the first plurality of affordances, there is displayed one or more images (e.g., as thumbnails), each of the one or more images corresponding to a scene of a previous challenge completed by the first user and including a plurality of virtual furnishing units that was used to complete the previous challenge. Responsive to selection of a first image of the one or more images, there is concurrently displayed (e.g., in the same view of the display) (i) a magnified view of the first image including a first plurality of virtual furnishing units that was used to complete the challenge and (ii) an image for each virtual furnishing unit in the first plurality of virtual furnishing units. In some implementations, each of the first plurality of affordances is an icon displayed at a predefined area of the application. In some embodiments, the image of each virtual furnishing unit is displayed as a thumbnail, the images of the virtual furnishing units are displayed in a layout view, having the form of a table and including rows and columns, with each image occupying a cell in the table.

In yet another aspect, some implementations include a method for competitive scene completion. The method is performed at a client device comprising a display, one or more processors and memory, in an application running on the client device associated with a first user. The method comprises providing the first user with an affordance corresponding to a challenge associated with a premises (e.g., a house or a building), the premises including a plurality of rooms. Responsive to selection of the affordance: (a) there is displayed a layout of the premises including the plurality of rooms and relationships between the plurality of rooms, (b) a selection of a first room of the plurality of rooms in the layout is received, and (c) responsive to the selection of the first room, an image corresponding to a first room scene of the first room is displayed. In some implementations, the challenge comprises decorating the premises with a plurality of virtual furnishing units. In some implementations, the plurality of rooms is a predetermined number and of a predetermined type (e.g., each of a living room, a kitchen, and a bedroom is a type of room). In some embodiments, the layout is also referred to as the first mode of display of the application. The layout comprises a blueprint showing a floor plan (or a plan view) of the premise including the plurality of rooms, the relative location of each of the plurality of rooms, relationships between the plurality of rooms, and the walls separating the rooms. The dimensions of the rooms in the layout are drawn to scale. In some embodiments, the premises has multiple stories and the layout details one such story. In some embodiments, the image of the room scene is also referred to as the second mode of display of the application. The image of the room scene includes a three-dimensional perspective/presentation/image of the first room.

In yet another aspect, some embodiments include a method for forming a first community performed at a client device comprising a display, one or more processors and memory, in an application running on the client device associated with a first user. The method comprises receiving selection of a plurality of other users associated with the first user, where each of the plurality of other users is associated with a respective other client device, the application running on the respective client device (e.g., each of the plurality of other users is a respective user of the application). The method further comprises sending to (the application on) each other client device an invitation (e.g., to participate in a challenge) to form a first community. The method further comprises receiving affirmative responses from at least a subset of the plurality of other users. Responsive to the received responses, the method creates the first community and associates the first user and the other users that each provided an affirmative response with the first community.

In yet another aspect, some implementations include a computing system comprising a display, one or more processors, and memory coupled to the one or more processors, the memory storing one or more programs configured to be executed by the one or more processors, the one or more programs singularly or collectively comprising instructions for running an application on the computing device for performing any of the methods described herein.

In yet another aspect, some implementations include a non-transitory computer-readable storage medium storing one or more programs in a computing device, the computing device comprising a display, one or more processors, and memory storing the one or more programs for execution by the one or more processors, the one or more programs singularly or collectively comprising instructions for running an application on the computing device for performing any of the methods described herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 5A, 5B, 5C, 5D, 5E, 5F, 5G, 5H, 5I, and 5J collectively provide a flowchart of processes and features of systems and methods for competitive scene completion in an application in accordance with some implementations of the present disclosure. In these figures, elements in dashed boxes are optional.

FIG. 7 is a screen image showing the receiving of a user selection of a selected virtual furnishing unit in a first plurality of virtual furnishing units and displaying a three-dimensional graphic of the selected virtual furnishing unit at the different designated set of coordinates within the respective scene, in accordance with some implementations of the present disclosure.

FIG. 28 is a screen image that is displayed in response to receiving of a user selection of one of the plurality of images of FIG. 27, in accordance with some implementations of the present disclosure.

FIG. 30 is a screen image displaying a user's inventory of virtual furnishing units, in accordance with some implementations of the present disclosure.

Like reference numerals refer to corresponding parts throughout the several views of the drawings.

DETAILED DESCRIPTION

Figure 6:
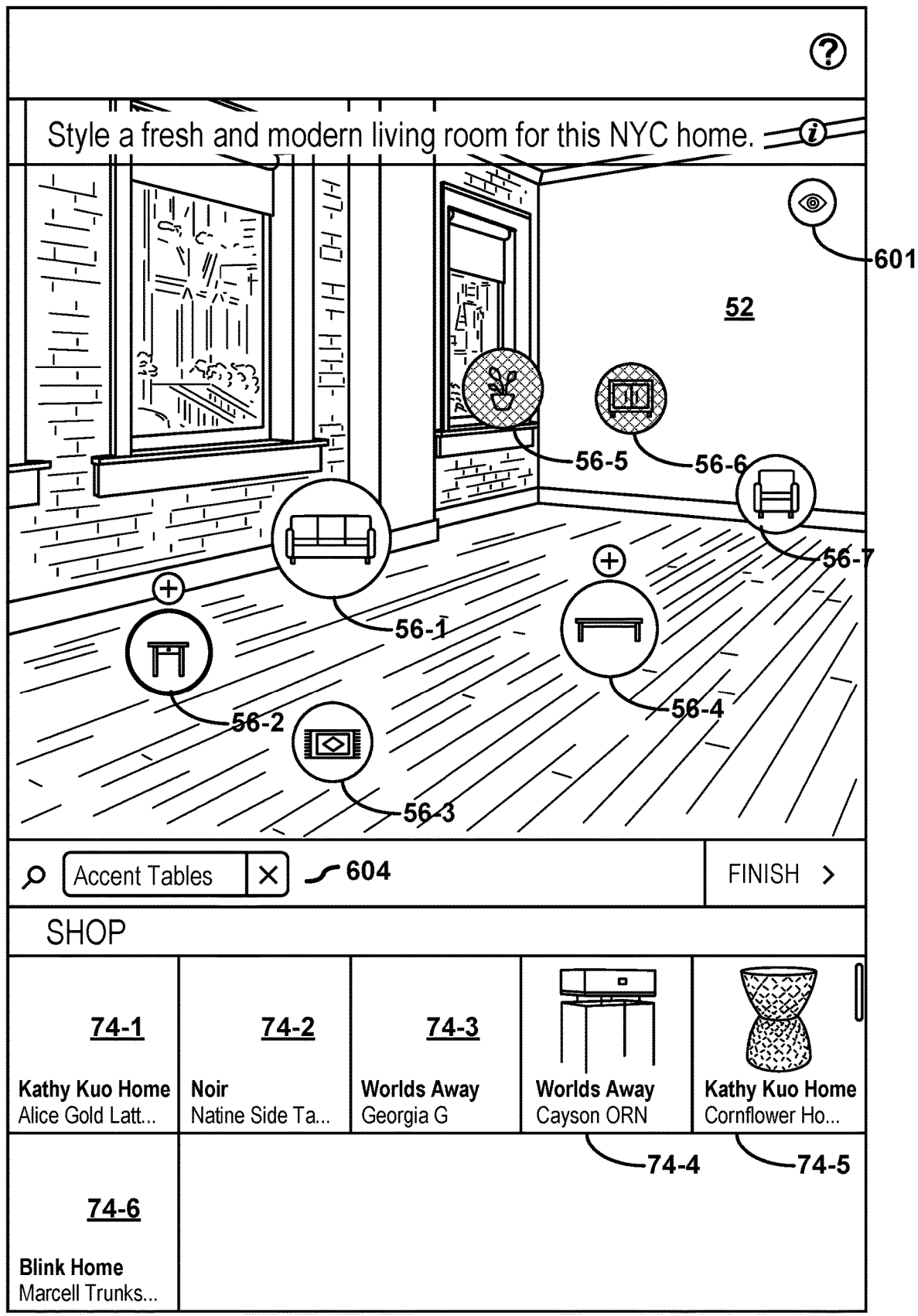
FIG. 6 is a screen image showing, responsive to user selection of a first affordance in the first plurality of affordances, the display of an image of a respective scene and a first plurality of markers of a first challenge in a first plurality of challenges that corresponds to the first affordance, in accordance with some implementations of the present disclosure.
Figure 8:
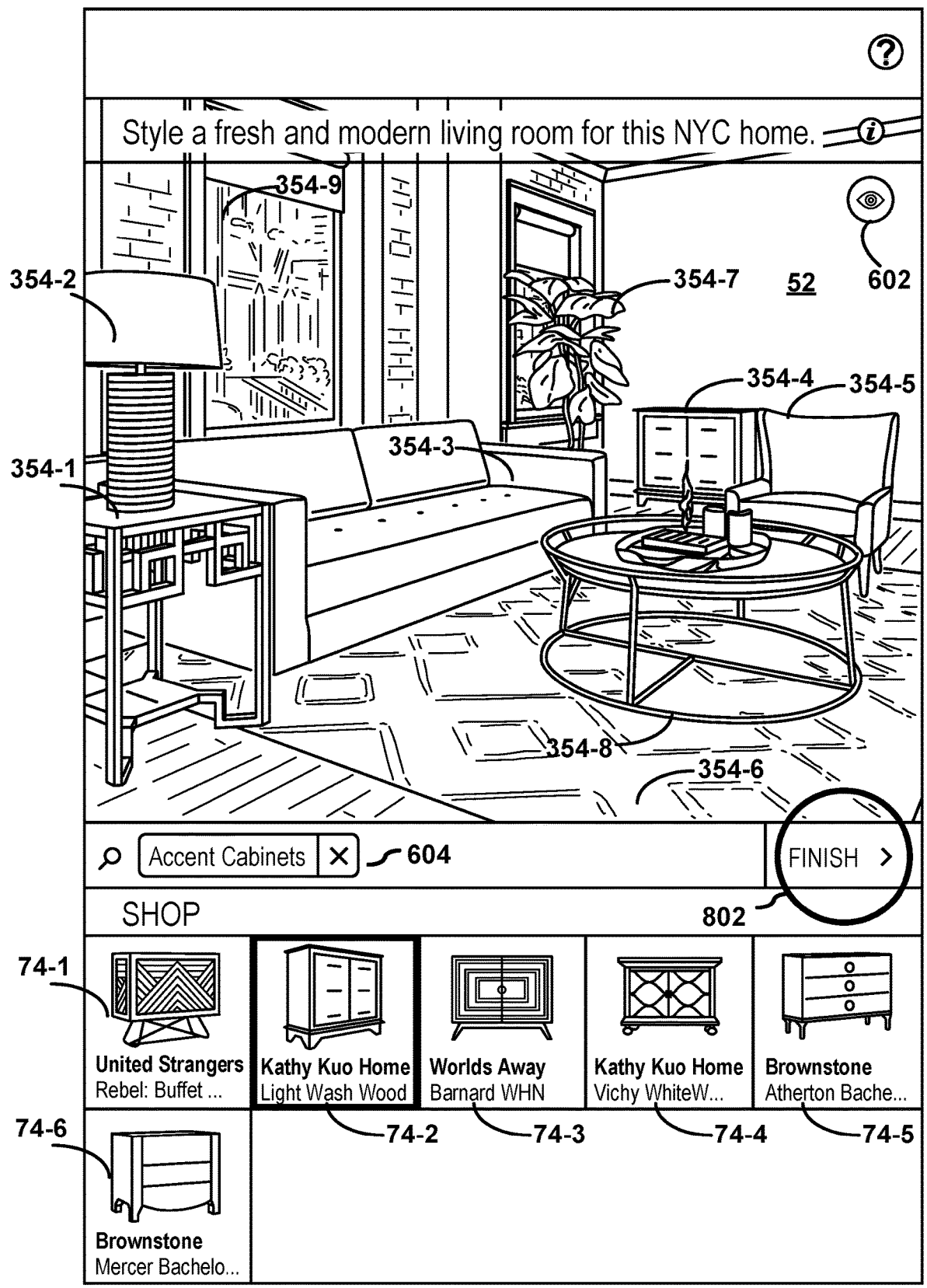
FIG. 8 is a screen image showing user selection of additional virtual furnishing units for additional markers in a plurality of markers and displaying the three-dimensional graphics corresponding to the selected virtual furnishing units at the different designated sets of coordinates of the additional markers within the scene in accordance with some implementations of the present disclosure.
Figure 9:
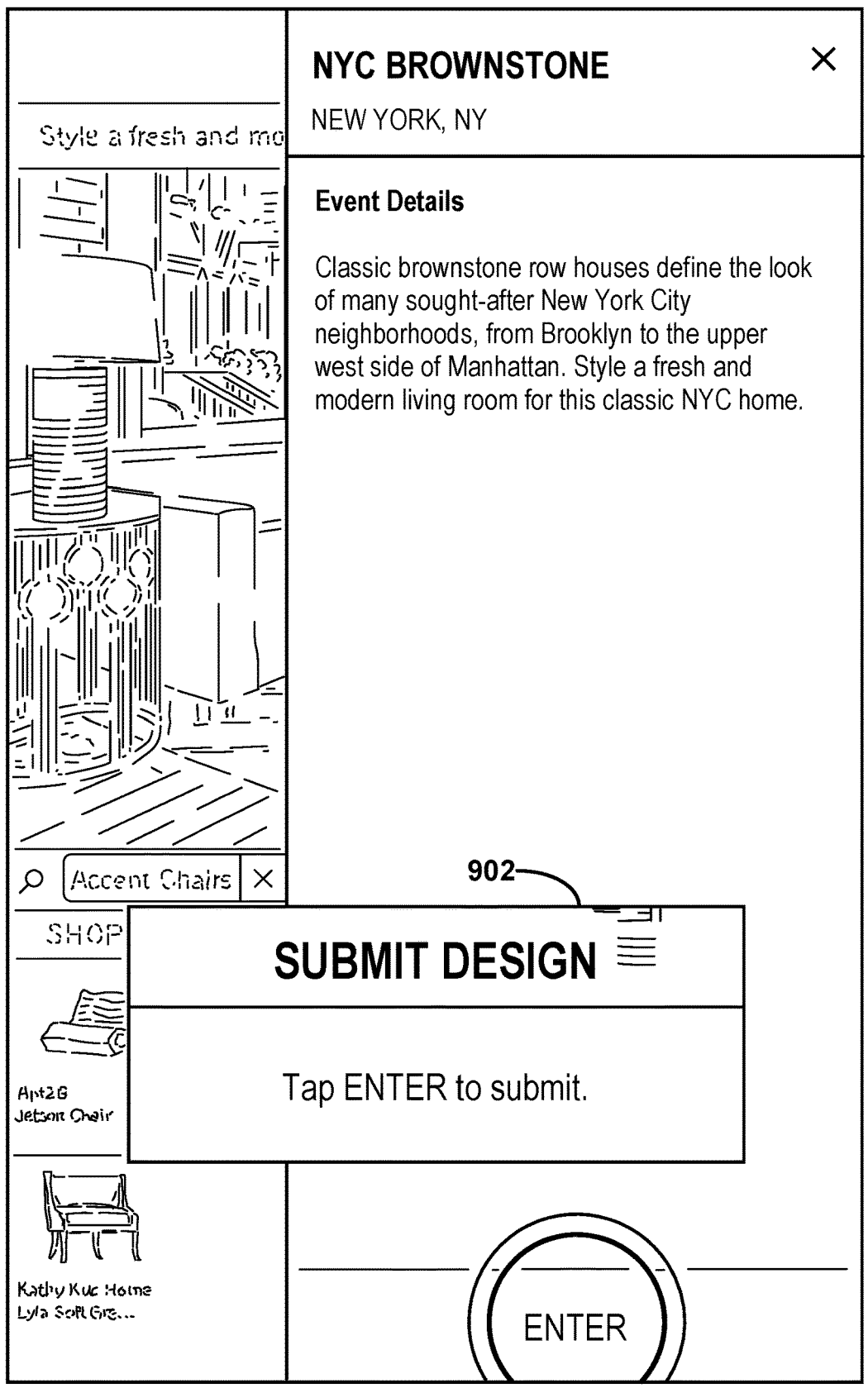
FIG. 9 is a screen image showing an application that enables a user to submit a scene with selected three-dimensional graphics within the scene when a first completion criterion associated with a challenge that includes the scene has been satisfied in accordance with some implementations of the present disclosure.
Figure 16:
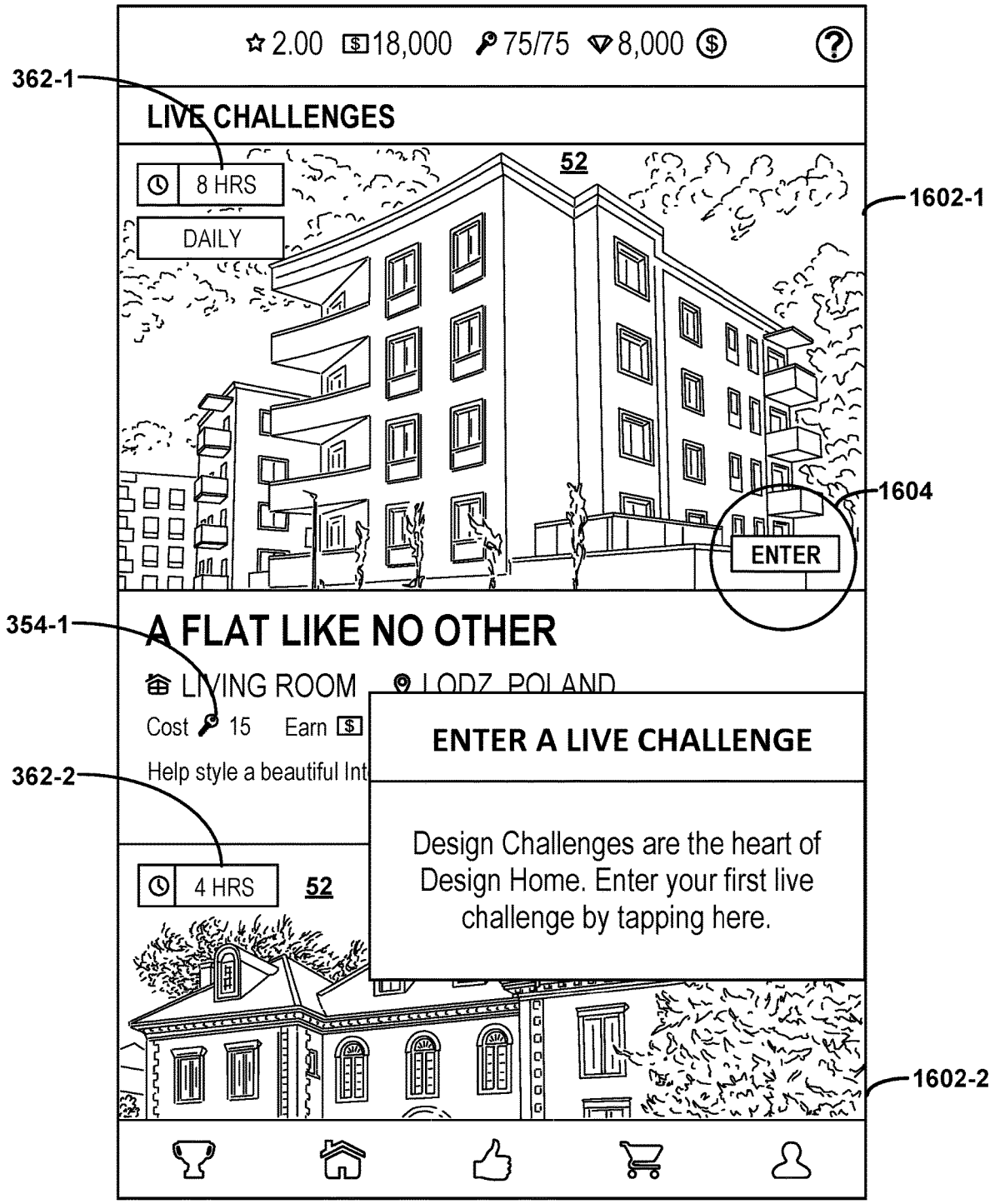
FIG. 16 is another screen image of an application inviting a user to participate in a respective challenge in a plurality of challenges, each challenge in the plurality of challenges comprising (i) an image of a respective scene and (ii) a first plurality of markers, each marker having a different designated set of coordinates within the respective scene and corresponding to a type within a plurality of types, where the challenge is associated with a first amount, in units of a first application counter, required to submit the respective scene corresponding to the challenge in accordance with some implementations of the present disclosure.
Figure 19:
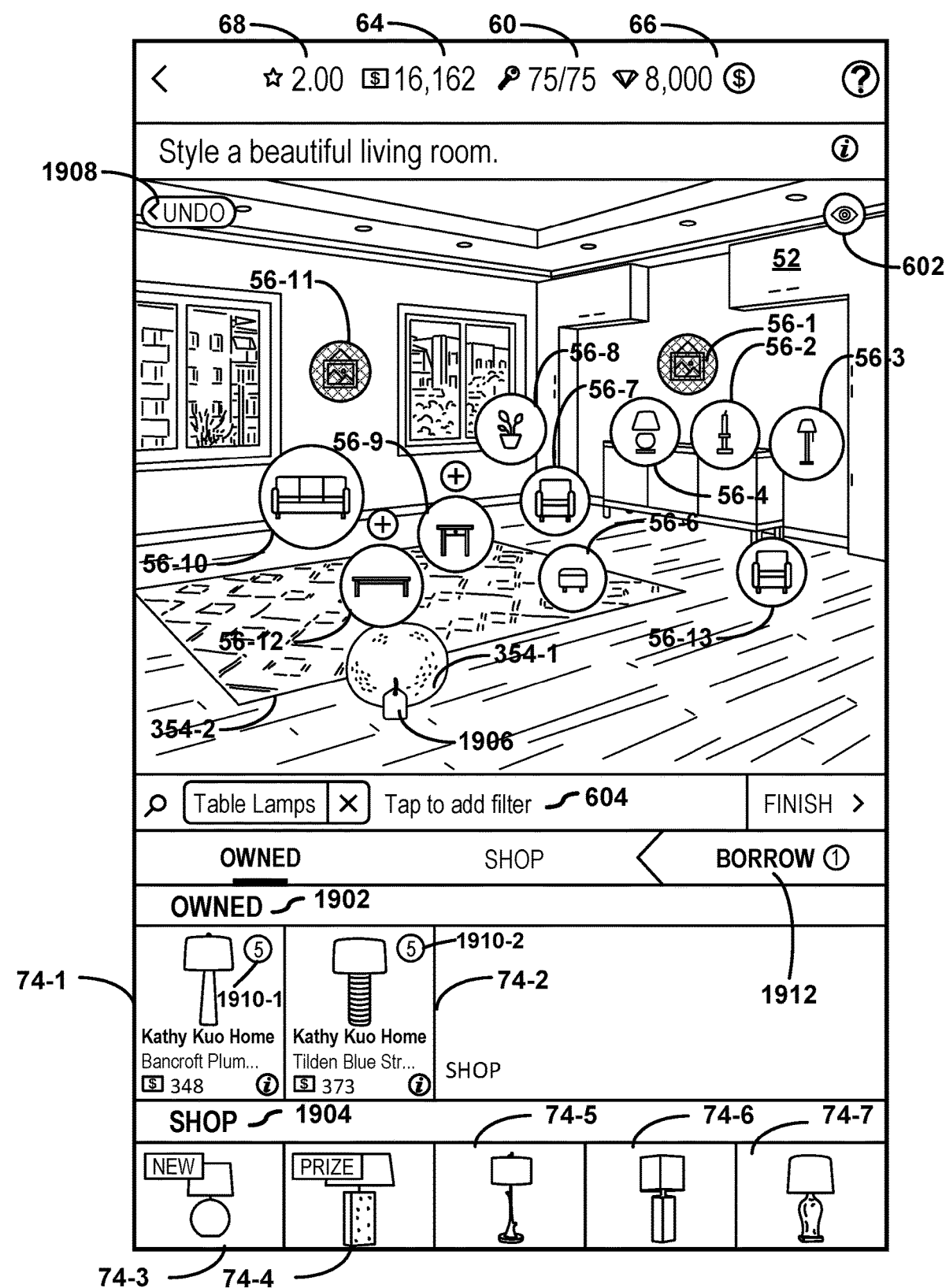
FIG. 19 is a screen image illustrating the display of a plurality of virtual furnishing units corresponding to a respective marker, where the plurality of virtual furnishing units comprises (i) one or more first virtual furnishing units retained (owned) by the user that match the type of the respective marker and (ii) one or more second virtual furnishing units not retained (not owned) by the user that match the type of the respective marker, where the displaying further comprises removing from display any virtual furnishing units that do not qualify for populating the respective marker in accordance with some implementations of the present disclosure.

Disclosed are systems and methods for scene completion in an application. Referring to FIG. 16, a user selects from among affordances 1602. Each affordance 1602 corresponds to a different challenge. Referring to FIG. 6, each challenge comprises a scene image 52 of a respective scene and a plurality of markers. As illustrated in FIG. 6, each marker 56 has a different designated set of coordinates within the respective scene and corresponds to a type within a plurality of types. Responsive to selection of an affordance 1602 (FIG. 16), the image, such as the scene image 52 of FIG. 6, of the respective scene and plurality of markers of the corresponding challenge is displayed. Continuing to refer to FIG. 6, for each sequential user marker 56 selection within the challenge, a plurality of virtual furnishing units 74 corresponding to the respective marker is displayed. Referring to FIG. 19, the furnishing units match the type of the selected marker and comprise virtual furnishing units retained (owned) 1902 by the user and virtual furnishing units not retained (not owned, shop) 1904 by the user. In response to receiving a user selection of one of these furnishing units, a three-dimensional graphic 354 of FIG. 8 of the selected unit at the designated set of coordinates within the respective scene is displayed. In this way, the scene image 52 of FIG. 8 is populated with three-dimensional graphics each of which is at a corresponding designated set of coordinates within the scene specified by the corresponding marker. Referring to FIG. 9, the user submits the scene with the plurality of graphics when a completion criterion of the first challenge has been satisfied. The criterion specifies which corresponding designated set of coordinates within the scene must be populated and, referring to FIG. 17, specifies a cost 356, in units of a first application counter 60, required for submission (e.g., 15 keys in FIG. 17). Responsive to submitting the scene with the plurality of graphics, the user selection of furnishing units for the challenge is communicated to a remote server and the user is provided with an award 358 (e.g., a reward) of a second amount in units of a second application counter 64 (e.g., $2,500 in FIG. 17). There is received from the remote server a community vote on the user selection of virtual furnishing units for the challenge by the user. The user is notified of the vote for the challenge. The user is limited to using a virtual furnishing unit retained by the first user in a predetermined number of challenges 1910 (FIG. 19) before the virtual furnishing unit is no longer retained by the user.

Figure 1:
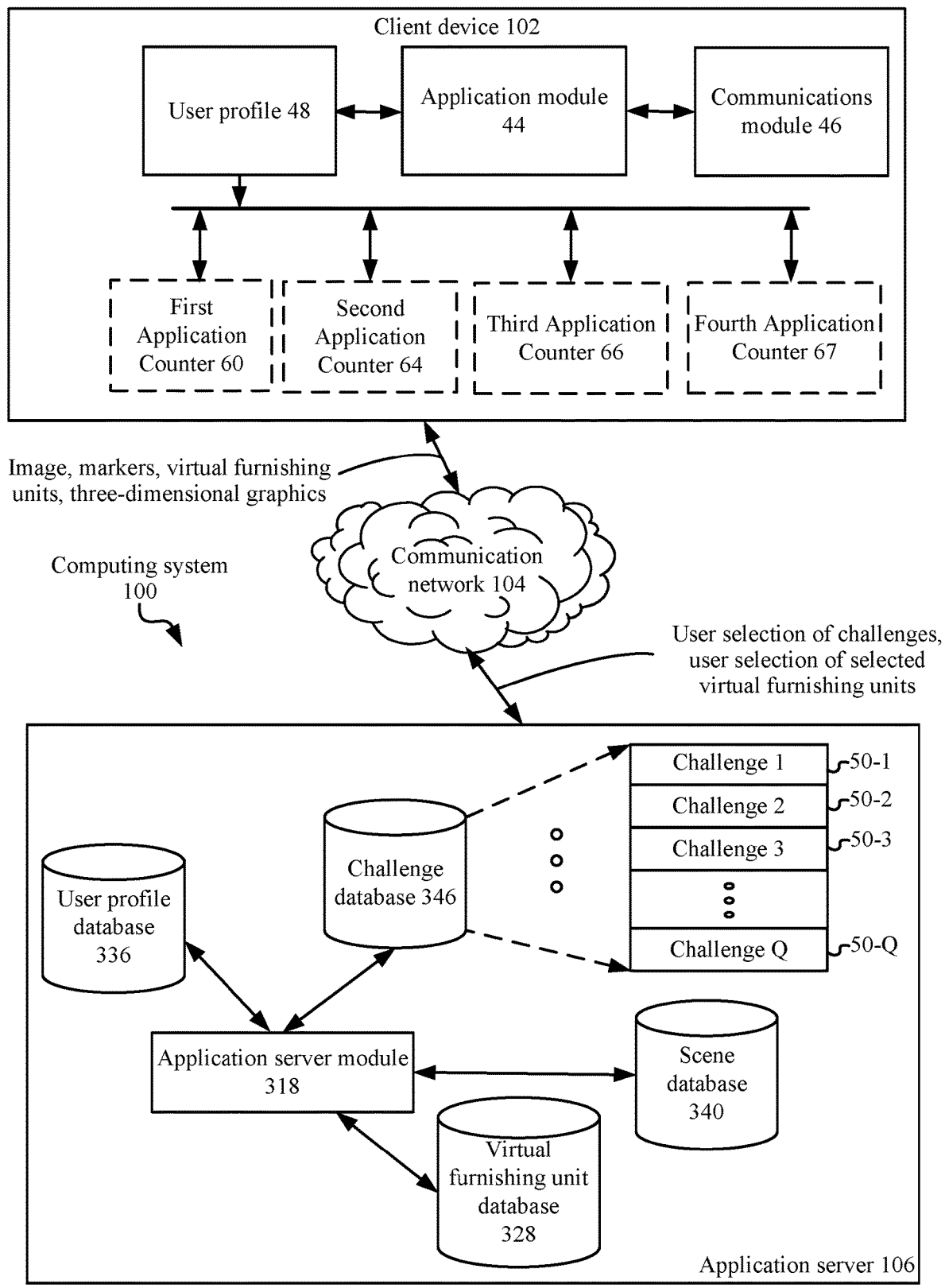
FIG. 1 is an example block diagram illustrating a computing system, in accordance with some implementations of the present disclosure.
Figure 2:
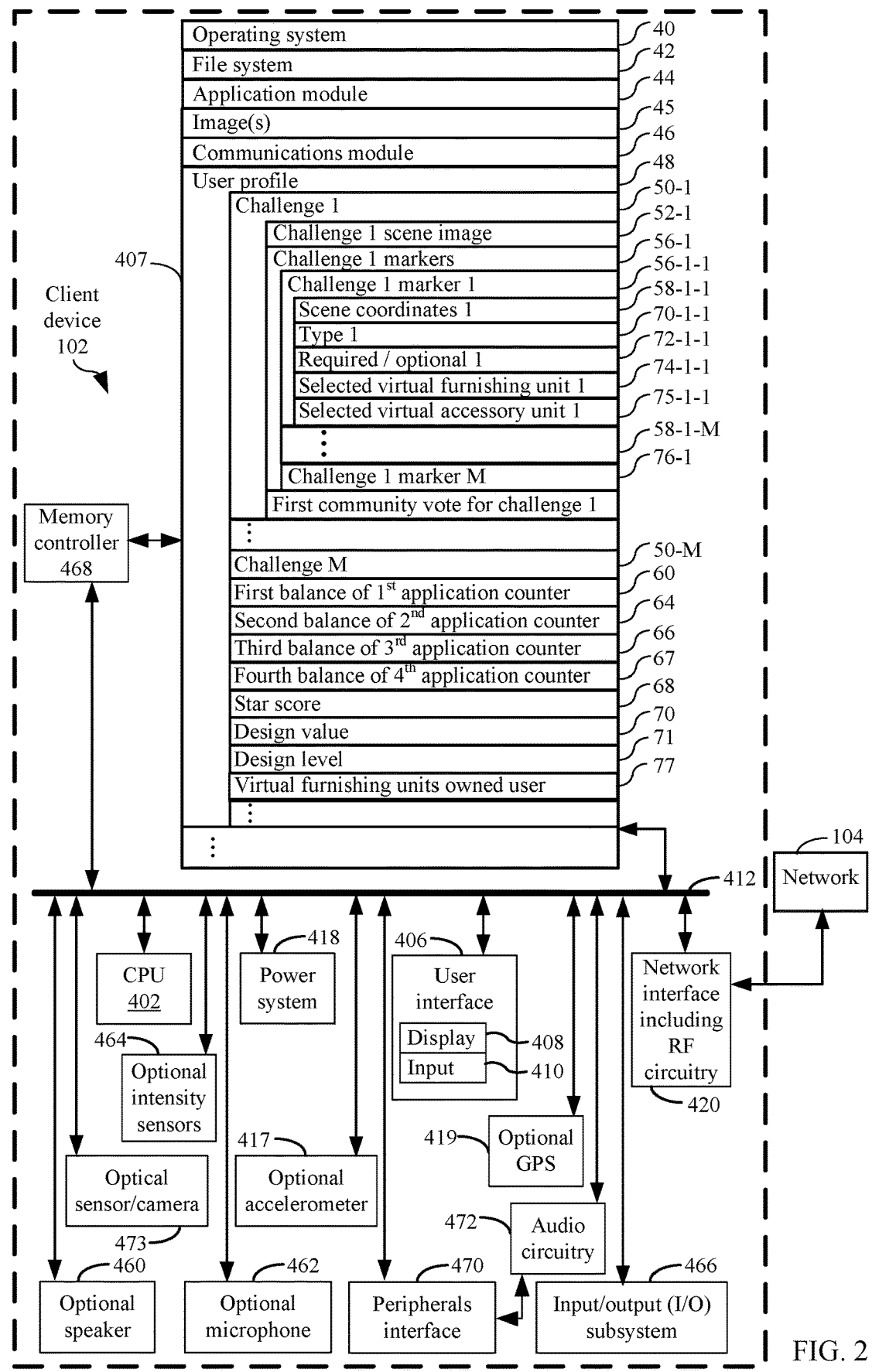
FIG. 2 is an example block diagram illustrating a client computing device, in accordance with some implementations of the present disclosure.
Figure 3:
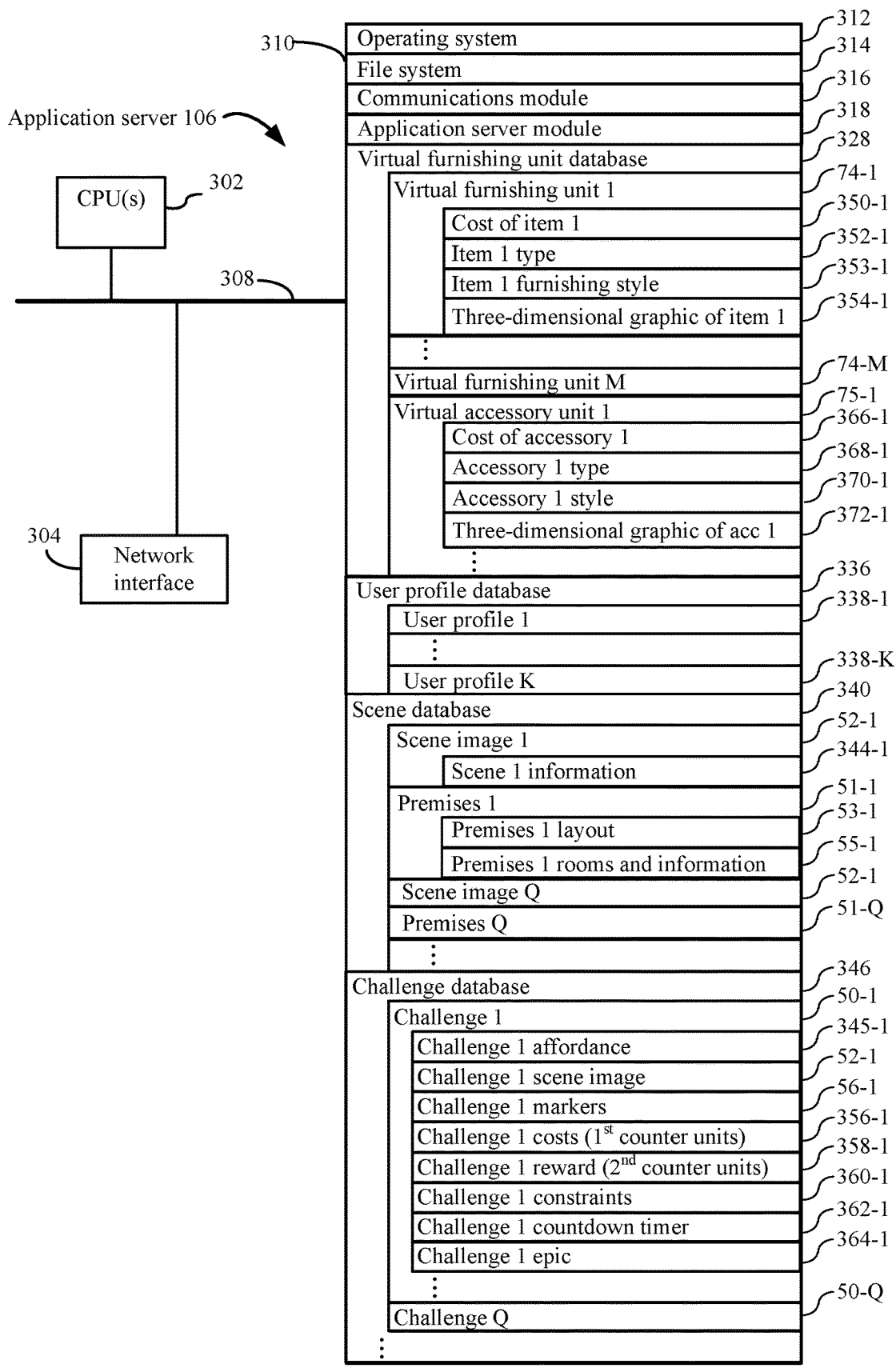
FIG. 3 is an example block diagram illustrating an application server, in accordance with some implementations of the present disclosure.

Now that an overview of improved systems and methods for competitive scene completion in an application has been provided, additional details of systems, devices, and/or computers in accordance with the present disclosure are now described in relation to the FIGS. 1-3.

FIG. 1 is a block diagram illustrating a computing system 100, in accordance with some implementations. In some implementations, the computing system 100 includes one or more computing devices 102 (e.g., computing devices 102A, 102B, 102C, 102D, and 102N) (also known as a client device), a communication network 104, and one or more application server systems 106. In some implementations, a computing device 102 is a phone (mobile or landline, smart phone or otherwise), a tablet, a computer (mobile or otherwise), or a hands free computing device. In some embodiments, a computing device 102 is any device having a touch screen display. In some embodiments, a computing device 102 is any device having a display that will detect a location of a stylus. In some embodiments, a computing device 102 is any device that is in electronic communication and responsive to an electronic pointing device such as a track ball or a mouse.

In some implementations, a computing device 102 provides a mechanism by which a user earns credit through successful completion of one or more challenges within an application. In these challenges, the user populates a scene (e.g., a room in a house) with three-dimensional graphic images of virtual furnishing units. In typical embodiments, these three-dimensional graphic images are two-dimensional in nature but depict a three dimensional "perspective view" of the corresponding virtual furnishing unit. For instance, in the case where the virtual furnishing unit is a couch, the corresponding three-dimensional graphic image of the couch would be a two-dimensional perspective of the couch that gives rise to a three-dimensional appearance.

Referring to FIG. 1, in some implementations, the computing device 102 includes an application module 44 that facilitates the above identified actions. In some implementations, the computing device 102 also includes a user profile 48. The user profile 48 stores characteristics of the user such as application credit that the user has acquired in the form of a first application counter 60 (e.g., keys), a second application counter 64 (e.g., virtual cash), and a third application counter 66 (e.g., diamonds) that the user has acquired through use of the application 44. In some implementations, the computing device 102 also includes a communications module 46. The communications module 46 is used to communicate with application server 106, for instance, to select challenges, communicate the selection of virtual furnishing units for challenges, and select furnishing units for challenges.

In some implementations, the communication network 104 interconnects one or more computing devices 102 with each other, and with the application server system 106. In some implementations, the communication network 104 optionally includes the Internet, one or more local area networks (LANs), one or more wide area networks (WANs), other types of networks, or a combination of such networks.

In some implementations, the application server system 106 includes an application server module 318, a user profile database 336, a challenge database 346 comprising a plurality of challenges 50, a scene database 340, and/or a virtual furnishing unit database 328. In some embodiments, the application server module 318, through the application module 44, provides players (users) with challenges 50. Typically, a challenge 50 challenges a user to populate a corresponding scene image 52, such as the scene image 52 shown in FIG. 7, with a plurality of three-dimensional graphics 354, where each such three-dimensional graphic is placed at corresponding designated set of coordinates within the respective scene. Advantageously, in some embodiments, the application server module 318 can draw from any of the scene images 52 in scene database 340 to build challenges 50. In some embodiments, the scene database 340 includes licenses and/or access to scenes of commercial or landmark/historical buildings. In alternative embodiments, the application server module 318 draws from upon a predetermined set of scene images 52 in scene database 340 to build one or more predetermined challenges 50. In other embodiments, the scene of a challenge is obtained directly from the client device 102. For example, the scene is a live image or a live video obtained using one or more optical sensors/cameras 473 on the client device 102 (See FIG. 2). Alternatively, the scene is an image 45 stored on the client device 102 (See FIG. 2).

In some embodiments, as each user progresses in the application, they improve their scores or other characteristics. In some embodiments, such scores or other characteristics are used to select which scene images 52 are used in the challenges offered by application server module 318 to any given user. The goal is to match the skill level and/or experience level of a given user to the challenges the user participates in so that the given player is appropriately challenged and is motivated to continue use of the application. Thus, in some embodiments, the difficulty of the challenges offered to a given user matches the skill level and/or experience level of the user. As the user successfully completes challenges, their skill level and/or experience level advances. In some embodiments, the types of challenges offered to a user are not influenced by the user's experience level or other characteristics of the user. In some embodiments, application server module 318 allows the user to select challenges 50.

In some embodiments, the challenge database 346 is used to store the challenges 50 that may be offered by the application server module 318. In some embodiments, some or all of the challenges 50 in the challenge database 346 are system created rather than user created. This provides a measure of quality control, by ensuring a good spectrum of challenges of varying degrees of difficulty. In this way, there are challenges 50 available for both beginners and more advanced users.

As referenced above, in some embodiments, the scene database 340 stores a description of each of the scene images 52 that may be used in challenges offered by the application server module 318 and/or application module 44. In some embodiments, a scene is that of a single room. In some embodiments, a scene is that of a single room in a home (e.g., a bedroom, a living room, a dining room, a kitchen, a bathroom, a library, a family room, a game room, a garage, etc.). In some embodiments a scene is of an outdoor location (e.g., a porch, a patio, a back yard, a pool area, a front yard, a side yard, a plaza, etc.). In some embodiments, a scene is that of a compartment or room in a boat, plane, train, cave, subway, bus, van, trailer, recreational vehicle, or tent. In some embodiments, a scene is that of a hotel lobby, a spa, a cafeteria, a ranch, a winery, or any other outdoor area. In other embodiments, a scene is that of a premises 51 and correspondingly the scene database stores a layout 53 and rooms and information 55 associated with the premises 51. In typical embodiments, a challenge 50 stored in challenge database 346 is associated with a single two-dimensional scene 52 in the scene database 340. In some embodiments, the scene database 340 is subsumed by the challenge database 346.

In some embodiments, application server module 318 maintains a profile in the user profile database 336 of each user that makes use of the application module 44 on a computing device 102. In some embodiments, there are hundreds, thousands, tens of thousands or more users of the application module 44 on corresponding computing devices 102 and an application server module 318 stores a profile for each such user in user profile database 336. In some embodiments, the user profile database 336 does not store an actual identity of such users, but rather a simple login and password. In some embodiments, the profiles in the user profile database 336 are limited to the logins and passwords of users. In some embodiments, the profiles in user profile database 336 comprises user logins, passwords, and current balances in terms of the first application counter 60, second application counter 64, third application counter 66, and fourth application counter 67. In some embodiments, the profiles in user profile database 336 store more information about each user, such as an identity of completed challenges, and the virtual furnishing units the user selected for each such challenge. In some embodiments, the user profile in the user profile database 336 includes a limited amount of information whereas a user profile 48 on a computing device 102 associated with the user contains more information. For example, in some embodiments, the user profile in user profile database 336 includes user login and password and application credit acquired (e.g., in terms of the first, second, third, and/or fourth application counter) whereas the user profile 48 on the computing device 102 for the same user includes information on challenges completed by the user. It will be appreciated that any possible variation of this is possible, with the profile for the user in user profile database 336 including all or any subset of the data associated with the user and the user profile 48 for the user on the corresponding computing device 102 including all or any subset of the data associated with the user. In some embodiments, there is no user profile 48 stored on computing device 102 and the only profile for the user is stored on application server 106 in user profile database 336.

FIG. 2 is an example block diagram illustrating a computing device 102, in accordance with some implementations of the present disclosure. It has one or more processing units (CPU's) 402, peripherals interface 470, memory controller 468, a network or other communications interface 420, a memory 407 (e.g., random access memory), a user interface 406, the user interface 406 including a display 408 and input 410 (e.g., keyboard, keypad, touch screen, mouse, track ball), an optional accelerometer 417, optional audio circuitry 472, an optional speaker and/or audio jack 460, an optional microphone 462, one or more optional intensity sensors 464 for detecting intensity of contacts on the computing device 102 (e.g., a touch-sensitive surface such as a touch-sensitive display system 408 of the computing device 102), optional input/output (I/O) subsystem 466, one or more optional optical sensors/camera 473, one or more communication busses 412 for interconnecting the aforementioned components, and a power system 418 for powering the aforementioned components.

In typical embodiments, the input 410 is a touch-sensitive display, such as a touch-sensitive surface. In some embodiments, the user interface 406 includes one or more soft keyboard embodiments. The soft keyboard embodiments may include standard (QWERTY) and/or non-standard configurations of symbols on the displayed icons.

Computing device 102 optionally includes, in addition to accelerometer(s) 417, a magnetometer (not shown) and a GPS 419 (or GLONASS or other global navigation system) receiver for obtaining information concerning the coordinates and orientation (e.g., portrait or landscape) of computing device 102.

It should be appreciated that computing device 102 is only one example of a multifunction device that may be used, and that computing device 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Memory 407 optionally includes high-speed random access memory and optionally also includes non-volatile memory, such as one or more magnetic disk storage devices, flash memory devices, or other non-volatile solid-state memory devices. Access to memory 407 by other components of computing device 102, such as CPU(s) 402 is, optionally, controlled by memory controller 468.

Peripherals interface 470 can be used to couple input and output peripherals of the device to CPU(s) 402 and memory 407. The one or more processors 402 run or execute various software programs and/or sets of instructions stored in memory 407 to perform various functions for computing device 102 and to process data.

In some embodiments, peripherals interface 470, CPU(s) 402, and memory controller 468 are, optionally, implemented on a single chip. In some other embodiments, they are, optionally, implemented on separate chips.

RF (radio frequency) circuitry 108 of network interface 420 receives and sends RF signals, also called electromagnetic signals. RF circuitry 108 converts electrical signals to/from electromagnetic signals and communicates with communications networks and other communications devices via the electromagnetic signals. RF circuitry 420 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks 104. In some embodiments, circuitry 108 does not include RF circuitry and, in fact, is connected to network 104 through one or more hard wires (e.g., an optical cable, a coaxial cable, or the like).

Examples of networks 104 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, audio circuitry 472, speaker 460, and microphone 462 provide an audio interface between a subject (user of application module 44) and computing device 102. The audio circuitry 472 receives audio data from peripherals interface 470, converts the audio data to an electrical signal, and transmits the electrical signal to speaker 460. Speaker 460 converts the electrical signal to human-audible sound waves. Audio circuitry 472 also receives electrical signals converted by microphone 462 from sound waves. Audio circuitry 472 converts the electrical signal to audio data and transmits the audio data to peripherals interface 470 for processing. Audio data is, optionally, retrieved from and/or transmitted to memory 407 and/or RF circuitry 420 by peripherals interface 470.

In some embodiments, power system 418 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the computing device 102 optionally also includes one or more optical sensors/camera. Optical sensor(s)/camera 473 optionally include charge-coupled device (CCD) or complementary metal-oxide semiconductor (CMOS) phototransistors. Optical sensor(s)/camera 473 receive light from the environment, projected through one or more lens, and converts the light to data representing an image. Optical sensor(s)/camera 473 optionally capture live and still images and/or video. In some embodiments, an optical sensor/camera is located on the back of computing device 102, opposite display system 408 on the front of the device, so that the touch screen is enabled for use as a viewfinder for still and/or video image acquisition.

As illustrated in FIG. 2, a computing device 102 preferably comprises an operating system 40 (e.g., iOS, ANDROID, DARWIN, RTXC, LINUX, UNIX, OS X, WINDOWS, or an embedded operating system such as VxWorks), which includes various software components and/or drivers for controlling and managing general system tasks (e.g., memory management, storage device control, power management, etc.) and facilitates communication between various hardware and software components. The device further optionally comprises a file system 42 which may be a component of operating system 40, for managing files stored or accessed by the computing device 102. Further still, the computing device 102 further comprises an application module 44 for providing a user with an application having the disclosed methods for competitive scene completion in an application. In some embodiments, the computing device 102 also stores one or more images 45. The one or more images 45 may be acquired using the one or optional optical sensors/camera 473 of the computing device 102. Alternatively, the computing device 102 may receive the one or more images 45 from other devices that the computing device 102 is connected to. In some embodiments, the computing device 102 comprises a communications module (or instructions) 46 for connecting the computing device 102 with other devices (e.g., the application server 106 and the devices 102B . . . 102N) via one or more network interfaces 420 (wired or wireless), and/or the communication network 104 (FIG. 1).

Further still, in some embodiments, the computing device 102 comprises a user profile 48 for tracking the aspects of the user. Exemplary aspects include a description of one or more challenges the user has completed or is presently working on, and for each such challenge, an indication of the scene image 52 for the challenge, the markers 56 within the image (and for each respective marker the coordinates of the respective marker within the challenge, the marker type 70 of the respective marker, whether the respective marker is required or optional 72, the virtual furnishing unit 74 that the user has selected for the respective marker, and the virtual accessory unit 75 that the user has selected for the respective marker). In some embodiments, the user profile 48 also includes information about one or more premises 51 owned by the user (not shown). Additional exemplary aspects include a first balance of a first application counter 60 (e.g., keys), a second balance of a second application counter 64 (e.g., virtual cash), a third balance of a third application counter 66 (e.g., diamonds), a fourth balance of a fourth application counter 67 (e.g., style cards), a star score 68, a design value 70, a design level 71, and virtual furnishing units owned by the user 77.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 407 optionally stores a subset of the modules and data structures identified above. Furthermore, the memory 407 may store additional modules and data structures not described above.

FIG. 3 is an example block diagram illustrating an application server 106 in accordance with some implementations of the present disclosure. The application server 106 typically includes one or more processing units CPU(s) 302 (also referred to as processors), one or more network interfaces 304, memory 310, and one or more communication buses 308 for interconnecting these components. The communication buses 308 optionally include circuitry (sometimes called a chipset) that interconnects and controls communications between system components. The memory 310 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 310 optionally includes one or more storage devices remotely located from CPU(s) 302. The memory 310, or alternatively the non-volatile memory device(s) within the memory 310, comprises anon-transitory computer readable storage medium. In some implementations, the memory 310 or alternatively the non-transitory computer readable storage medium stores the following programs, modules and data structures, or a subset thereof:

- an operating system 312, which includes procedures for handling various basic system services and for performing hardware dependent tasks;
- optionally, a file system 314 which may be a component of operating system 312, for managing files stored or accessed by the application server 106;
- a network communication module (or instructions) 316 for connecting the application server 106 with other devices (e.g., the computing devices 102) via the one or more network interfaces 304 (wired or wireless), or the communication network 104 (FIG. 1);
- an application server module 318 for managing a plurality of instances of an application 44, each instance corresponding to a different participant (user of a computing device 102) and for tracking user activities within such application 44;
- a virtual furnishing unit database 328 to track the virtual furnishing units 74 that are supported by the application 44 as well as the costs 350 of such units, the characteristics (e.g., type 352 and furnishing style 353) of such units, and the three-dimensional graphic 354 of such units. In some embodiments, the virtual furnishing unit database 328 further tracks virtual accessory units 75 that are supported by the application 44 as well as the costs 366 of such units, the characteristics (e.g., type 368 and furnishing style 370) of such units, and the three-dimensional graphic 372 of such virtual accessory units.

a user profile database 336 that stores a user profile 338 for each user of the application module 44 (e.g., that is run on computing device 102 of FIG. 2);

an optional scene database 340 that stores a description of each scene image 52 (e.g., such as the scene illustrated in FIG. 4) that is hosted by the system (e.g. by challenges 50), including for each such scene information 344 regarding the scene; and a challenge database 346 for storing the challenges 50 that may be offered to the application server module 318, wherein each respective challenge 50 in the challenge database 346 provides the affordance 345 for the respective challenge, the scene image 52 for the respective challenge, the markers 56 for the respective challenge, a cost 356, in units of the first counter, for participating in the respective challenge, a reward, in units of the second counter, for participating in the respective challenge, any constraints 360 associated with the respective challenge, a countdown timer 362 for the respective challenge, and any applicable epic 364 for the respective challenge.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 310 optionally stores a subset of the modules and data structures identified above. Furthermore, the memory 310 may store additional modules and data structures not described above.

Although FIGS. 2 and 3 show a "computing device 102" and an "application server 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

FIG. 5 is a flow chart illustrating a method for improved competitive scene completion in an application, e.g., using a computing device 102 and/or application server 106, in accordance with some implementations. In some implementations, a user initiates, at the computing device 102, an instruction to start the application module 44 using the computing device 102A. In some embodiments, in response, application server 106 identifies the user profile 338 associated with the user who just initiated the application module 44. In some alternative embodiments (not shown), some or all of the components of the user profile is actually obtained from the user profile 48 stored locally on the computing device 102 rather than obtaining a profile of the user from the server. In still other embodiments, some components of the user profile are obtained from user profile 48 of computing device 102 whereas other components of the user profile are obtained from the user profile 338. Accordingly, as noted in block 502 of FIG. 5A, a method is performed at a client device 102 comprising a display 408, one or more processors 402 and memory 407, in an application 44 running on the client device. The application 44 is associated with a user.

Turning to block 504, the first user is provided with one or more affordances. Each of the one or more affordances corresponds to a different respective challenge 50 in a corresponding set of one or more challenges. In some embodiments, the set of one or more challenges consists of a single challenge. In some embodiments, the set of one or more challenges comprises three or more challenges, five or more challenges, ten or more challenges, 50 or more challenges, or 100 or more challenges. In some embodiments, the set of one or more challenges includes a series challenge. A series challenge consists of a set of challenges (e.g., a set of three, five, or seven challenges) that are linked to (associated with) each other by a (e.g., common) theme. An example of a series challenge is "Tour the Tropics" (e.g., having a tropical theme) and the challenges in the series include "A Taste of Fiji," "Sunset in Sri Lanka," "Walking on Water in Mo'orea," and "R&R in Rarotonga," each having a respective scene in the tropics. Each of the challenges in the series challenge has its respective scene and respective completion criterion. In addition, the series challenge has a series completion criterion. In some embodiments, the series challenge completion criterion is a completion of four out of five challenges in the series. In other embodiments, the series completion criterion requires completion of all the challenges in the series. The user is awarded (rewarded) a prize upon fulfillment of the series challenge completion criterion. In some embodiments, the set of one or more challenges also includes elite challenges that are only available to users who have achieved a predefined design level 71 in FIG. 2 (e.g., an elite challenge is available to a user who has attained design level 10 in the application 44). In other embodiments, the set of one or more challenges includes "serious" challenges that involve designing one or more rooms of famous landmark (e.g., historical) buildings, such as rooms of Buckingham Palace, Windsor Castle, the West Wing of the White House, Winchester Mystery House, Hearst Castle and the like.

Figure 4:
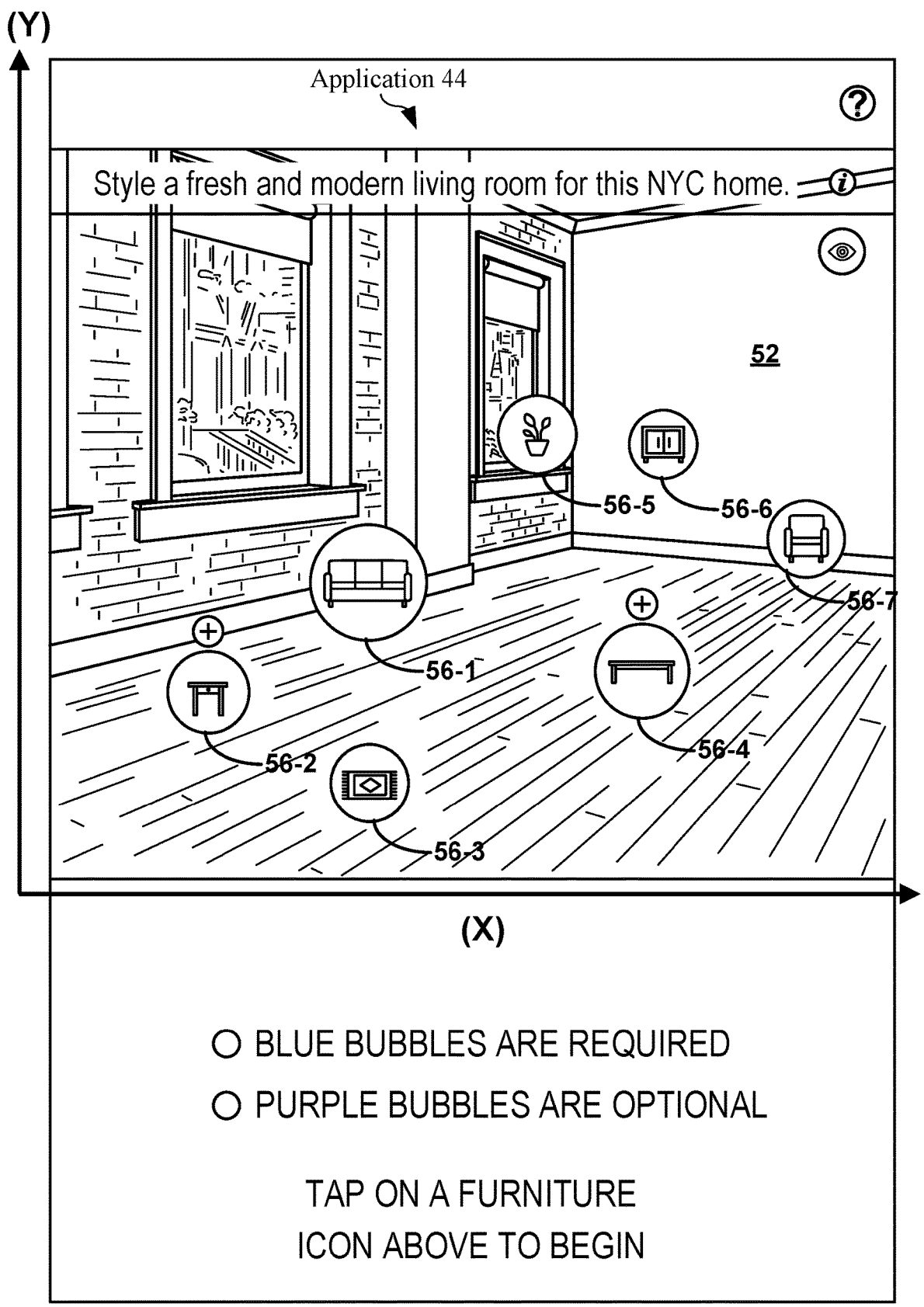
FIG. 4 illustrates an example application on a client computer device, in accordance with some implementations of the present disclosure.

In typical embodiments, the one or more challenges is a plurality of challenges and thus there are a plurality of affordances. For instance, referring to FIG. 16, two affordances 1602-1 and 1602-2, are illustrated. Each of these affordances represents a different challenge. In some embodiments, the user can sweep down or up on the display to see more affordances 1602 representing other challenges. In some embodiments, the user can sweep left or right on the display to see more affordances 1602 representing other challenges. Each challenge comprises a scene image 52 of a respective scene and a different first plurality of markers (not shown in FIG. 16). That is, each respective challenge has its own independent plurality of markers that may be the same or different than the markers of other challenges. Referring to FIG. 4, which shows more detail of the scene image 52 for a particular challenge 50, each marker 56 has a different designated set of coordinates within the respective scene image 52 and corresponds to a type 70 within a plurality of types. For instance, referring to FIG. 4, marker 56-1 is a multi-seating type, marker 56-2 is a small table type, marker 56-3 is a throw carpet type, marker 56-4 is a coffee table type, marker 56-5 is a large plant type, marker 56-6 is a small cabinet type, and marker 56-7 is a single seating type. Referring to block 506 of FIG. 5A, in some embodiments the scene for a challenge 50 is that of a single room in a building. In some embodiments, the scene for a challenge 50 is that of a single room in a home (e.g., a bedroom, a living room, a dining room, a kitchen, a bathroom, a library, a family room, a game room, a garage, etc.). Referring to block 508 of FIG. 5A, in some embodiments the scene for a challenge 50 is of an outdoor location (e.g., a porch, a patio, a back yard, a pool area, a front yard, a side yard, etc.). In some embodiments, the scene for a challenge 50 is a compartment or room in a boat, plane, train, cave, subway, bus, van, trailer, recreational vehicle, or tent.

Referring to block 510 of FIG. 5A and as illustrated in FIG. 4, each respective marker 56 in the plurality of markers for a challenge 50 is in the form of a closed form shape that is overlaid on the respective scene image 52 at the corresponding different designated set of coordinates within the respective scene that are associated with the marker. In FIG. 4, this closed form shape is a circle or bubble. In other words, each respective marker 56 is in the form of a circle or bubble and is positioned within the scene image 52 at the set of coordinates associated with the respective marker. For instance, in FIG. 4, locations in the scene image 52 are addressable using Cartesian (x,y) coordinates off of the x- and y-axis. Thus, in such embodiments, each marker has a unique set of (x,y) coordinates within the scene image 52 and it is at these (x,y) coordinates that the closed form shape for the marker 56 is placed. As further illustrated in FIG. 4, each respective marker 56 includes a generalized depiction of the type 70 of the respective marker. For instance, referring to FIG. 4, because marker 56-1 is a multi-seating type, the generalized depiction of the type 70 of the respective marker within the closed form shape for marker 56-1 is a sketch of couch. Because marker 56-2 is a small table type, the generalized depiction of the type 70 of the respective marker within the closed form shape for marker 56-2 is a sketch of a small table. Because marker 56-3 is a throw carpet type, the generalized depiction of the type 70 of the respective marker within the closed form shape for marker 56-3 is a sketch of a throw carpet, and so forth.

There can be any number of different types of markers 56 within a scene image 52 for a challenge and block 512 of FIG. 5A provides a non-limiting list of some such types: single seat seating, multiple seats seating (e.g., couch, sectional seating, etc.), bed, entertainment center, table, storage furniture, mirror, rug, lamp, wall décor, and home accent.

Referring to block 514 of FIG. 5A and with reference to FIG. 4, in some embodiments the closed form shape used to represent each marker 56 in a challenge 50 is a colored circle. In other embodiments, the closed form shape used to represent each marker 56 in a challenge 50 is a square, oval shape, n-gon (wherein n is a positive integer of 3 or greater), or any other closed form shape.

Referring to block 516 of FIG. 5A and with reference to FIG. 16, in some embodiments the one or more challenges is a plurality of challenges and each respective challenge 50 in the plurality of challenges available to the user further comprises a countdown clock 362 showing an amount of time remaining for the respective challenge to be completed by the first user within the application 44. For instance, the challenge 50-1 associated with affordance 1602-1 must be completed within the next eight hours whereas the challenge 50-2 associated with affordance 1602-2 must be completed within the next four hours. With reference to block 517 of FIG. 5A, FIG. 16 further illustrates how in some embodiments an amount of time remaining for one challenge to be completed by a user within an application is different than an amount of time remaining for a another challenge in the plurality of challenges available to the user to be completed by the user within the application 44. That is, each challenge is associated with an independent countdown clock for completion, and thus the amount of time available to complete challenges may vary across the challenges. For instance, some challenge may need to be completed within the next four hours, some within the next eight hours, some within the next twelve hours, and so forth. Referring to block 518 of FIG. 5A, in one specific embodiment, the amount of time available for one challenge 50 available to the user is one day and the challenge 50 is free of constraints (e.g., on what vendors, styles, etc. may be used to complete the challenge), and the amount of time available to complete another challenge 50 available to the user is two days.

In alternative embodiments, the countdown clock 362 for each respective challenge 50 in the plurality of challenges available to the user shows an amount of time remaining for the respective challenge to be accepted or initiated by the user within the application 44, rather than the amount of time remaining for the respective challenge to be completed by the user.

Figure 17:
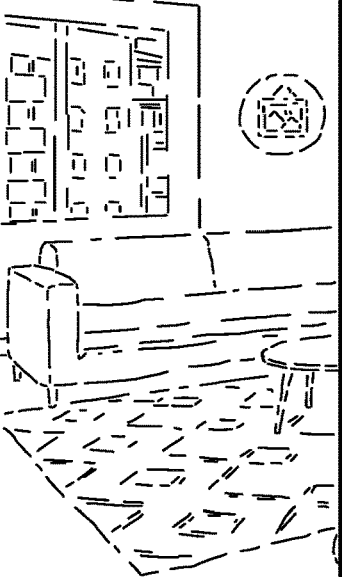
FIG. 17 is a screen image illustrating a challenge, where the challenge comprises (i) an image of a respective scene and (ii) a first plurality of markers, each marker having a different designated set of coordinates within the respective scene and corresponding to a type within a plurality of types, where the challenge is associated with a first amount, in units of a first application counter, required to submit the respective scene corresponding to the challenge and where a user receives a second amount, in units of a second application counter, when the user complete the completion criteria associated with the challenge and submits the scene corresponding to the challenge for community voting in accordance with some implementations of the present disclosure.

In some embodiments, application module 44 concurrently services live challenges, daily challenges, challenges that are awaiting voting results, and past challenges. Live challenges are challenges 50 that are available for the user to enter. For instance, referring to FIG. 16, in some embodiments the user simply taps the affordance 1602 to read more about the challenge (e.g., "A Flat Like No Other"), as illustrated in FIG. 17, and see the prizes that will be awarded for top scores, as also illustrated in FIG. 17. The user then chooses the "Enter" affordance 1604 in FIG. 16 to begin. Each live challenge has a clock icon 362 showing the amount of time that the challenge will remain open. Once a challenge closes and enters voting, it is no longer available for the user to enter. Each challenge shows the cost (a first amount, in units of a first application counter such as keys) 356 needed to enter. This cost is deducted from the user balance when the user finishes designing the scene image 52 associated with the challenge. In some embodiments, daily challenges 50 are only open for 24 hours. In some such embodiments, each day, a different assortment of daily challenges 50 are offered to the user in addition to the live challenges. In some embodiments, daily challenges are listed in purple and have no item requirements. In some embodiments, some of the challenges serviced by application module 44 are awaiting results. Such challenges once were available to the user but are now closed and are presently being voted on by a community of users, as described in further detail below. In some embodiments, a "thumbs up" icon shows the amount of time that a challenge will remain in voting until results are posted. In some embodiments, some of the challenges serviced by application module 44 are past challenges. Past challenges are now closed and voting results have been posted. If a user entered one of these challenges, the results of the challenge will be shown alongside the scene image 52 of the challenge. If a user did not enter one of these past challenges, the scene image 52 associated with the challenge 50 will be greyed out. Accordingly, referring to block 520 of FIG. 5B, in some embodiments the one or more challenges is a plurality of challenges and a first subset of a plurality of challenges is available to a first user for user selection (e.g., daily challenges, live challenges). A second subset of the plurality of challenges is closed and no longer available to the first user for user selection, where each challenge in the second subset of the plurality of challenges is presently being voted on by a community of users (e.g., awaiting results). A third subset of the plurality of challenges is closed and no longer available to the first user for user selection (e.g., past challenges). Each challenge in the third subset of the plurality of challenges has been voted on by a community of users. In some embodiments, referring to block 522 of FIG. 5B and FIG. 16 as a reference, the display 408 is a touch-sensitive surface and the selection of a first affordance 1602 is detected by the application using a gesture recognizer responsive to a touch of the touch-sensitive surface by the first user. In some such embodiments, referring to FIG. 16, the user can view the various challenges by sweeping up or down on the display. When the user would like to enter a challenge 50 in the first subset of challenges, they press the enter key 1604 on the affordance 1602 associated with the challenge.

Figure 5B:
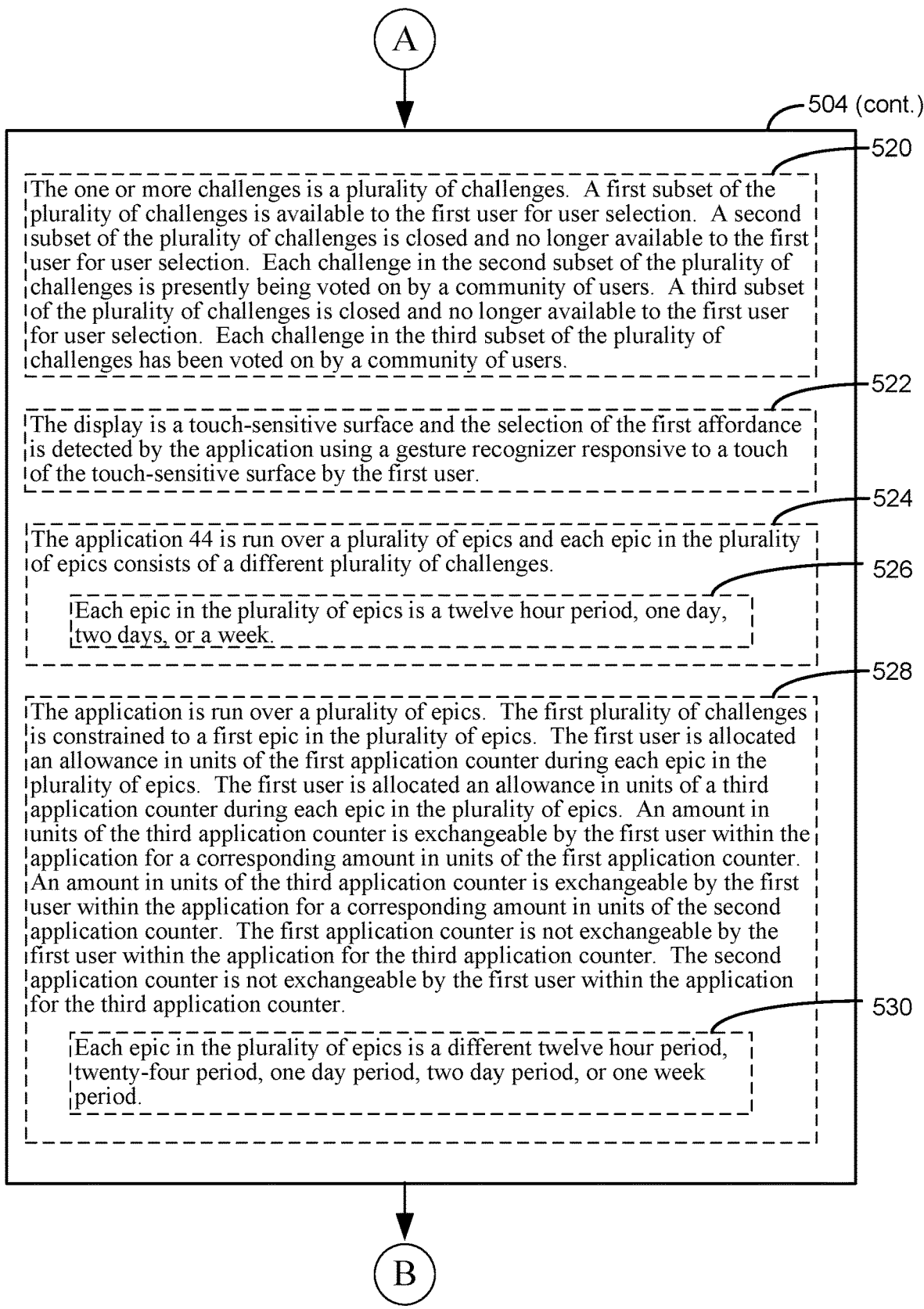

Referring to block 524 of FIG. 5B, in some embodiments, the application 44 is run over a plurality of epics and each epic in the plurality of epics consists of a different plurality of challenges. For instance, as discussed above, in some embodiments, each day there is a different set of daily challenges available to the user that day. The set of daily challenges available to the user changes from day to day. In addition, as discussed above, in some embodiments there are also live challenges available to the user. In some embodiments, referring to block 526 of FIG. 5B, the duration of time of each epic is other than daily. For instance, in some embodiments, rather than daily challenges, there is a different set of challenges available to the user each twelve-hour period, one-day period, two-day period, one-week period, two-week period or monthly.

Figure 11:
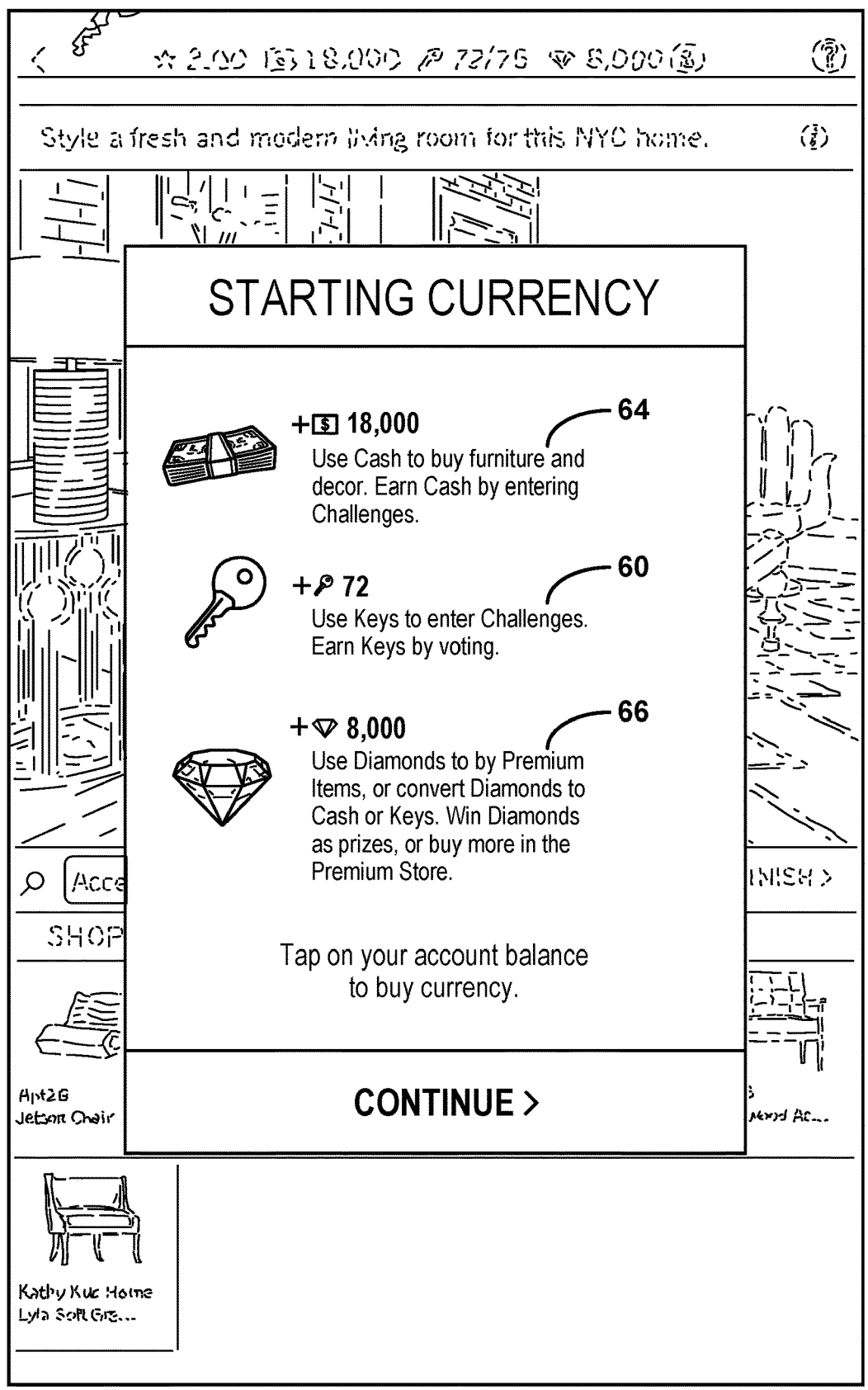
FIG. 11 is a screen image showing how a user has a first balance of a first application counter, a second balance of a second application counter, and a third balance of a third application counter, and how an amount in units of the third application counter is exchangeable by the first user within an application for a corresponding amount in units of the first or second application counter, the first application counter is not exchangeable by the user within the application for the third application counter, and the second application counter is not exchangeable by a user within the application for the third application counter in accordance with some implementations of the present disclosure.

Referring to block 528 of FIG. 5B, the application module 44 is run over a plurality of epics. As discussed above, in typical embodiments each epic is a 24-hour period although the present disclosure is not limited to such a period. For instance, referring to block 530 of FIG. 5B, in some embodiments each epic is a different twelve-hour period, twenty-hour period, one day period, two day period, or one week period. The plurality of challenges available to a user is constrained to a first epic in the plurality of epics. That is, once a first epic is over, at least some of the challenges in the first epic are no longer available to a user. With respect to the series challenge discussed earlier, in some embodiments the set of challenges in the series challenge runs over a plurality of epics. For instance, in the "Tour the Tropics" example series challenge described earlier, the first challenge "A Taste of Fiji" in the series challenge has a first epic of (e.g., is available to the user for) a sixteen hours. Once the sixteen-hour period is over, the first challenge is no longer available, and the application displays the second challenge "Sunset in Sri Lanka" in the series challenge for another sixteen hours. Moreover, the user is allocated an allowance in units of a first application counter during each epic in the plurality of epics. The user is also allocated an allowance in units of a third application counter during each epic in the plurality of epics. In some embodiments, the application module 44 supports three such application counters. Referring to FIG. 11 as a reference, in some embodiments these application counters have the following attributes:

| KEYS (first application counter 60) | |
| --- | --- |
| Needed by user to submit a complete challenge to community voting. | Awarded for voting on other players' completed challenge entries. The user is provided with an allowance of keys each epic (e.g., 20 keys per day) up to a maximum amount of earned keys. |

| VIRTUAL CASH (second application counter 64) | |
| --- | --- |
| Used to purchase some virtual furnishing units 74 in challenges 50. | Awarded for entering a completed challenge. |

| DIAMONDS (third application counter 66) | |
| --- | --- |
| Used to purchase virtual cash or keys. Used to purchase some virtual furnishing units 74 in challenges 50. | Awarded based on voting score for completed challenge. The user is provided with an allowance of diamonds each epic (e.g., 500 diamonds per day). Additional diamonds can be earned by watching videos. Additional diamonds can be purchased. |

Accordingly, in some embodiments an amount in units of the third application counter 66 is exchangeable by a user within the application 44 for a corresponding amount in units of the first application counter 60 (e.g., the user can use diamonds to buy keys). Further, an amount in units of the third application counter 66 is exchangeable by the first user within the application 44 for a corresponding amount in units of the second application counter 64 (e.g., the user can use diamonds to buy virtual cash). In some embodiments, amounts of the first application counter 60 are not exchangeable by the user within the application 44 for amounts within the third application counter 66 (e.g., the user cannot use keys to buy diamonds). In some embodiments, amounts within the second application counter 64 are not exchangeable by the user within the application 44 for amounts within the third application counter 66 (e.g., the user cannot use virtual cash to buy diamonds).

Figure 5C:
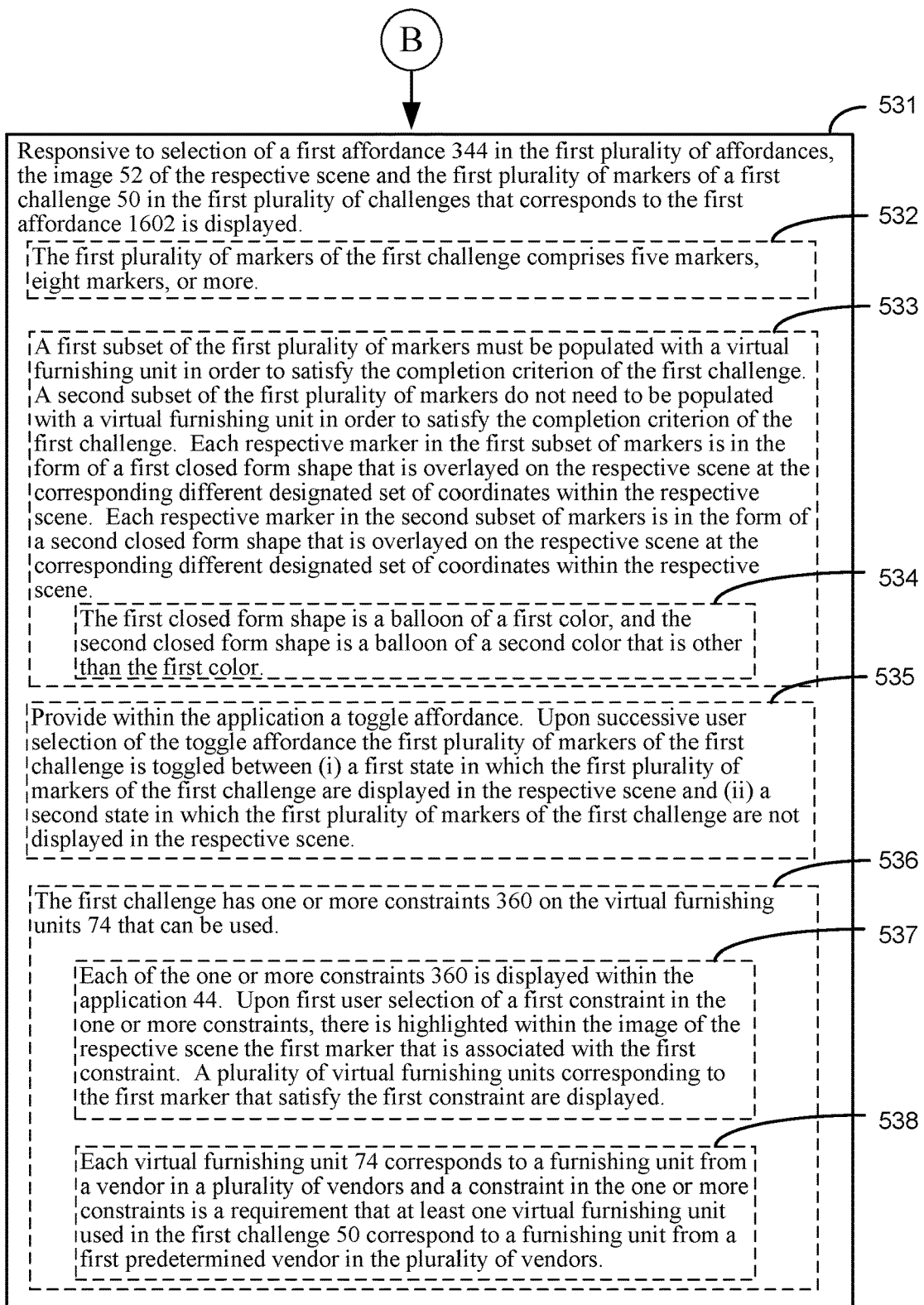

Referring to block 531 of FIG. 5C, responsive to selection of a first affordance 345 in the first plurality of affordances 1602 (FIG. 16), the scene image 52 of the respective scene and the first plurality of markers of a first challenge 50 in the first plurality of challenges that corresponds to the first affordance 1602 is displayed. For instance, referring to FIG. 6, seven markers 56 and the scene image 52 of a challenge 50 are displayed. Referring to block 532 of FIG. 5C, in some embodiments the plurality of markers of the challenge comprises five markers, eight markers, or more.

Referring to block 533 of FIG. 5C and continuing to refer to FIG. 6, a first subset of the displayed markers 56 must be populated with a virtual furnishing unit 74 in order to satisfy the completion criterion of the first challenge. A second subset of the markers do not need to be populated with a virtual furnishing unit 74 in order to satisfy the completion criterion of the challenge 50. Accordingly, in some embodiments, each respective marker in the first subset of markers (the required markers) is in the form of a first closed form shape that is overlaid on the respective scene at its corresponding different designated set of coordinates within the respective scene. Each respective marker in the second subset of markers (the optional markers) is in the form of a second closed form shape that is overlaid on the respective scene at the corresponding different designated set of coordinates within the respective scene. Referring to block 534 of FIG. 5C, in some such embodiments, the first closed form shape is a balloon of a first color (e.g., blue), and the second closed form shape is a balloon of a second color that is other than the first color (e.g., purple). Referring to FIG. 6, in some such embodiments, the first closed form shape is an unmarked (not hashed) balloon, and the second closed form shape is a hashed balloon. Accordingly, in FIG. 6, markers 56-1, 56-2, 56-3, 56-4, and 5-7 are required to be populated with virtual furnishing units 74 in order to complete the challenge whereas markers 56-5 and 56-6 are not required to be populated with virtual furnishing units 74 in order to complete the challenge.

Referring to block 535 of FIG. 5C, and with reference to FIG. 6, successive user selection of the toggle affordance 601 causes the markers 56 of the selected challenge to toggle between (i) a first state in which the markers are displayed in the respective scene image 52 (as illustrated in FIG. 6) and (ii) a second state in which the first plurality of markers of the first challenge are not displayed in the respective scene (not shown).

Referring to FIG. 6, in typical embodiments, the purpose of the challenge is to decorate a room using 3D representations of real-world decor items (virtual furnishing units 74). In some embodiments, the available virtual furnishing units 74 are provided at the bottom of the screen as illustrated in FIG. 6 and as discussed in more detail below.

Referring to block 536 of FIG. 5C, in some embodiments, the challenge 50 has one or more constraints 360 on the virtual furnishing units 74 that can be used (e.g., some challenges have requirements and/or restrictions that must be followed). Referring to block 537 of FIG. 5C, in some such embodiments, each of the one or more constraints 360 is displayed within the application 44. Upon user selection of a first constraint in the one or more constraints, there is highlighted within the scene image 52 of the respective scene the first marker that is associated with the first constraint. Furthermore, a plurality of virtual furnishing units 74 corresponding to the first marker 56 that satisfy the first constraint are displayed.

Referring to block 538 of FIG. 5C, in some such embodiments, each virtual furnishing unit 74 corresponds to a furnishing unit from a vendor in a plurality of vendors and a constraint in the one or more constraints is a requirement that at least one virtual furnishing unit used in the first challenge 50 correspond to a furnishing unit from a first predetermined vendor in the plurality of vendors. For instance, in some embodiments, a vendor is a business organization that is in the business of making furniture or décor items. For instance, in other embodiments, a vendor is a business organization that is in the business of selling furniture or décor items.

Figure 5D:
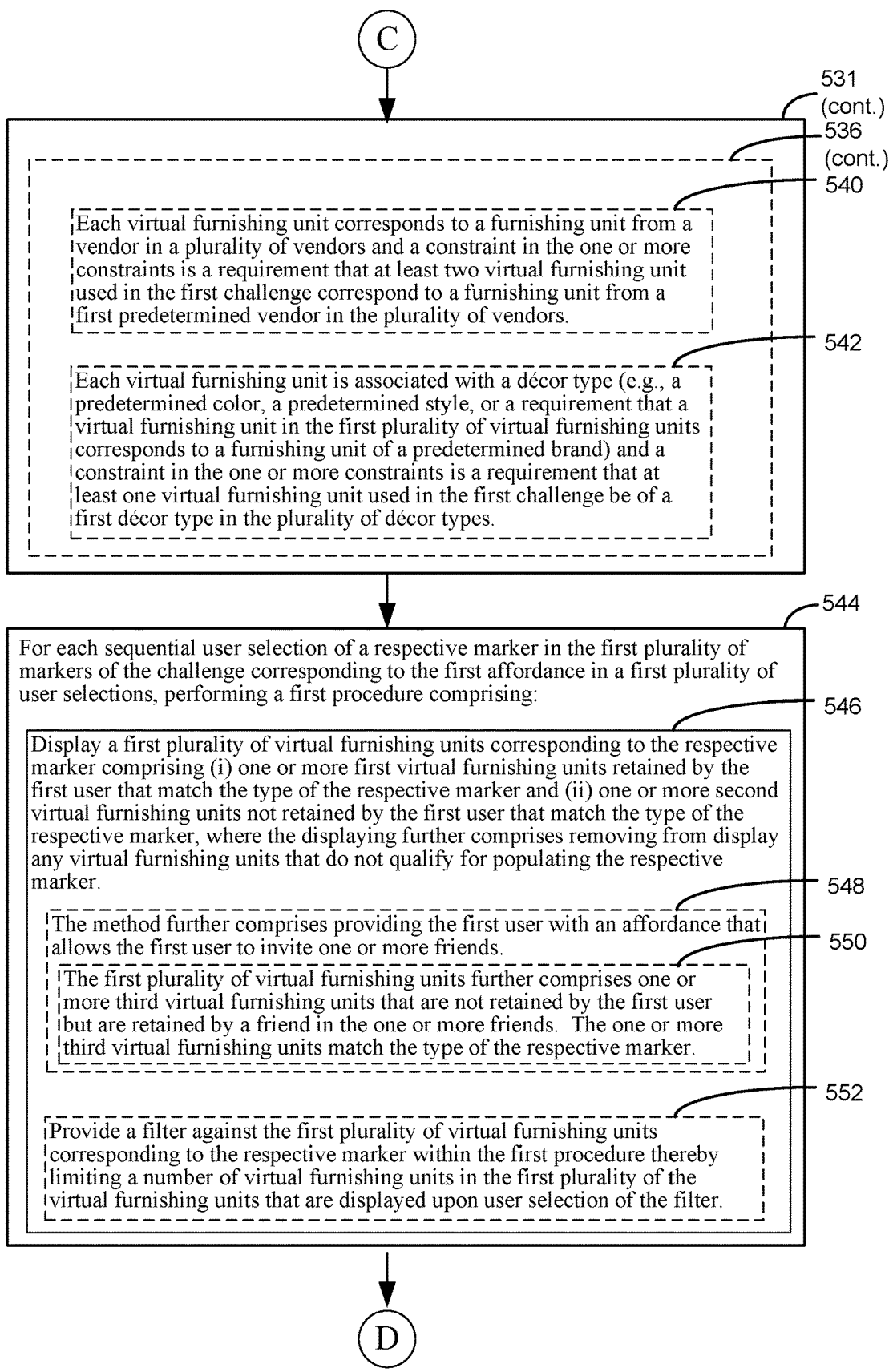

Referring to block 540 of FIG. 5D, in some embodiments, each virtual furnishing unit 74 corresponds to a furnishing unit (e.g., chair, coach, table, dresser, desk, lamp, décor item, etc.) from a vendor in a plurality of vendors and a constraint in one or more constraints for a particular challenge 50 is a requirement that at least two virtual furnishing units used in the first challenge correspond to a furnishing unit from a first predetermined vendor in a plurality of vendors.

Referring to block 542 of FIG. 5D, in some embodiments, each virtual furnishing unit 74 is associated with a décor type (e.g., a predetermined color, a predetermined style, or a requirement that a virtual furnishing unit 74 in the plurality of virtual furnishing units available to the user corresponds to a furnishing unit of a predetermined brand) and a constraint in the one or more constraints for a particular challenge 50 is a requirement that at least one virtual furnishing unit 74 used in the particular challenge be of a first décor type in the plurality of décor types.

Referring to block 544 of FIG. 5D and FIG. 6 for reference, for each sequential user selection of a respective marker 56 in the plurality of markers of a challenge 50 corresponding to the first affordance 1602 (FIG. 16) in a first plurality of user selections (of such markers), the application module 44 performs a first procedure. In this first procedure, and referring to block 546 of FIG. 5D and FIG. 19 for reference, a plurality of virtual furnishing units corresponding to the respective marker 56 is displayed. For instance, in FIG. 19, the virtual furnishing units corresponding to the respective marker 56-4, table lamps, is displayed. The plurality of virtual furnishing units comprises (i) one or more first virtual furnishing units retained (e.g., owned 1902) by the user completing the challenge (e.g., first user) that match the type 70 of the respective marker (e.g., table lamp) and (ii) one or more second virtual furnishing units not retained (e.g., shop 1904) by the user completing the challenge that match the type 70 of the respective marker (e.g., table lamp). In such embodiments the displaying further comprises removing from display any virtual furnishing units that do not qualify for populating the selected respective marker. For instance, if the user had previously selected a different marker, such as marker 56-10 in FIG. 19, the virtual furnishing units corresponding to the previously selected marker (e.g., couches) would be removed from the display when marker 56-12 is selected.

Thus, to summarize, and referring to FIG. 19, a user (e.g., player) chooses a design challenge 50 to enter. Once this is done, a scene image 52 of an empty room (or other scenery such as an outdoor location) appears, ready for decorating. Bubbles, or other closed form shapes show positions where decor items may be placed (markers 56). Some markers are mandatory for challenge completion (e.g., in FIG. 19, markers 56-2 through 56-10, and markers 56-12 and 56-13), while other markers are optional (e.g., in FIG. 19, markers 56-11 and 56-1). A user chooses a marker 56 (e.g., chooses a bubble). Once the user chooses a marker, e.g., marker 56-4 in FIG. 19, available virtual furnishing units 74 (e.g., items modeled from real-world decor) available for user to purchase for use in the challenge 50 (e.g., using one of the application counters) are presented to the user (e.g., Shop section 1904 in FIG. 19). The user's inventory that matches the type of the selected marker also appears (e.g., owned section 1902 in FIG. 19). The player chooses a decor item (e.g., the player chooses a displayed virtual furnishing units 74). If the chosen virtual furnishing unit is not yet in the user's inventory (e.g., the user selected the unit from the shop section 1904, such as the table lamp 74-3, it may be purchased using the specified amount of the second application counter 64 (FIG. 11) (e.g., virtual cash) or third application counter 66 (FIG. 11) (e.g., diamonds). In some embodiments, purchased virtual furnishing units are usable for a limited number of challenges (e.g., 5 different challenges in some embodiments). The chosen virtual furnishing unit is then placed in the scene image 52 at the position of the corresponding marker 56. For instance, in FIG. 19, if the user selects virtual furnishing unit 74-1 for marker 56-4, a three-dimensional graphic 354 of the virtual furnishing unit 74-1 is positioned in the scene image 52 at the coordinates of marker 56-4 and the closed form shape of the marker 56-4 is no longer displayed.

Referring to block 548 of FIG. 5D, in some embodiments, the method further comprises providing the user with an affordance that allows the first user to invite one or more friends (not shown). For example, the affordance allows the first user to link the application with one or more social media accounts of the first user, and to invite one or more friends through the first user's social media accounts. The application identifies, from the first user's social media accounts, a list of friends who are current users of the application, and sends invitations to the one or more friends to join in the first user's challenge and provide virtual furnishing units for loan to the first user. One of the benefits of this is that, referring to block 550 of FIG. 5D and FIG. 19, in such embodiments, the plurality of virtual furnishing units 74 that is displayed responsive to selection of a marker 56 in the scene image 52 further comprises one or more third virtual furnishing units that are not retained by the first user but are retained by a friend in the one or more friends. The one or more third virtual furnishing units match the type of the respective marker. Advantageously, the user can use any of the virtual furnishing units in the one or more third virtual furnishing units without being charged in units of the second counter (e.g., virtual cash) or the third counter (e.g., diamonds).

As discussed above, in some embodiments, when a user selects a particular marker 56 in the scene image 52 of a challenge, all virtual furnishing units that match the type 70 of the selected marker are displayed (termed "the first plurality of virtual furnishing units") as illustrated in FIG. 19 for a table lamp. Referring to block 552 of FIG. 5D, in some embodiments, the application module 44 further provides a filter against the first plurality of virtual furnishing units corresponding to the respective marker within the first procedure thereby limiting a number of virtual furnishing units in the first plurality of the virtual furnishing units that are displayed upon user selection of the filter. For instance, referring to FIG. 6, the user can use the filter 604 to further limit the display of the virtual furnishing units 74 that matches a selected marker 56.

Figure 5E:
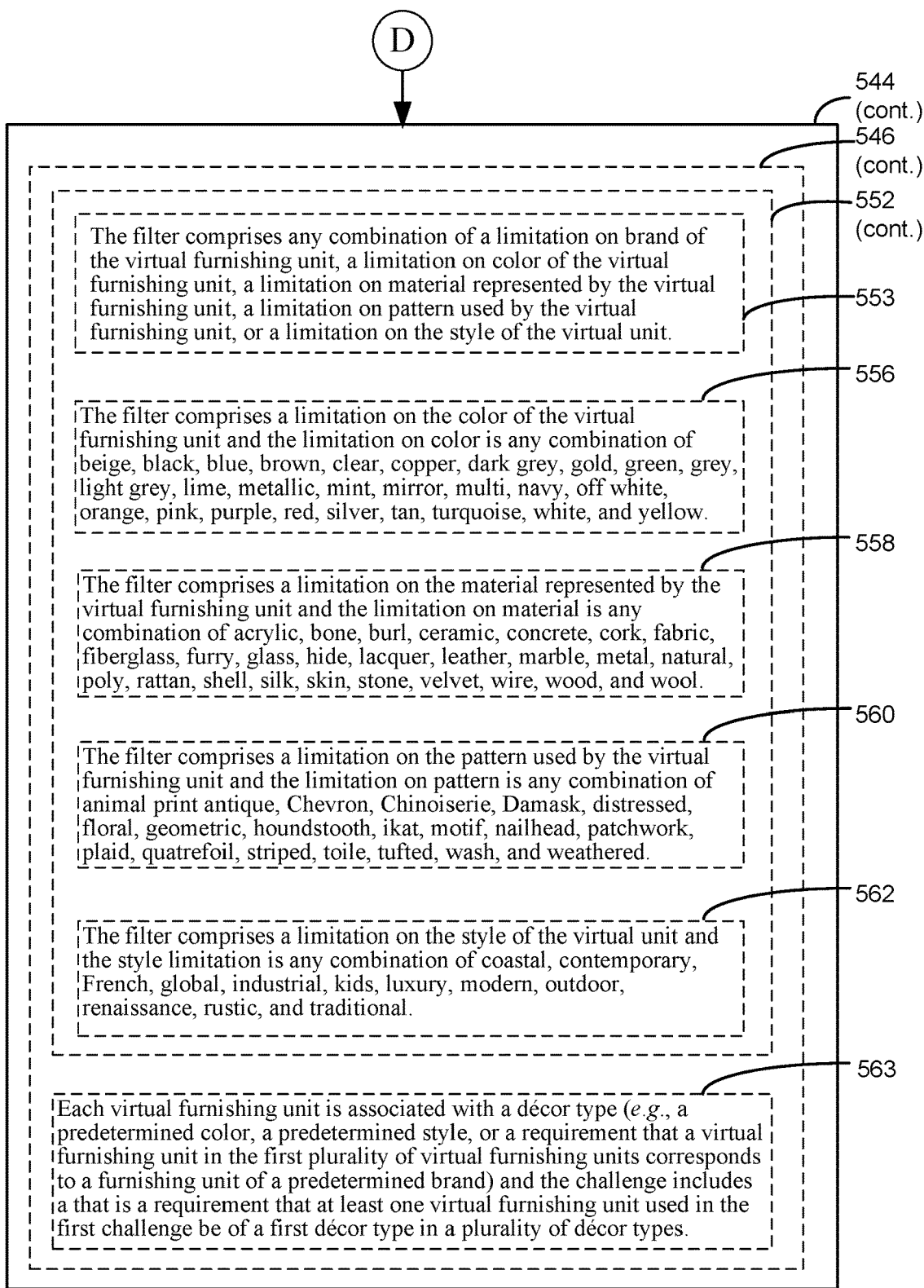
Figure 20:
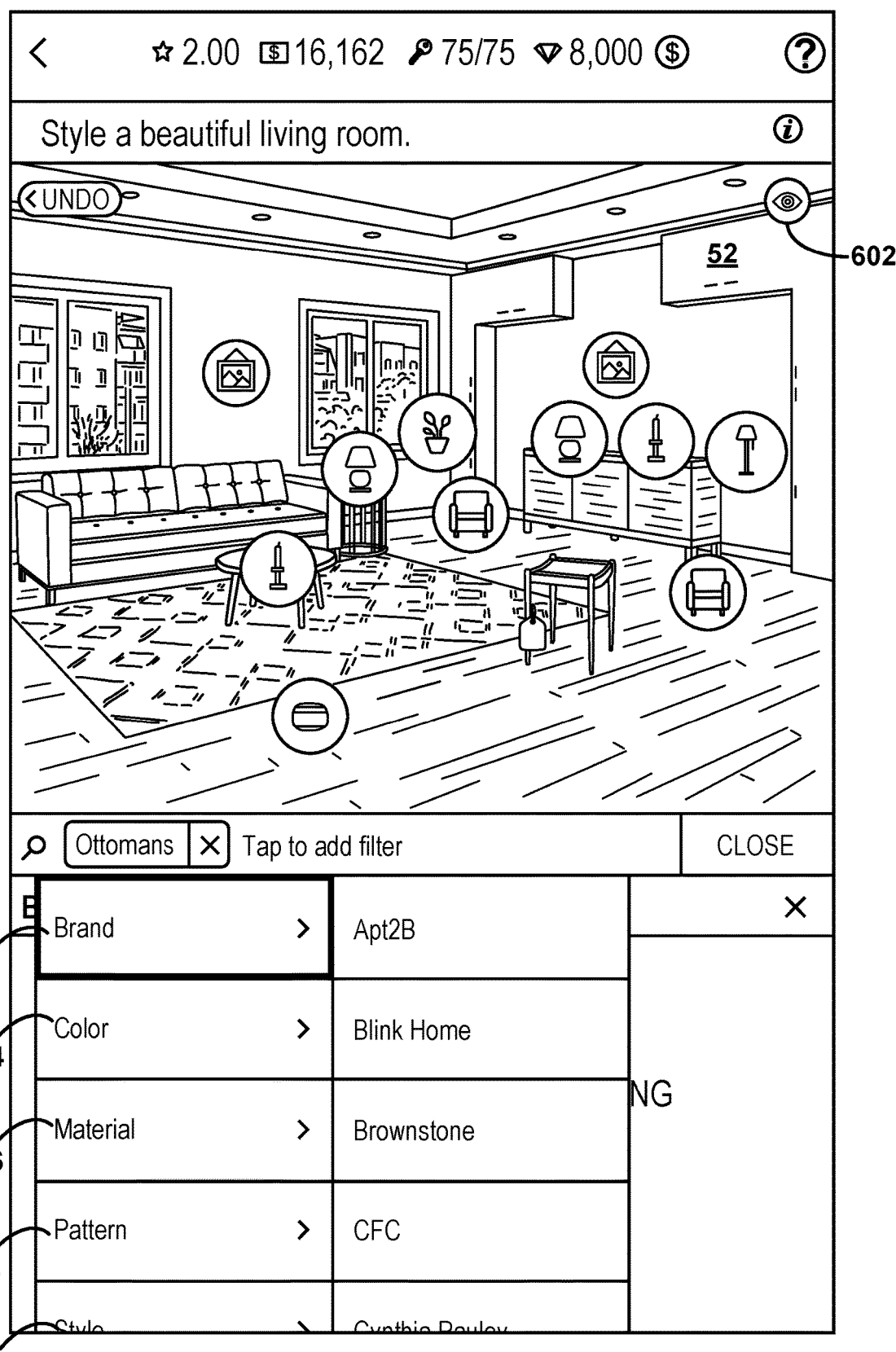
FIG. 20 illustrates providing a filter against a plurality of virtual furnishing units corresponding to a respective marker thereby limiting a number of virtual furnishing units that are displayed upon user selection of the filter in accordance with some implementations of the present disclosure.
Figure 21:
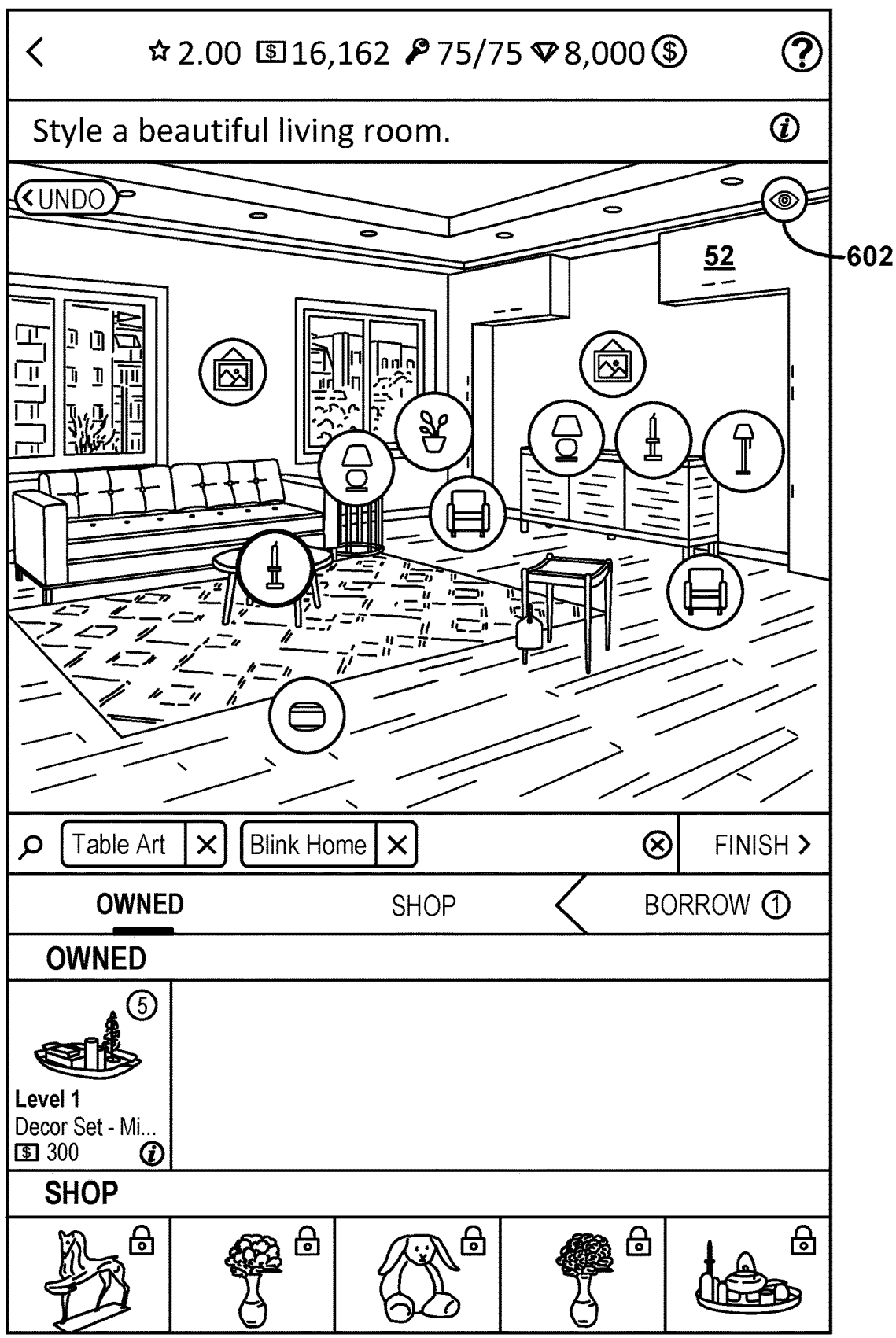
FIG. 21 further illustrates providing a filter against a plurality of virtual furnishing units corresponding to a respective marker thereby limiting a number of virtual furnishing units that are displayed upon user selection of the filter in accordance with some implementations of the present disclosure.

Referring to block 553 of FIG. 5E, FIG. 20 and FIG. 21, in some embodiments the filter 604 comprises any combination of a limitation on brand 2002 of the virtual furnishing unit 74, a limitation on color 2004 of the virtual furnishing unit, a limitation on material 2006 represented by the virtual furnishing unit, a limitation on pattern 2008 used by the virtual furnishing unit, or a limitation on the style 2010 of the virtual unit. In such embodiments, the user of the application module 44 can use the filter 604 to limit the displayed virtual furnishing units 74 by any combination of designated brand corresponding to the virtual furnishing units, virtual furnishing unit color, material used to make the real world item corresponding to the virtual furnishing unit, pattern used by the virtual furnishing unit, or style of the virtual furnishing units. FIG. 21 illustrates the display of the virtual furnishing unit corresponding to "Table Art" by the application 44 in response to utilization of the brand filter 2002 and the selection of the designated brand "Blink Home."

Referring to block 556 of FIG. 5E and FIG. 20, in some embodiments the filter 604 comprises a limitation on the color of the virtual furnishing unit 74. In some such embodiments, the limitation on color is any combination of beige, black, blue, brown, clear, copper, dark grey, gold, green, grey, light grey, lime, metallic, mint, mirror, multi, navy, off white, orange, pink, purple, red, silver, tan, turquoise, white, and yellow. Thus, in such embodiments, the user of the application module 44 can use the filter 604 to limit the displayed virtual furnishing units 74 by any combination of colors (e.g., any combination of beige, black, blue, brown, clear, copper, dark grey, gold, green, grey, light grey, lime, metallic, mint, mirror, multi, navy, off white, orange, pink, purple, red, silver, tan, turquoise, white, and yellow).

Referring to block 558 of FIG. 5E and FIG. 20, in some embodiments the filter 604 comprises a limitation on the material represented by the virtual furnishing unit 74. In some such embodiments the limitation on material is any combination of acrylic, bone, burl, ceramic, concrete, cork, fabric, fiberglass, furry, glass, hide, lacquer, leather, marble, metal, natural, poly, rattan, shell, silk, skin, stone, velvet, wire, wood, and wool. Thus, in such embodiments, the user of the application module 44 can use the filter 604 to limit the displayed virtual furnishing units 74 by any combination of material (e.g., acrylic, bone, burl, ceramic, concrete, cork, fabric, fiberglass, furry, glass, hide, lacquer, leather, marble, metal, natural, poly, rattan, shell, silk, skin, stone, velvet, wire, wood, wool, etc.).

Referring to block 560 of FIG. 5E and FIG. 20, in some embodiments the filter 604 comprises a limitation on the pattern used by the virtual furnishing unit 74. In some such embodiments, the limitation on pattern is any combination of animal print antique, Chevron, Chinoiserie, Damask, distressed, floral, geometric, houndstooth, ikat, motif, nailhead, patchwork, plaid, quatrefoil, striped, toile, tufted, wash, and weathered. Thus, in such embodiments, the user of the application module 44 can use the filter 604 to limit the displayed virtual furnishing units 74 to any particular pattern or combination of patterns (e.g., animal print antique, Chevron, Chinoiserie, Damask, distressed, floral, geometric, houndstooth, ikat, motif, nailhead, patchwork, plaid, quatrefoil, striped, toile, tufted, wash, weathered, etc.).

Referring to block 562 of FIG. 5E, in some embodiments the filter 604 comprises a limitation on the style of the virtual unit 74. In some such embodiments, the style limitation is any combination of coastal, contemporary, French, global, industrial, kids, luxury, modern, outdoor, renaissance, rustic, and traditional. Thus, in such embodiments, the user of the application module 44 can use the filter 604 to limit the displayed virtual furnishing units 74 to any style, or any combination of styles (e.g., coastal, contemporary, French, global, industrial, kids, luxury, modern, outdoor, renaissance, rustic, traditional, etc.)

Referring to block 563 of FIG. 5E, in some embodiments, each virtual furnishing unit 74 is associated with a décor type (e.g., a predetermined color, a predetermined style, or a requirement that a virtual furnishing unit 74 in the first plurality of virtual furnishing units corresponds to a furnishing unit 74 of a predetermined brand). Moreover, in some embodiments, one or more constraints 360 is associated with the challenge 50. In some such embodiments, the requirement is that at least one virtual furnishing unit 74 used in the first challenge be of a first décor type in the plurality of décor types. As an example, in one example challenge 50, there is a constraint 360 that at least one of the selected virtual furnishing units 74 be blue. Thus, in order to successfully complete the challenge, one of the selected virtual furnishing units 74 for one of the markers 56 of the challenge must be blue. As another example, in one example challenge 50, there is a constraint 360 that at least two of the selected virtual furnishing units 74 be from a particular manufacturer. Thus, in order to successfully complete the challenge, two of the selected virtual furnishing units 74 for markers 56 of the challenge must be from this particular manufacturer.

Figure 5F:
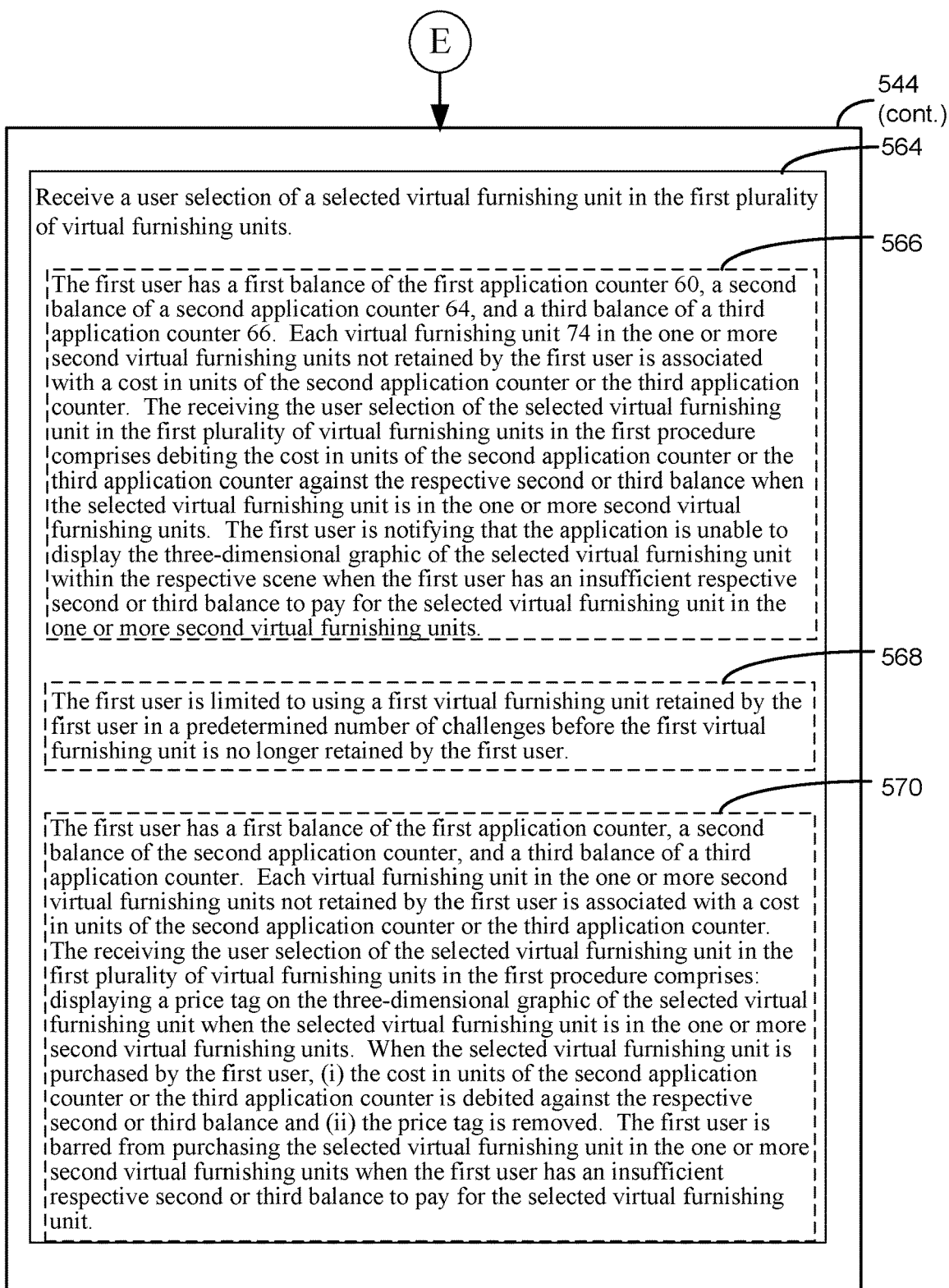
Figure 18:
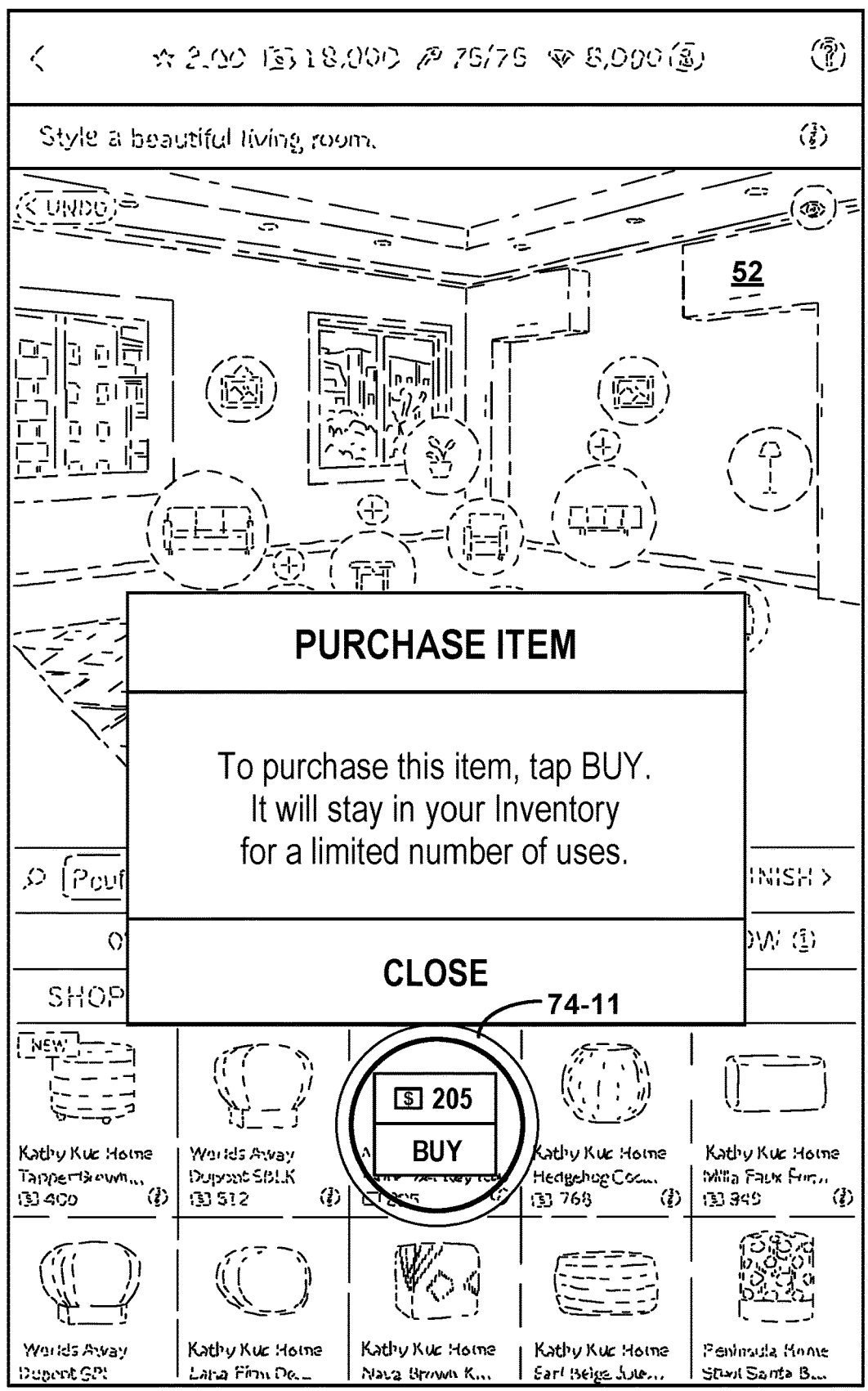
FIG. 18 is a screen image illustrating a virtual furnishing unit not retained by the first user, where the virtual furnishing unit is associated with a cost in units of a second application counter or a third application counter, and where user selection of the virtual furnishing unit comprises debiting the cost in units of the second application counter or the third application counter against the respective second or third balance of the user in accordance with some implementations of the present disclosure.

Referring to block 564 of FIG. 5F, the first procedure of block 544 (FIG. 5D) continues with a user selection of a selected virtual furnishing unit 74 in the plurality of virtual furnishing units that are displayed. In some such embodiments, referring to block 566 of FIG. 5F and referring to FIG. 11, user has a first balance of a first application counter 60 (e.g., keys), a second balance of a second application counter 64 (e.g., virtual cash), and a third balance of a third application counter 66 (e.g., diamonds). Each virtual furnishing unit 74 in the one or more second virtual furnishing units not retained by the first user is associated with a cost in units of the second application counter or the third application counter. For instance, referring to FIG. 18, the virtual furnishing unit 74-11 has a cost of $205 in units of the second application counter 64 (e.g., virtual cash). In such embodiments, the receiving of the user selection of the selected virtual furnishing unit in the first plurality of virtual furnishing units in the first procedure comprises debiting the cost in units of the second application counter or the third application counter against the respective second or third balance when the selected virtual furnishing unit is not already owned by the first user. When the user has an insufficient respective second or third balance to pay for the selected virtual furnishing unit, the user is notified that the application is unable to display the three-dimensional graphic of the selected virtual furnishing unit within the respective scene. For instance, in the case of unit 74-11 in FIG. 18, the user cannot display this virtual furnishing unit 74-11 if the second application counter 64 associated with the user is less than $205. In typical embodiments, and referring to block 568 of FIG. 568, even in instances where a user of the application module 44 owns (retains) a particular virtual furnishing unit 74, the user is limited to using the virtual furnishing unit 74 retained by the user in a predetermined number 1910 of challenges (FIG. 19) before the virtual furnishing unit 74 is no longer retained (owned) by the user. For instance, referring to FIG. 19, a user can use a particular virtual furnishing unit 74-2 retained by the user for five challenges 1910-2 before the user no longer owns the furnishing unit 74-2. At this point, if the user would like to use the particular virtual furnishing unit 74 in another (sixth) challenge, the user will have to pay a price in the specified units of the second counter or third counter) to again use the virtual furnishing unit. Alternatively, the user can borrow the virtual furnishing unit from a friend who owns the unit, e.g., by selecting the borrow affordance 1912 as shown in FIG. 19. In some embodiments, the user can use a retained virtual furnishing unit 74 in three challenges 50 before the user no longer owns the virtual furnishing unit 74. In some embodiments, the user can use a retained virtual furnishing unit 74 in four challenges 50 before the user no longer owns the virtual furnishing unit 74. In some embodiments, the user can use a retained virtual furnishing unit 74 in six challenges 50 before the user no longer owns the virtual furnishing unit 74. In some embodiments, the user can use a retained virtual furnishing unit 74 in seven challenges 50 before the user no longer owns the virtual furnishing unit 74. In some embodiments, the user can use a retained virtual furnishing unit 74 in eight challenges 50 before the user no longer owns the virtual furnishing unit 74.

Referring to block 570 of FIG. 5F, in a related embodiment, the user of the application module 44 has a first balance of the first application counter 60 (e.g., keys), a second balance of the second application counter 64 (e.g., virtual cash), and a third balance of the third application counter 66 (e.g., diamonds). Each virtual furnishing unit 74 in the one or more second virtual furnishing units not retained by the user (e.g., the virtual furnishing units in section 1904 of FIG. 19) is associated with a cost in units of the second application counter or the third application counter. In this embodiment, the receiving of the user selection of the selected virtual furnishing unit 74 in the plurality of virtual furnishing units in the first procedure comprises displaying a price tag on the three-dimensional graphic 354 of the selected virtual furnishing unit 74 when the selected virtual furnishing unit 74 is in the one or more second virtual furnishing units (e.g., in the section 1904 of FIG. 19, which contains furnishing units 74 not owned by the user). This is illustrated in FIG. 19, where a price tag 1906 is displayed with the three-dimensional graphic 354-1 for a selected virtual furnishing item 74 not retained by the user that the user has not yet paid for. When the selected virtual furnishing unit 74 is subsequently purchased by the first user, the first procedure further comprises (i) debiting the cost in units of the second application counter or the third application counter against the respective second or third balance and (ii) removing the displayed price tag 1906 from the three-dimensional graphic 354-1. Tags remain on items that the user has not purchased (retained) yet. In some embodiments, the user can have only one unpurchased (not retained) item in their challenge 50 while designing the challenge. In some embodiments, the user can have up to two unpurchased (not retained) furnishing units in their challenge 50 while completing the challenge. In some embodiments, the user can have up to three, up to four, up to five, or up to six unpurchased furnishing units in their challenge 50 while completing the challenge. As noted in the related embodiment above, the first user is barred from purchasing the selected virtual furnishing unit 74 when the first user has an insufficient respective second or third balance to pay for the selected virtual furnishing unit 74.

Figure 5G:
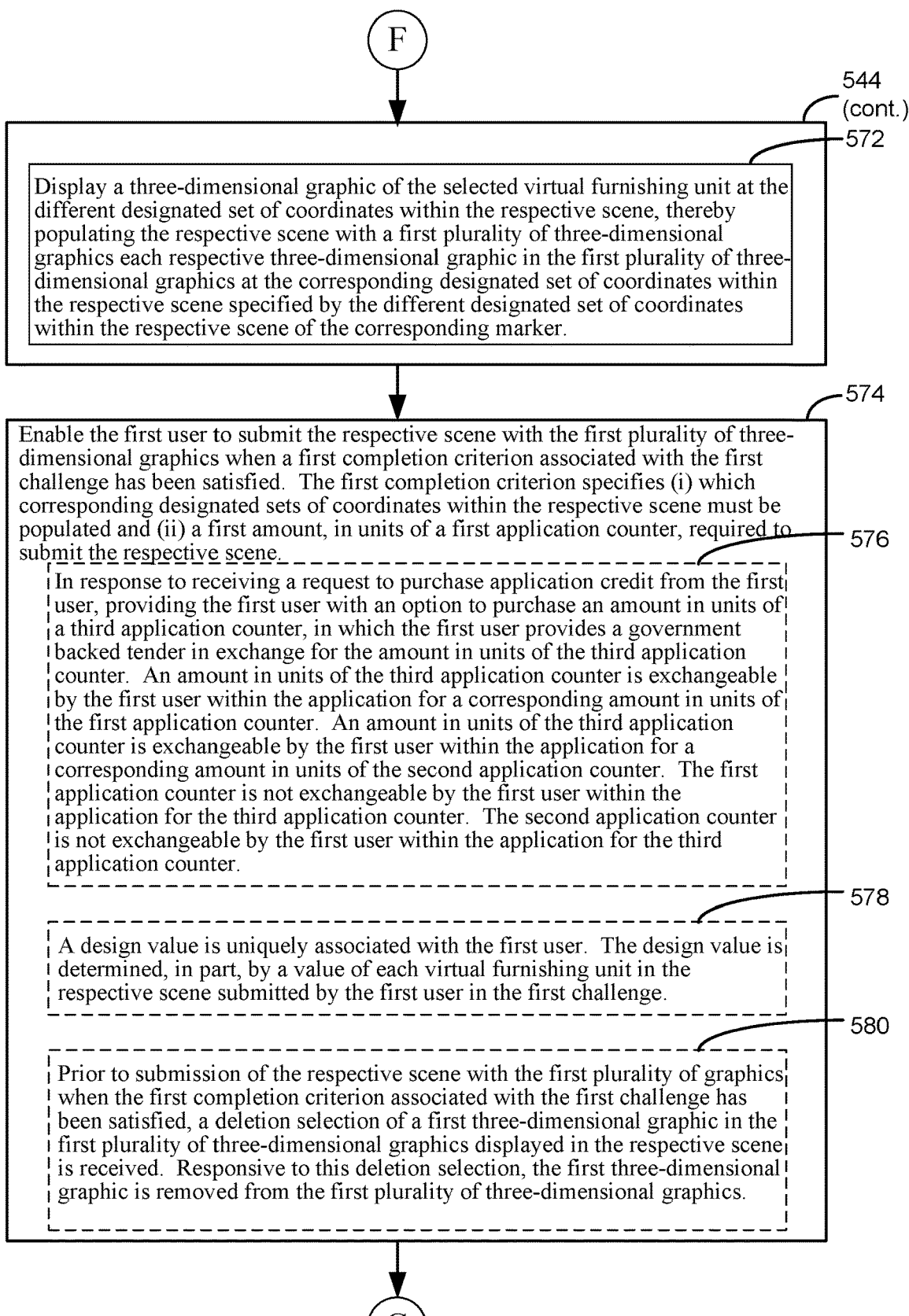
Figure 7:
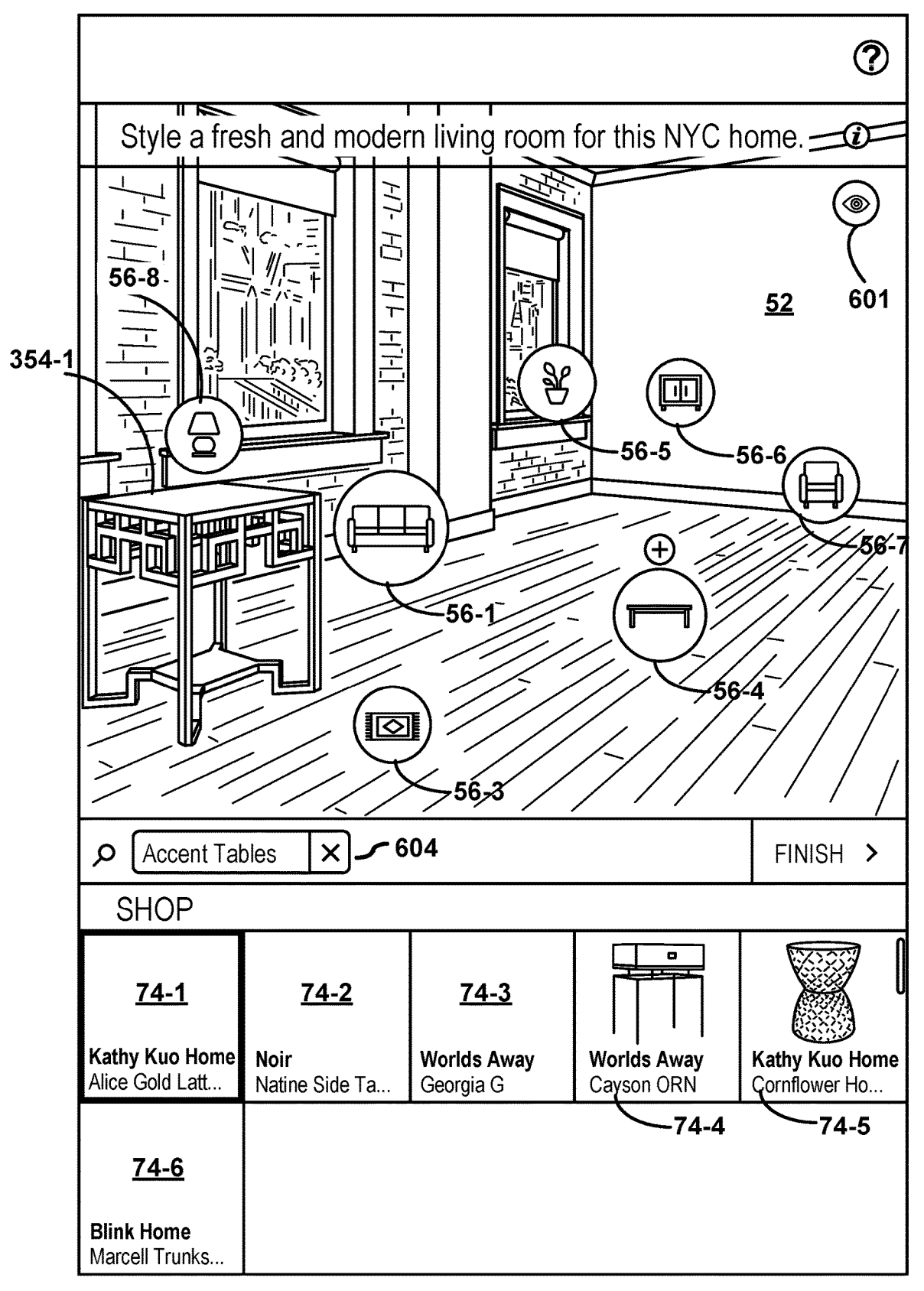

Referring to block 572 of FIG. 5G, the first procedure of block 544 (FIG. 5D) continues with the display of a three-dimensional graphic 354 of the selected virtual furnishing unit 74 at the different designated set of coordinates within the respective scene, thereby populating the respective scene with a first plurality of three-dimensional graphics each respective three-dimensional graphic in the first plurality of three-dimensional graphics at the corresponding designated set of coordinates within the respective scene specified by the different designated set of coordinates within the respective scene of the corresponding marker. For instance, the transition from FIG. 6 to FIG. 7 illustrates how the marker 56-2 in FIG. 6 is replaced with a three-dimensional graphic 354-1 (FIG. 7) of the selected virtual furnishing unit 74-1 for the marker 56-2 at the different designated set of coordinates within the respective scene of the marker 56-2. The transition from FIG. 7 to FIG. 8 illustrates how the markers 56-8, 56-1, 56-5, 56-6, 56-7, 56-3, and 56-4 are respectively replaced with the three-dimensional graphics 354-2 (56-8→354-2, lamp), 354-3 (56-1→354-3, couch), 354-7 (56-5→354-7, large plant), 354-4 (56-6→354-4, cabinet), 354-5 (56-7→354-5, chair), 354-6 (56-3→354-6, rug), and 354-8 (56-4→354-8, coffee table) of the selected virtual furnishing units 74 for these markers at the different designated set of coordinates within the scene image 52 for these respective markers.

Figure 10:
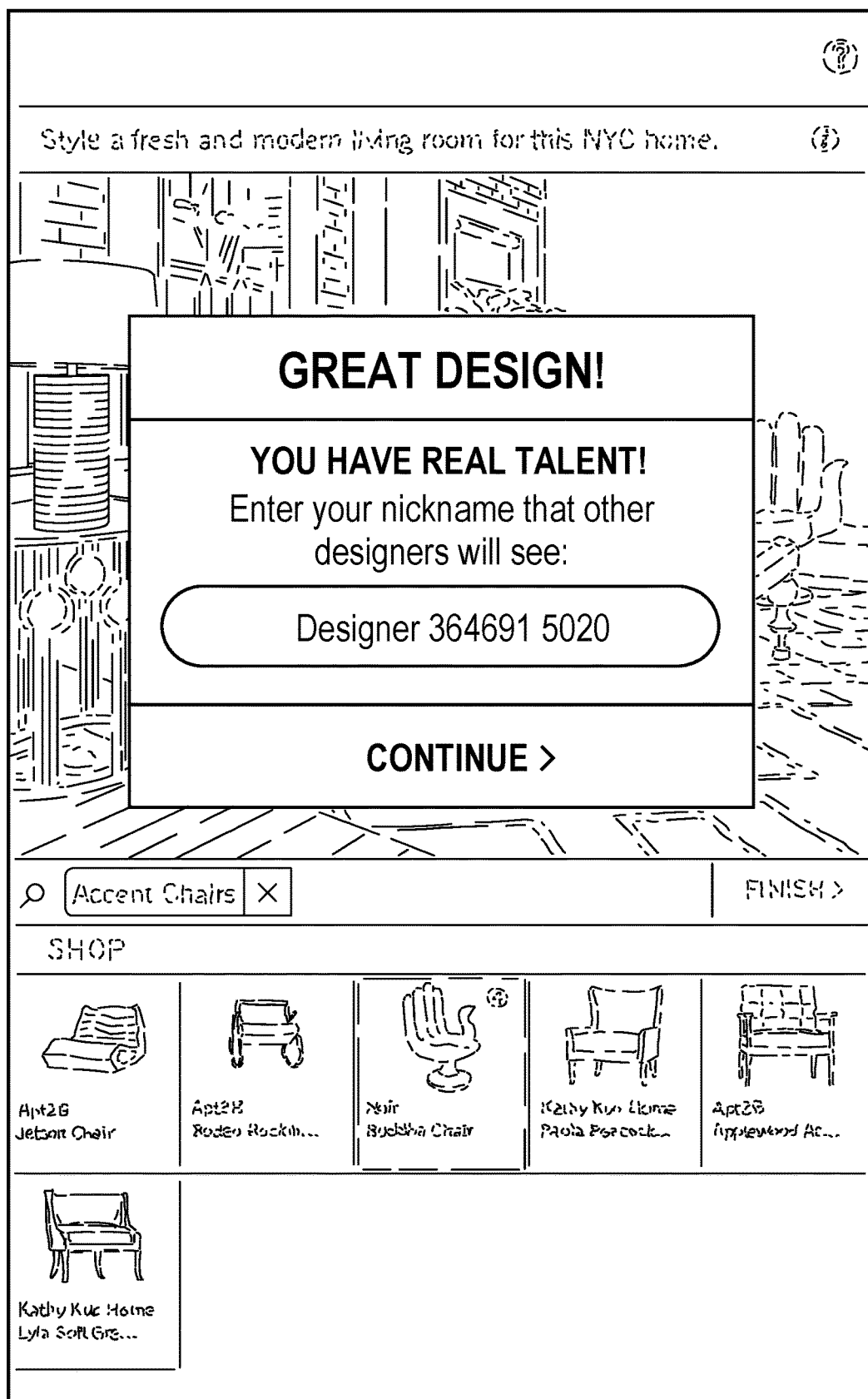
FIG. 10 is a screen image showing an application after a user has submitted a scene with selected three-dimensional graphics within the scene when a first completion criterion associated with a challenge that includes the scene has been satisfied in accordance with some implementations of the present disclosure.

Referring to block 574 of FIG. 5G, the application module 44 enables the user of the application 44 to submit the respective scene with the first plurality of three-dimensional graphics when a first completion criterion associated with the first challenge has been satisfied. In some such embodiments, the first completion criterion specifies (i) which corresponding designated sets of coordinates within the respective scene must be populated and (ii) a first amount, in units of the first application counter 60, required to submit the respective scene. To illustrate, FIG. 8 represents a challenge in which the designated sets of coordinates corresponding to markers 56 that must be populated within the scene image 52 of the challenge 50 have been populated with three-dimensional graphics 354 of selected virtual furnishing units 74. Accordingly, the user may now select affordance 802 to submit a description of the virtual furnishing units 74 that user has selected for the challenge 50. In some embodiments, when the user has completed the challenge 50 and selects the affordance 802, the panel 902 illustrated in FIG. 9 is illustrated, enabling the user to submit the design. When the user submits the design (e.g., using panel 902) the user is charged a first amount, in units of the first application counter 60 (e.g., a number of keys associated with submitting a design for the challenge). Upon submitting the design, the application module 44 provides confirmation of the submission as illustrated in FIG. 10.

As noted above, the user may not select virtual furnishing units 74 that the user does not retain when the user has insufficient credit in terms of the applicable second or third application counter. Moreover, the user cannot submit a design for a challenge 50 when the user does not have sufficient credit in terms of the first application counter 60. Accordingly, in some embodiments as illustrated in block 576 of FIG. 5G, the application module 44, in response to receiving a request to purchase application credit from the user (e.g., when the user clicks on their account balance 1202 in FIG. 12), provides the user with an option to purchase an amount in units of the third application counter 66 (e.g. diamonds). In such embodiments, the first user provides a government backed tender (e.g., U.S. currency) in exchange for the amount in units of the third application counter 66 (e.g., diamonds). Moreover, in such embodiments an amount in units of the third application counter 66 (e.g., diamonds) is exchangeable by the user within the application 44 for a corresponding amount in units of the first application counter 60 (e.g., keys). Moreover, an amount in units of the third application counter 66 (e.g., diamonds) is exchangeable by the user within the application 44 for a corresponding amount in units of the second application counter 64 (e.g., virtual cash). In some such embodiments, the first application counter 60 (e.g., keys) is not exchangeable by the user within the application 44 for the third application counter (e.g., diamonds). Also, the second application counter 64 (e.g., virtual cash) is not exchangeable by the user within the application 44 for the third application counter (e.g., diamonds).

Referring to 578 of FIG. 5G, in some embodiments, a design value 70 is uniquely associated with a user of the application module 44. In some such embodiments the design value 70 is the total value of all the challenges 50 (rooms) the user has successfully completed and submitted for community vote. Each time a user submits such a completed challenge 50, the user's design value 70 increases by the total value of the virtual furnishing units 74 the user used in the submitted challenge. As such, in some embodiments, the design value 70 is determined, in part, by a value of each virtual furnishing unit in the respective scene submitted by the user in a challenge.

Block 580 of FIG. 5G highlights that some embodiments of the application module 44 support an undo function. FIG. 19 illustrates this feature. In FIG. 19, the undo affordance 1908 can be used to undo the last user action. For instance, if the last user action was to place the three-dimensional graphic 354-1 of a corresponding selected virtual furnishing unit 74, selection of the affordance 1908 undoes this selection, thereby removing the three-dimensional graphic 354-1 from the scene image 52. If the last action was to select a challenge 50, selection of the undo affordance removes the user from the challenge. Accordingly, in an embodiment in accordance with block 580, in some embodiments, prior to submission of a respective scene image 52 for a challenge 50 with a first plurality of three-dimensional graphics 354 (corresponding to selected virtual furnishing units 74 for the challenge 50) when the first completion criterion associated with the first challenge has been satisfied, a deletion selection of a first three-dimensional graphic in the first plurality of three-dimensional graphics displayed in the respective scene is received (e.g. the user selects the undo affordance 1908 of FIG. 19). Responsive to the deletion selection of the first three-dimensional graphic 354, the first three-dimensional graphic 354 is removed from the first plurality of displayed three-dimensional graphics 354 in the scene image 52 of the challenge 50.

Figure 5H:
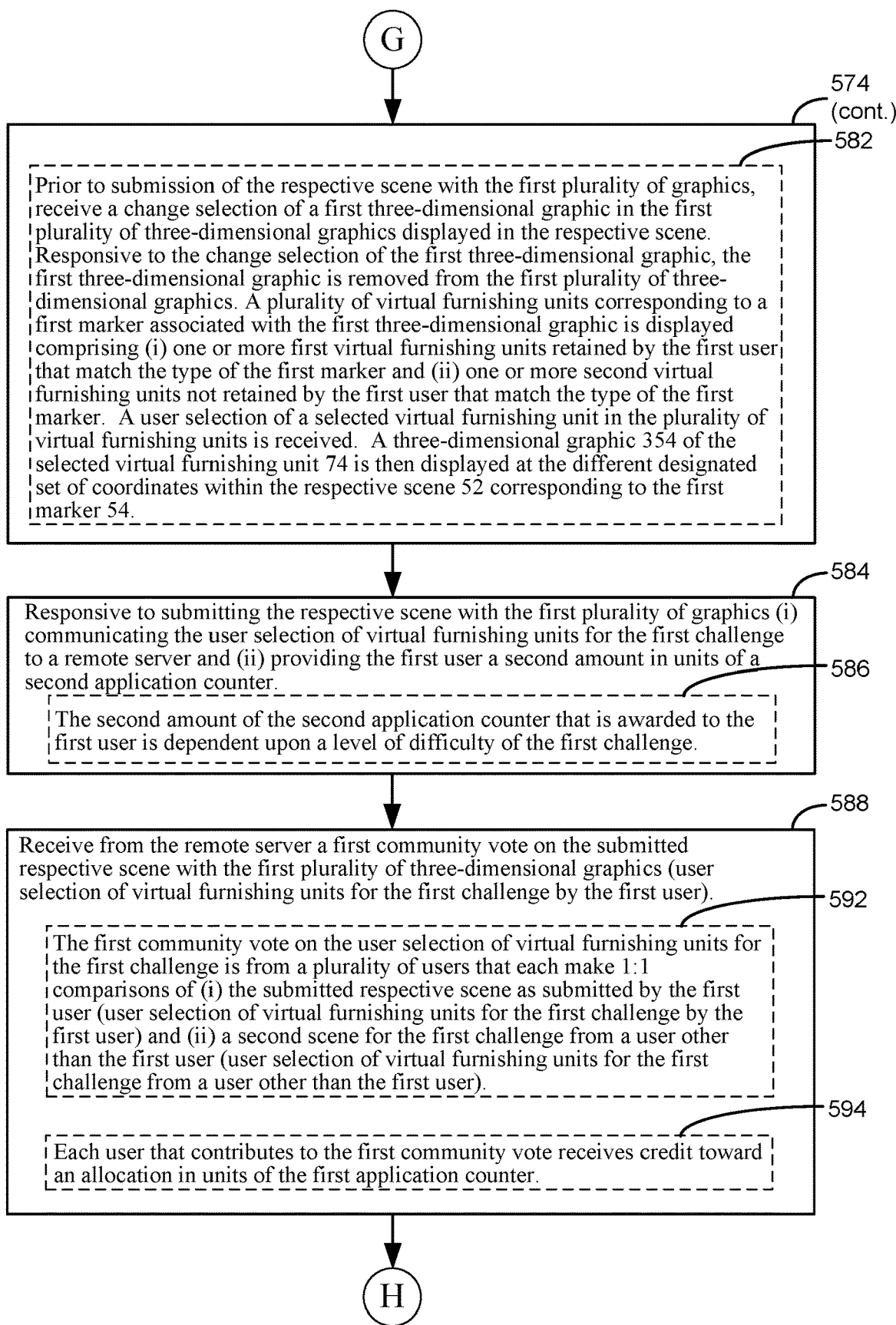

Block 582 of Figure of FIG. 5H highlights that some embodiments of the application module 44 supports a change selection function. This feature is explained using FIG. 8 as a reference. In FIG. 8, the user has recently placed a three-dimensional graphic 354-4 of an accent cabinet in the scene image 52 corresponding to a first virtual furnishing unit 74-2 among a plurality of virtual furnishing unit 74 that are all of the accent cabinet type 352 (units 74-1 through 74-6). However, the user is not satisfied with this selection. To replace the displayed three-dimensional graphic 354-4 of the accent cabinet in the scene image 52 corresponding to the first virtual furnishing unit 74 with a different one, all the user has to do in some embodiments is click on (select) a different displayed virtual furnishing unit 74. In response, the original image 354-4 is replaced in the scene image 52 with the three-dimensional graphic 354 of the newly selected virtual furnishing unit 74. Accordingly, in some embodiments in accordance with block 582, prior to submission of the respective scene image 52 with the first plurality of graphics 354 (corresponding to the virtual furnishing units 74 that the user has selected for the markers 56 in the challenge 50), a change selection is received for a first three-dimensional graphic in the first plurality of three-dimensional graphics displayed in the respective scene. Responsive to the change selection of the first three-dimensional graphic, the first three-dimensional graphic is removed from the first plurality of three-dimensional graphics. A plurality of virtual furnishing units corresponding to a first marker associated with the first three-dimensional graphic is provided (or was already being displayed) that comprises (i) one or more first virtual furnishing units retained by the first user that match the type of the first marker and (ii) one or more second virtual furnishing units not retained by the first user that match the type of the first marker. A user selection of a selected virtual furnishing unit 74 in the plurality of virtual furnishing units is received. Finally, a three-dimensional graphic of the selected virtual furnishing unit 74 is displayed at the different designated set of coordinates within the respective scene corresponding to the first marker. In some such embodiments, the change selection is detected when the user taps on a different one of the displayed virtual furnishing units as described above with reference to FIG. 8.

Referring to block 584 of FIG. 5H, responsive to submitting the respective scene with the first plurality of graphics (i) the user selection of virtual furnishing units 74 for the first challenge is communicated to a remote server and (ii) the first user is provided with a second amount in units of the second application counter 64. For instance, reference to FIG. 17, when the user completes the challenge illustrated in FIG. 17, the user earns an award 358 of $2,500 in units of the second application counter 64 (e.g., virtual cash). In some embodiments, what is communicated to the remote server (e.g., application server 106), is an identification of the virtual furnishing item 74 selected for each populated marker 56 in the plurality of markers associated with the challenge 50. That is, the scene image 52 complete with the three-dimensional graphics 342 of the virtual furnishing units that the user selected for the challenge are typically not communicated to the server. This advantageously reduces the bandwidth requirements of the application 44 on the network 104. However, in some embodiments, a user can E-mail the scene image 52 complete with the three-dimensional graphics 342 of the virtual furnishing units that the user selected for the challenge 50 to a friend by E-mail directly from the application module 44. Referring to block 586, in some embodiments, the second amount of the second application counter 64 that is awarded to the first user upon completion of a challenge is dependent upon a level of difficulty of the first challenge. For instance, in some embodiments, more difficult challenges are granted larger amounts in units of the second application counter 64 (e.g., virtual cash) and easier challenges are granted smaller amounts in units of the second application counter 64 (e.g., virtual cash).

Figure 14:
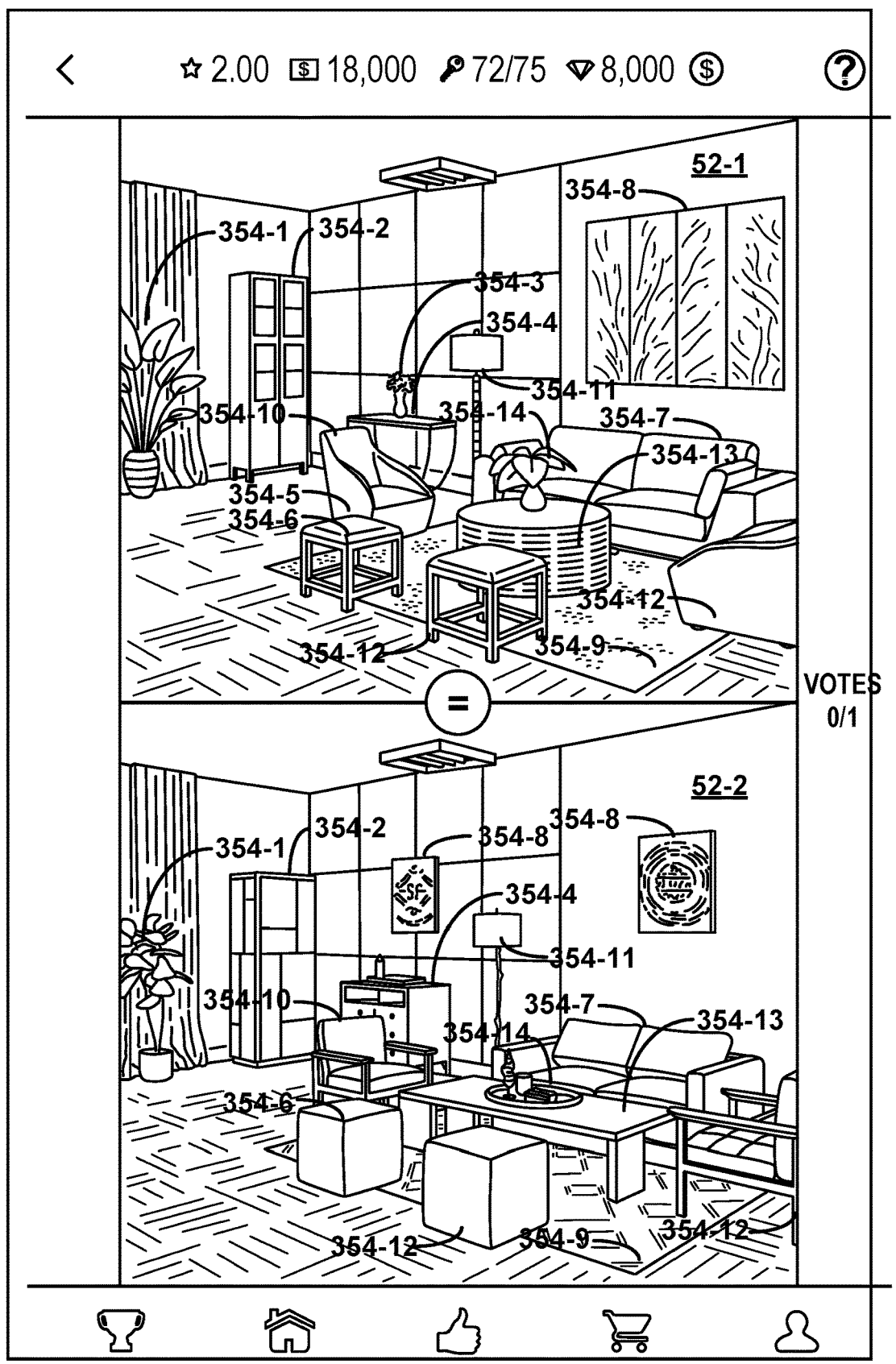
FIG. 14 illustrates, responsive to an invitation to vote, concurrently displaying on a display (i) a first image comprising a candidate scene populated with a first set of three-dimensional graphics at corresponding designated sets of coordinates within as scene that has been submitted by a user other than the voting user and (ii) a second image comprising the candidate scene populated with a second set of three-dimensional graphics at corresponding designated sets of coordinates within the scene that has been submitted by a second user other than the first user and the voting user in accordance with some implementations of the present disclosure.
Figure 15:
FIG. 15 is a screen image of an application inviting a user to participate in a respective challenge in a plurality of challenges, each challenge in the plurality of challenges comprising (i) an image of a respective scene and (ii) a first plurality of markers, each marker having a different designated set of coordinates within the respective scene and corresponding to a type within a plurality of types in accordance with some implementations of the present disclosure.

Referring to block 588 of FIG. 5H, eventually there is received from the remote server (e.g., application server 106) a first community vote on the user selection of virtual furnishing units 74 for the challenge 50 submitted by the first user. Referring to block 592 and FIG. 14, in some such embodiments, the first community vote on the user selection of virtual furnishing units 74 for the first challenge 50 (the submitted respective scene) is from a plurality of users that each make 1:1 comparisons of (i) the user selection of virtual furnishing units for the first challenge by the first user (the submitted respective scene by the first user) and (ii) the user selection of virtual furnishing units 74 for the first challenge 50 from a user other than the first user (a second scene for the first challenge from a user other than the first user). Referring to block 594 of FIG. 5H, each user that contributes to the first community vote receives credit toward an allocation in units of the first application counter 60 (e.g., keys).

Figure 5I:
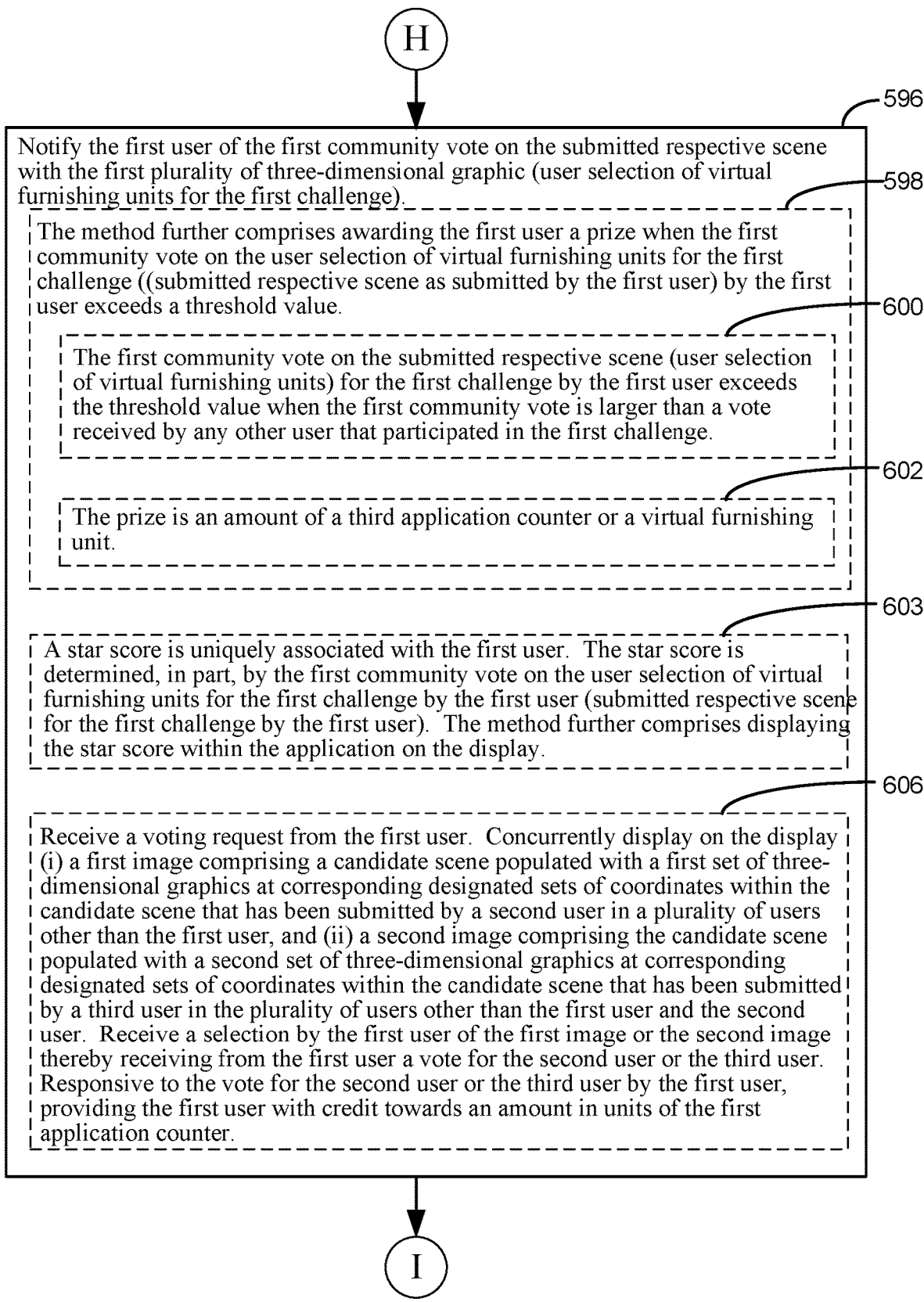

Referring to block 596 of FIG. 5I, the first user is notified of the first community vote on the user selection of virtual furnishing units for the first challenge. In some embodiments, this notification is in the form of a message in a mailbox hosted by the application module 44.

In some embodiments, each vote by a user counts as a single vote in the community voting. Accordingly, if 100 users vote for the submitted scene of a first user, and 50 users vote for the submitted scene of a second user, in a given challenge, the first user will have a first community vote of 100 and the second user will have a community vote of 50 for the given challenge, in typical embodiments.

Referring to block 598 of FIG. 5I, the method further comprises awarding the first user a prize when the first community vote on the user selection of virtual furnishing units for the first challenge by the first user (submitted respective scene as submitted by the first user) exceeds a threshold value. For instance, referring to block 600, in some embodiments the first community vote on the user selection of virtual furnishing units for the first challenge by the user exceeds the threshold value when the first community vote is larger than a vote received by any other user that participated in the challenge. Referring to block 602 of FIG. 5I, in some embodiments, the prize is an amount of the third application counter 66 (e.g., diamonds) or a virtual furnishing unit 74. In the case where the prize is a virtual furnishing unit 74, the user retains the virtual furnishing unit 74 and is thus able to use the virtual furnishing unit 74 in a predetermined number of challenges (e.g., 5 challenges) before the user no longer retains the virtual furnishing unit 74.

Figure 12:
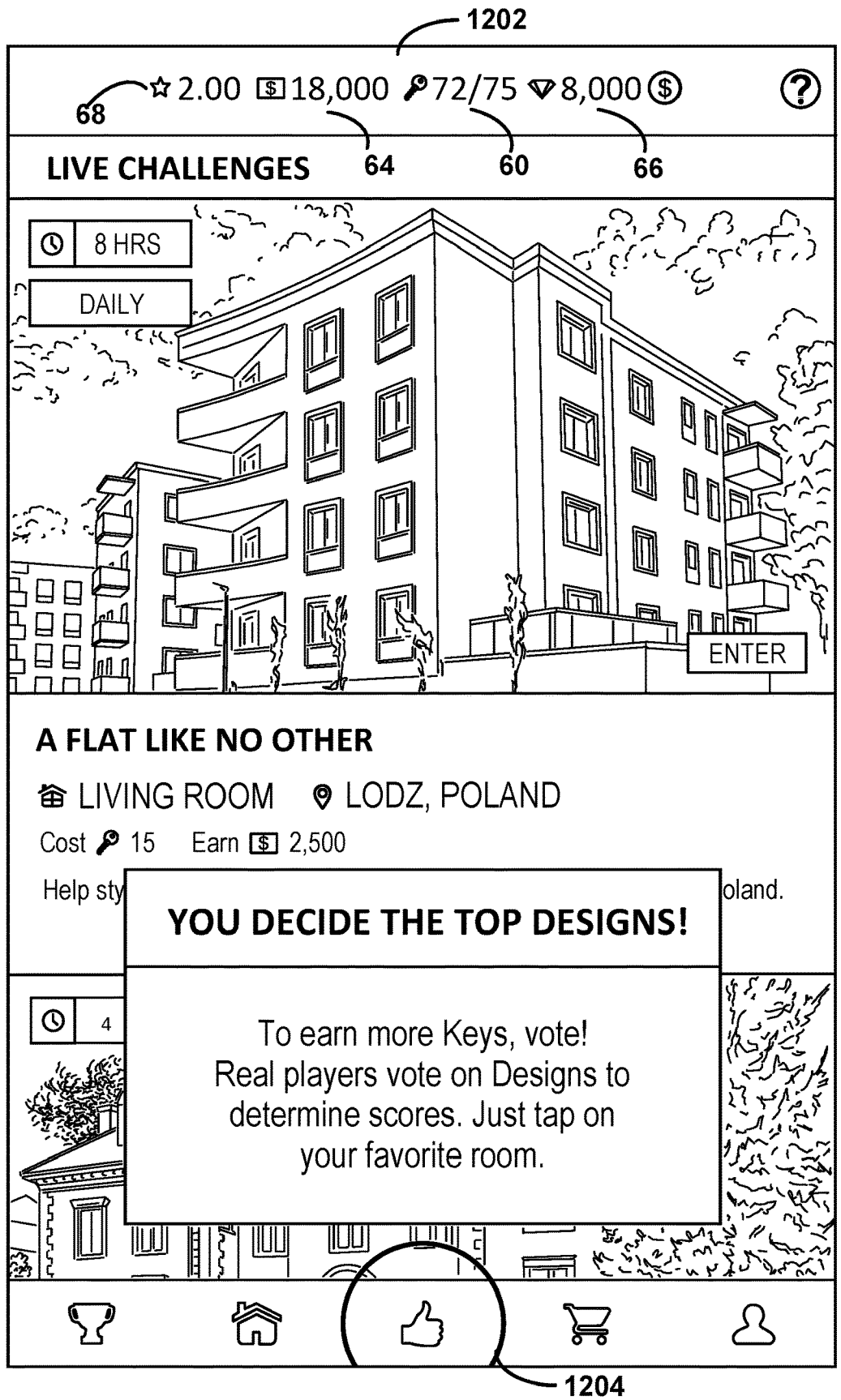
FIG. 12 illustrates an invitation to a user to vote on completed challenges in which there is concurrently displayed on the display (i) a first image comprising a candidate scene populated with a first set of three-dimensional graphics at corresponding designated sets of coordinates within a candidate scene that has been submitted by one user other than the voting user, and (ii) a second image comprising the candidate scene populated with a second set of three-dimensional graphics at corresponding designated sets of coordinates within the candidate scene that has been submitted by a another user other than the voting user in accordance with some implementations of the present disclosure.

Referring to block 603 of FIG. 5I, in some embodiments a star score 68 is uniquely associated with a user. The star score 68 is determined, in part, by the first community vote on the user selection of virtual furnishing units 74 for a challenge 50 completed and submitted by the user. The method further comprises displaying the star score 68 within the application on the display. For instance, FIGS. 12 and 19 illustrate the star score 68 for the user at the top of the display. In some embodiments the star score 68 of a user increases and decreases based on the votes for their completed designs for challenges 50 received from the community of users.

Figure 13:
FIG. 13 further illustrates an invitation to a user to vote on completed challenges in which there is concurrently displayed on the display (i) a first image comprising a candidate scene populated with a first set of three-dimensional graphics at corresponding designated sets of coordinates within a candidate scene that has been submitted by one user other than the voting user, and (ii) a second image comprising the candidate scene populated with a second set of three-dimensional graphics at corresponding designated sets of coordinates within the candidate scene that has been submitted by a another user other than the voting user in accordance with some implementations of the present disclosure.

In typical embodiments, user completion and submission of challenges 50 requires a certain amount in units of the first application counter 60 (e.g., keys). More advanced challenges generally require more keys to enter, but have greater rewards. To earn more keys, a user can vote on challenge entries. In some embodiments, each set of five votes earns the user more keys. Accordingly, with reference to block 606, in some embodiments, a voting request is received from first user. For instance, referring to FIG. 12, the user may select the vote affordance 1204. Responsive to this, a panel such as that disclosed in FIG. 13 which shows the next challenge available for voting is displayed in some embodiments. The user can participate in voting in this displayed challenge by selecting the vote affordance 1304. When this is done the user can then vote on the challenge 50. In some embodiments, referring to FIG. 14, such voting comprises concurrently displaying on the display (i) a first scene image 52-1 comprising a candidate scene populated with a first set of three-dimensional graphics 354 at corresponding designated sets of coordinates within the candidate scene that has been submitted by a second user in a plurality of users other than the first user, and (ii) a second scene image 52-2 comprising the candidate scene populated with a second set of three-dimensional graphics 354 at corresponding designated sets of coordinates within the candidate scene that has been submitted by a third user in the plurality of users other than the first user and the second user. The user makes a selection between 52-1 and 52-2. Accordingly, a selection is received by the application module 44 from the first user of the first scene image 52-1 or the second scene image 52-2 thereby receiving from the first user a vote for the second user or the third user. In some embodiments, the user selects between the first scene image 52-1 and the second scene image 52-2 by tapping on the image that the user prefers. Responsive to the vote for the second user or the third user by the first user, the first user is provided with credit towards an amount in units of the first application counter 60 (e.g., keys). For instance, in some embodiments the user receives a predetermine amount in units of the first application counter 60 when the user has participated in a certain number of votes (e.g., 5 votes or some other designated number).

Referring to block 608 of FIG. 5I, the application is run over a plurality of epics (e.g., each epic in the plurality of epics is a twelve-hour period, one day, two days, or a week) and the one or more challenges is a first plurality of challenges. A subset of the first plurality of challenges is constrained to a first epic 364-1 in the plurality of epics. During a second epic 364-2 in the plurality of epics the user of the application module 44 is provided with a second plurality of affordances, each affordance in the second plurality of affordances corresponding to a different respective challenge in a second plurality of challenges. One or more challenges 50 in the second plurality of challenges is not found in the first plurality of challenges. As in the first epic, each challenge 50 in the second plurality of challenges comprises: (i) a scene image 52 of a respective scene and (ii) a different second plurality of markers, each marker 56 having different designated set of coordinates within the respective scene and corresponding to a type 70 within a plurality of types. That is, each challenge in the second plurality of challenges comprises its own independent plurality of markers that may be the same or different than the markers in other challenges in the second plurality of challenges. Responsive to selection of a first affordance in the second plurality of affordances, the scene image 52 of the respective scene and the second plurality of markers of a first challenge 50 in the second plurality of challenges is displayed. For each sequential user selection of a respective marker 56 in the second plurality of markers of the challenge 50 corresponding to the first affordance in a first plurality of user selections, a second procedure is performed. The second procedure comprises displaying a second plurality of virtual furnishing units 74 corresponding to the respective marker 56 comprising (i) one or more first virtual furnishing units 74 retained by (e.g., owned) the user that match the type 70 of the respective marker and (ii) one or more second virtual furnishing units 74 not retained (e.g., not owned) by the user that match the type 70 of the respective marker. This displaying further comprises removing from display any virtual furnishing units 74 that do not qualify for populating the respective marker. A user selection of a selected virtual furnishing unit 74 in the second plurality of virtual furnishing units is received. A three-dimensional graphic 354 of the selected virtual furnishing unit 74 is displayed at the different designated set of coordinates within the respective scene, thereby populating the respective scene with a second plurality of three-dimensional graphics each respective three-dimensional graphic in the second plurality of three-dimensional graphics at a corresponding designated set of coordinates within the respective scene specified by the different designated set of coordinates within the respective scene of the corresponding marker 56. The second procedure enables the first user to submit the respective scene with the second plurality of three-dimensional graphics when a second completion criterion associated with the second challenge has been satisfied.

The second completion criterion specifies (i) which corresponding designated sets of coordinates within the respective scene must be populated and (ii) a second amount, in units of the first application counter 60 (e.g., keys), required to submit the respective scene. Responsive to submitting the respective scene with the second plurality of graphics (i) the user selection of virtual furnishing units 74 for the second challenge (the respective scene with the second plurality of three-dimensional graphics) is communicated to the remote server (e.g., application server 106) and (ii) the first user is provided with a third amount in units of the second application counter 64 (e.g., virtual dollars). There is received from the remote server (e.g., application server 106) a second community vote on the user selection of virtual furnishing units for the second challenge by the first user (the submitted respective scene with the second plurality of three-dimensional graphics for the second challenge). The first user is notified of the second community vote on the user selection of virtual furnishing units for the second challenge.

Fourth Application Counter

Figure 23:
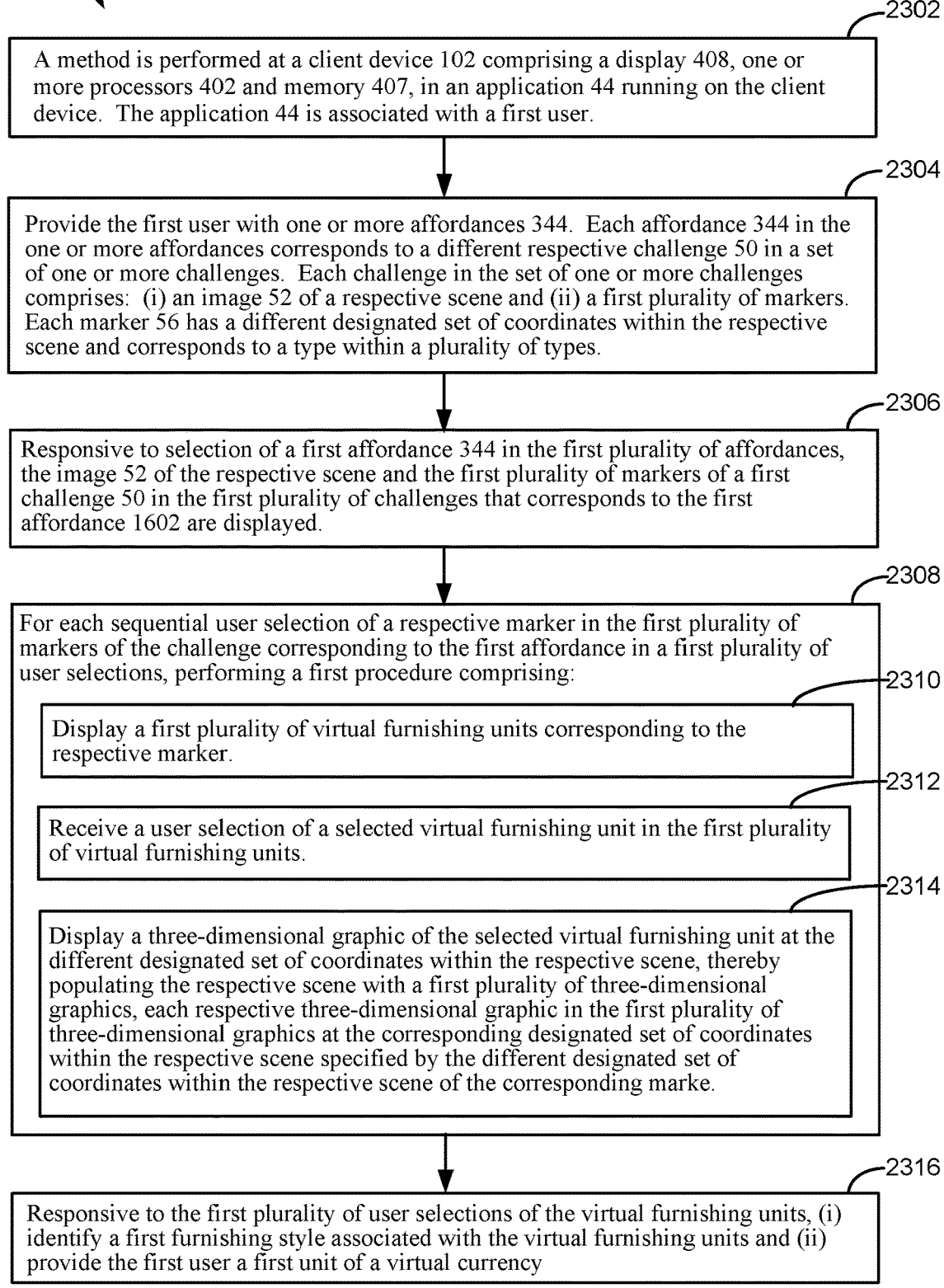
FIG. 23 is another flow chart illustrating a method for competitive scene completion in an application, in accordance with some implementations of the present disclosure.

In some implementations, the various methods and systems for competitive scene completion disclosed herein also provide tools that enable users to learn about furnishing styles. To this effect, FIG. 23 is a flow chart illustrating a method 2300 for competitive scene completion in an application, in accordance with some implementations of the present disclosure. As noted in block 2302 of FIG. 23, the method 2300 is performed at a client device 102 comprising a display 408, one or more processors 402 and memory 407, in an application 44 running on the client device associated with a first user.

Referring to block 2304 of FIG. 23, the first user is provided with one or more affordances 345. Each affordance 345 in the one or more affordances corresponds to a different respective challenge 50 in a set of one or more challenges. Each challenge 50 in the set of one or more challenges comprises: (i) a scene image 52 of a respective scene and (ii) an independent first plurality of markers 56. Each marker 56 in the independent first plurality of markers has a different designated set of coordinates within the respective scene and corresponding to a type 70 within a plurality of types. In some embodiments, the scene is of a single room in a building, or an outdoor location. In other embodiments, the scene is a hotel lobby, a spa, a cafeteria, a ranch, or a winery (or an outdoor area). Details about the affordances 345, challenge 50, scene image 52 of a respective scene and markers 56 have been discussed in FIGS. 4, 5, and 16 and their corresponding paragraphs, and will not be repeated for the sake of brevity.

Turning to block 2306 of FIG. 23, responsive to selection of a first affordance 345 in the one or more affordances, the scene image 52 of the respective scene and the first plurality of markers 56 of a first challenge 50 in the one or more challenges that corresponds to the first affordance 1602 are displayed.

Referring to block 2308 of FIG. 23 and FIG. 6 for reference, for each sequential user selection in a first plurality of user selections, of a respective marker 56 in the first plurality of markers, of the challenge 50, corresponding to the first affordance 1602 (FIG. 16), the application module 44 performs a procedure. In this procedure, and referring to block 2310 of FIG. 23 and FIG. 19 for reference, a first plurality of virtual furnishing units corresponding to the respective marker is displayed.

Referring to block 2312 of FIG. 23, the procedure of block 2308 continues with a user selection of a selected virtual furnishing unit 74 in the first plurality of virtual furnishing units that are displayed.

Referring to block 2314 of FIG. 23, the procedure of block 2308 continues with the display of a three-dimensional graphic 354 of the selected virtual furnishing unit at the different designated set of coordinates within the respective scene, thereby populating the respective scene with a first plurality of three-dimensional graphics, each respective three-dimensional graphic in the first plurality of three-dimensional graphics at the corresponding designated set of coordinates within the respective scene specified by the different designated set of coordinates within the respective scene of the corresponding marker. For instance, the transition from FIG. 6 to FIG. 7 illustrates how the marker 56-2 is replaced with a three-dimensional graphic 354-1 of the selected virtual furnishing unit 74 for the marker 56-2 at the different designated set of coordinates within the respective scene of the marker 56-2. The transition from FIG. 7 to FIG. 8 illustrates how the markers 56-8, 56-1, 56-5, 56-6, 56-7, 56-3, and 56-4 are respectively replaced with the three-dimensional graphics 354-2 (56-8→354-2, lamp), 354-3 (56-1→354-3, couch), 354-7 (56-5→354-7, large plant), 354-4 (56-6→354-4, cabinet), 354-5 (56-7→354-5, chair), 354-6 (56-3→354-6, rug), and 354-8 (56-4→354-8, coffee table) of the selected virtual furnishing units 74 for these markers at the different designated set of coordinates within the scene image 52 for these respective markers. In some embodiments, the first plurality of user selections of the first plurality of three-dimensional graphics 354 completes the first challenge.

Referring to block 2316 of FIG. 23, responsive to the first plurality of user selections of the virtual furnishing units 74, (i) a first furnishing style associated with the virtual furnishing units 74 is identified and (ii) the first user is provided with (e.g., awarded, offered) a first unit of a virtual currency.

In some embodiments, the plurality of user selections of virtual furnishing units of the virtual furnishing units 74 exactly matches a particular furnishing style and accordingly the identified (first) furnishing style is the particular furnishing style. In some embodiments, the virtual furnishing units 74 corresponding to the first plurality of user selections have a plurality of furnishing styles. The identification of the first furnishing style for the virtual furnishing units corresponding to the first plurality of user selections further comprises: (i) a determination of a furnishing style for each virtual furnishing unit corresponding to the first plurality of user selections and (ii) an identification of the first furnishing style in accordance with a determination that a majority (e.g., the highest proportion/percentage of furnishing units) of the furnishing units 74 have the first furnishing style. For example, in a scene having ten pieces of furniture, the scene is determined to be predominantly a style when at least 50% (e.g., five) of the virtual furnishing units 74 have the same style.

In some embodiments, the virtual furnishing units 74 corresponding to the first plurality of user selections have a plurality of furnishing styles. The identification of the first furnishing style for the virtual furnishing units corresponding to the first plurality of user selections is responsive to a determination that a predetermined number (e.g., four) of the virtual furnishing units 74 have the first furnishing style.

In other embodiments, the plurality of user selections of virtual furnishing units 74 includes several different styles and the application 44 selects a dominant furnishing style between (i) the plurality of user selections and (ii) the respective profile of each furnishing style in a plurality of furnishing styles. Stated another way, the application 44 looks at past selections of the user and selects a dominant furnishing style based on the furnishing style(s) that the user has tended toward in the past.

In yet other embodiments, the plurality of user selections of virtual furnishing units 74 includes several different styles and the application 44 selects a dominant furnishing style using a nearest neighbor algorithm or other form of classifier. Here, the application 44 uses the nearest neighbor algorithm (or other form of classifier) against a search space that is defined by (i) a first location within the scene identified by the first user (e.g., using the coordinates of the scene) and (ii) furnishing styles that other users have selected for the first location or locations within the vicinity of the first location. The application 44 then selects a dominant furnishing style in accordance with the results provided by nearest neighbor algorithm or other form of classifier, identifies the dominant style as the first furnishing style, and selects the dominant style as the first furnishing style associated with the virtual furnishing units 74.

In some embodiments, the application 44 selects the dominant furnishing style based on furnishing styles of friends of the first user. As discussed earlier, in some embodiments the application 44 identifies, from the first user's social media accounts, a list of friends who are current users of the application. In some embodiments, the application 44 further pulls (e.g., retrieves) respective profiles from across at least a subset of the list of friends and identifies a respective dominant furnishing style for each of the friends in the subset. The application then selects the furnishing style for the first user based on the respective identified furnishing styles for each of the friends in the subset. For example, the application 44 selects the first furnishing style as the dominant furnishing style based on a majority of the subset of friends having selected the first furnishing style as their dominant furnishing style.

In some embodiments, instead of (or in addition to) selecting the dominant furnishing style, the application 44 selects one or more dominant pieces of furnishing units for a particular location/spot within the scene identified by the first user, by identifying the furnishing units that the friends have placed at the particular location/spot. For example, the first user may identify a corner of a room as the location/spot that they wish to place a furnishing unit. Responsive to the identification of the corner of the room by the first user, the application 44 identifies furnishing units that the user's friends have selected for the corner of the room (e.g., from the friends' completed challenges and having the scene with the particular corner/spot). In some instances, the application 44 may identify that that five of the friends have each selected a plant, three of the friends have each selected a table, and two of the friends have each selected a chair, for placement at the corner of the room. The application 44 then selects a furnishing unit based on the friends' selections of furnishing units. Thus, in this instance the application 44 selects the plant as the dominant furnishing unit. Alternatively, the application 44 notifies the first user that the plant and the table are the two most dominant options based on the selections of the friends.

In some embodiments, the virtual currency provided to the first user is in the form of the first application counter 60 (e.g., keys), the second application counter 64 (e.g., virtual cash), or the third application counter (e.g., diamonds). For example, responsive to the first plurality of user selections of the virtual furnishing units 74 and the identification of the first furnishing style associated with the virtual furnishing units 74, the user is provided with 75 units of keys, $2,500 virtual cash, or 500 units of diamonds.

Figure 24A:
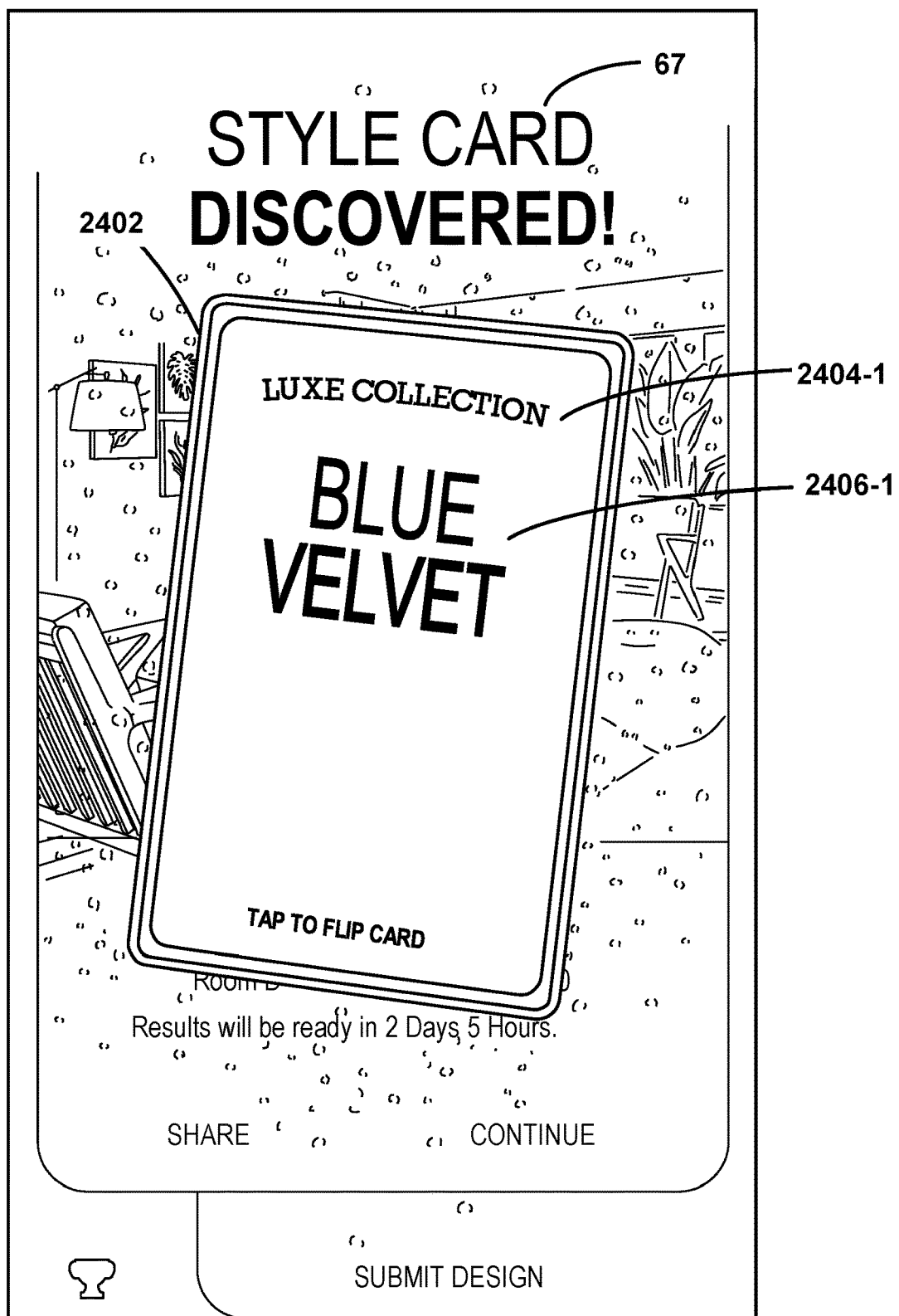
FIGS. 24A and 24B are screen images illustrating an example virtual style card, in accordance with some implementations of the present disclosure.

In some embodiments, the virtual currency is in the form of the fourth application counter 67 (e.g., virtual style card, as illustrated in FIG. 24A). For example, responsive to the first plurality of user selections of the virtual furnishing units 74 and the identification of the first furnishing style associated with the virtual furnishing units, the user is provided with one unit of virtual style card 67. In some embodiments, the first unit of the virtual currency (e.g., the virtual style card 67) provided to the first user is associated with (e.g., describes) the first furnishing style that has been identified.

A virtual style card 67 is a card that conveys (e.g., describes) a look (appearance), connection (association), and feeling of a furnishing style 353. Different virtual furnishing units 74 have different furnishing styles 353, e.g., modern, traditional or eclectic, and thus virtual style cards 67 are tools to get users to learn about particular styles and how the different pieces of the furnishing units 74 (e.g., color, material, pattern) fit together to form a particular style by describing the connection between the color, material, pattern, and the style. As players (users) piece together a particular style—either by random or by knowing about the style, they will be able to collect (e.g., awarded) a virtual style card 67 that is associated with the particular style. In some implementations (as will be described later), when a user has collected a certain number of virtual style cards, the user will be provided with additional rewards. In other words, a user is rewarded a style card 67 for that style that the user demonstrated proficiency at.

In some embodiments (not shown), a user will be able to let other users know that they are experts of a particular design/style (e.g., by registering/tagging themselves as an expert for a particular design style in the application 44). Likewise, a user can let other users know that their friend is an expert in a different design/style (e.g., by tagging their friend in the application 44). Additionally, the application 44 may associate users as having expertise in particular designs/styles based on a number of virtual style cards 67 collected by the users. In some embodiments, the application 44 further recognizes users who are real life design experts by virtue of their profession, skills, credentials, and/or qualifications, and the application 44 gives out "official recognized" tags to these users. Tags are searchable metadata and a user can search within the application 44 for other users with particular design expertise. Thus, accordingly, the application 44 also functions as a resource for users to locate and connect with experts of interior decorating for particular furnishing styles/designs, and to engage them in both the application 44 and in a real life setting.

Figure 24B:
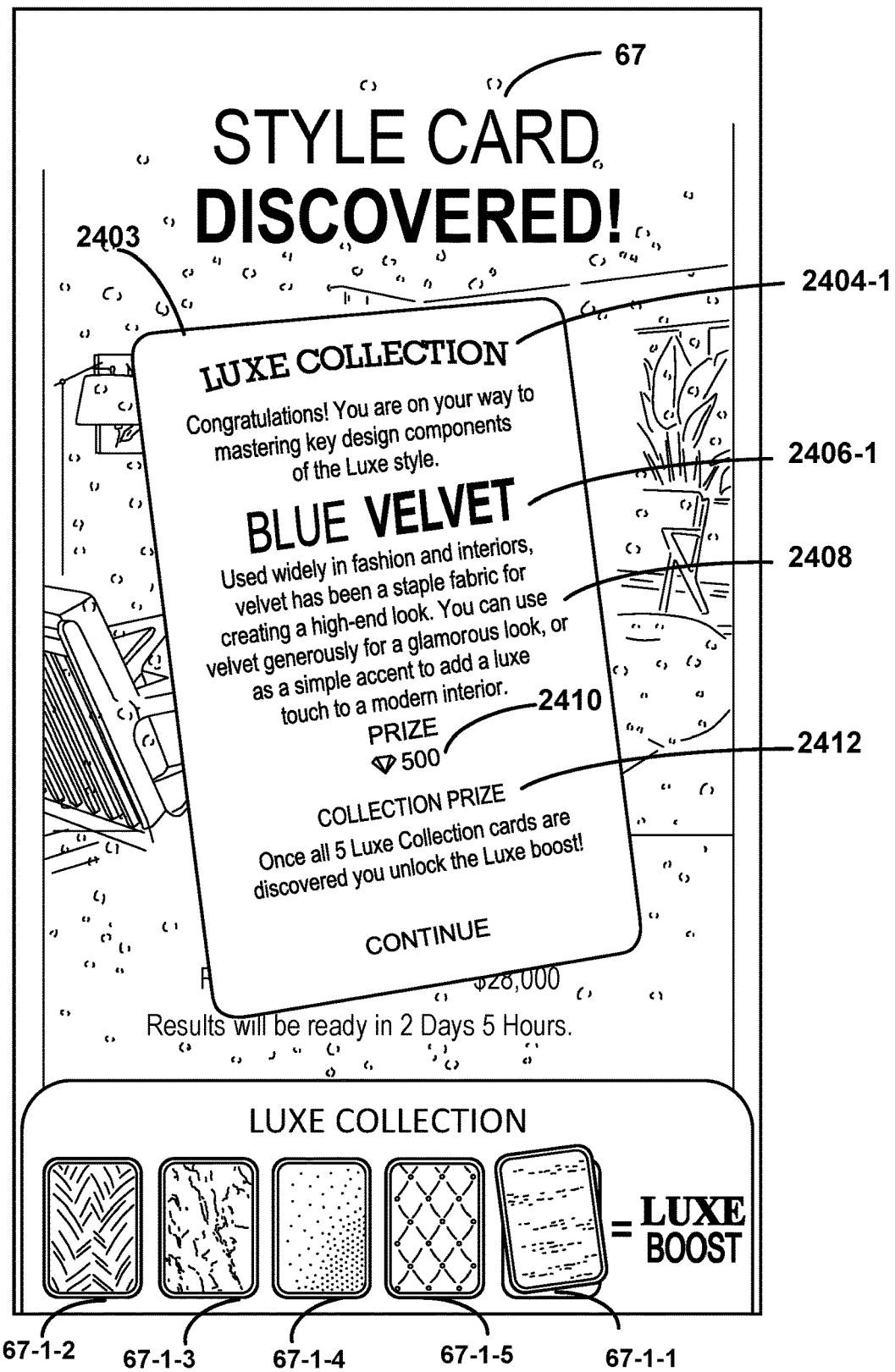

FIGS. 24A and 24B are screen images showing details of a virtual style card 67, in accordance with some implementations. In some embodiments, the virtual style card 67 includes a first side 2402 (FIG. 24A) and a second side 2403 (FIG. 24B). The first side 2402 includes an identification of the first furnishing style 2404-1 ("Luxe Collection") and identification of one or more of color ("Blue"), material ("Velvet"), and pattern 2406-1 associated with the first furnishing style 2404-1. In some embodiments and referring to FIG. 24B, the second side 2403 also includes information of the first furnishing style 2404-1 and the one or more of color, material, and pattern 2406-1 that are found on the first side 2402. The second side 2403 also provides a description 2408 of where and how the color and/or the material and/or the pattern 2406-1 may be used. Additionally, the second side 2403 also includes a first reward 2410 ("Prize—500 diamonds") that is provided to a user for collecting the first unit ("Blue Velvet") of virtual style card 67 associated with the first furnishing style 2404-1. In this example, the first reward 2410 is in the form of the third application counter 66 ("500 diamonds"). In other embodiments, the first reward 2410 takes the form of a different virtual currency (e.g., in the first application counter 60 (e.g., keys) or the second application counter 64 (e.g., virtual cash). Furthermore, the second side 2403 also provides a description of a second reward 2412 ("Collection Prize") that a user will receive when a collection criterion associated with the virtual currency (e.g., virtual style card) is satisfied. In some embodiments, the collection criterion is five units of virtual style cards of the first furnishing style. Specifically, referring to FIGS. 24B and 25, a user will receive the second reward 2412 ("Luxe boost") when the user has collected a predetermined number (e.g., five) of (distinct) units of virtual style cards associated with the first furnishing style 2404-1.

In some embodiments and referring to FIGS. 24A and 24B, the first unit (e.g., "Blue Velvet" virtual style card 67-1-1) is one of a plurality of units associated with the first furnishing style 2404-1 ("Luxe Collection"). The first furnishing style 2404-1 includes a plurality of colors and/or materials and/or patterns 2406-1. Each of the plurality of units 67-1 associated with the first furnishing style 2404-1 has a distinct combination of the colors, and/or the materials, and/or the patterns. As illustrated in FIG. 24B, the first furnishing style 2404-1 includes a plurality of units (e.g., five virtual style cards) corresponding to "Blue Velvet (67-1-1)," "Green Leaf Weave (67-1-2)," "Marble Embellishments (67-1-3)," "Yellow Satin (67-1-4), and "Quilted Cushion (67-1-5)." Each of the plurality of units 67-1 associated with the first furnishing style 2404-1 and has a distinct combination of the colors, and/or the materials, and/or the patterns.

Figure 22:
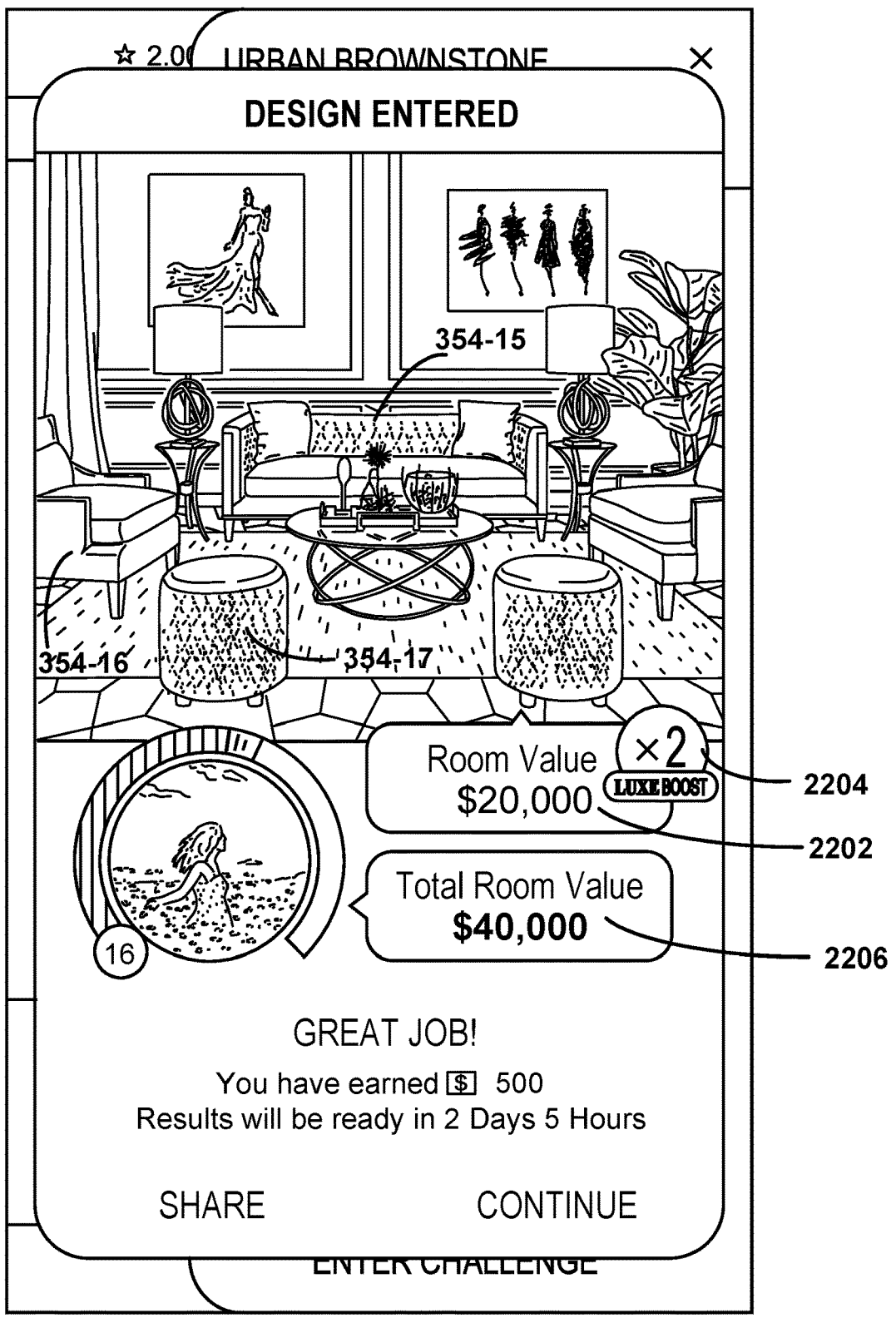
FIG. 22 is a screen image illustrating the display of a completed scene including a plurality of three-dimensional graphics of selected furnishing units and a corresponding room value, in accordance with some implementations of the present disclosure.

In some embodiments, responsive to a determination that the collection criterion associated with the virtual currency has been satisfied, the first user is provided with the second reward 2412. In some embodiments, the second reward 2412 is one of: a first amount in units of a first application counter (e.g., keys) 60, a second amount in units of the second application counter (e.g., virtual cash) 64, a third amount in units of a third application counter (e.g., diamonds) 66, and a virtual furnishing unit 74 (e.g., a rare furnishing unit in limited quantity) that can be used in future challenges 50. Referring to FIG. 24B, the second reward 2412 ("Collection Prize") associated with discovering five cards of the first furnishing style 2404-1 ("Luxe collection") is a Luxe boost. For instance, referring to FIGS. 22 and 24B, suppose a user has collected units 67-1-1 to 67-1-4 of virtual style cards associated with the first furnishing style 2404-1, and has completed a challenge 50 by populating a respective scene with virtual furnishing units corresponding to the quilted design, as illustrated by quilted sofa 354-15 and quilted ottoman 354-17 as in FIG. 22. Accordingly, the user is awarded the "Quilted Cushion" unit 67-1-5 of virtual furnishing card. Furthermore, since the user has now discovered all five cards associated with the first furnishing style 2404-1 ("Luxe Collection") (e.g., the application determines that the collection criterion associated with the first furnishing style 2404-1 has been satisfied), responsive to a determination that the collection criterion associated with the virtual currency has been satisfied, the user is awarded with the second reward 2212 ("Luxe boost" 2204 in FIG. 22) which doubles the room value from $20,000 to $40,000 in virtual dollars.

Referring to FIG. 24B, in some embodiments, each unit of virtual style card 67 is associated with a respective first reward 2410. Further, referring to FIGS. 24B and 25, in some embodiments, each furnishing style 2404 is associated with a respective collection criterion and a respective second reward 2412. For instance, the second reward 2404-2 for satisfying the collection criterion of the second furnishing style 2404-2 ("Tropical Collection") may be a limited edition beach house dining table (e.g., a virtual furnishing unit).

In some embodiments, the virtual style card 67 includes a plurality of furnishing styles 2404. The first furnishing style 2404-1 is one of the plurality of furnishing styles. Each of the plurality of furnishing styles 2404 includes a plurality of units (of the virtual currency).

Figure 25:
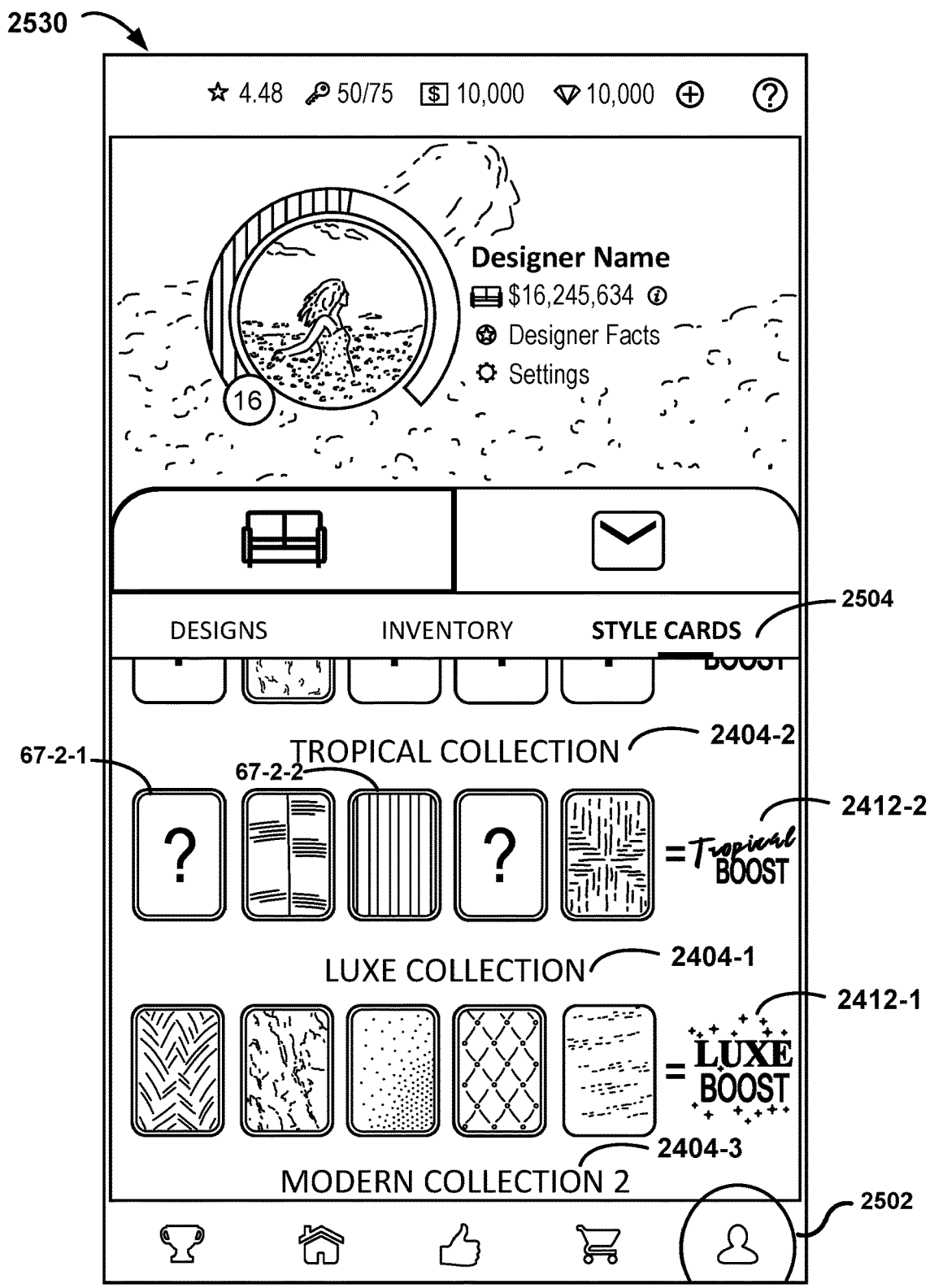
FIG. 25 is a screen image displaying a collection of style cards, in accordance with some implementations of the present disclosure.

In some embodiments and referring to FIG. 25, the virtual currency (e.g., fourth application counter 67 (e.g., virtual style cards)) includes a plurality of furnishing styles 2404. FIG. 25 shows that the first furnishing style 2404-1 ("Luxe collection") is one of the plurality of furnishing styles. There is also a second furnishing style 2404-2 ("Tropical collection") and a third furnishing style 2404-3 ("Modern Collection"). Each of the plurality of furnishing styles 2404 includes a plurality of units (of virtual style cards). Furthermore, as shown in FIG. 25, in some embodiments, the appearance of a unit of virtual style card 67-2-1 (and therefore the color and/or material and/or pattern associated with the furnishing style) is not revealed to a user until the user has discovered it in the challenge and earned the virtual style card 67. In other embodiments, the various units of virtual style cards 67 that make up a particular furnishing collection are made known to a user, to motivate the user to explore the associated color and/or material and/or pattern of the furnishing style and earn rewards.

In some embodiments, virtual style cards 67 associated with some styles are rarely given out. In other embodiments, virtual style cards 67 associated with some styles have more units than those of other styles. Further, in some embodiments, virtual style cards 67 can be traded with other players. Additionally, virtual style cards 67 can be cashed in for other currency or virtual items (e.g., virtual furnishing units 74). In some embodiments, virtual style cards 67 associated with a particular style can also be used to obtain store credit in the form of a discount on purchases of real world items in that particular style.

In some embodiments, the first furnishing style 2404-1 is one of: modern, contemporary, Scandinavian, English (e.g., Traditional English or English country), Bohemian, Victorian, French (e.g., French country), Oriental, Queen Anne, Sheraton, luxurious, traditional, minimalist, rustic, tropical, or coastal.

In some embodiments, the color of the one or more of color, material, and pattern 2406 is any combination of beige, black, blue, brown, clear, copper, dark grey, gold, green, grey, light grey, lime, metallic, mint, mirror, multi, navy, off white, orange, pink, purple, red, silver, tan, turquoise, white, and yellow.

In some embodiments, the material of the one or more of color, material, and pattern 2406 is any combination of acrylic, bone, burl, ceramic, concrete, cork, cotton, fabric, faux leather, faux suede, fiberglass, furry, glass, hide, lacquer, leather, linen, marble, metal, mohair, natural, poly, rattan, satin, shell, silk, skin, stone, velvet, wire, wood, and wool.

In some embodiments, the pattern of the one or more of color, material, and pattern 2406 is any combination of animal print antique, Chevron, Chinoiserie, Damask, distressed, floral, geometric, houndstooth, ikat, marble, motif, nailhead, patchwork, plaid, polka dots, quatrefoil, striped, toile, tufted, wash, weave, and weathered.

Completed Challenges

In accordance with some implementations, the application 44 includes affordances (e.g., menu options) with which a user may interact to access the various functionalities of the application. Besides providing functionalities associated with competitive scene completion, the application 44 is also configured to allow a user to revisit a scene that the user has previously completed (e.g., the scene of a previously completed challenge that includes respective furnishing units 74 chosen during the challenge 50). In some embodiments, the application 44 also includes affordances to allow the user to create a virtual scrapbook that comprises a collection of completed scenes. In other embodiments, the application further includes other affordances to facilitate the creation of a tangible book (e.g., in print format) of comprising print scenes of completed challenges.

Figure 26:
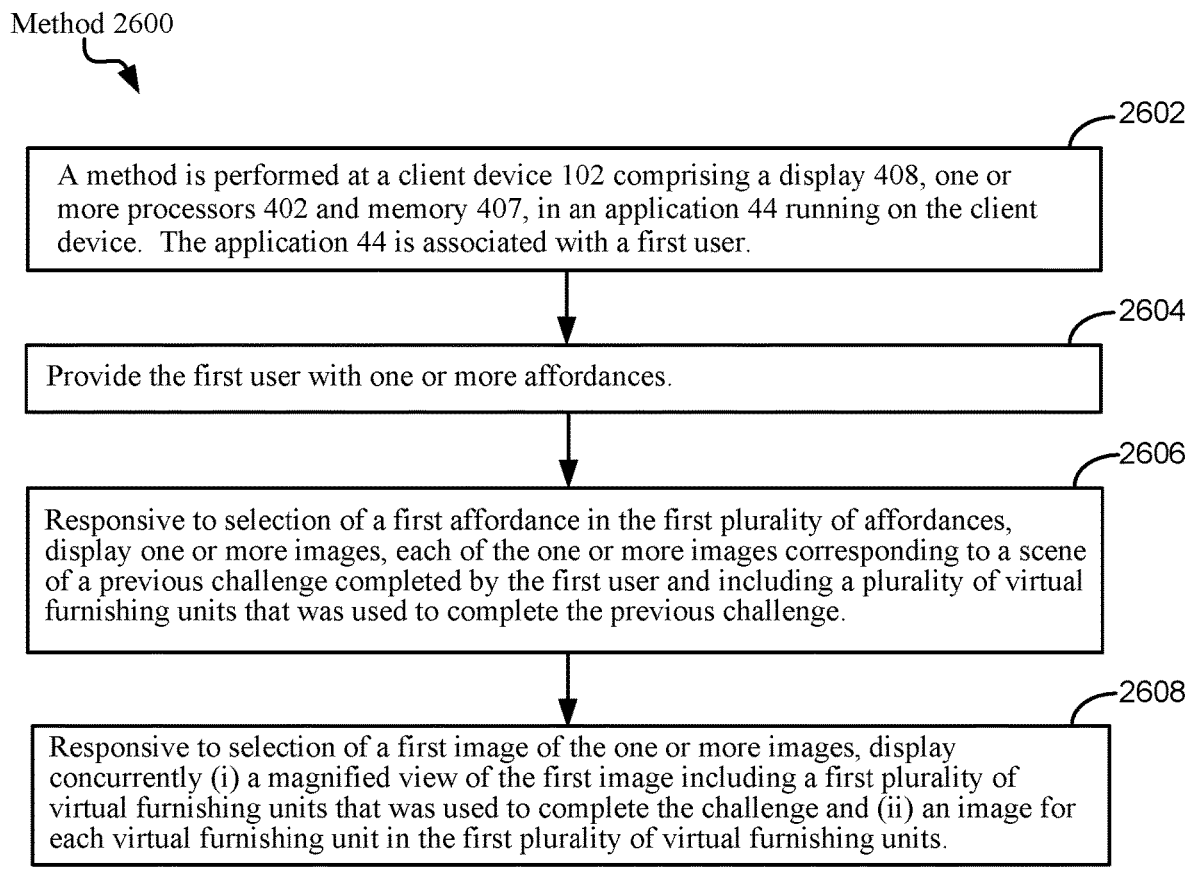
FIG. 26 is another flow chart illustrating a method for revisiting previously completed challenges in an application, in accordance with some implementations of the present disclosure.

To this end, FIG. 26 is a flow chart illustrating a method 2600 for revisiting previously completed challenges in an application 44, in accordance with some implementations of the present disclosure. As noted in block 2602 of FIG. 23, the method 2600 is performed at a client device 102 comprising a display 408, one or more processors 402 and memory 407, in an application 44 running on the client device associated with a first user.

Figure 27:
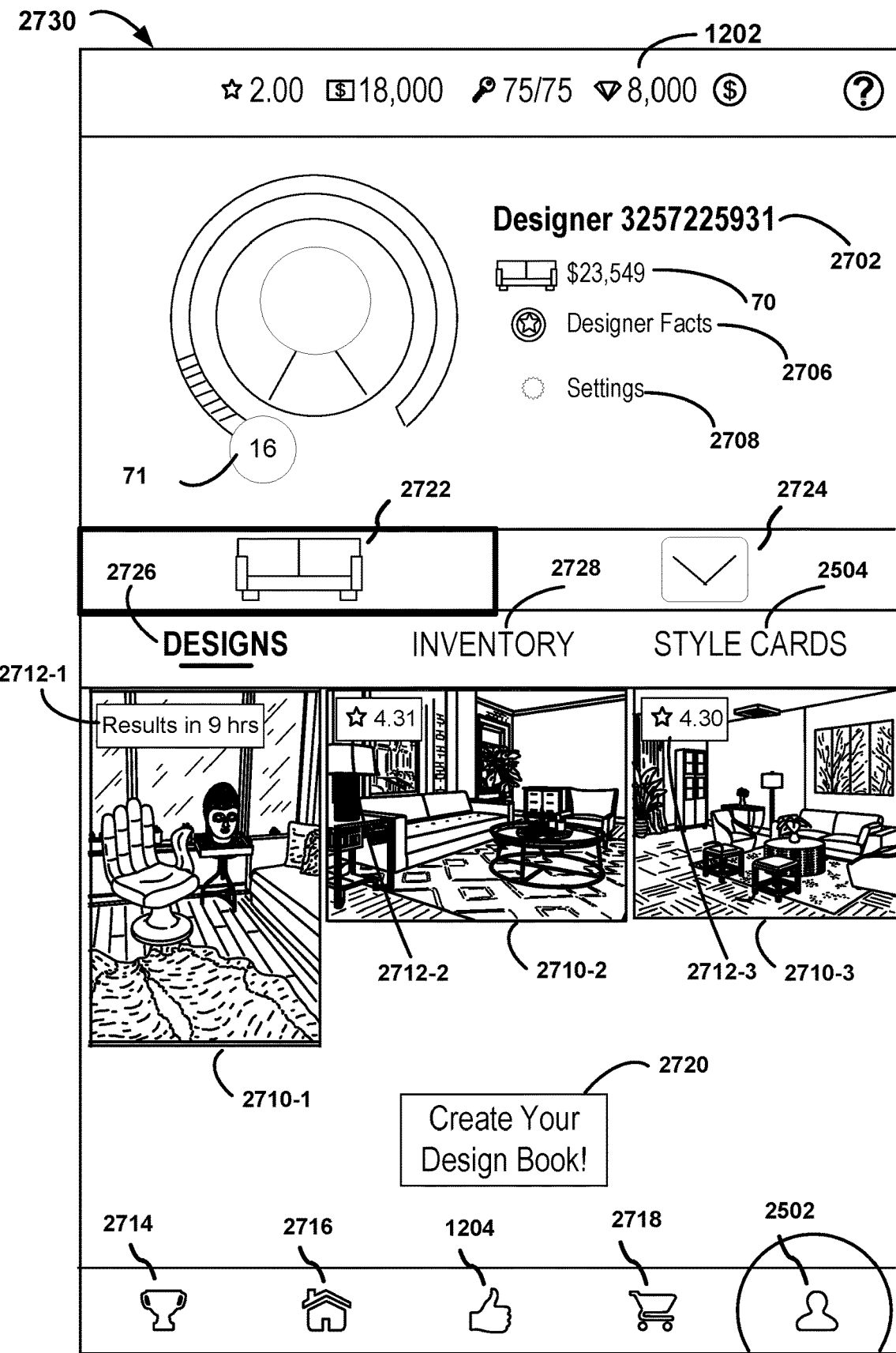
FIG. 27 is a screen image displaying a plurality of images, each of the plurality of images corresponding to a scene of a previous challenge completed by a user, in accordance with some implementations of the present disclosure.

Referring to block 2604 of FIG. 26, the first user is provided with a first plurality of affordances. As illustrated in FIG. 27, the application 44 comprises a plurality of menu options (e.g., a first plurality of affordances), such as a winner affordance 2714, a challenges affordance 2716, the vote affordance 1204, a shop affordance 2718, and a user affordance 2502. Each of the first plurality of affordances is a user interface object (e.g., a user-selectable icon) with which a user may interact to access features (and/or functions) of the application. FIG. 27 shows that the first plurality of affordances is displayed at the bottom of the screen display. In other implementations, the first plurality of affordances may be displayed at a predefined area of the display, albeit a different location. Further, selection of one of the first plurality of affordances may cause respective sub-menus and/or options (e.g., in the form of icons and/or tabs) to be displayed, as will be described in greater detail in the following paragraphs.

As noted above, selection of each of the first plurality of affordances causes a different feature of the application to be displayed. For example, a user may select the winner affordance 2714. Responsive to this, several lists are displayed (not shown). In some embodiments, each list is associated with a category (e.g., highest star stores, highest seasonal star store, top design values etc.) and contains rankings of the top users (e.g., the top ten users, the top 50 users, the top 100 users) of the category. In another instance, a user may select the challenges affordance 2716. Responsive to this, a plurality of challenges such as that disclosed in FIG. 16 is displayed, in accordance with some embodiments. A user may participate in a respective challenge to complete a scene using the method described in FIG. 5. In another example, a user may select the vote affordance 1204. Responsive to this, a panel such as that disclosed in FIG. 13 which shows the next challenge available for voting is displayed, in accordance with some embodiments and as described earlier. In yet another example, a user may select the shop affordance 2718. Responsive to this, a plurality of virtual furnishing units 74 from the virtual furnishing unit database 328 is displayed (not shown). In some embodiments, the displayed virtual furnishing units are arranged by their arrival date, with the most recent virtual furnishing unit displayed first. In some embodiments, the plurality of virtual furnishing units from the virtual furnishing unit database 328 can be sorted by brand or by furnishing unit type.

Figure 30:
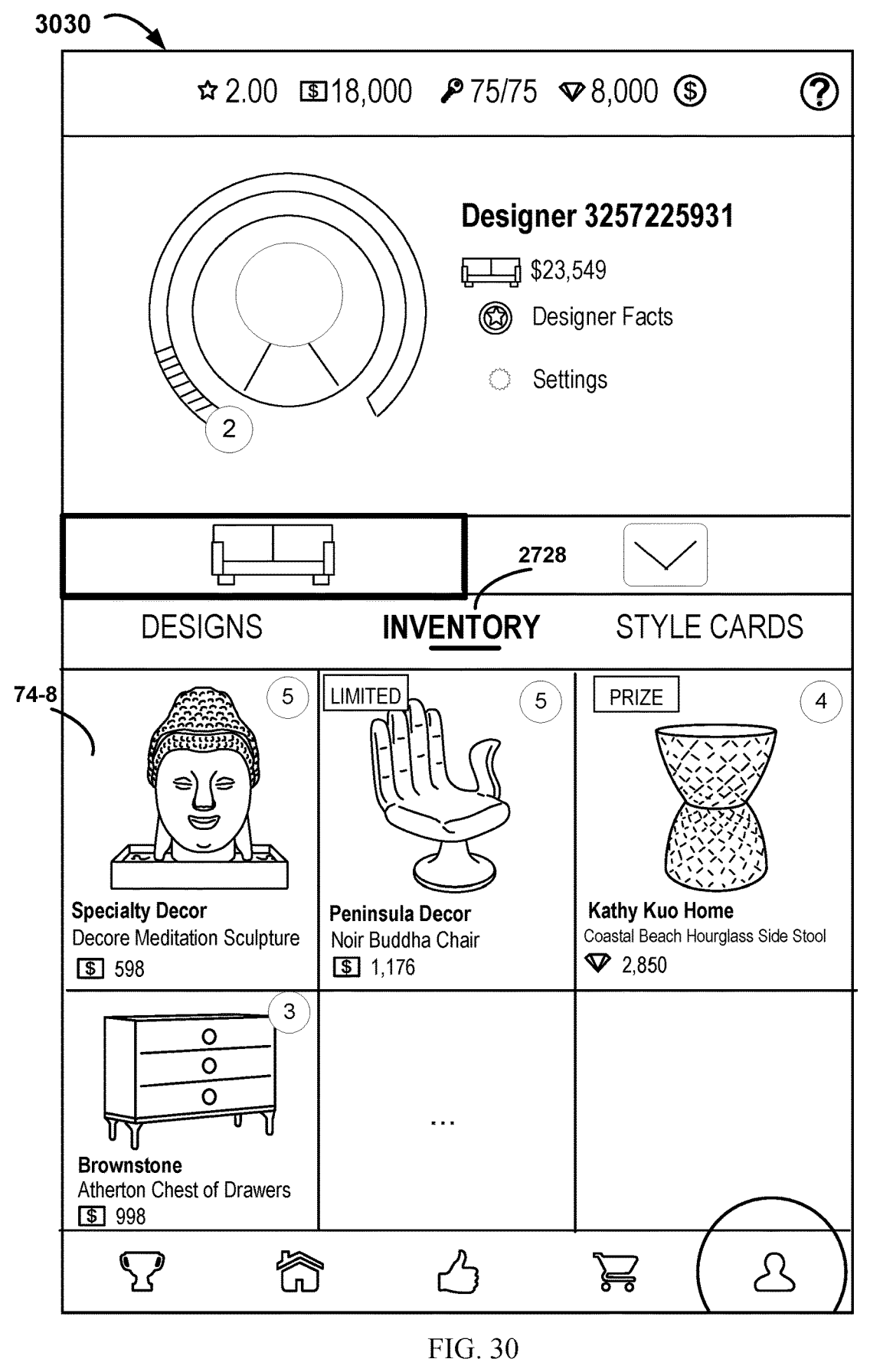

In some embodiments, a user may select the user affordance 2502. Responsive to this, panels such as those disclosed in FIGS. 27, 30, and 25 are displayed. These panels collectively provide information about challenges that have been completed by the user and virtual assets (e.g., in the form of virtual style cards 67 and virtual furnishing units 74) owned by the user. These panels also provide information about the account balance 1202 of the user (e.g., the other assets of the user) in units of the first application counter 60 (e.g., keys), the second application counter 64 (e.g., virtual cash), and the third application counter 64 (e.g., diamonds), as illustrated to FIG. 12 and described in the respective paragraphs.

For example, referring to FIG. 27, panel 2730 is displayed responsive to selection of the combination of the user affordance 2502, a furniture affordance (e.g., icon) 2722, and a tab 2726 ("Designs") (e.g., in this order). The panel 2730 comprises images 2710 of scenes corresponding to challenges previously completed by the user. Panel 3030 in FIG. 30 is displayed responsive to selection of the user affordance 2502, the furniture affordance (e.g., icon) 2722, and a tab 2728 ("Inventory") (e.g., in this order). The panel 3030 displays images of virtual furnishing units 74 that are owned by the user. In some embodiments, each of the images is a user-selectable affordance. In some embodiments, a selection of an image of the virtual furnishing unit 74-8 in panel 3030 causes a panel such as that in FIG. 29 to be displayed. Referring to FIG. 25, panel 2530 is displayed responsive to selection of the user affordance 2502, the furniture affordance (e.g., icon) 2722, and a tab 2504 ("Style Cards") (e.g., in this order). The panel 2530 a collection of virtual style cards 67 that the user has collected (e.g., owns). Each of the images of the virtual style card is a user-selectable affordance. For example, a user selection of an image of the style card in panel 2530 causes information about the corresponding furnishing style and details of the color/material and/or pattern 2406 to be displayed, as described previously with reference to FIGS. 24A and 24B.

Referring to block 2606 of FIG. 26, responsive to selection of a first affordance in the first plurality of affordances, one or more images are displayed. Each of the one or more images corresponds to a scene of a previous challenge completed by the first user and includes a plurality of virtual furnishing units 74 that was used to complete the previous challenge. To this end, FIG. 27 shows a panel 2730 that is displayed responsive to selection of the user affordance 2502 (e.g., a first affordance in the first plurality of affordances). In some embodiments, the panel 2730 is the default panel that is displayed responsive to selection of the user affordance 2502. In some embodiments, panel 2730 is displayed responsive to selection of the combination of user affordance 2502, furniture affordance (e.g., icon) 2722, and tab 2726 ("Designs") as discussed previously. Panel 2730 includes images 2710-1, 2710-2, and 2710-3, each corresponding to a scene of a previous challenge completed by the first user. Each of the images 2710 includes a respective plurality of three-dimensional graphics 354 of virtual furnishing units 74 that was used to complete the previous challenge. Each of the images 2710 is displayed as a thumbnail and is a user-selectable affordance, as will be described in further detail. In some embodiments, each image of the one or more images includes a score 2712 (e.g., 2712-2 and 2712-3) corresponding to a first community vote in response to completion of the respective challenge. In some embodiments, a user has completed a respective challenge but the epic is not yet over (e.g., the respective challenge is still available to other users). In such instances instead of an actual score, the image 2710-1 includes an indication 2712-1 of when the voting results will be available to the user.

In some embodiments and as illustrated in FIG. 27, information about the first user, including: a unique identification 2702, a design level 71, and a design value 70 of the first user, is displayed concurrently with the one or more images 2710.

In some embodiments, a selection of a subset of the one or more images 2710 is received. Printing of the selected subset of the one or more images is facilitated, e.g., using an affordance 2720 that prompts a user to create a design book. In some instances, responsive to a selection of the affordance 2720, the user is directed to the website of an outside vendor/publisher that produces printed copies of the images, thus causing creation of a tangible book. In some embodiments, the user is also provided with editing options (within the application 44 and/or from the outside vendor/publisher) to edit the images (e.g., cropping, applying a filter, changing brightness, changing contrast, changing an orientation, selectively changing a color, changing an orientation, changing hue, and adding a sticker) prior to submission for printing.

In some embodiments, a selection of a subset of the one or more images 2710 is received. A second plurality of affordances is provided to the first user, to allow (enable) the first user to share the subset of the one or more images with one or more friends.

Figure 28:
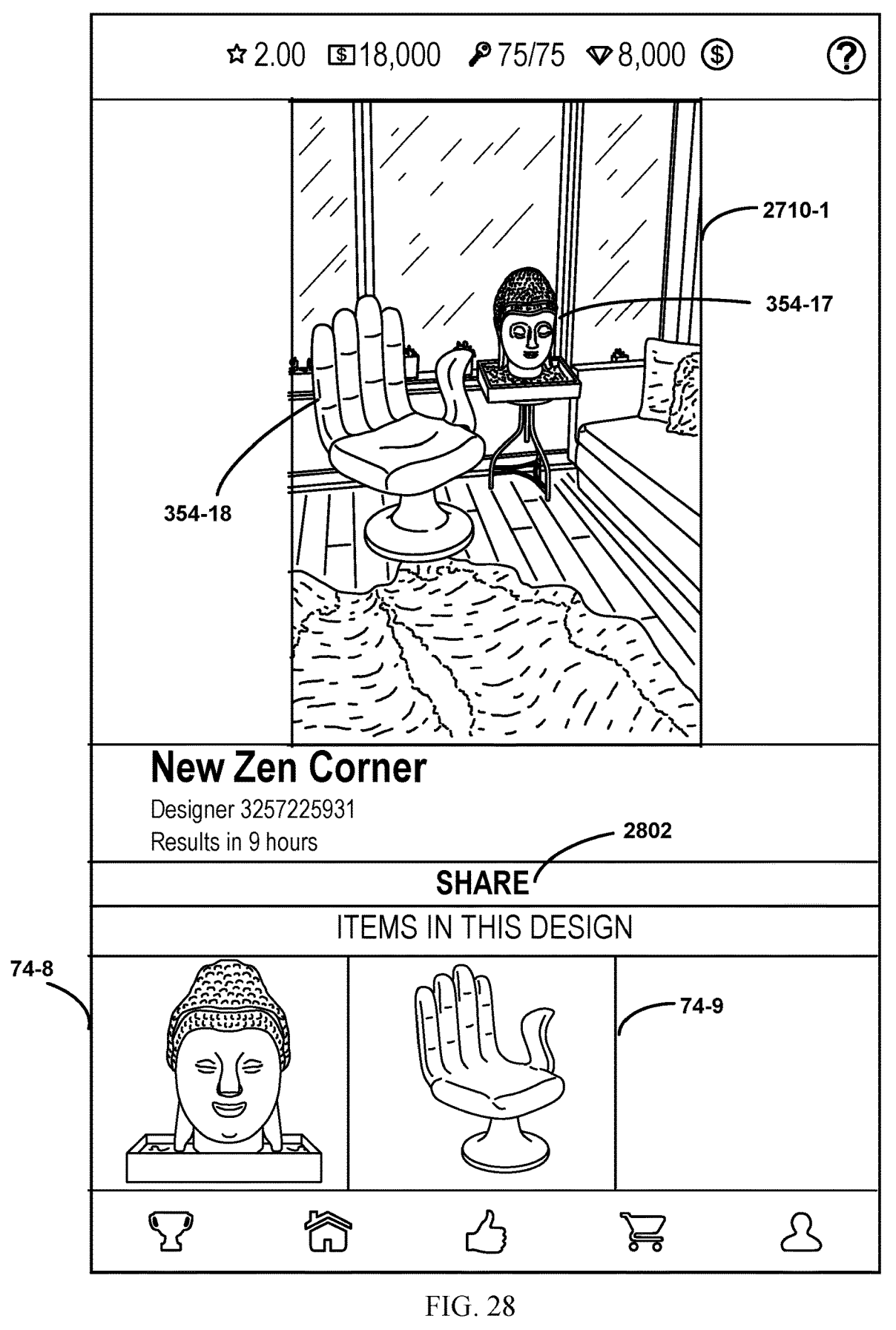

Referring to block 2608 of FIG. 26 and FIG. 27 for reference, responsive to selection of a first image 2710-1 of the one or more images 2710, (i) a magnified view of the first image 2710-1 including a first plurality of three-dimensional graphics 354-17 and 354-18 of virtual furnishing units that was used to complete the challenge and (ii) an image for each virtual furnishing unit in the first plurality of virtual furnishing units 74-8 and 74-9 are concurrently displayed (e.g., in the same view of the display). This is illustrated in FIG. 28. In some embodiments, the display of the magnified view of the first image 2710-1 further comprises display of a plurality of editing options to edit the (overall composition of) first image (not shown). The plurality of editing options to edit the first image is any combination of: cropping, applying a filter, changing brightness, changing contrast, changing an orientation, selectively changing a color, changing an orientation, changing hue, and adding a sticker to the first image. Further, as shown in FIG. 28, the image of each virtual furnishing unit 74 is displayed as a thumbnail. The images are displayed in a layout view, in the form of a table and includes rows and columns, with each image of the virtual furnishing unit 74 occupying a cell in the table. In addition, an affordance 2802 is provided to the user, to allow (enable) the first user to share the first image 2710-1 with one or more friends.

Figure 29:
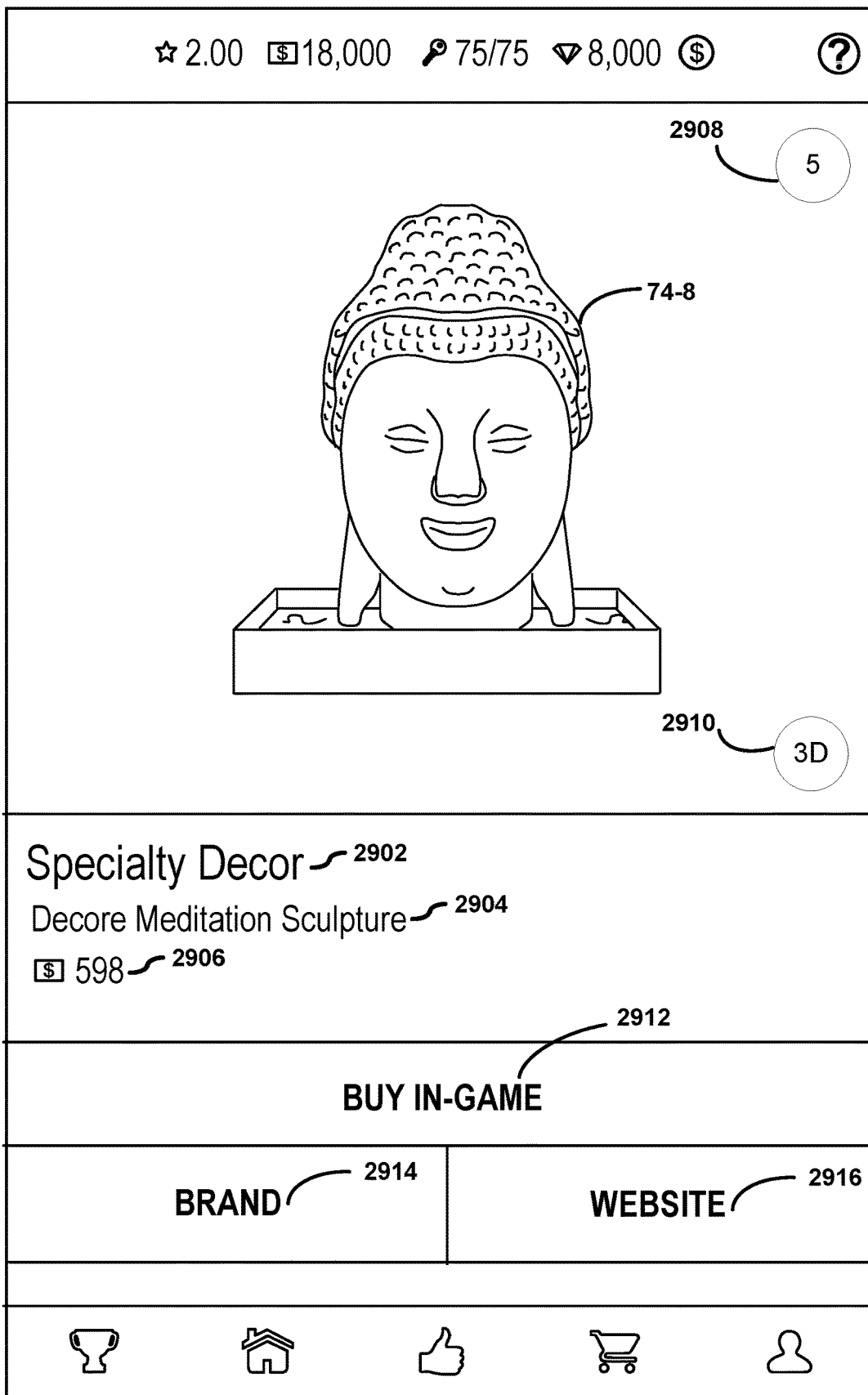
FIG. 29 is a screen image that is displayed in response to receiving of a user selection of one of a plurality of virtual furnishing units of FIG. 28, in accordance with some implementations of the present disclosure.

In some embodiments and with reference to the transition from FIG. 28 to FIG. 29, responsive to selecting the image for a first virtual furnishing unit 74-8 in the first plurality of virtual furnishing units in FIG. 28, a second plurality of affordances is displayed, as shown in FIG. 29. The second plurality of affordances corresponds to options for: (i) purchasing the first virtual furnishing unit (using affordance 2912) for use in subsequent challenges, (ii) displaying brand (e.g., manufacturer, vendor) information 2914 of the first virtual furnishing unit, and (iii) accessing a website 2916 of the brand. In some implementations, at least a subset of the plurality of virtual furnishing units 74 in the virtual furnishing unit database 328 are graphical renditions of third-party licensed furniture. The image of the first virtual furnishing unit 74-8 (and for each (or at least) the subset of the virtual furnishing unit 74 in the first plurality of virtual furnishing units) further comprises information regarding a brand 2902 of the virtual furnishing unit (e.g., brand name, vendor information) and an amount in units of an application counter (e.g., the second application counter 66, virtual cash of "$598") to purchase the virtual furnishing unit. In other embodiments (not shown), the panel in FIG. 28 also displays additional user interface elements (e.g., affordances) that enable a user to purchase tangible (e.g., real) counterparts of the virtual furnishing units 74 directly within the application 44. Further, in some embodiments, information about the remaining number of times 2908 that the first virtual furnishing unit 74-8 is available to the user to be used in subsequent challenges ("5") is displayed. A 3D affordance 2910 may also be included. For example, selection of the 3D affordance 2910 causes the first virtual furnishing unit 74-8 to rotate in space (e.g., about the vertical axis), thus giving the first virtual furnishing unit 74-8 a three-dimensional perspective. In some embodiments, the 3D affordance 2910 is a toggle button that allows a user to alternate the displaying of the first virtual furnishing unit 74-8 between its two-dimensional projection as shown in FIG. 29 and three-dimensional perspective.

Augmenting a Real Environment with a Virtual Furnishing Unit

In accordance with some implementations, the application server module 318, through the application module 44, provides players (users) with challenges by drawing on resources from both the application server 106 and the client device 102. In one aspect, the application 44 is configured to project (e.g., superimpose, overlay) one or more virtual furnishing units 74 from the virtual furnishing unit database 328 onto a room (e.g., a live scene) that is obtained using one or more optical sensors/cameras 473 on the client device 102. Alternatively, the one or more virtual furnishing units 74 from the virtual furnishing unit database 328 are projected onto an image 45 that is stored on the client device 102. Thus, the completed challenge is an augmented version of reality where the physical environment of a user is augmented with an overlaid (superimposed), three-dimensional graphic of a virtual furnishing unit. In some implementations the virtual furnishing unit is a three-dimensional graphical rendition of a commercially available (e.g., real) furniture. Thus, the augmented reality capability enables a user to visualize how the real furnishing item will look and fit in the environment of the user, before actually purchasing the piece of furniture.

Figure 32:
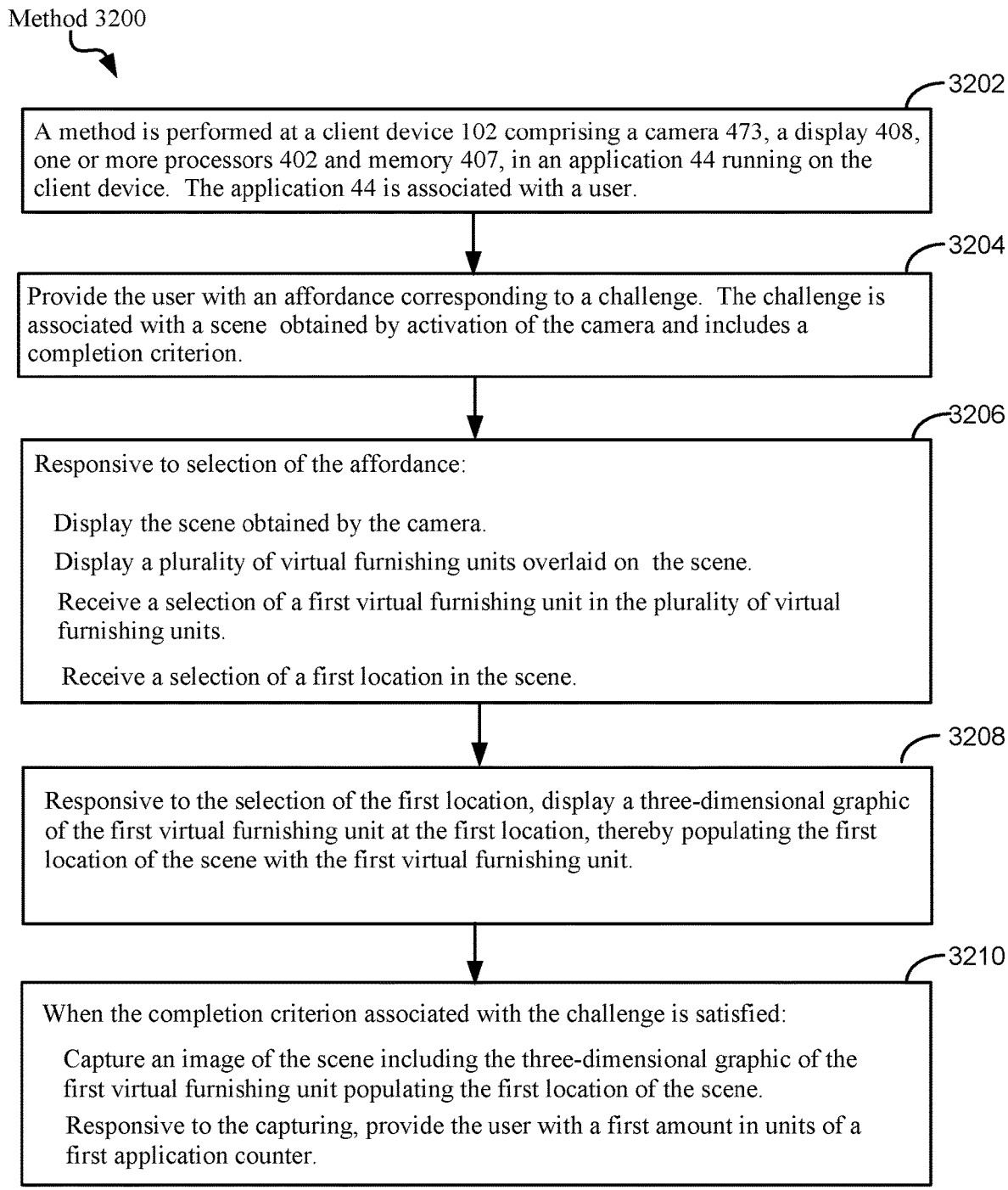
FIG. 32 is a flow chart illustrating a method for competitive scene completion in an application, the scene obtained by activation of a camera of a client device associated with a user, in accordance with some implementations of the present disclosure.

To this end, FIG. 32 is a flow chart illustrating a method 3200 for competitive scene completion in an application 44, in which the scene is obtained by activation of a camera (e.g., optical sensor/camera 473) of a client device 102 associated with a user, in accordance with some implementations of the present disclosure.

As noted in block 3202 of FIG. 32, the method 3200 is performed at a client device 102 comprising a camera (e.g., optical sensor/camera 473), a display 408, one or more processors 402 and memory 407, in an application 44 running on the client device associated with a user. The camera (e.g., optical sensor/camera 473) includes an image sensor having a field of view and being configured to capture (live) images and (live) videos within the field of view.

Figure 31:
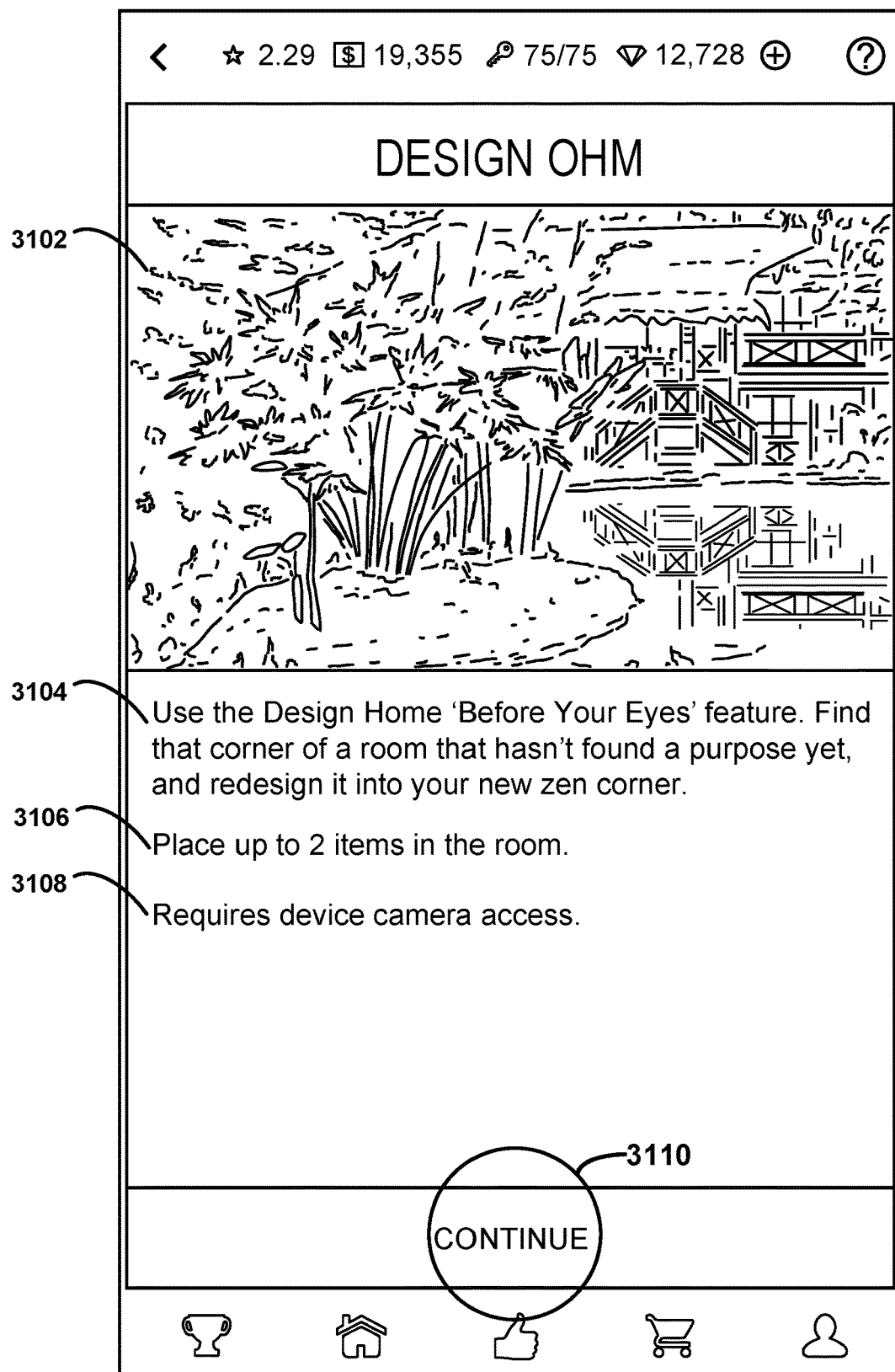
FIG. 31 is a screen image displaying an affordance inviting a user to participate in a challenge obtained by activation of a camera on a client device associated with the user, in accordance with some implementations of the present disclosure.
Figure 33A:
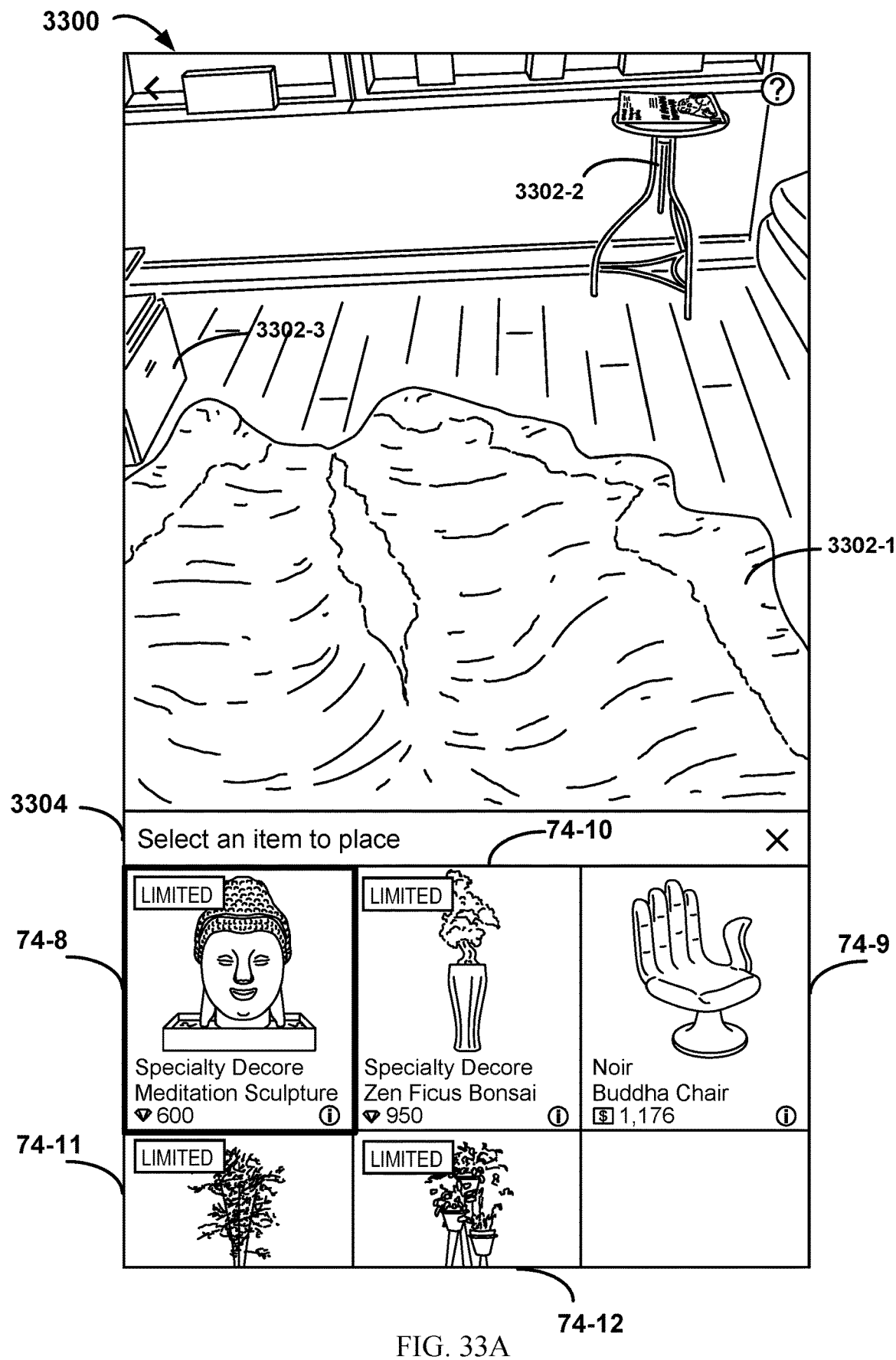
FIGS. 33A to 33R are screen images illustrating a process for competitive scene completion in an application, the scene obtained by activation of a camera of a client device associated with a user, in accordance with some implementations of the present disclosure.

Referring to block 3204 of FIG. 32 and with reference to FIG. 31, the user is provided with an affordance 3102 corresponding to a challenge. The challenge is associated with a scene that is obtained by activation of the camera 473. In some embodiments and as illustrated in FIG. 33A, the scene 3300 is a live image captured by the camera. In other embodiments, the scene is an image 45 that is obtained from (e.g., stored on) the camera 473.

In some embodiments, the scene includes (a corner of) a room in the user's premises, a backyard, or a garden. The challenge includes a completion criterion 3106 in FIG. 31 ("Place up to 2 items") and a description 3108 that camera access (e.g., via optical sensor/camera 473 of the computing device 102) is required for the challenge. In some embodiments, the completion criterion includes populating the scene with a predetermined number (e.g., one, two, three or five) of virtual furnishing units 74. In other embodiments, the completion criterion includes populating the scene with one or more predefined types of virtual furnishing units, or a combination of both number and types of virtual furnishing units. When the user would like to enter the challenge, they press the continue key 3110 on affordance 3102 associated with the challenge.

Figure 33B:
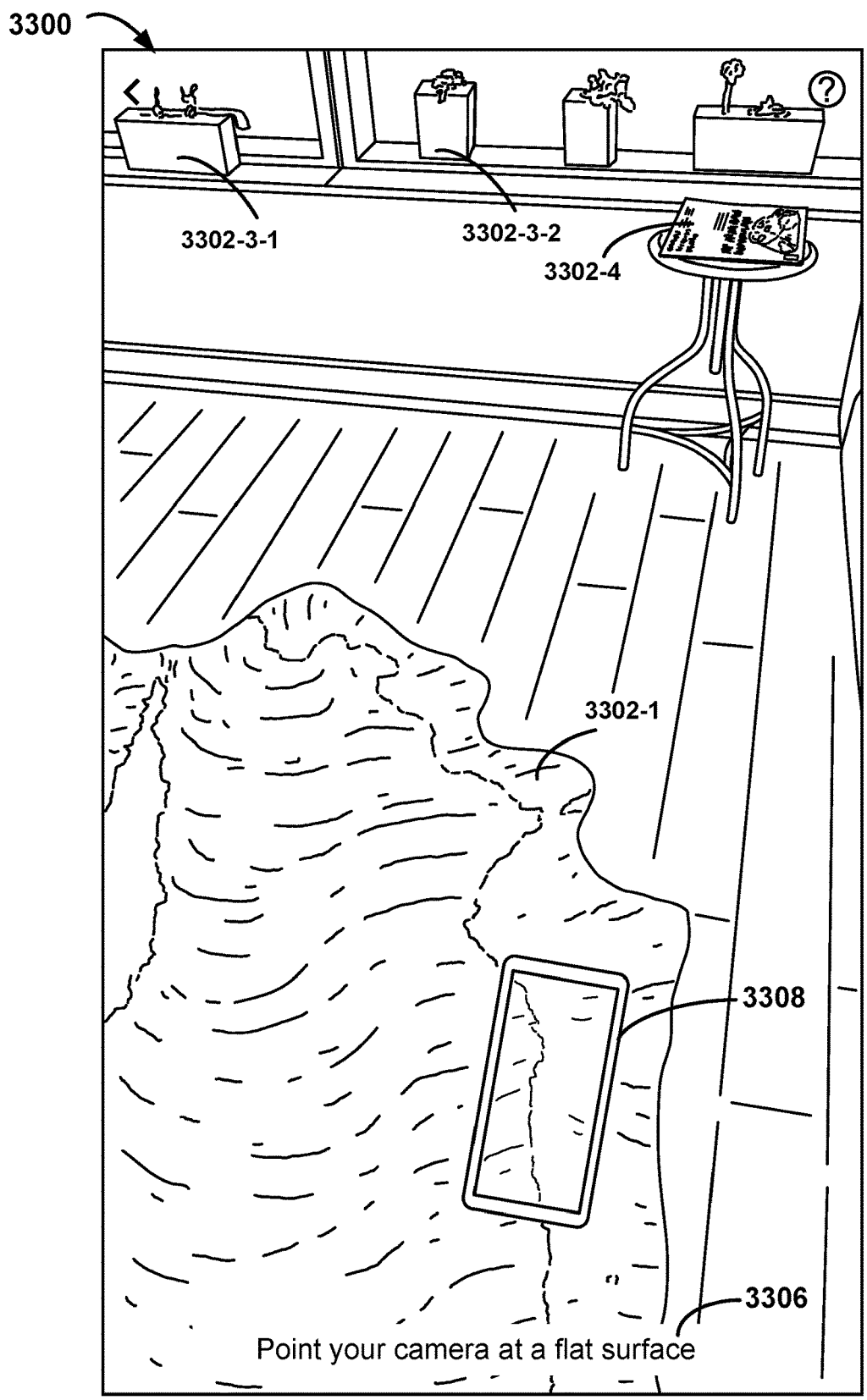
Figure 33C:
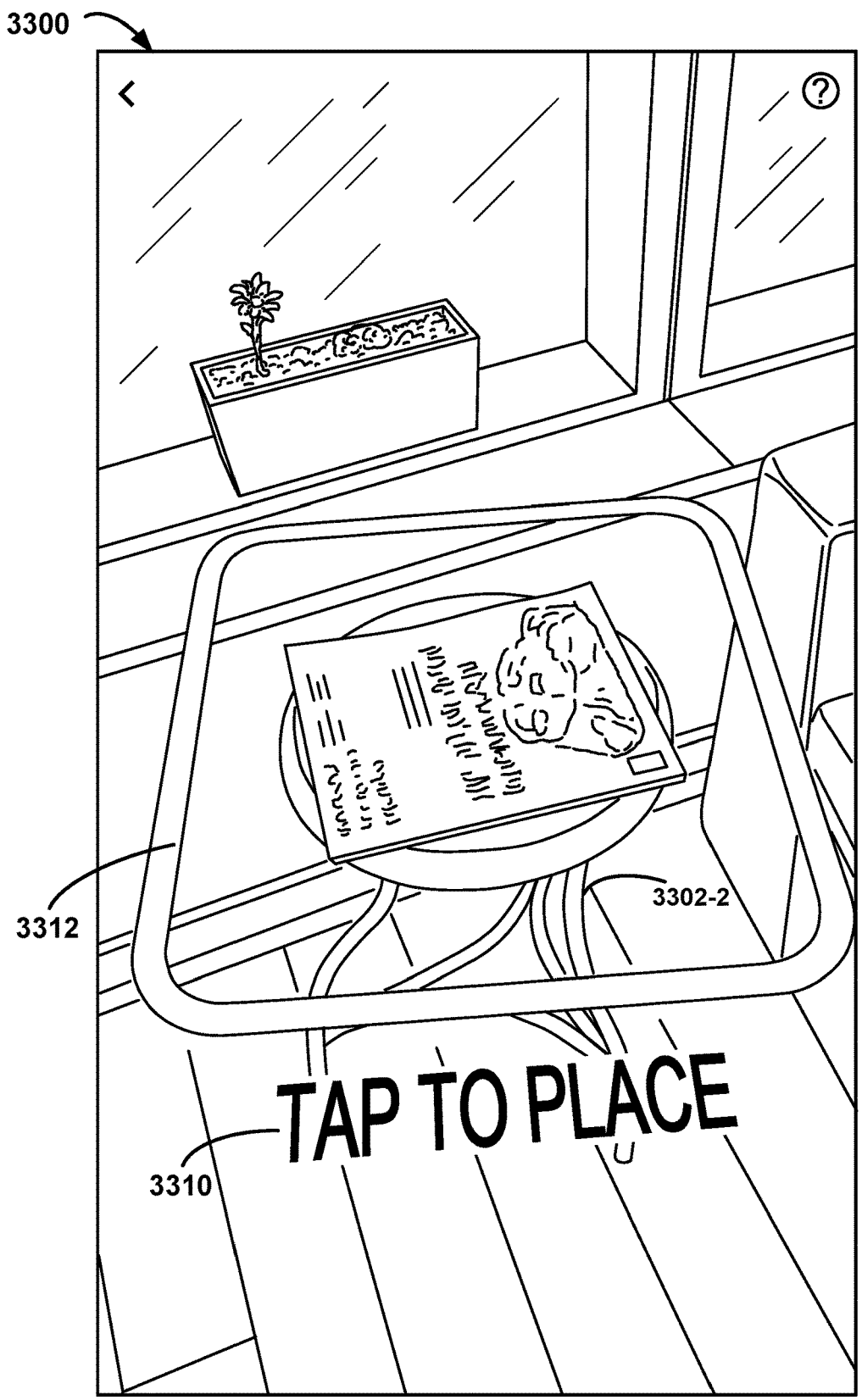
Figure 33D:
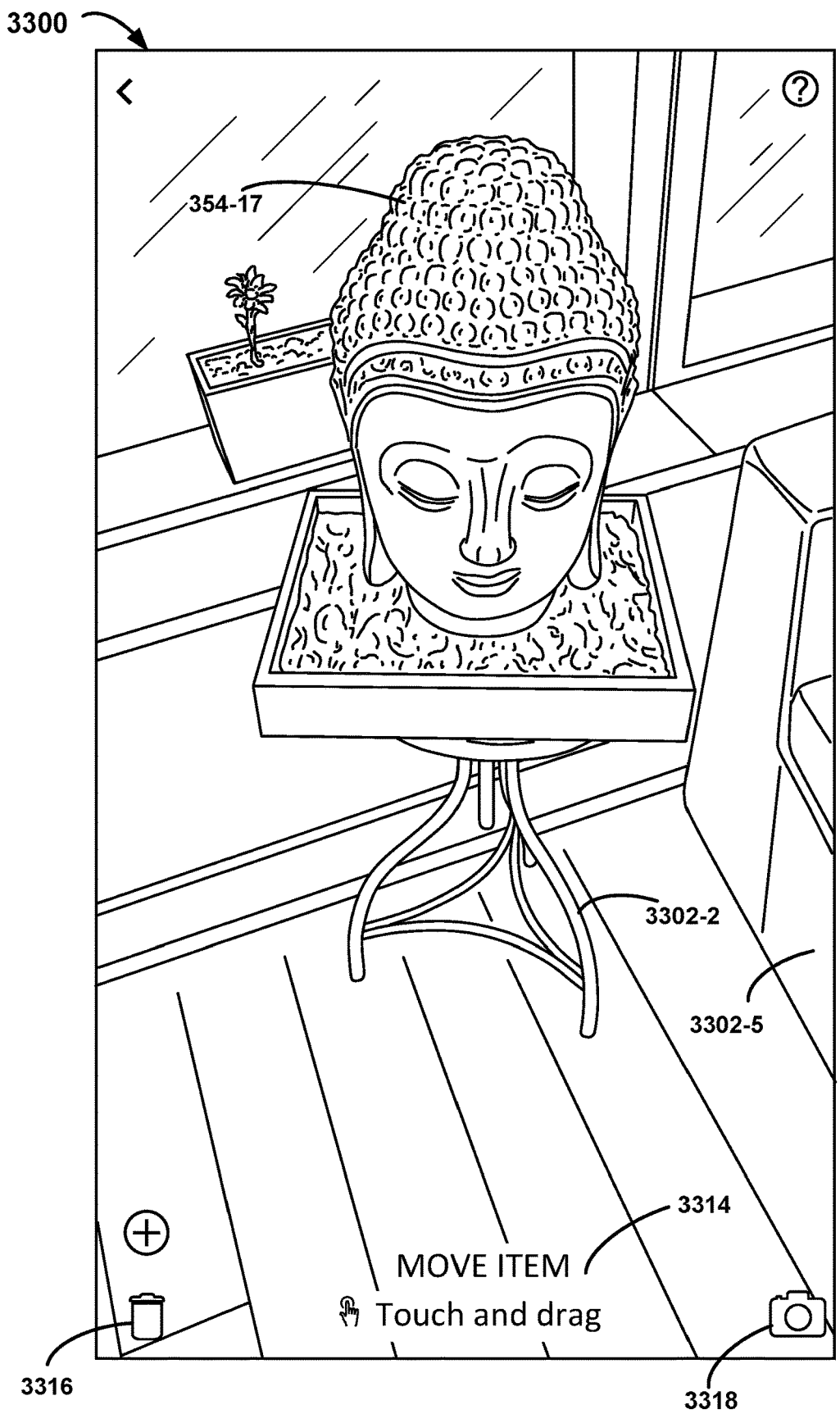
Figure 33E:
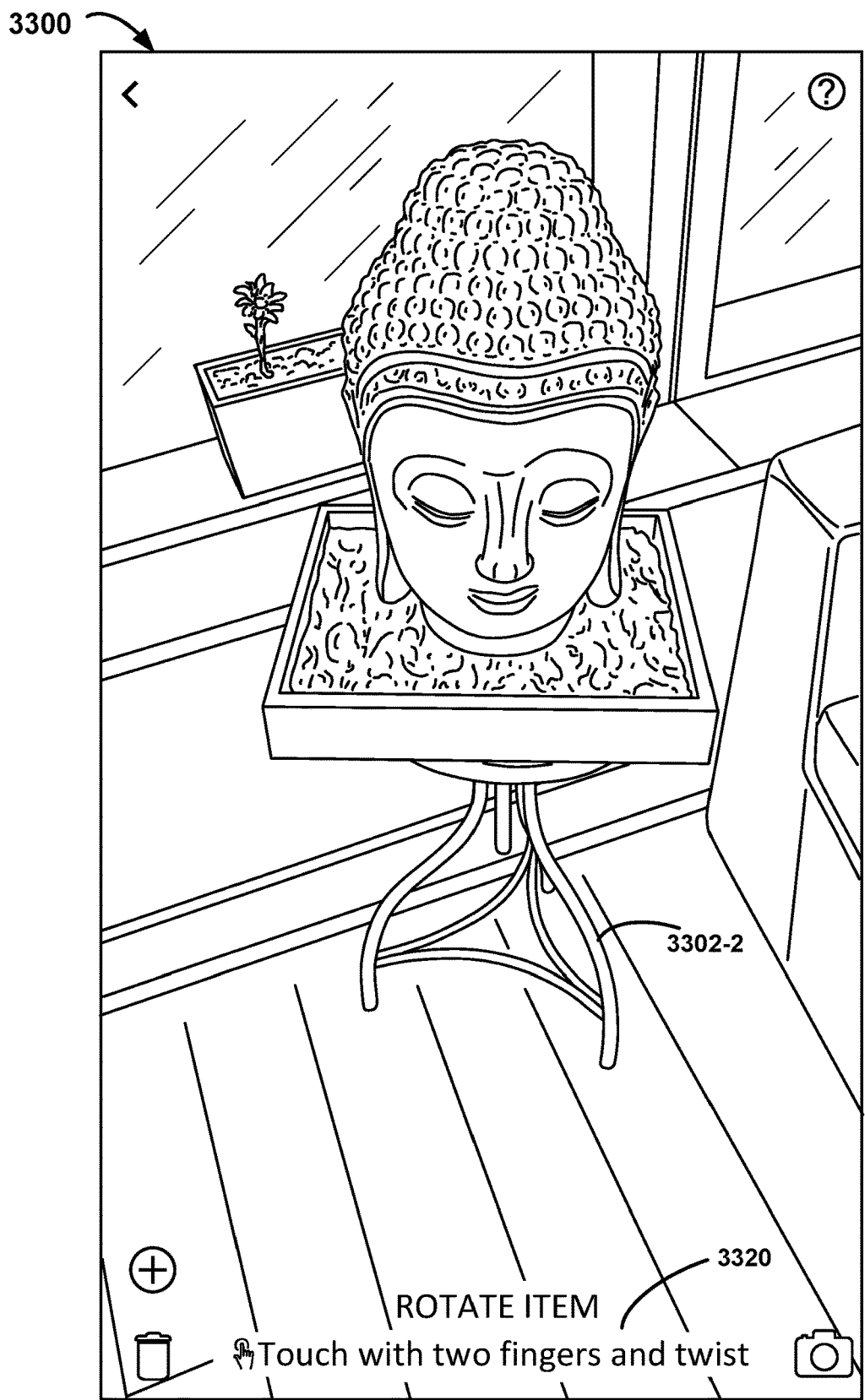
Figure 33F:
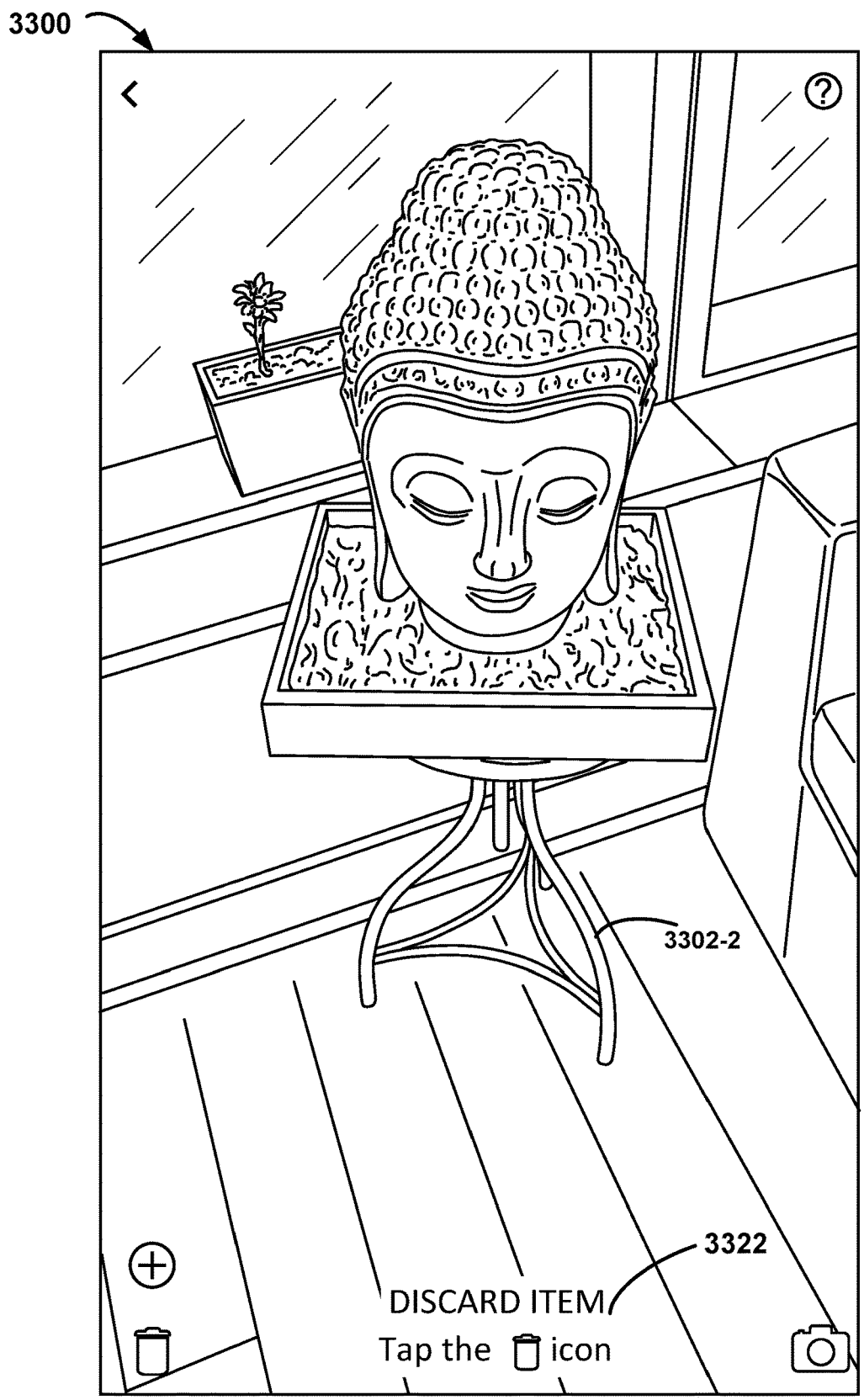
Figure 33G:
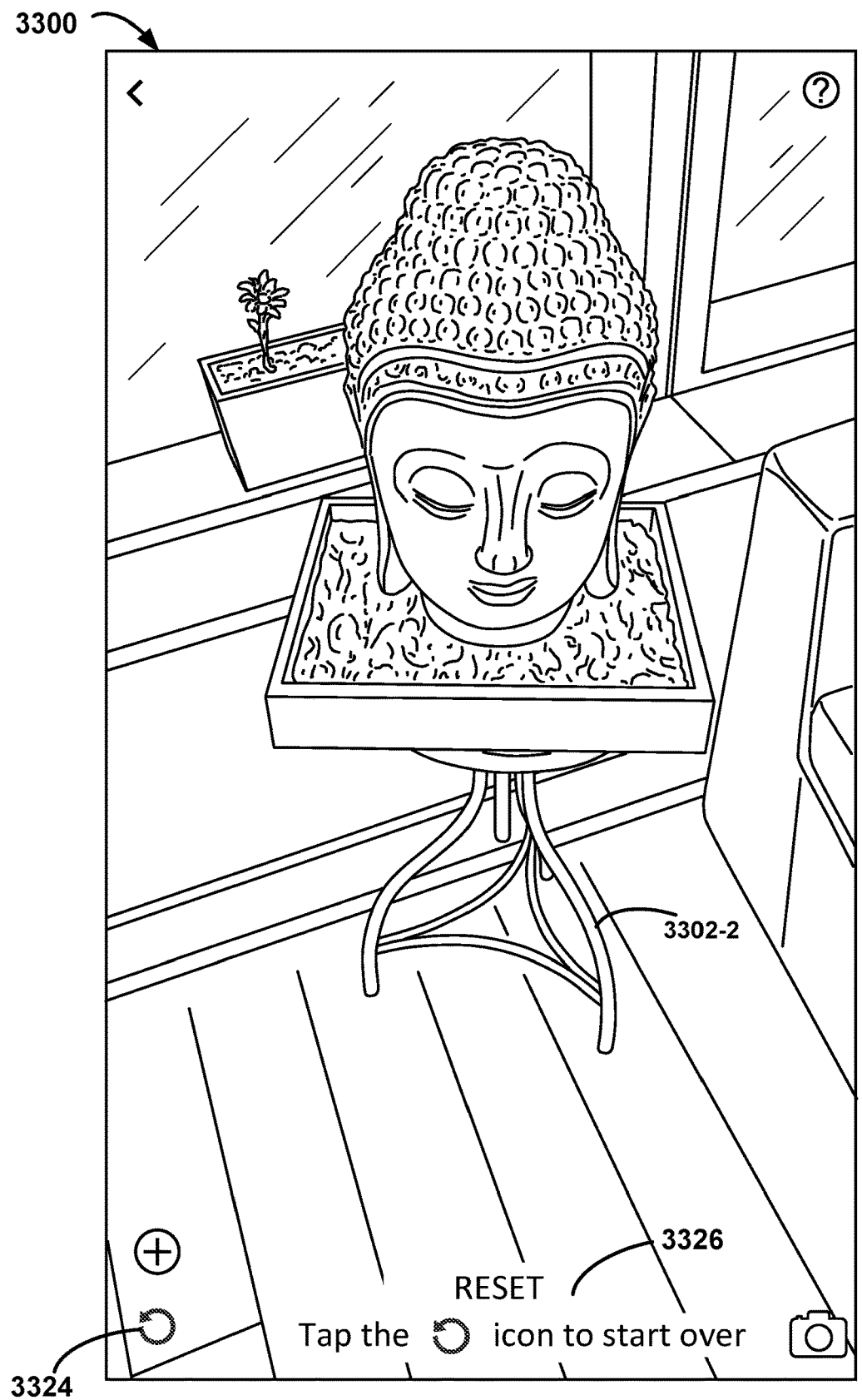
Figure 33H:
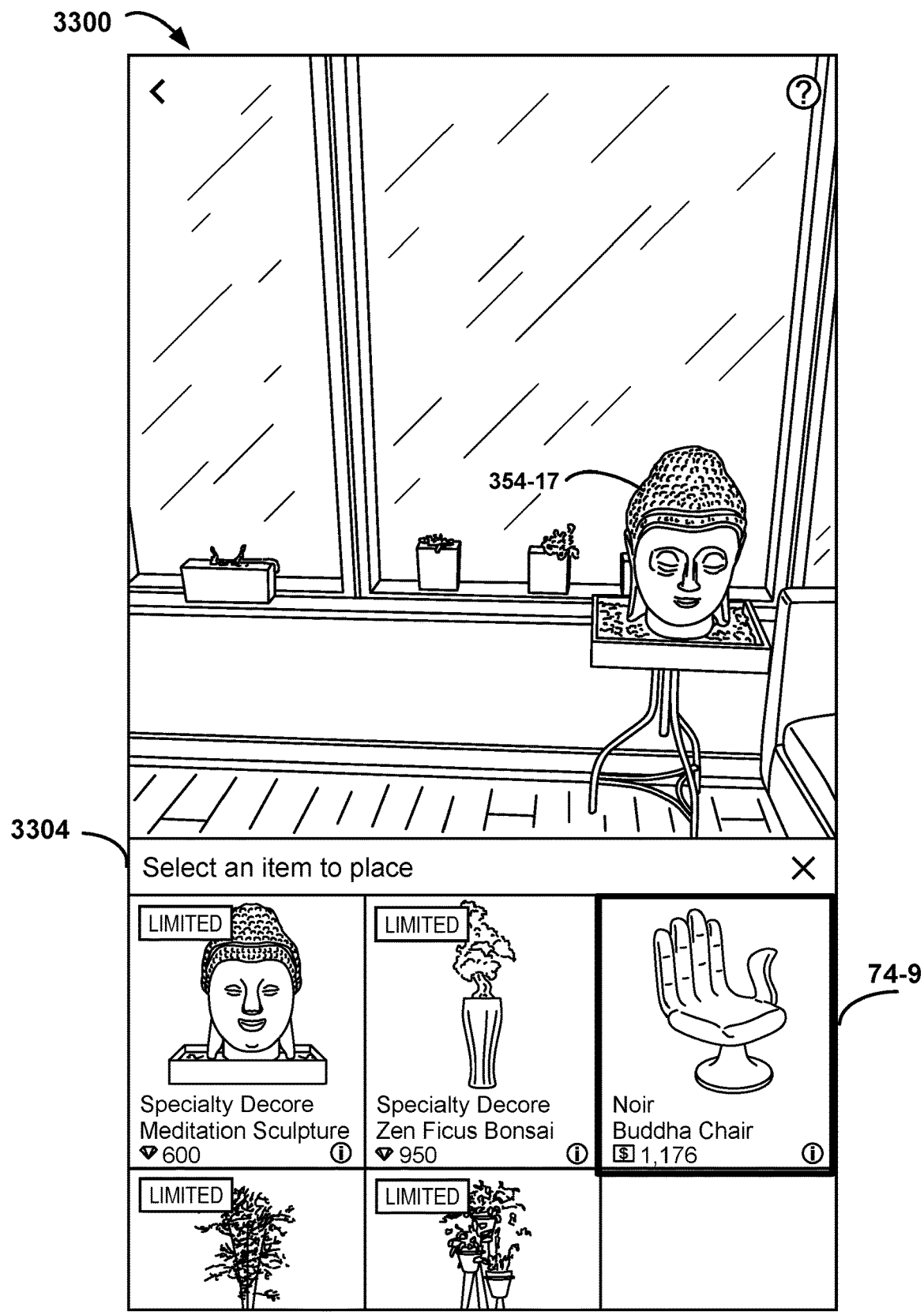
Figure 33I:
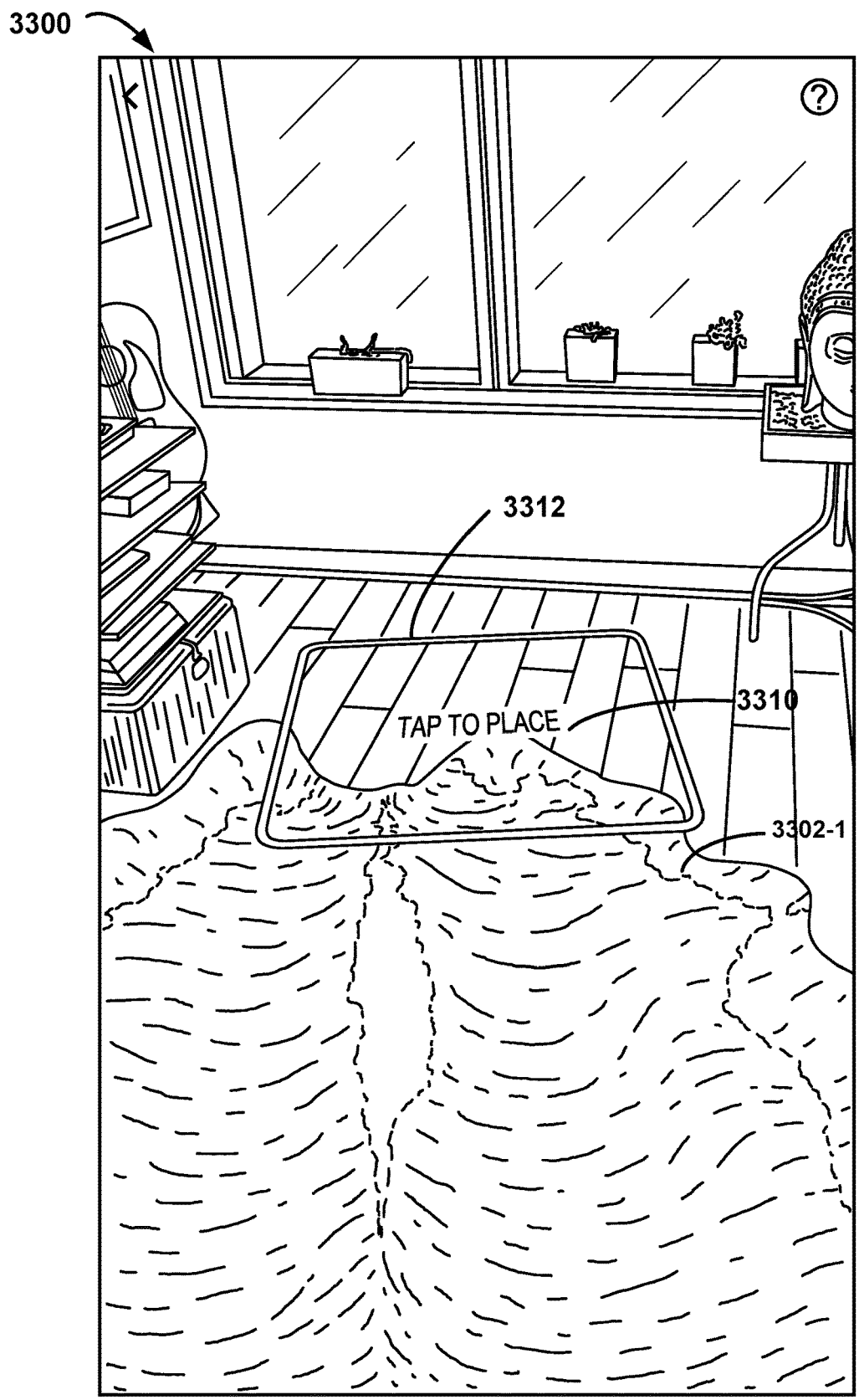
Figure 33J:
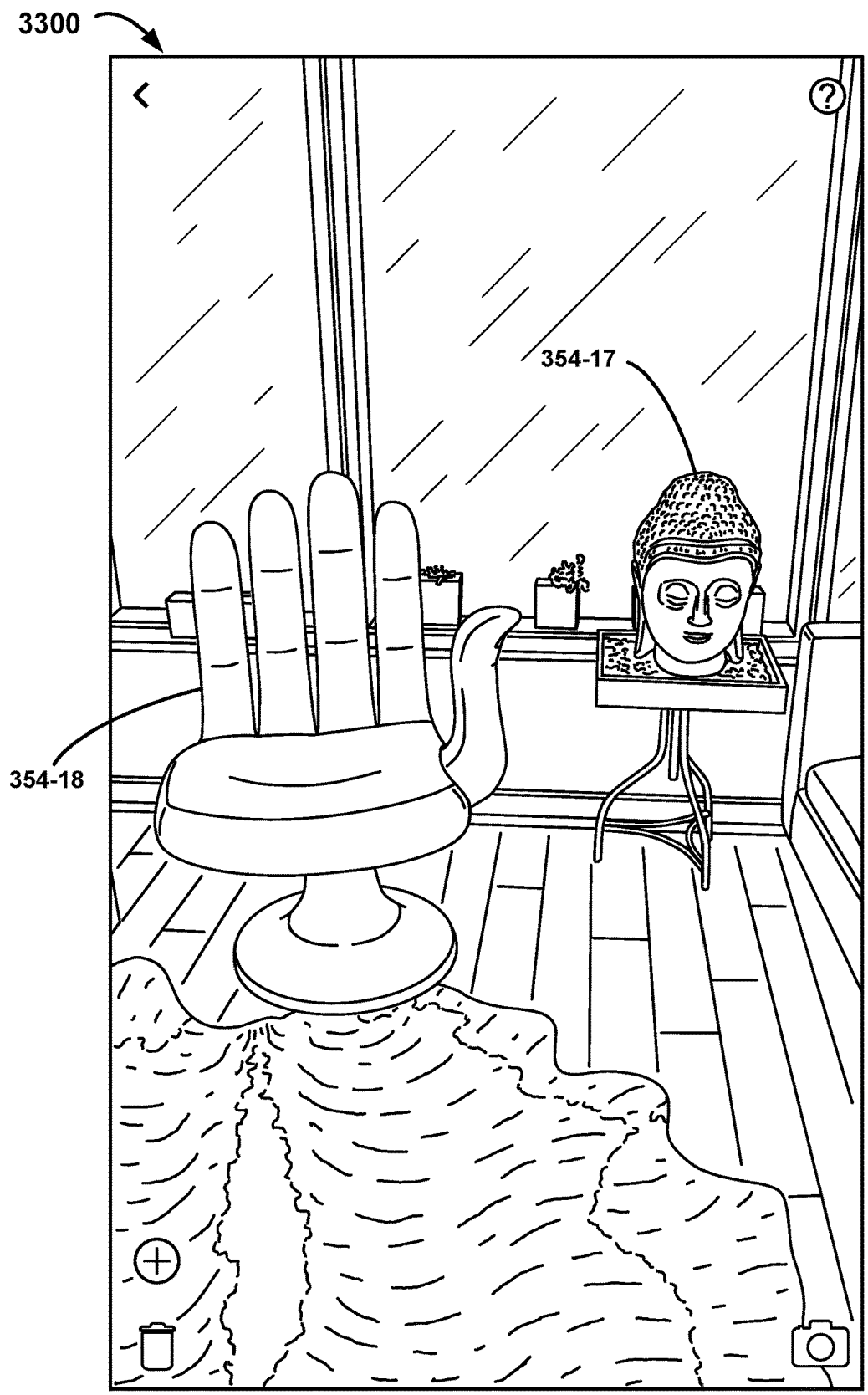
Figure 33K:
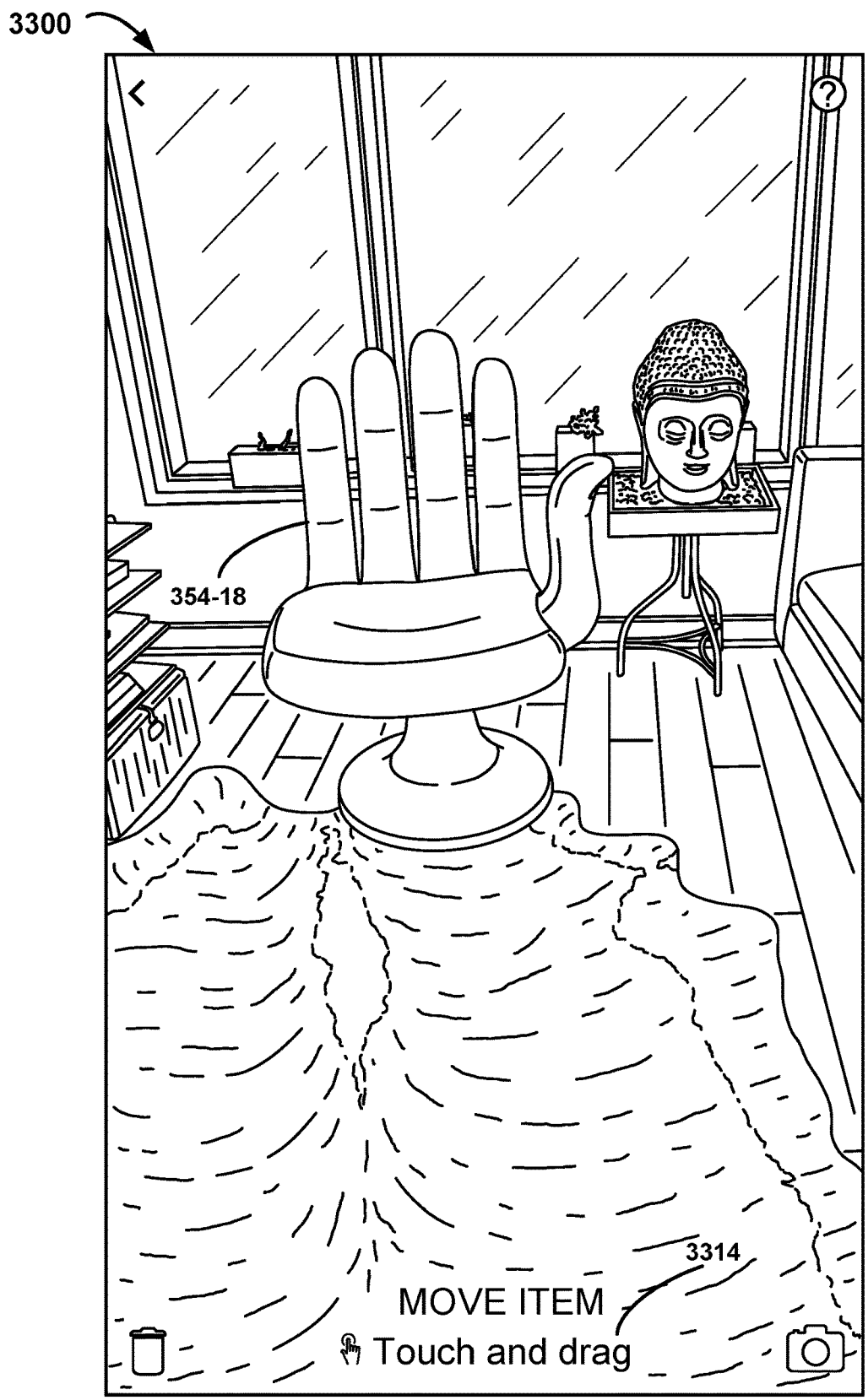
Figure 33L:
Figure 33M:
Figure 33N:
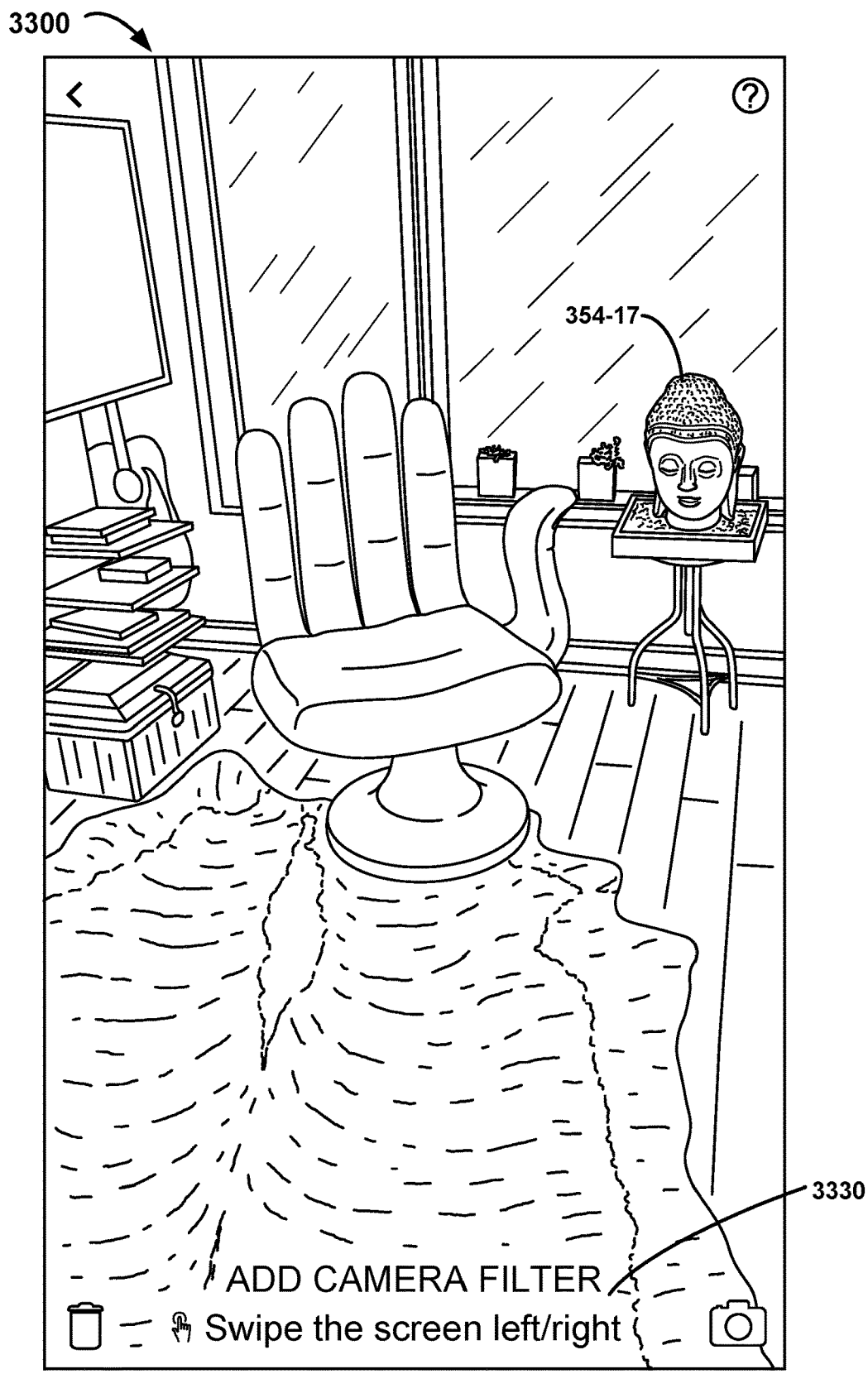
Figure 33O:
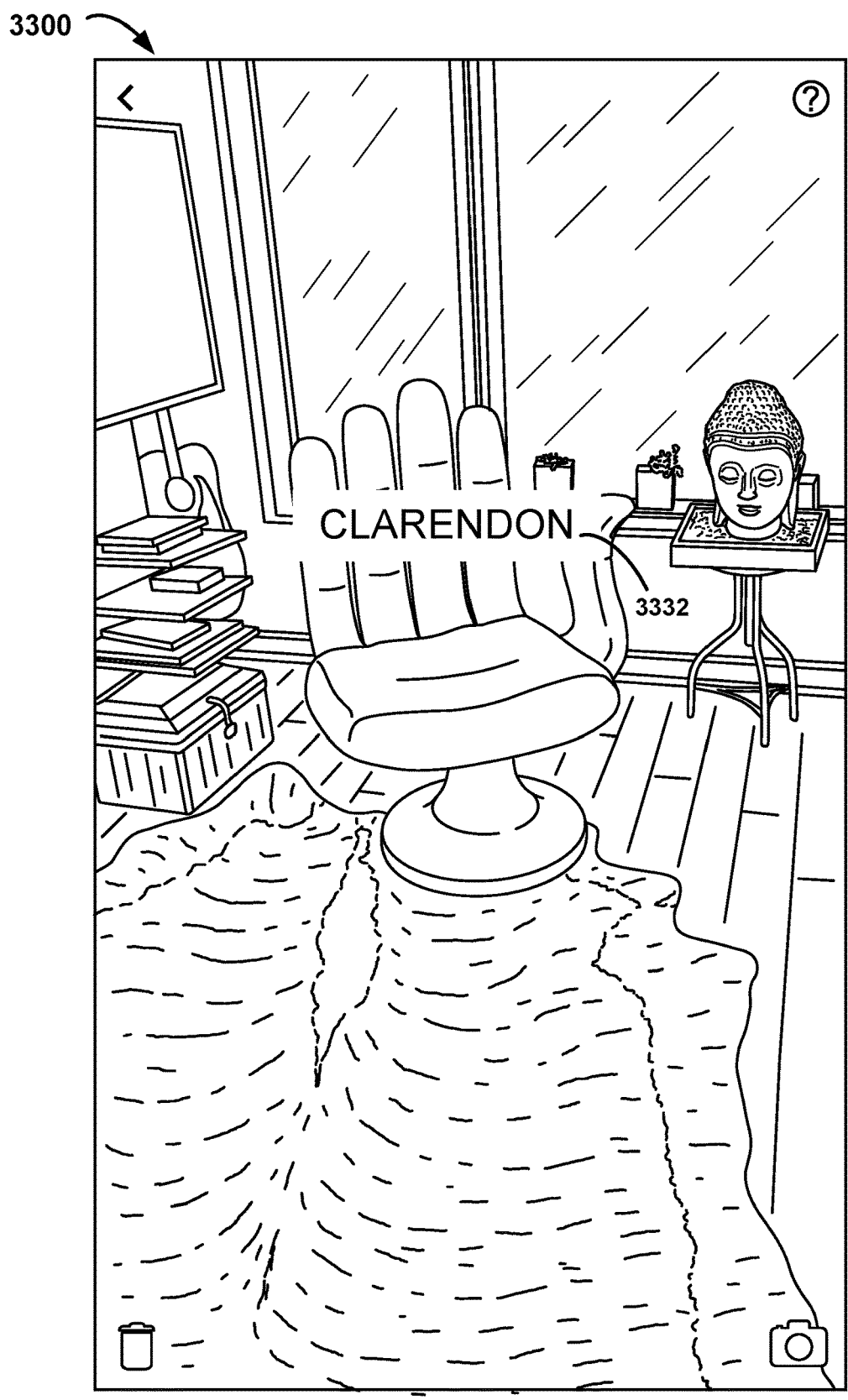
Figure 33P:
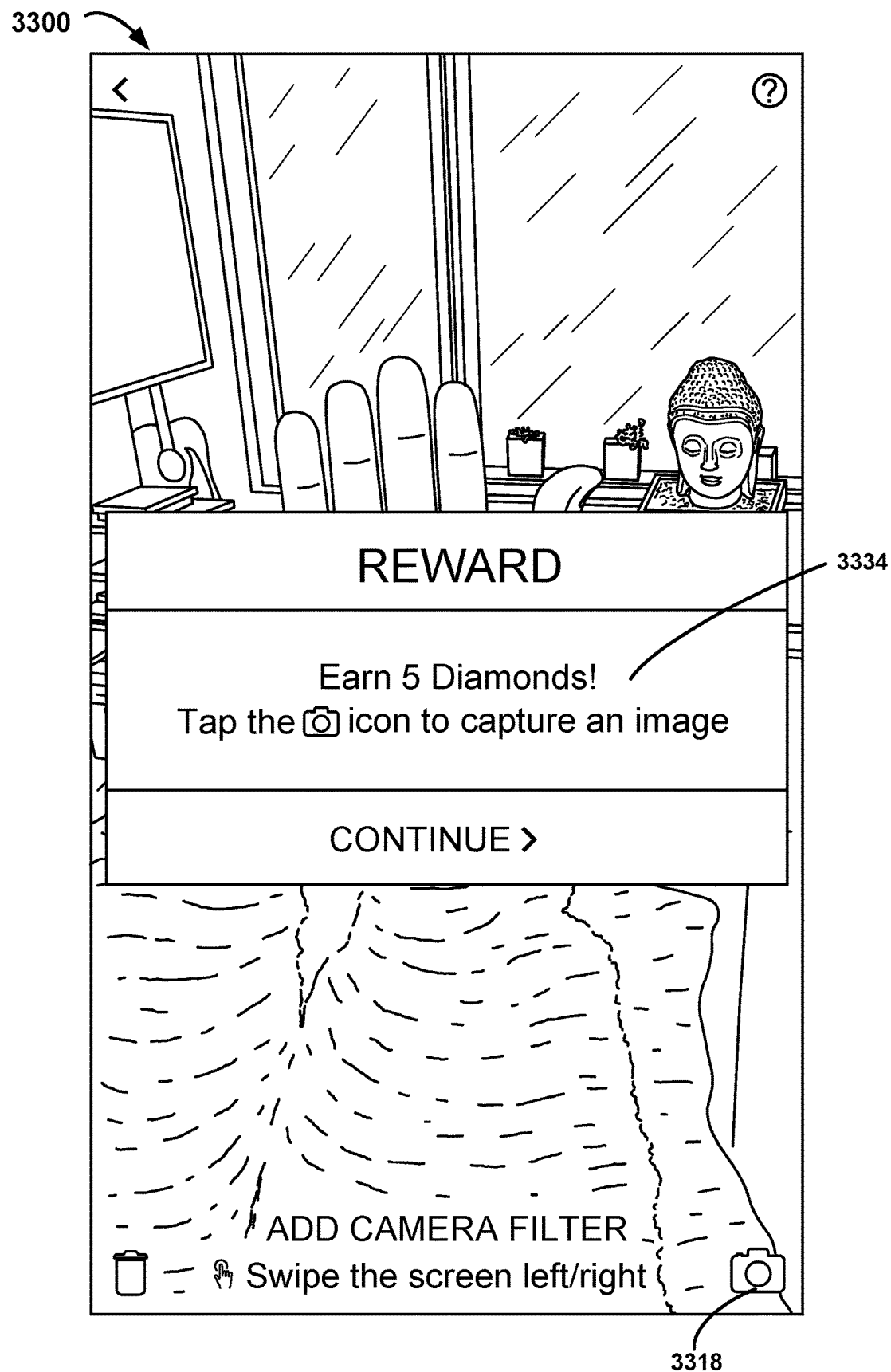
Figure 33Q:
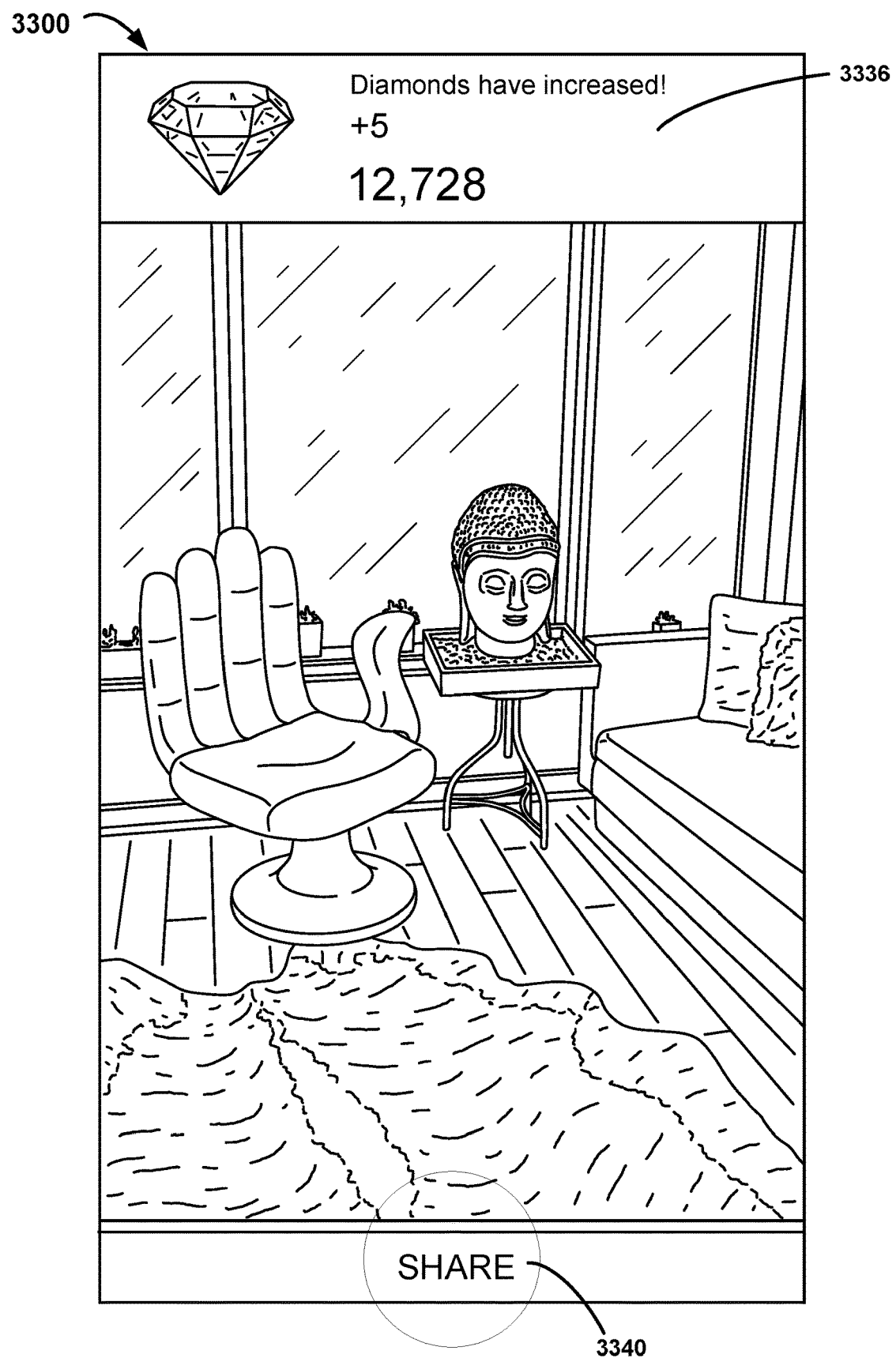
Figure 33R:
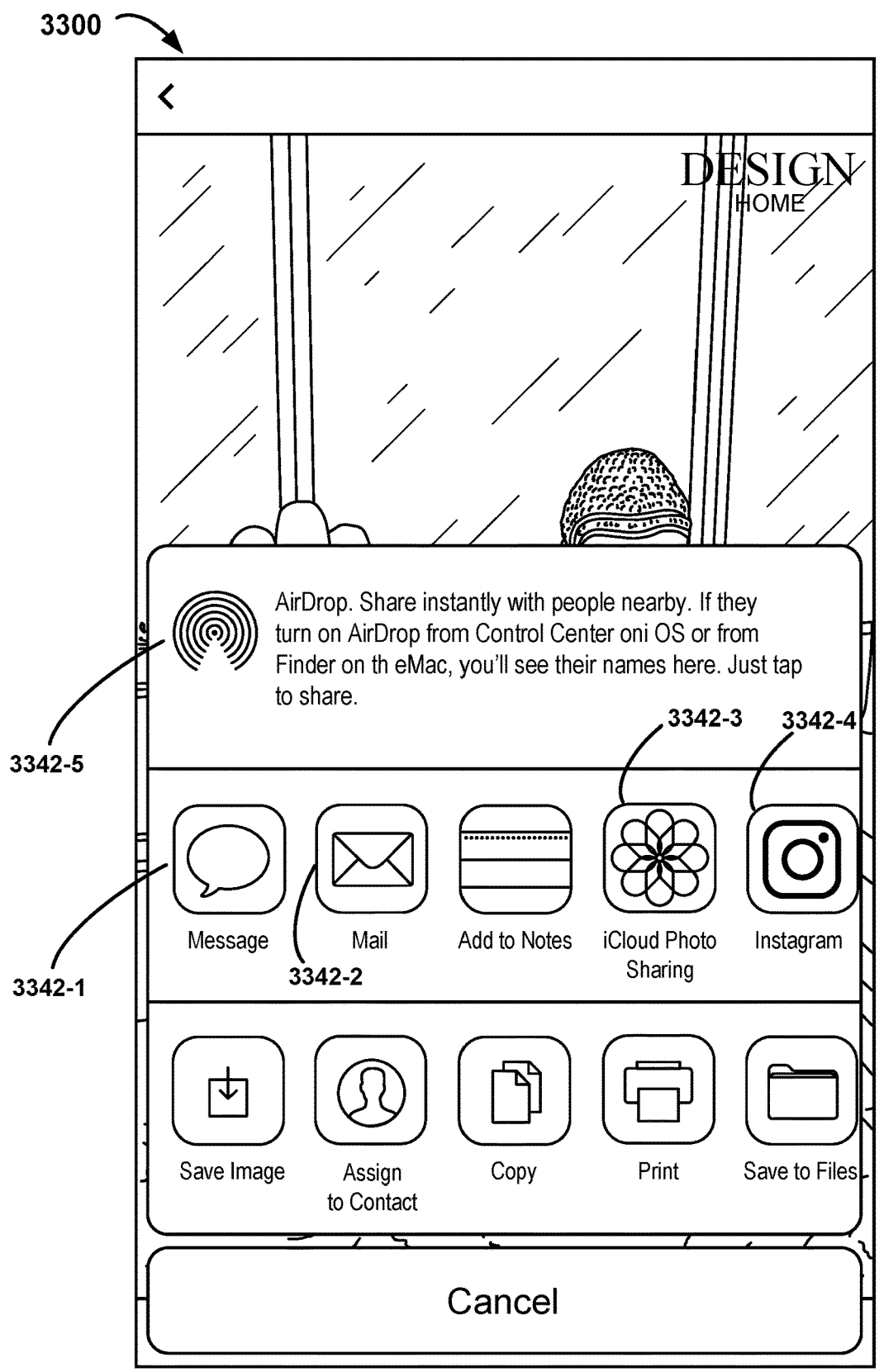

Referring to block 3206 of FIG. 32 and as illustrated in FIGS. 33A to 33R, responsive to selection of the affordance, the scene obtained by the camera is displayed. FIGS. 33A to 33R are screen images illustrating a scene 3300 that is obtained by activation of the camera (e.g., optical sensor/camera 473) and is displayed on the client device 102. Referring to FIG. 31, the affordance 3102 includes a description 3104 to "find that corner of a room." In this example, the scene 3300 is a room that the user (e.g., the client device 102) is situated. In some embodiments and referring to FIG. 33B, the scene includes a plurality of images of commercially available (e.g., real) furnishing units 3302. In some embodiments, the plurality of images of commercially available furnishing units 3302 includes two or more of: a table 3302-2, a carpet 3302-1, a countertop, a painting, a seating unit, a plant 3302-3, a television 3302-6, a dresser, a bookshelf, a shelf, a desk, and a stereo. In some embodiments, the scene also includes one or more books 3302-7 and/or magazine 3302-4.

Returning to block 3206 of FIG. 32 and as illustrated in FIG. 33A, a plurality of virtual furnishing units 74 is displayed on the screen image. A comparison between FIGS. 33A and 33B reveals that the plurality of virtual furnishing units 74 that is displayed is overlaid (e.g., superimposed) on the scene 3300. In this example, the plurality of virtual furnishing units 74 is overlaid on the bottom half of the display. In other embodiments, the plurality of virtual furnishing units 74 may be overlaid on and in-line with any one of the sides of the display. In response to receiving a selection of a first virtual furnishing unit 74-8 in the plurality of virtual furnishing units 74 and a selection of a first location 3302-2 (FIG. 33C) in the scene 3300, a three-dimensional graphic of the first virtual furnishing unit 354-17 (FIG. 34D) is displayed at the first location 3302-2, thereby populating the first location 3302-2 of the scene 3300 with the first virtual furnishing unit 74-8. In some embodiments, the first location includes a countertop, a table, the floor, a window, a ceiling, a wall, or any real furnishing unit that is available of the scene 3300.

In some embodiments, before the selection of the first location 3302-2 (FIG. 33C) in the scene 3300 is received, the method further comprises overlaying (superimposing), on the displayed scene, a plurality of instructions for the user. Referring to FIGS. 33B and 33C, the plurality of instructions includes a first instruction 3306 to position the camera 473 over a flat surface of the scene. The plurality of instructions also includes a second instruction 3310 to activate (e.g., tap on/"Tap to place") a first icon 3312 that is overlaid (superimposed) on the scene. As further illustrated in FIG. 33C, in some embodiments the first icon 3310 is at a predefined position with respect to the second instruction 3310.

Referring to block 3208 of FIG. 32 and as illustrated from the transition from FIG. 33C to FIG. 33D, responsive to the selection of the first location 3302-2, a three-dimensional graphic 354-17 of the first virtual furnishing unit 74-8 is displayed at the first location, thereby populating the first location 3302-2 of the scene 3300 with the first virtual furnishing unit 74-8. In some embodiments, an execution of the second instruction is 3310 detected by the application 44 (e.g., the display is a touch-sensitive display and the application 44 detects a tapping action (of a finger) of the user on the touch-sensitive display). Responsive to the detection, the three-dimensional graphic 354-17 of the first virtual furnishing unit 74-8 is displayed at the first location 3302-2.

In some embodiments, the first location includes a real furnishing unit 3302. Specifically, with reference to FIGS. 33C and 33D, the first location is (e.g., corresponds to) a real table 3302-2 that is in the environment of the user (client device 102). Accordingly, as illustrated in these figures, displaying the three-dimensional graphic of the first virtual furnishing unit at the first location comprises displaying the three-dimensional graphic 354-17 of the first virtual furnishing unit 74-8 on (e.g., a surface of) the real furnishing unit 3302-2.

In some embodiments, the display is a touch-sensitive display. As illustrated in FIG. 33D, after displaying the three-dimensional graphic 354-17 of the first selected virtual furnishing unit 74-8 at the first location 3302-2, the application 44 detects one or more predefined user actions with respect to the display (e.g., in accordance with instruction 3314 presented in FIG. 33D). In response to the detecting, a position of the first selected furnishing unit in the scene is varied. The varying includes a translation (moving, displacing) of the first selected furnishing unit 74-8 with respect to the first location. Additionally, or alternatively, the varying includes a rotation of the first selected furnishing unit with respect to a time-averaged position of the first location.

In some embodiments, the rotation is in response to detecting a touch action on the first selected furnishing unit with two fingers of the user and a twist action of the two fingers (e.g., in accordance with instruction 3320 presented in FIG. 33E).

In some embodiments, the moving is in response to detecting a touch action on the first selected furnishing unit (e.g., using one finger) by the user and a drag action on the first selected furnishing unit (e.g., in accordance with instruction 3314 in FIG. 33D.)

In some embodiments, the completion criterion is placing two virtual furnishing units in the scene 3300. FIGS. 33H to 33M illustrate the steps to populate the scene 3300 with the three-dimensional graphic 354-18 of the second virtual furnishing unit 74-9. Essentially these steps are a repeat of what have been described with respect to FIGS. 33A to 33F. Specifically, the transition from FIG. 33K to FIG. 33L provides an example of a translation (moving, displacing) of the three-dimensional graphic 354-18 of the second selected furnishing unit 74-9 (responsive to detection of a touch and drag action on the display). Further, the transition from FIG. 33L to 33M provides an example of a rotation of the three-dimensional graphic 354-18 of the second selected furnishing unit 74-9 (responsive to detection of a touch with two fingers and a twist on the display).

Referring to block 3210 of FIG. 32, when the completion criterion associated with the challenge is satisfied, an image of the scene is captured, as illustrated in FIG. 33Q. The captured image of the scene includes the three-dimensional graphic of the first virtual furnishing unit populating the first location of the scene. Responsive to the capturing, the user is provided with a first amount 3336 in units of an application counter (e.g., the first application counter 60, the second application counter 64, the third application counter 66, or the fourth application counter 67).

In some embodiments, the captured image of the scene, including the three-dimensional graphic of the first virtual furnishing unit, is captured using the camera (e.g., by activating the camera icon 3318 in FIG. 33P on the display).

As illustrated in FIGS. 33Q and 33R, responsive to the capturing, the application provides an option 3340 to share the captured image with one or more friends of the user in some embodiments. Responsive to selection of the option 3340, the application 44 provides a plurality of affordances 3342 that allows the user to share the captured image with one or more friends (e.g., through email, message, AirDrop, photo sharing sites, and social media platforms).

In some embodiments and as illustrated in FIG. 33D, the application 44 further displays a second icon 3316 (e.g., a trash can icon). In response to the user selection of the second icon 3316, the first virtual furnishing unit 74-8 is caused to be removed (e.g., deleted) from the scene. In some embodiments and as illustrated in FIG. 33G, the application 44 also includes a reset option 3326 to abort the operations associated with the first virtual furnishing unit 74-8 thus far. The user gets to select either the same or a different furnishing unit for placement in the scene 3300.

In some embodiments and referring to FIG. 33N, after the image of the scene 3300 including the three-dimensional graphic of the first virtual furnishing unit 74-8 is captured, the application 44 displays a third instruction 3330 to activate one or more filters. In some embodiments, the one or more filters are included in the configuration of the camera (e.g., the one or more filters are built-in features of the camera). In other embodiments, the one or more filters are included within (e.g., are features of) the application 44 (e.g., the filters are part of the application 44). In some embodiments, the one or more filters include: a Hefe filter, a Clarendon filter, or a Moon filter. The Hefe filter adds high contrast and saturation to the image, and creates a warm feeling in the modified captured image when it is applied. The Clarendon filter adds light to lighter areas of the image and makes dark areas of the image darker, thus causing colors to stand out. The Moon filter reduces the glare of the image.

In some embodiments, a predefined user action responsive to the third instruction 3330 to activate one or more filters is detected. Referring to FIGS. 33N and 33O, the predefined user action may comprise a swipe gesture (e.g., the movement of a finger on the display from the left to right or from the right to left). In response to the detection of the predefined user action, the application 44 activates the one or more filters. The application 44 further displays the type (e.g., name) of filter 3332 that has been activated, and an image of the scene 3300 whose effect has been modified according to the activated filter 3332. In some embodiments, modifying the captured image includes modifying one or more of: a brightness, a color, a contrast, a color balance, a hue, and a saturation of the captured image.

Accordingly, the various embodiments disclosed above enable a user to know the look of the furnishing units and how they fit in the user's environment. Furthermore, once the virtual furnishing units are placed on the scene 3300, the user can freely walk around the scene 3300 and view the placed virtual furnishing units from different angles, through the camera 473 on the client device 102.

In some embodiments, a virtual furnishing unit 74 is further associated with an animation sequence that is generated under a given set of conditions (e.g., a swipe action, a zoom action, a swipe action, a twist or torqueing action, and a flick action). The animation sequence comprises a plurality of two-dimensional images that are generated based on an orientation of the virtual furnishing unit 74 at the time the given set of conditions occur. This results in a series of two-dimensional images of the furnishing unit in which portions of the images (e.g., portions of the depicted furnishing unit) appear to move over time. The animation sequences may be generated from the virtual furnishing unit in a digital file formats (e.g., .mp4, .mov, .png, .jpeg, .fli, .flc, .fla, .gif, .mov, .swf, or similar file formats).

In some embodiments, a virtual furnishing unit 74 is represented a three-dimensional vector representation (e.g., AutoCAD, ArchiCAD, 3DStudioMax, Rhino) of the object (furnishing unit). The user is able to interact with the object (e.g., furnishing units placed in the scene 3300). As the user moves around the scene 3300 (e.g., pans around the scene, rotates about the scene, and/or magnifies a portion of the scene), the object's view changes. For example, when a user transitions to viewing a top of the object from an initial perspective, the view of the top of the object varies compared to the initial perspective. Moreover, in some embodiments once a zoom criterion or other form of trigger criterion is satisfied a two-dimensional motion effect is imposed such as pitch, roll, yaw, swing, etc of all or a portion of the furnishing unit by varying some of the coordinates in the three-dimensional vector representation. For instance, when a user pans from a first side of a scene to a second side of the scene, leaves of a plant type furnishing unit included in the scene may sway in accordance with the panning of the scene.

In some embodiments, one or more furnishing units are associated with a threshold magnification condition. When the user magnifies the scene at a magnification greater than or equal to a predetermined magnification threshold, one or more additional details associated with the one or more furnishing units in the magnified scene are displayed. In some embodiments, the user magnifies the furnishing units included in the scene instead of the entire scene. In some embodiments, the user magnifies a portion of the scene. For instance, when a scene includes an aquarium type furnishing unit and a user magnifies the scene past a predetermined magnification threshold of the aquarium type furnishing unit, additional details of the aquarium (e.g., inhabitants of the aquarium) are displayed and/or animated. Thus, depending on the view and the zoom (e.g., distance and angle), parts of object will be selected and animated for the corresponding two-dimensional view. By bridging the gap between the perception of a furnishing unit and the actual product, the user's experience is improved.

Premises-Related Challenges

In accordance with some implementations of the present disclosure, competitive scene completion also includes premises-related challenges that are associated with premises of users. Briefly, the process starts with a user acquiring one or more premises 51 (e.g., a house, a building, or (a part of a) famous landmark buildings such as the West Wing of the White House) in the application 44 using an amount in units of the first application counter 60 (e.g., keys), the second application counter 64 (e.g., virtual cash), and/or the third application counter 66 (e.g., diamonds). The premises 51 includes a plurality of rooms. Then, the user is enabled to participate in a plurality of premises-related challenges. For instance, the initially acquired premises 51 starts unfurnished. The first premises-related challenge comprises decorating a first room (e.g., with a plurality of virtual furnishing units 74, such as using the method described in FIG. 5). After the user completes the first premises-related challenge, the application 44 causes additional rooms in the premises 51 to become unlocked for decorating.

Figure 34A:
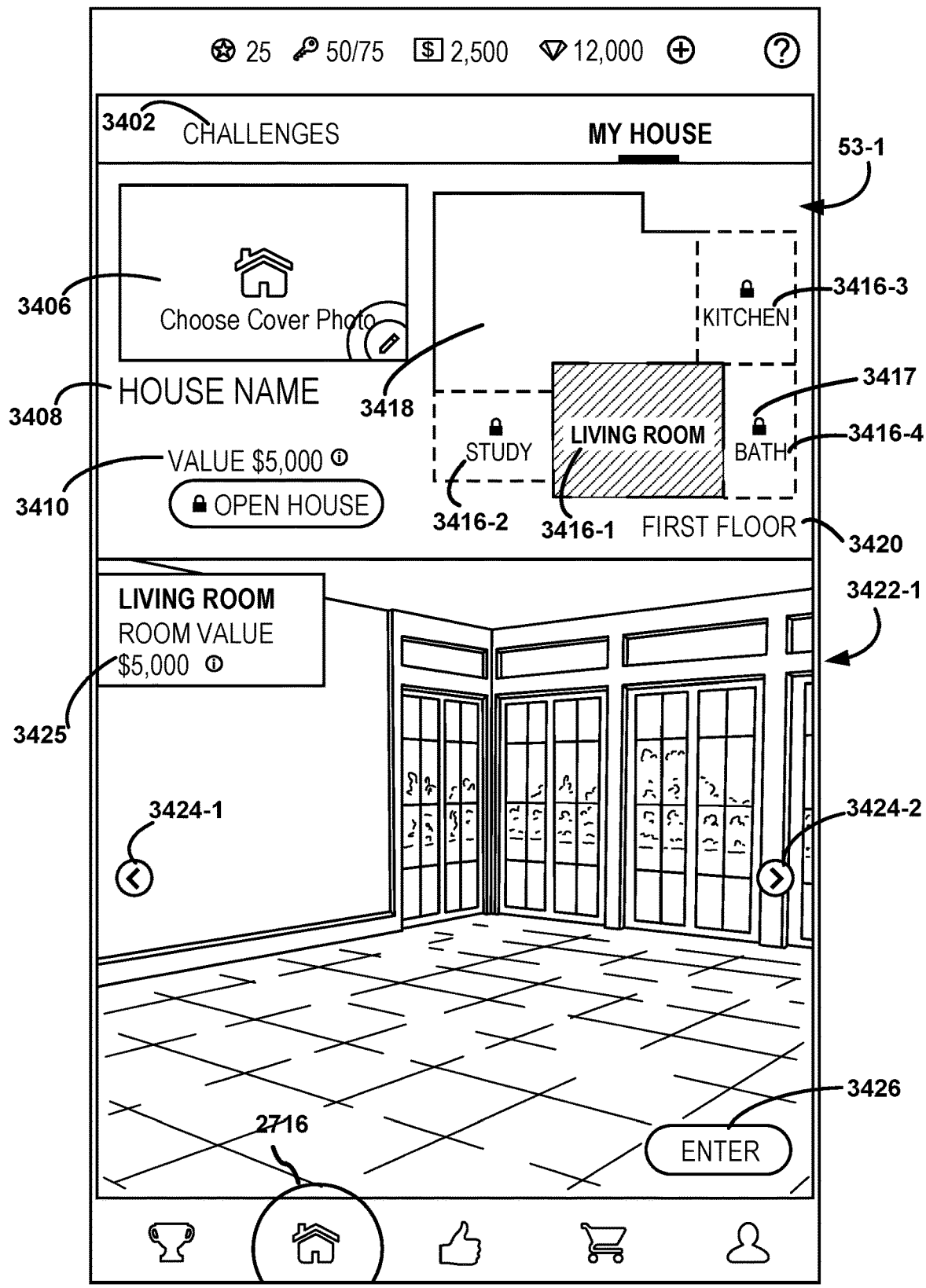
FIGS. 34A and 34B are screen images illustrating affordances for premises-related challenges, in accordance with some implementations of the present disclosure.

In some embodiments, premises-related challenges are available in the application 44 through the challenges affordance 2716 in FIG. 27. Referring to FIG. 34A, the challenges affordance 2716 includes sub-menus (or tabs) 3402 ("Challenges") and 3404 ("My House"). When the user selects the "My House" tab 3404, a screen image such as the one illustrated in FIG. 34A is displayed, inviting the user to participate in one or more challenges associated with the premises. On the other hand, when the user selects the "Challenge" tab 3402, the screen image as illustrated in FIG. 16 is presented to the user to invite the user to participate in a respective challenge in a plurality of challenges, in accordance with some embodiments and as discussed previously.

Figure 35:
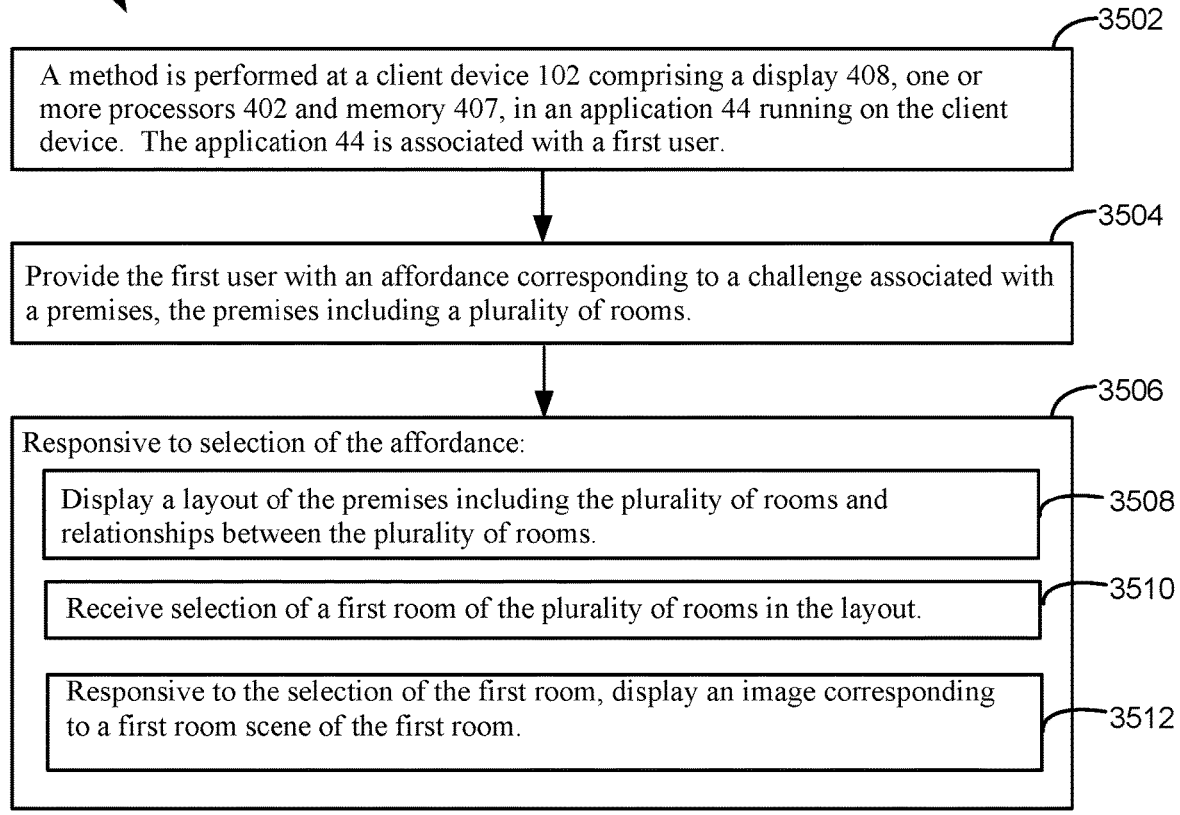
FIG. 35 is a flow chart illustrating a method for competitive scene completion associated with a premises in an application, in accordance with some implementations of the present disclosure.

FIG. 35 is a flow chart illustrating a method 3500 for competitive scene completion associated with a premises 51 in an application 44, in accordance with some implementations of the present disclosure.

As noted in block 3502 of FIG. 35, the method 3500 is performed at a client device 102 comprising a display 408, one or more processors 402 and memory 407, in an application 44 running on the client device associated with a first user.

Referring to block 3504 of FIG. 35 and with reference to FIG. 34A, the first user is provided with an affordance 3404 corresponding to a challenge associated with a premises. The premises includes a plurality of rooms.

In some embodiments, the premises 51 is a house, an office, a hotel or a landmark building (e.g., a famous building, or a building with historical significance, such as the West Wing of the White House, Hearst Castle, or Buckingham Palace).

In some embodiments, the plurality of rooms is a predetermined number and each of the plurality of rooms is associated with a type. For instance, the premises 51 is a house that comprises four rooms, namely: a bedroom, a living room, a kitchen, and a bathroom, of which is a type of room.

Responsive to selection (3506) of the affordance and in accordance with FIG. 34A, a layout 53-1 of the premises 51 including the plurality of rooms and relationships between the plurality of rooms is displayed (3508). The layout 53-1 is also referred to as a blueprint (or floor plan/plan view) that the user uses to navigate the premises and access the various rooms. As depicted in FIG. 34A, the layout 53-1 shows a relative location (position) of each room in the premises 51, relationships between the plurality of rooms 3416, and includes walls separating the rooms 3416. The dimensions of each of the plurality of rooms 3416 are drawn to scale. In some embodiments, the layout 53-1 is also referred to as a first mode of display.

In some embodiments and as shown in FIG. 34A, a user-modifiable label 3408 ("House Name"), an option to upload an image of the premises 3406, and a value 3410 (e.g., a first premises value or an initial value) of the premises ("$5,000") are displayed concurrently with the layout 53-1 of the premises.

Figure 34B:
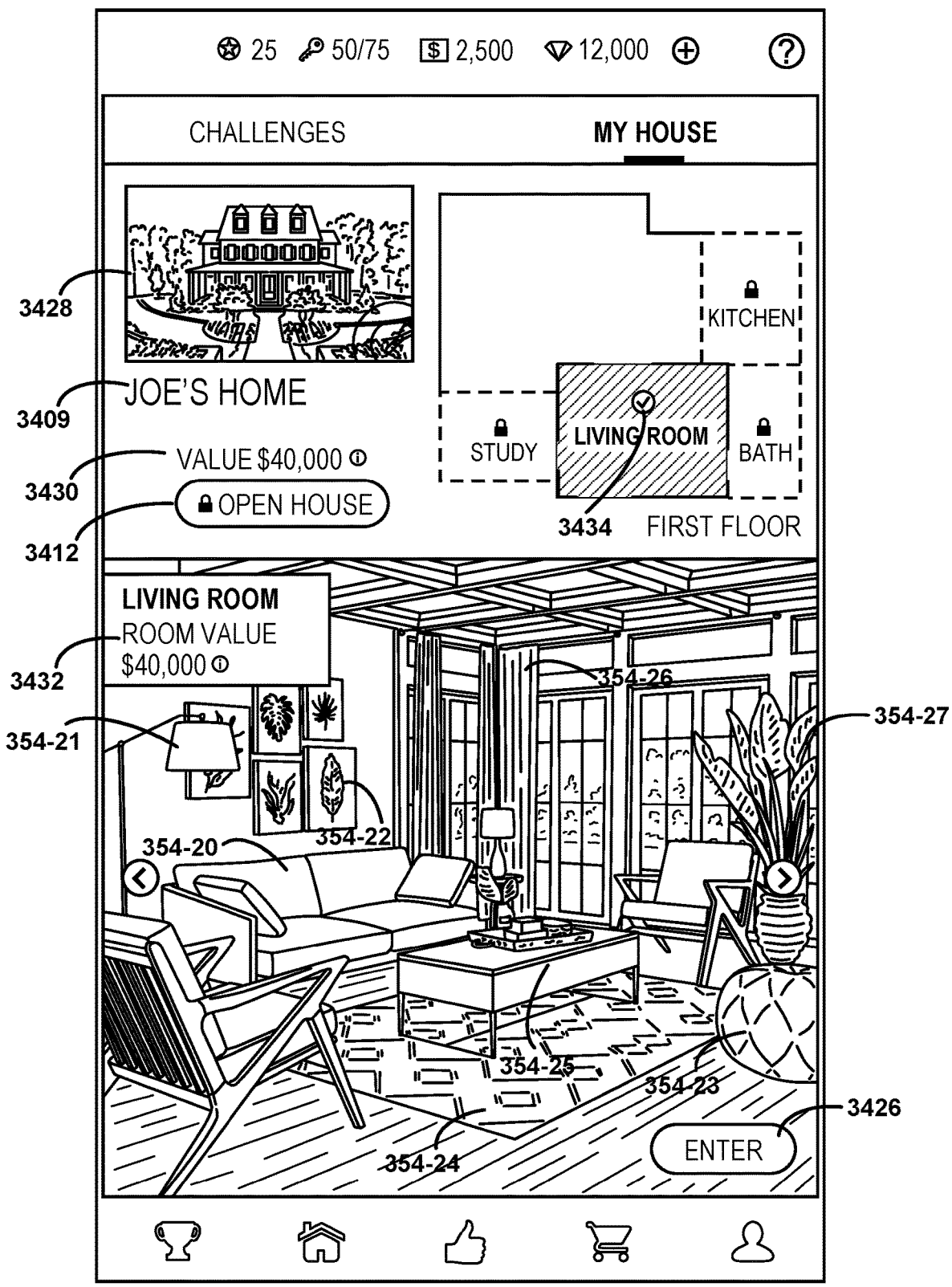

In some embodiments and referring to the transition from FIG. 34A to FIG. 34B, a user modification of the label is received and a user selection of an image representation of the premises is also received. Responsive to the receipt of these inputs, the application 44 updates the label and image, and displays concurrently with the layout of the premises the user-modified label 3409 and the image 3428 representing the premises.

In some embodiments and referring to FIG. 34A, the premises comprises a plurality of levels (e.g., the premises is multi-story). Displaying the layout of the premises comprises displaying the layout of a first level 3420 ("First Floor") of the plurality of levels of the premises. In some embodiments (not shown), options for accessing other levels of the plurality of levels of the premises are also presented to the user. Selection of the options causes a respective layout of (one of) the other levels of the premises to be displayed. In some instances, the premises is a single story building and in this case, information about the level/floor/story of the single story premises is optional.

Referring to block 3510 of FIG. 35, a selection of a first room of the plurality of rooms in the layout is received.

Referring to block 3512 of FIG. 35 and as illustrated in FIG. 34A, responsive to the selection of the first room, an image 3422-1 corresponding to a first room scene of the first room (e.g., living room) is displayed. The first room scene shows a three-dimensional perspective (e.g., presentation or image) of the first room and includes affordances 3424 that allow a user to navigate and see the full image of the room from different angles. In some embodiments, the room scene is also known as a second mode of display. In some embodiments, responsive to selection of the first room of the plurality of rooms in the layout, the first room is caused to be displayed differently from other rooms of the plurality of rooms in the layout 53-1. For example, the selected room is indicated with a different color (e.g., blue) compared to the rest of the rooms (e.g., gray).

In some embodiments, the display 408 is a touch-sensitive display. Receiving selection of the first room of the plurality of rooms in the layout comprises detecting a first predefined action with respect to the touch-sensitive display. For example, the first predefined action comprises a touch gesture or a tap gesture on the region of the layout corresponding to the first room. In some embodiments and as shown in FIG. 34A, the layout 53-1 includes labels ("Living Room," "Kitchen" etc.) that identify each of the rooms of the premises, and each of the labels is a user-selectable affordance. In this instance, the first predefined action corresponds to a tap action of the label on the layout.

In some embodiments, the plurality of rooms 3416 in the layout 53-1 includes a first subset of rooms that is responsive to user selection and a second subset of rooms that is not responsive to user selection. The first subset of rooms has a first visual representation (e.g., a first color or a first type of icon). The second subset of rooms has a second visual representation (e.g., a second color or a second type of icon) that is distinct from the first visual representation. Referring to FIG. 34A, the living room 3416-1 is the only one of the plurality of rooms that is responsive to user selection, and has a different visual representation from the other rooms (e.g., the study, the kitchen and the bathroom) that are not selectable. For instance, on the layout 53-1, the walls defining the living room are represented as solid lines whereas the other rooms have walls that are represented as dotted lines. Also, as noted in FIG. 34A, the living room 3416-1 is the only room does not have a lock icon 3417. The lock icon 3417 indicates that the room is non-selectable (e.g., not responsive to user selection).

In some embodiments, the premises 51 starts with a single room that is selectable Thus, the user starts with a challenge associated with the single room and as they progress, additional rooms (premises-related challenges) become unlocked and selectable. As illustrated in FIG. 34A, the first room 3416-1 is the only one of the plurality of rooms 3416 in the layout 53-1 that is responsive to user selection. In some embodiments, when a first completion criterion associated with the first room scene has been satisfied, a second room of the plurality of rooms in the layout is (caused to be) unlocked. The unlocking causes the second room to be responsive to user selection.

In some embodiments, at least two rooms of the plurality of rooms in the layout is responsive to user selection, thereby providing the user with a starting option to decorate either one of the at least two rooms. In other embodiments, each room of the plurality of rooms in the layout is responsive to user selection (e.g., each room of the plurality of rooms in the layout is a user-selectable affordance). Thus, the user has a choice in terms of which room/challenge they would like to start with as a first premises-related challenge.

In some embodiments, the first room scene comprises a first plurality of markers. Each marker in the first plurality of markers has a different designated set of coordinates within the first room and corresponds to a type within a plurality of types. The method 3500 further comprises: for each sequential user selection of a respective marker in the first plurality of markers, performing a first procedure. The first procedure comprises displaying a first plurality of virtual furnishing units corresponding to the respective marker. A user selection of a selected virtual furnishing unit in the first plurality of virtual furnishing units is received. A three-dimensional graphic of the selected virtual furnishing unit at the different designated set of coordinates within the first room scene is displayed. The first room scene is thereby populated with a first plurality of three-dimensional graphics, each respective three-dimensional graphic in the first plurality of three-dimensional graphics at the corresponding designated set of coordinates within the scene specified by the different designated set of coordinates within the scene of the corresponding marker. This procedure is similar to that of block 544 of FIG. 5 and illustrated in the transition from FIG. 6 to FIG. 7.

In some embodiments, displaying the first plurality of virtual furnishing units corresponding to the respective marker comprises displaying one or more first virtual furnishing units retained by the first user that match the type of the respective marker. The displaying the first plurality of virtual furnishing units corresponding to the respective marker also comprises displaying one or more second virtual furnishing units not retained by the first user that match the type of the respective marker, wherein the displaying further comprises removing from display any virtual furnishing units that do not qualify for populating the respective marker.

In some embodiments, a user is enabled submit the first room scene with the first plurality of three-dimensional graphics when a first room completion criterion associated with the first room scene has been satisfied, for example using the Enter affordance 3426 in FIG. 34B. The first room completion criterion specifies (i) which corresponding designated sets of coordinates within the first room scene must be populated and (ii) a first amount, in units of a first application counter (e.g., keys), required to submit the first room scene. Responsive to submitting the first room scene with the first plurality of three-dimensional graphics, the user selection of virtual furnishing units for the first room scene is communicated to a remote server. The user is provided a second amount in units of a second application counter. A first community vote on the submitted first room scene with the first plurality of three-dimensional graphics is received from the remote server. The first user is notified of the first community vote on the submitted first room scene with the first plurality of three-dimensional graphics. The first user is limited to using a first virtual furnishing unit retained by the first user in a predetermined number of challenges before the first virtual furnishing unit is no longer retained by the first user.

In some embodiments the first room has an initial first value 3425 in FIG. 34A ("$5,000). The first user is enabled to submit the first room scene with the first plurality of three-dimensional graphics when a first room completion criterion associated with the first room scene has been satisfied. The first room completion criterion specifies (i) which corresponding designated sets of coordinates within the first room scene must be populated and (ii) a first amount, in units of a first application counter 60 (e.g., keys), required to submit the first room scene. Responsive to submitting the first room scene with the first plurality of three-dimensional graphics, the first user is provided with a second value 3432 (FIG. 34B) of the first room ("$40,000"). The second value is higher than the initial first value. The second value is determined, in part, by a value of each virtual furnishing unit in the first room scene submitted by the first user.

In some embodiments, completion of the first room scene causes the layout 53-1 to display an indication that the first room scene has been completed. For example, referring to FIG. 34B, the living room 3416-1 is updated with an indication 3434 (e.g., a checkmark icon) to indicate completion of the challenge associated with the living room.

In some embodiments, responsive to a determination that a first room completion criterion associated with the first room scene has been satisfied, the application 44 displays again the layout 53-1 including the plurality of rooms.

In some embodiments, a selection of a second room of the plurality of rooms in the layout is received. Responsive to the selection of the second room of the plurality of rooms in the layout, an image corresponding to a second room scene of the second room is displayed (not shown).

In some embodiments, the second room scene comprises a second plurality of markers. Each marker in the second plurality of markers has a different designated set of coordinates within the second room and corresponds to a type within the plurality of types. The method further comprises: for each sequential user selection of a respective marker in the second plurality of markers, repeating the first procedure to populate the second room scene with a second plurality of three-dimensional graphics, each respective three-dimensional graphic in the second plurality of three-dimensional graphics at the corresponding designated set of coordinates within the scene specified by the different designated set of coordinates within the scene of the corresponding marker.

As indicated earlier, the layout 53 enables the user to navigate the premises 51 and access the various rooms. For example, in some embodiments, while the image of the first room scene is displayed, a user selection of a different room of the plurality of rooms in the layout 53 is received. In response to the user selection of the different room, an image of a different room scene of the different room is displayed.

In some embodiments, the challenge associated with the premises comprises a plurality of room challenges. Each room challenge of the plurality of room challenges corresponds to a room of the plurality of rooms. Each of the plurality of room challenges includes a respective room completion criterion. The respective room completion criterion may be distinct for each of the plurality of room challenges. The respective room completion criterion may include a number of virtual furnishing units and/or a type of virtual furnishing unit.

In some embodiments and as described earlier, each of the plurality of rooms corresponds to a room type within a plurality of room types. In the case of a house, each of bedroom, kitchen, bathroom, dining room, living room, study, garage, and dining room etc. corresponds to a room type. Each room type of the plurality of room types includes one virtual furnishing unit that is specific to the room type. For instance, the bedroom includes a bed as one of its virtual furnishing unit whereas this unit does not show up when one is decorating a living room.

In some embodiments, the method 3500 further comprises a determination that a premises completion criterion associated with the premises 51 has been satisfied. The premises completion criterion specifies (i) a predetermined number of rooms in the premises to be completed; (ii) Each of the rooms of the predetermined number of rooms is considered to be completed when its respective room completion criterion is satisfied; (iii) The respective room completion criterion includes which corresponding designated sets of coordinates within the corresponding room scene must be populated; (iv) Each of the rooms of the predetermined number of rooms includes a respective room scene and is populated with a respective plurality of three-dimensional graphics. Each three-dimensional graphic in the respective plurality of three-dimensional graphics is at the corresponding designated set of coordinates within the corresponding room scene; and (v) a first amount, in units of the first application counter, required to submit the premises for voting. In some embodiments, the premises completion criterion also includes a number of room types in the premises that must be completed. In accordance with a determination that the premises completion criterion has been satisfied, the first user is enabled to submit the premises to a remote server (e.g., application server 106) for voting by a first community. Responsive to submitting the premises for voting, (i) the user selection of virtual furnishing units for each of the rooms of the predetermined number of rooms is communicated to a remote server (e.g., application server 106). (ii) The first user is provided a second amount in units of a second application counter. A first community vote on the submitted premises is received from the remote server (e.g., application server 106). The first user is notified of the first community vote on the submitted premises.

In some embodiments, the premises has a first premises value 3410 in FIG. 34A. Responsive to submitting the premises for voting, a second premises value 3430 in FIG. 34B of the premises is determined, wherein the second premises value is larger than the first premises value. The first user is notified of the second premises value. The second premises value is displayed (e.g., on the display).

In some embodiments, the second premises value 3430 is determined, in part, by a value of each virtual furnishing unit for each of the rooms of the predetermined number of rooms submitted by the first user.

Even though the example of FIGS. 34A and 34B shows that the initial premises value 3410 has the same virtual dollar value as the first value 3425 of the first room and the second premises value 3430 has the same virtual dollar value as the second value 3432 of the first room, in some embodiments the initial premises value 3410 can be different (e.g., higher) from the first value 3425 of the first room, and second premises value 3430 can be different (e.g., higher) from the second value 3432 of the first room.

In accordance with some implementations, the application 44 further provides the user with options to expand the premises. In some embodiments, in accordance to a determination that the (second) premises value of the premises exceeds a predetermined value, the application 44 displays one or more premises expansion options. The one or more premises expansion options include adding a level (story) to the premises, adding a room to the plurality of rooms in the premises, adding a backyard (or front porch, or a garage) to the premises, and expanding an area of the premises. Referring to FIG. 34A, the layout 53-1 includes an unassigned (or unidentified) area 3418. In some instances, when the user has collected (e.g., purchased) enough furnishing units or when their premises is at a high enough value, the user has the option to designate a room type to the unidentified area 3418, and complete one or more challenges associated with the area 3418 after designation. In other embodiments, the user is offered another option to purchase a second premises.

In some embodiments, a selection of a first premises expansion option of the one or more premises expansion options is received by the application 44. In response to the selected first premises expansion option, an updated layout of the premises is displayed. In some embodiments, the display of the updated layout comprises: (i) replacing the layout of the premises with the updated layout; and (ii) displaying the updated layout. The updated layout includes the plurality of rooms and the selected first premises expansion option.

In some embodiments, after the user has decorated the premises or a subset of rooms in the plurality of rooms in the premises, the user can invite other users to visit their premises. For example, responsive to submitting the premises for voting, the first user is provided with an "Open House" affordance 3412 to invite friends to view the premises. Responsive to selection of the affordance 3412, the user is provided with an affordance to select one or more friends. Responsive to selection of one or more friends, the application generates and sends an invitation to each of the one or more friends to view the premises.

In some embodiments, responsive to the sent invitations, the first user receives one or more gifts (e.g., housewarming gifts) from the one of the one or more friends. Each of the one or more gifts comprises one or more of: a first predetermined amount of the first application counter, a second predetermined amount of the second application counter, a third predetermined amount of a third application counter, and a virtual furnishing unit.

In accordance with some implementations, besides decorating the rooms in the premises with virtual furnishing units, a user can also add details (e.g., micro-decorate) to furnished rooms by adding items (e.g., smaller item) in the rooms and/or on virtual furnishing units that have populated the rooms. These smaller items are also known as virtual accessory units 75, and are included in the virtual furnishing unit database 328 (FIG. 3). For example, a user can select and place dining ware on the dining table, identify and place kitchen appliances on the kitchen countertop, hang picture frames in the hallways and kitchen, and add décor items in the bathroom etc., just like one would when decorating a premises in real life. In some embodiments, the virtual accessory units 75 are included as part of the virtual furnishing units 74 in the virtual furnishing unit database 328, and are distinguished from virtual furnishing units 74 based on type 352. For instance, virtual accessory units 75 are associated with one type 352 (e.g., small furniture) whereas virtual furnishing units 74 are associated with a different type 352 (e.g., large furniture).

Figure 36A:
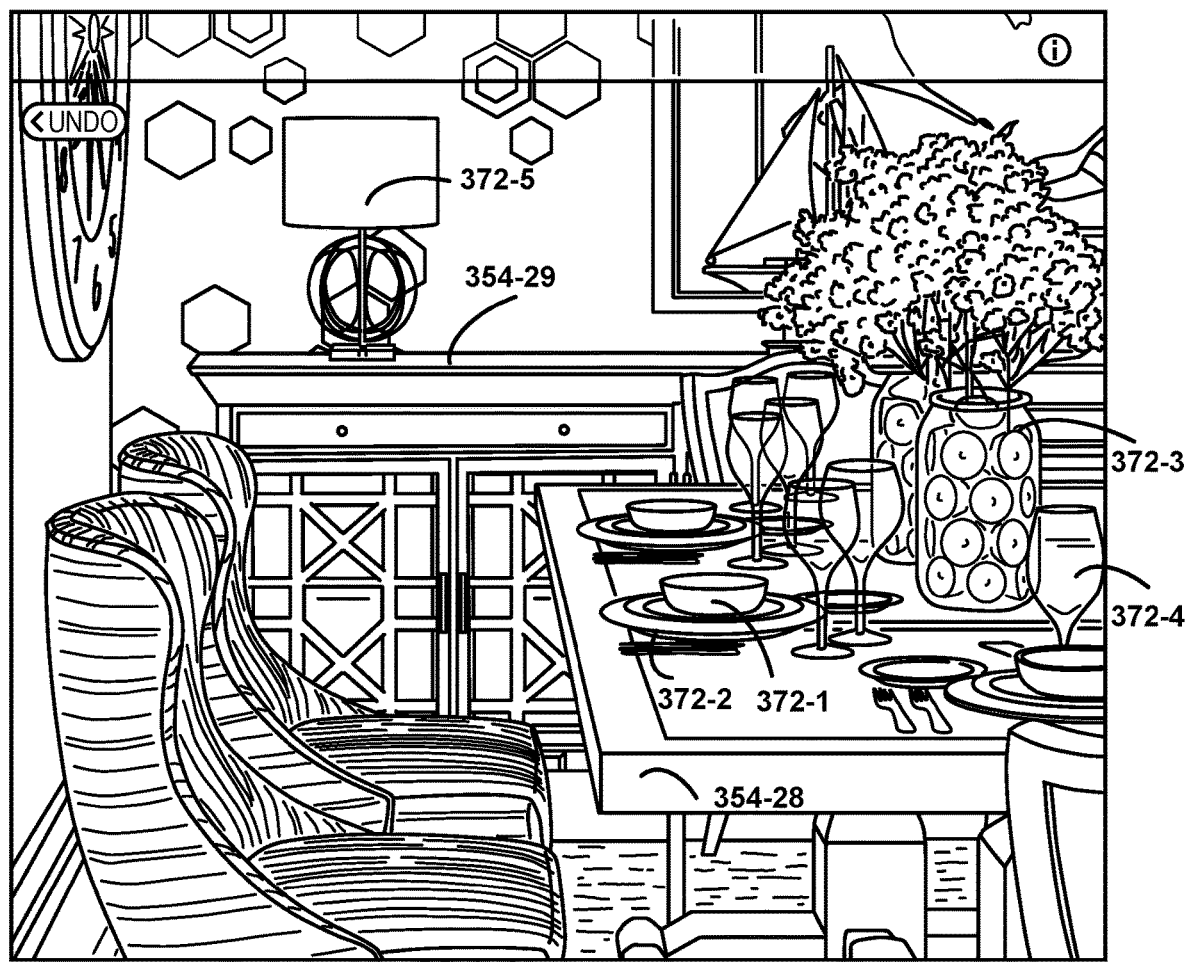
FIGS. 36A and 36B are screen images displaying details of a room in a premises, in accordance with some implementations of the present disclosure.
Figure 36B:
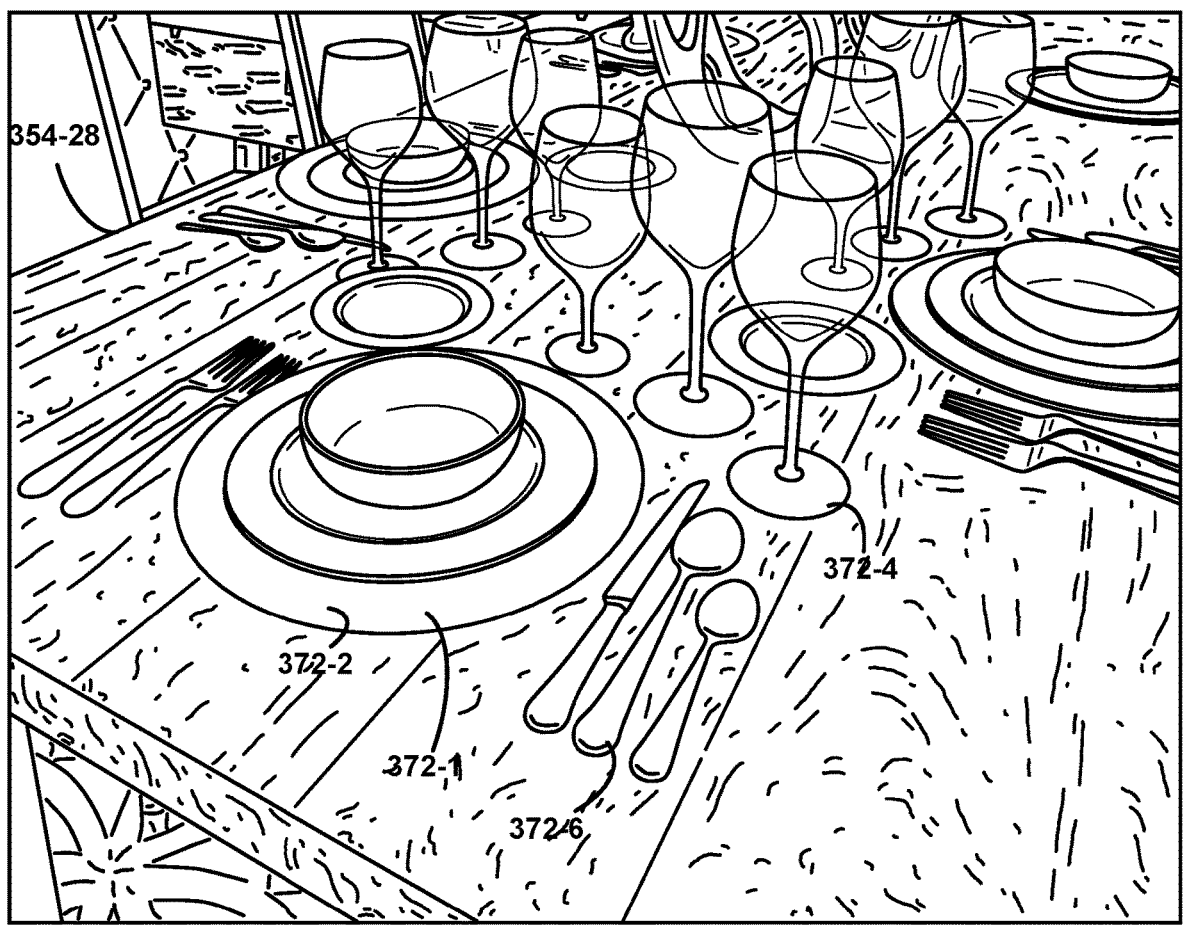
Figure 37:
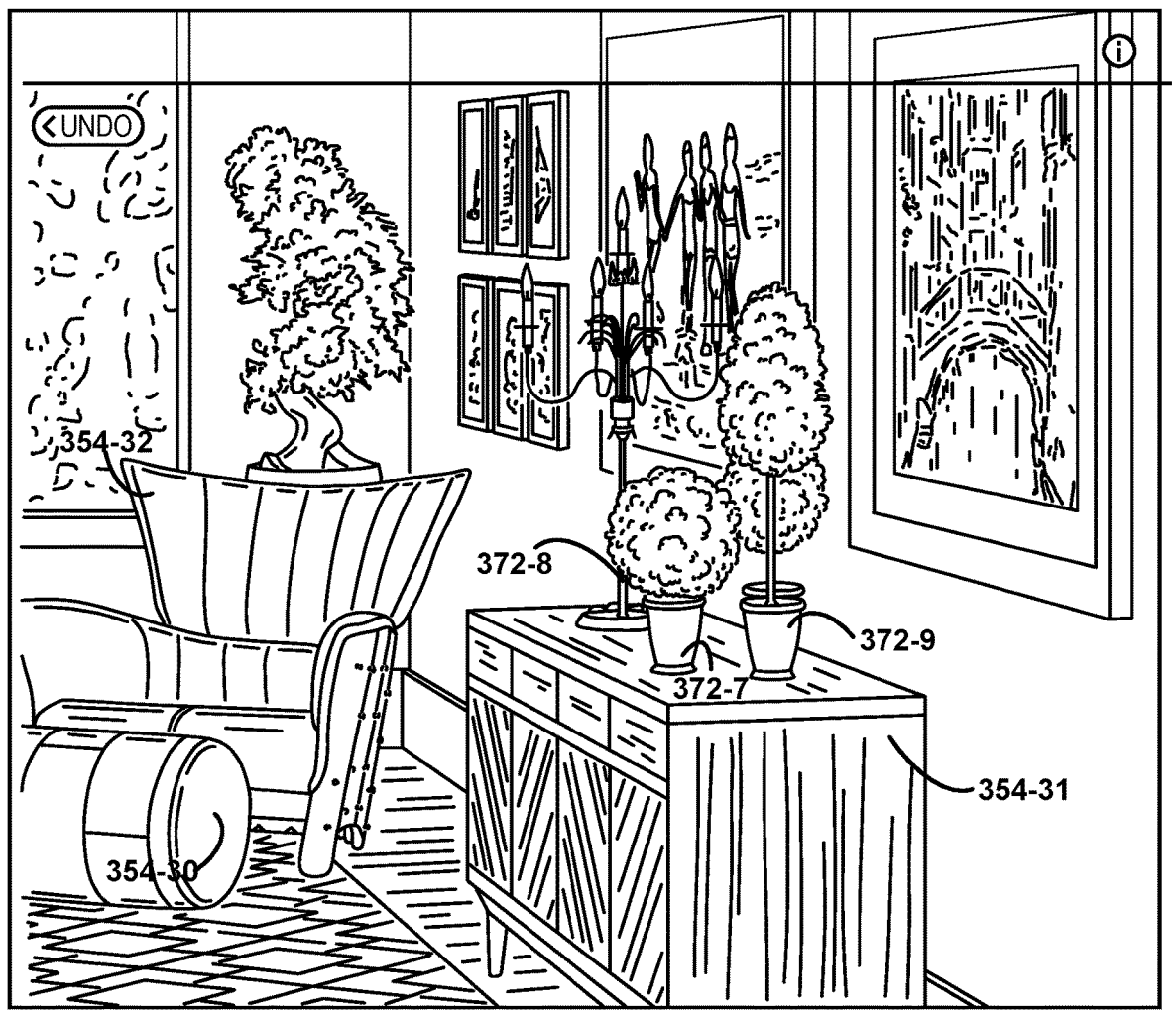
FIG. 37 is another screen image displaying details of a room in a premises, in accordance with some implementations of the present disclosure.

FIGS. 36A, 36B, and 37 are examples of rooms that have been populated with three-dimensional graphics 354 of virtual furnishing units 74 and with three-dimensional graphics 372 of virtual accessory units.

To this end, in some embodiments, the method of adding a virtual accessory unit 75 is as follows. After populating the first room scene with the first plurality of three-dimensional graphics 354 corresponding to virtual furnishing units 74 for the first room scene, a selection of a first one of the virtual furnishing units (e.g., a selection of the three-dimensional graphic 354 corresponding to the first one of the virtual furnishing units in the first room scene) is received. Responsive to the selection of (the three-dimensional graphic corresponding to) the first one of the virtual furnishing units, a first plurality of virtual accessory units 75 is displayed.

In some embodiments, a selection of a first virtual accessory unit 75 of the plurality of accessory units is received. Responsive to the selection of the first virtual accessory unit 75, a three-dimensional graphic of the first virtual accessory unit 75 is overlaid on (superimposed on) the first one of the furnishing units 74 (e.g., on a surface of the first one of the furnishing units).

In some embodiments, the first virtual accessory unit 75 is: a tablecloth, a photo frame, silverware, dining ware, a glass, a placemat, a plant, a painting, a vase, a book, a sculpture, a paper weight, a picture frame, or a lamp. For example, referring to FIG. 36A, overlaid (displayed) on the top of the dining table 354-28 are accessory units 372-1, 372-2, 372-3, and 372-4 corresponding to respectively, a bowl, plates, a vase, and a glass. Referring to FIG. 37, plants and a small lamp stand (372-7, 372-8, and 372-9) are displayed on the sideboard 354-31.

In some embodiments, the application 44 provides affordances that allow a user to specify a location (or portion) of the virtual furnishing unit on or at which the virtual accessory unit 75 is to be placed. For example, after receiving selection of the first one of the virtual furnishing units 74 (on the touch-sensitive display), the application 44 detects a second predefined action on a first portion (e.g., a surface) of the first one of the furnishing units with respect to the display. For instance, the second predefined action is a zoom action comprising a touch action on the first furnishing unit with two fingers of the user and a dragging action of the two fingers away from each other. In another embodiment, the application 44 also includes one or more icons and navigational panel to zoom in (magnify) a selected portion of the first one of the furnishing units. Responsive to the second predefined action, a close-up (e.g., magnified) view of the first one of the furnishing units with respect to the first portion is displayed. Overlaying the three-dimensional graphic of the first virtual accessory unit 75 the first one of the furnishing units 74 comprises overlaying the three-dimensional graphic 372 of the first virtual accessory unit 75 on the first portion of the three-dimensional graphic 354 of the first one of the virtual furnishing units 74.

In some embodiments, after overlaying the three-dimensional graphic 372 of the first virtual accessory unit 75 on the first portion of the first one of the virtual furnishing units 74, a position and/or an orientation of the first virtual accessory is changed with respect to the first portion. For example, the application 44 detects a change in a position of the first virtual accessory unit with respect to the first portion by detecting a touch action on the first selected furnishing unit (e.g., using one finger) by the user and a drag action on the first virtual accessory unit. Additionally, or alternatively, the application 44 a change in orientation of the first accessory unit with respect to the first portion by detecting a touch action on the first selected furnishing unit with two fingers of the user and a twist action of the two fingers. Accordingly, the application 44 overlays an image of the first virtual accessory unit 75 with the changed position and/or orientation on the first portion of the first one of the furnishing units 74.

In some embodiments, responsive to overlaying the three-dimensional graphic of the first virtual accessory unit 75 on the first one of the furnishing units 74, the first user is awarded (e.g., rewarded with/provided) a prize.

In some embodiments, the premises has a first premises value. Responsive to overlaying the three-dimensional graphic of the first virtual accessory unit on the first one of the furnishing units, a third premises value of the premises is determined. The third premises value is larger than the first premises value. The first user is notified of the third premises value. In some embodiments, the application 44 further updates the value of the premises to the third premises value, and displays the third premises value.

Referring back to FIG. 34, in some embodiments, the one or more gifts received by the first user from the one or more friends is a virtual accessory unit 75. In some embodiments, responsive to the receipt of the virtual accessory unit 75 as a gift, the first user further invites the one or more users to decorate the premises of the first user (e.g., by placing the virtual accessory unit gift on one or more designated areas in the premises).

Community of Houses

In accordance with some implementations of the present disclosure, responsive to the acquisition of one or more premises 51 by the user, the application 44 also presents affordances that enable the user to invite other users to form a neighborhood community (e.g., a community of houses) and to participate in community-related challenges.

Figure 38:
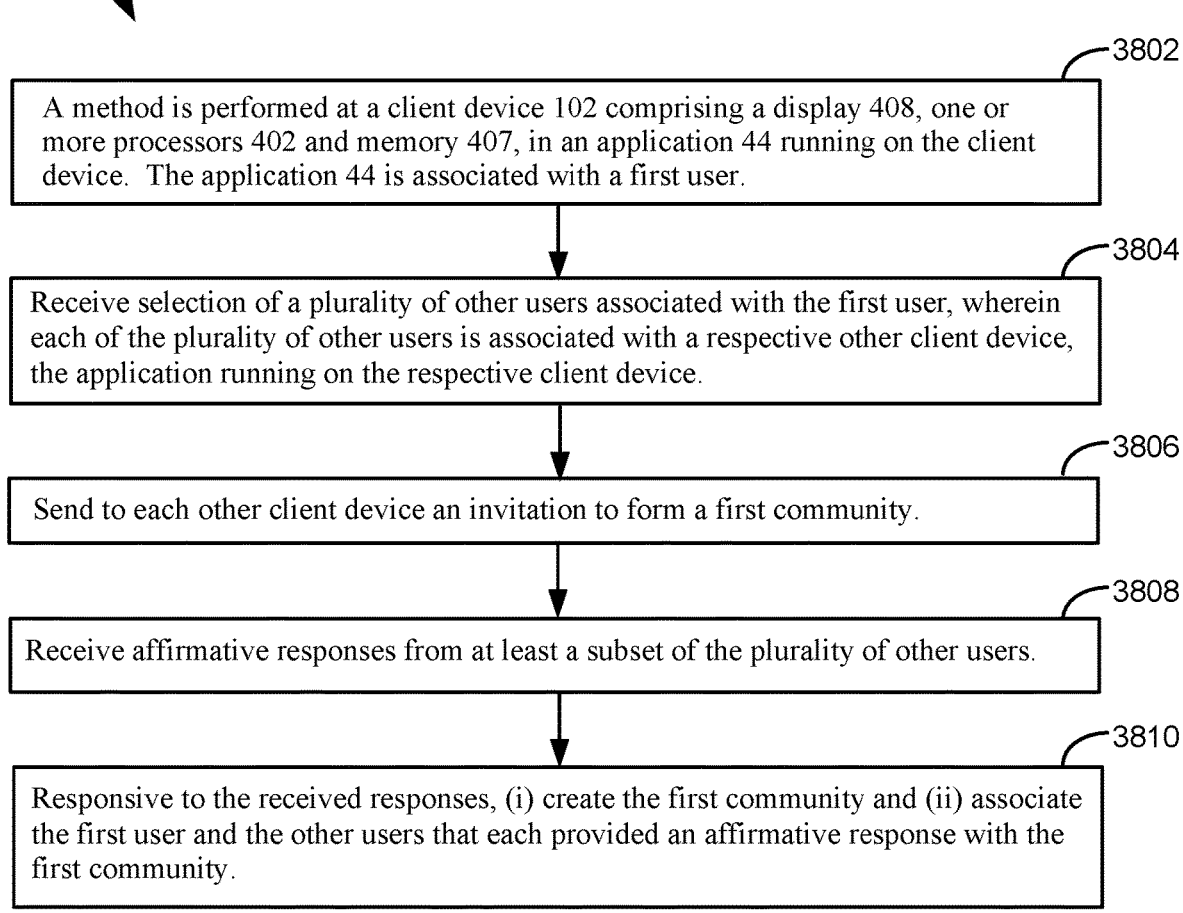
FIG. 38 a flow chart illustrating a method for creating a first community, in accordance with some implementations of the present disclosure.

To this end, FIG. 38 a flow chart illustrating a method 3800 for creating a first community, in accordance with some implementations of the present disclosure. As noted in block 3802 of FIG. 38, the method 3800 is performed at a client device 102 comprising a display 408, one or more processors 402 and memory 407, in an application 44 running on the client device associated with a first user.

Referring to block 3804 of FIG. 38, a selection of a plurality of other users associated with the first user is received. Each of the plurality of other users is associated with a respective other client device, with the application 44 running on the respective client device (e.g., each of the plurality of other users is a respective user of the application).

Referring to block 3808 of FIG. 38, an invitation to (e.g., participate in a challenge to) form a first community is sent to (the application on) each other client device.

Figure 39:
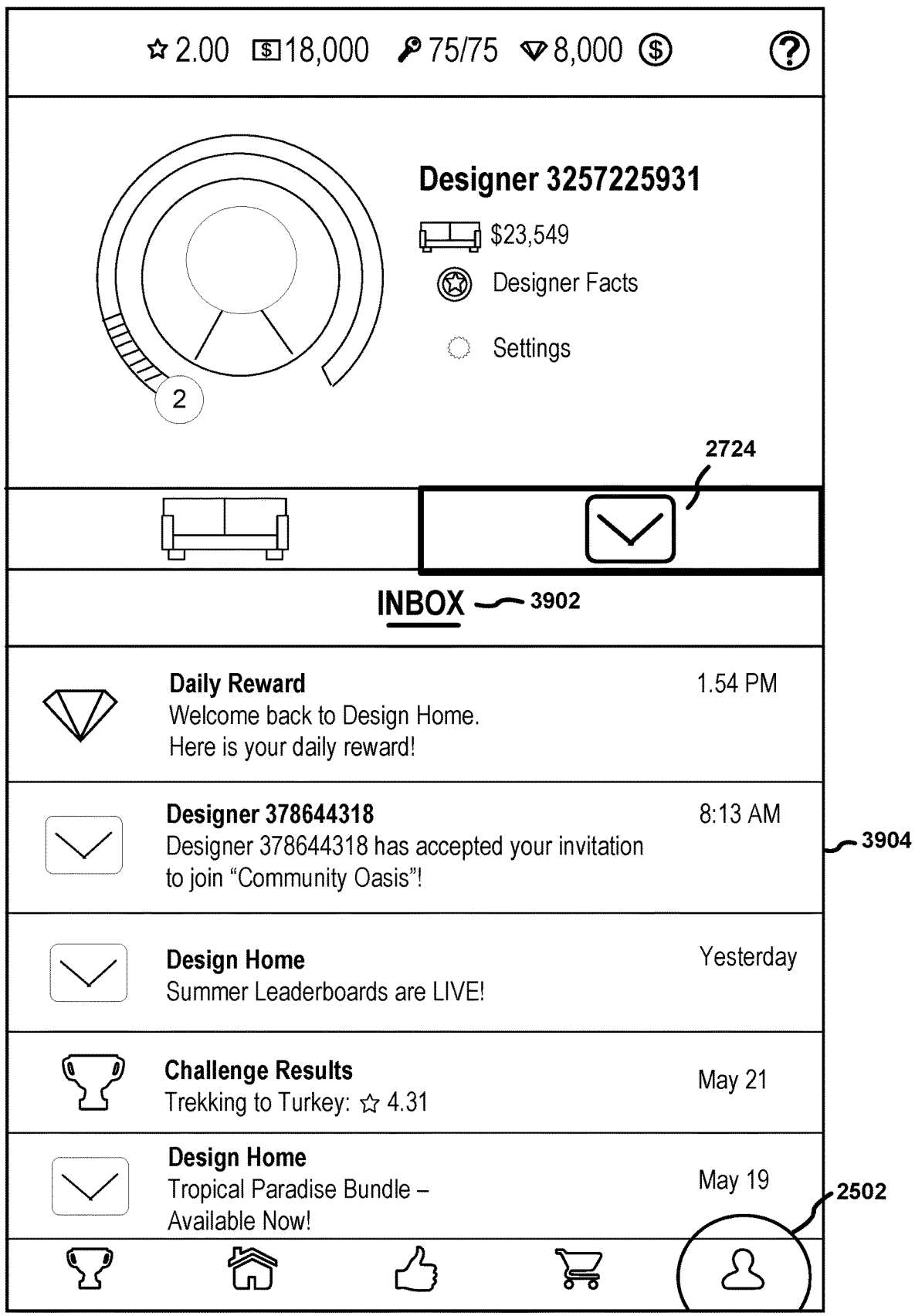
FIG. 39 is a screen image illustrating affordances in an application that enable a user to receive notifications, in accordance with some implementations of the present disclosure.

Referring to block 3808 of FIG. 38, affirmative responses are received from at least a subset of the plurality of other users. For example, as illustrated in FIG. 39, the affirmative responses 3904 are displayed in an inbox 3902 of the application 44, which is accessible through the user affordance 2502 (via mailbox tab 2724).

Referring to block 3810 of FIG. 38, responsive to the received responses, (i) a first community is created and (ii) the first user and the other users that each provided an affirmative response are associated with the first community.

In some embodiments and referring to FIGS. 34A and 34B, the first user is associated with a first house (or a first premises 51), and the other users in the first community are individually associated with a different house in a plurality of other houses (or premises 51). For example, each of the subset of the plurality of other users is associated with a respective other house. The first user is referred to as the owner of the first house, and each of the subset of the plurality of other users is an owner of the respective other house.

In some embodiments, the first community includes the first house (associated with the first user) and the plurality of other houses (associated with the subset of the plurality of other users).

In some embodiments, after the first community is created, a first value of the first community is determined. For example, the value of the first community is the total value of the houses that make up the first community.

In some embodiments, the first community includes a first plurality of virtual furnishing units, and the first value of the first community is determined, in part, by a value of each virtual furnishing unit of the first plurality of furnishing units.

In some embodiments, after the first community is formed, the first user is provided with a first affordance corresponding to a first challenge associated with the first community. For example, the first challenge is associated with a property area of the first community, such as a walkway, a swimming pool, or a garden of the first community. In some implementations, responsive to selection of the first affordance (by the first user), an image of a scene of the first community is displayed in the application 44. The image includes (i) the first house (associated with the first user), (ii) the plurality of other houses, and (iii) an area of the first community distinct from the first house and distinct from the plurality of other houses. A first plurality of markers for the area is also displayed, each marker in the first plurality of markers having a different designated set of coordinates within the area and corresponding to a type within a plurality of types. For each sequential user selection of a respective marker in the first plurality of markers, a first procedure is performed. The first procedure comprises: (i) displaying a second plurality of virtual furnishing units corresponding to the respective marker, wherein the displaying further comprises removing from display any virtual furnishing units that do not qualify for populating the respective marker; (ii) receiving a user selection of a selected virtual furnishing unit in the second plurality of virtual furnishing units, and (iii) displaying a three-dimensional graphic of the selected virtual furnishing unit at the different designated set of coordinates within the area, thereby populating the area with a first plurality of three-dimensional graphics, each respective three-dimensional graphic in the first plurality of three-dimensional graphics at the corresponding designated set of coordinates within the area specified by the different designated set of coordinates within the area of the corresponding marker.

In some embodiments, after the area is populated with the first plurality of three-dimensional graphics, the first user is enabled to submit the area with the first plurality of three-dimensional graphics to the other users of the first community when a first completion criterion associated with the first challenge has been satisfied. The first completion criterion specifies which corresponding designated sets of coordinates within the respective scene must be populated. Responsive to submitting the area with the first plurality of three-dimensional graphics, the user selection of virtual furnishing units for the first challenge is communicated to the other users of the first community. A respective prize is received by (e.g., awarded to) the first user from one or more users of the other users of the first community.

In some embodiments, the respective prize is an amount in units of the first application counter, second application counter, third application counter, or fourth application counter. In other implementations, the respective prize is in the form of a vote from the other users of the first community. In some implementations, the first user and the other users in the first community are each provided (on their respective client devices) with the first affordance corresponding to the same first challenge associated with the first community. Each of the other users who completes the first challenge is enabled to submit the area with their respective plurality of three dimensional graphics to the other users of the first community for voting. In some implementations, the user of the first community with the winning design (e.g., the user who gathered the most number of votes) is awarded a prize. In some instances, the application 44 includes affordances that allow the first community to compete with other communities in inter-community challenges, and the winning design of the first community is the design that is used to represent the first community in the inter-community challenge.

In some embodiments, after the area is populated with the first plurality of three-dimensional graphics, the first user is enabled to submit, for voting by a remote server (e.g., application server 106), the scene including the first house, the plurality of other houses, and the area with the first plurality of three-dimensional graphics when a second completion criterion associated with the first challenge has been satisfied. The second completion criterion specifies (i) which corresponding designated sets of coordinates within the area must be populated and (ii) a first amount, in units of a first application counter, required to submit the scene. Responsive to submitting the scene including the first house, the plurality of other houses, and the area with the first plurality of three-dimensional graphics, the user selection of virtual furnishing units for the first challenge is communicated to the remote server (e.g., application server 106). A first vote on the submitted scene with the first plurality of three-dimensional graphics is received from the remote server (e.g., application server 106). The first community is notified (e.g., through the inbox 3902) of the first vote on the submitted scene including the first house, the plurality of other houses, and the area with the first plurality of three-dimensional graphics.

In some embodiments, responsive to submitting the scene including the first house, the plurality of other houses, and the area with the first plurality of three-dimensional graphics, a second value of the first community is determined. The second value is determined in part by a value of each virtual furnishing unit of the second plurality of furnishing units.

In some embodiments, the second plurality of virtual furnishing units includes (i) one or more first virtual furnishing units retained by the first user that match the type of the respective marker and (ii) one or more second virtual furnishing units not retained by the first user that match the type of the respective marker.

In some embodiments, the application 44 further displays a layout of the community that includes relationships between the first house and the plurality of other houses.

It will be appreciated that the method 3800 and its various embodiments are also applicable to the respective client devices associated with each of the subset of the plurality of other users on which the application 44 is run.

In accordance with some implementations, a computing system (e.g., the client device 102) comprises a display 408, one or more processors 402, and memory 407 coupled to the one or more processors, the memory storing one or more programs configured to be executed by the one or more processors, singularly or collectively comprising instructions for running an application on the computing device that performs/executes any of the above methods and/or operations.

In accordance with some implementations, a non-transitory computer-readable storage medium stores one or more programs in a computing device (e.g., the client device 102), the computing device comprising a display 408, one or more processors 402, and memory 407, the memory storing one or more programs for execution by the one or more processors, the one or more programs singularly or collectively comprising instructions for running an application on the computing device that executes any of the above methods and/or operations.

Throughout this disclosure the terms profile 48 and profile 338 have been used interchangeably. While a profile 48 is found on a computing device 102 associated with a particular user and a profile 338 is found in a user profile database 336 on an application server 106, the present disclosure encompasses all possible variants of such a schema, including embodiments in which profile 48 does not exist or profile 338 does not exist and including embodiments in which some user information is found in profile 48 and some user information is found in profile 338. It is for this reason that the terms profile 48 and profile 338 have been used interchangeably in the present disclosure. Likewise, the terms "player" and "user" have been used interchangeably throughout the present disclosure. Likewise, the terms "image," "scene image," and "scene" are interchangeable in the present disclosure. Furthermore, it will be appreciated that there is a correspondence between types 352 (for virtual furnishing units 74) and types 70 (for markers 50). For instance, if a marker 50 specifies a type 70 that is for chairs, there virtual furnishing units 74 of type 352 that specifies chairs are used to populate the marker 50.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the "first mark" are renamed consistently and all occurrences of the "second mark" are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at a client device comprising a display, one or more processors and memory:
in an application running on the client device associated with a first user:
responsive to selection of a first scene completion challenge, displaying an initial scene of the first scene completion challenge and displaying within the initial scene a first plurality of markers, wherein each respective marker in the first plurality of markers has corresponding predefined designated coordinates that are not modifiable by the first user, wherein each respective marker corresponds to a furnishing unit type within a plurality of furnishing unit types, and wherein each respective marker is not modifiable by the user;
in response to each sequential user selection of a corresponding marker in the first plurality of markers within the initial scene of the first scene completion challenge, performing a procedure that comprises:
displaying a first plurality of virtual furnishing units that match the furnishing unit type of the corresponding marker, wherein each furnishing unit in the first plurality of virtual furnishing units is displayed as a corresponding three-dimensional graphic outside the initial scene, wherein the first plurality of virtual furnishing units comprises renditions of furnishing units and includes (i) one or more first virtual furnishing units purchased by the first user and (ii) one or more second virtual furnishing units not purchased by the first user, and wherein each marker in the plurality of markers does not display a virtual furnishing unit in the first plurality of virtual furnishing units;
receiving a user selection, outside the initial scene, of the corresponding three-dimensional graphic of a selected virtual furnishing unit in the first plurality of virtual furnishing units; and
responsive to the user selection, replacing the corresponding marker within the initial scene with the three-dimensional graphic of the selected virtual furnishing unit at the corresponding predefined designated coordinates;
wherein the performing the first procedure results in a first augmented scene that comprises the initial scene with a plurality of three-dimensional graphics of selected virtual furnishing units, including displaying each respective three-dimensional graphic at the corresponding predefined designated set of coordinates belonging to a corresponding marker in the first plurality of markers within the initial scene, and wherein the first augmented scene contains no marker in the first plurality of markers;
storing a user profile for the first user, wherein the user profile comprises indications of: the first scene completion challenge, the first plurality of markers, and a plurality of selected virtual furnishing units based on the performing the first procedure, each of the selected virtual furnishing units corresponding to a respective marker in the first plurality of markers;
in response to and based on a determination that a predefined completion criterion is satisfied, the predefined completion criterion comprising populating the initial scene with a predetermined number of virtual furnishing units specified by the first scene completion challenge, enabling the first user to submit the first augmented scene or the indications of the plurality of selected furnishing units to a remote server; and
responsive to submitting the first augmented scene or the indications of the plurality of selected furnishing units to the remote server, providing the first user a first reward.

2. The method of claim 1, wherein the displaying further comprises removing from display any virtual furnishing units that do not match the furnishing unit type of the respective marker.

3. The method of claim 1, further comprising:
receiving from the remote server a first community vote on the submitted first augmented scene or the indications of the plurality of selected furnishing units; and
notifying the first user of the first community vote.

4. The method of claim 3, wherein the first community vote on the submitted first augmented scene or the indications of the plurality of selected furnishing units is from a plurality of users that each make a 1:1 comparison of (i) the submitted first augmented scene or the indications of the plurality of selected furnishing units as submitted by the first user and (ii) a second augmented scene or a second plurality of user selections of virtual furnishing units for the first scene completion challenge from a user other than the first user.

5. The method of claim 3, further comprising:
awarding the first user a prize when the first community vote on the submitted first augmented scene or the first plurality of user selections exceeds a threshold value.

6. The method of claim 5, wherein the first community vote on the submitted first augmented scene or the indications of the plurality of selected furnishing units exceeds the threshold value when the first community vote for the submitted first augmented scene or the indications of the plurality of selected furnishing units by the first user is larger than a vote received by any other user that participated in the first scene completion challenge.

7. The method of claim 5, wherein the prize is a virtual furnishing unit.

8. The method of claim 3, further comprising:
associating with the first user a unique star score, wherein the star score is determined in part by the first community vote on the submitted first augmented scene or the first plurality of user selections; and
displaying the star score within the application on the display.

9. The method of claim 1, further comprising:
associating with the first user a unique design value, wherein the design value is determined in part by a value of each virtual furnishing unit in the first augmented scene or the first plurality of user selections submitted by the first user; and displaying the design value within the application on the display.

10. The method of claim 1, wherein:
the first user has a current balance in the application;
each virtual furnishing unit in the one or more second virtual furnishing units not purchased by the first user is associated with a cost;
receiving the user selection of the selected virtual furnishing unit in the first plurality of virtual furnishing units comprises debiting the cost from the current balance; and
responsive to a determination that the cost exceeds the current balance, notifying the first user that the application is unable to display the three-dimensional graphic of the selected virtual furnishing unit within the initial scene.

11. The method of claim 1, wherein:
the first user has a current balance in the application; and
each virtual furnishing unit in the one or more second virtual furnishing units not retained by the first user is associated with a cost;
the method further comprising:
receiving a first user selection of a selected virtual furnishing unit in the one or more second virtual furnishing units not purchased by the first user that match the furnishing unit type of the respective marker;
responsive to the first user selection:
displaying a price tag on the three-dimensional graphic of the selected virtual furnishing unit in the one or more second virtual furnishing units; and
when the selected virtual furnishing unit is purchased by the first user, (i) debiting the cost from the current balance and (ii) removing the price tag,
wherein the first user is barred from purchasing the selected virtual furnishing unit in the one or more second virtual furnishing units when the cost exceeds the balance.

12. The method of claim 1, further comprising:
providing within the application a first user-selectable icon, wherein upon successive user selection of the user-selectable icon the first plurality of markers of the first scene completion challenge is toggled between (i) a first state in which the first plurality of markers of the first scene completion challenge is displayed in the initial scene and (ii) a second state in which the first plurality of markers of the first challenge is not displayed in the initial scene.

13. The method of claim 1, further comprising:
providing the first user with a second user-selectable icon that allows the first user to invite one or more friends.

14. The method of claim 13, wherein the first plurality of virtual furnishing units further comprises one or more third virtual furnishing units that are not purchased by the first user but are purchased by a friend in the one or more friends, wherein the one or more third virtual furnishing units match the furnishing unit type of the respective marker, and wherein the receiving the user selection of a selected virtual furnishing unit includes one or more of the third furnishing units from the marker.

15. The method of claim 1, further comprising:
providing a filter against the first plurality of virtual furnishing units corresponding to the respective marker within the first procedure, thereby limiting a number of virtual furnishing units in the first plurality of virtual furnishing units that are displayed upon user selection of the filter.

16. The method of claim 15, wherein the filter comprises any combination of a limitation on brand of the virtual furnishing unit, a limitation on color of the virtual furnishing unit, a limitation on material represented by the virtual furnishing unit, a limitation on pattern used by the virtual furnishing unit, or a limitation on the style of the virtual unit.

17. The method of claim 1, wherein the first scene completion challenge has one or more constraints on the virtual furnishing units that can be used.

18. The method of claim 1, wherein the first plurality of virtual furnishing units includes renditions of actual furnishing units provided by one or more vendors.

19. The method of claim 1, wherein each marker in the first plurality of markers is in the form of a single closed form shape that is overlaid on the initial scene at the respective designated set of coordinates.

20. The method of claim 19, wherein
a generalized depiction of the furnishing unit type of a respective marker in the first plurality of markers is depicted on the respective marker.

21. The method of claim 19, wherein the single closed form shape is a colored circle.

22. The method of claim 1, wherein the first plurality of markers includes a first subset of markers that are mandatory for the first scene completion challenge.

23. The method of claim 1, further comprising:
receiving a voting request from the first user;
concurrently displaying on the display (i) a first image comprising a candidate scene populated with a first set of three-dimensional graphics at corresponding designated sets of coordinates within the candidate scene that has been submitted by a second user in a plurality of users other than the first user, and (ii) a second image comprising the candidate scene populated with a second set of three-dimensional graphics at corresponding designated sets of coordinates within the candidate scene that has been submitted by a third user in the plurality of users other than the first user and the second user;
receiving a selection by the first user of the first image or the second image thereby receiving from the first user a vote for the second user or the third user; and
responsive to the vote for the second user or the third user by the first user, providing the first user a second reward.

24. The method of claim 1, wherein the first scene completion challenge is a first series challenge within a set of series challenges, the set of series challenges is associated with a theme and includes a series completion criterion, and wherein each of the series challenges within the set has a respective image of an initial scene and a respective completion criterion, the method further comprising:
repeating the steps of the first scene completion challenge for other series challenges within the set; and
in accordance with a determination that the series completion criterion has been satisfied, providing the first user with a series prize.

25. The method of claim 1, wherein a virtual furnishing unit in the first plurality of virtual furnishing units is a décor item.

26. The method of claim 25, wherein the décor item has a predetermined color or a predetermined style.

27. A computing system associated with a first user, comprising:

a display;

one or more processors; and memory coupled to the one or more processors, the memory storing one or more programs configured to be executed by the one or more processors, the one or more programs comprising instructions for running an application on the computing system, the one or more programs including instructions for:

responsive to selection of a first scene completion challenge, displaying an initial scene of the first scene completion challenge and displaying within the initial scene a first plurality of markers, wherein each respective marker in the first plurality of markers has corresponding predefined designated coordinates that are not modifiable by the first user, wherein each respective marker corresponds to a furnishing unit type within a plurality of furnishing unit types, and wherein each respective marker is not modifiable by the user;

in response to each sequential user selection of a corresponding marker in the first plurality of markers within the initial scene of the first scene completion challenge, performing a procedure that comprises:

displaying a first plurality of virtual furnishing units that match the furnishing unit type of the corresponding marker, wherein each furnishing unit in the first plurality of furnishing units is displayed as a corresponding three-dimensional graphic outside the initial scene, wherein the first plurality of furnishing units comprises renditions of furnishing units and includes (i) one or more first virtual furnishing units purchased by the first user and (ii) one or more second virtual furnishing units not purchased by the first user, and wherein each marker in the plurality of markers does not display a virtual furnishing unit in the first plurality of virtual furnishing units;

receiving a user selection, outside the initial scene, of the corresponding three-dimensional graphic of a selected virtual furnishing unit in the first plurality of virtual furnishing units; and responsive to the user selection, replacing the corresponding marker within the initial scene with the three-dimensional graphic of the selected virtual furnishing unit at the corresponding predefined designated coordinates;

wherein the performing the first procedure results in a first augmented scene that comprises the initial scene with a plurality of three-dimensional graphics of selected virtual furnishing units, including displaying each respective three-dimensional graphic at the corresponding predefined designated set of coordinates belonging to a corresponding marker in the first plurality of markers within the initial scene, and wherein the first augmented scene contains no marker in the first plurality of markers;

storing a user profile for the first user, wherein the user profile comprises indications of: the first scene completion challenge, the first plurality of markers, and a plurality of selected virtual furnishing units based on the performing the first procedure, each of the selected virtual furnishing units corresponding to a respective marker in the first plurality of markers;

in response to and based on a determination that a predefined completion criterion is satisfied, the predefined completion criterion comprising populating the initial scene with a predetermined number of virtual furnishing units specified by the first scene completion challenge, enabling the first user to submit the first augmented scene or the indications of the plurality of selected furnishing units to a remote server; and responsive to submitting the first augmented scene or the indications of the plurality of selected furnishing units to the remote server, providing the first user a first reward.

28. A non-transitory computer-readable storage medium storing one or more programs, the one or more programs comprising instructions, which when executed by a computing system having a display and associated with a first user, cause the computing system to:

responsive to selection of a first scene completion challenge, display an initial scene of the first scene completion challenge and display within the initial scene a first plurality of markers, wherein each respective marker in the first plurality of markers has corresponding predefined designated coordinates that are not modifiable by the first user, wherein each respective marker corresponds to a furnishing unit type within a plurality of furnishing unit types, and wherein each respective marker is not modifiable by the user;

in response to each sequential user selection of a corresponding marker in the first plurality of markers within the initial scene of the first scene completion challenge, performing a procedure that comprises:

displaying a first plurality of virtual furnishing units that match the furnishing unit type of the corresponding marker, wherein each furnishing unit in the first plurality of furnishing units is displayed as a corresponding three-dimensional graphic outside the initial scene, wherein the first plurality of furnishing units comprises renditions of furnishing units and includes (i) one or more first virtual furnishing units purchased by the first user and (ii) one or more second virtual furnishing units not purchased by the first user, and wherein each marker in the plurality of markers does not display a virtual furnishing unit in the first plurality of virtual furnishing units;

receiving a user selection, outside the initial scene, of the corresponding three-dimensional graphic of a selected virtual furnishing unit in the first plurality of virtual furnishing units; and responsive to the user selection, replacing the corresponding marker within the initial scene with the three-dimensional graphic of the selected virtual furnishing unit at the corresponding predefined designated coordinates;

wherein the performing the first procedure results in a first augmented scene that comprises the initial scene with a plurality of three-dimensional graphics of selected virtual furnishing units, including displaying each respective three-dimensional graphic at the corresponding predefined designated set of coordinates belonging to a corresponding marker in the first plurality of markers within the initial scene, and wherein the first augmented scene contains no marker in the first plurality of markers;

store a user profile for the first user, wherein the user profile comprises indications of: the first scene completion challenge, the first plurality of markers, and a plurality of selected virtual furnishing units based on the performing the first procedure, each of the selected virtual furnishing units corresponding to a respective marker in the first plurality of markers;

in response to and based on a determination that a predefined completion criterion is satisfied, the predefined completion criterion comprising populating the initial scene with a predetermined number of virtual furnishing units specified by the first scene completion challenge, enable the first user to submit the first augmented scene or the indications of the plurality of selected furnishing units to a remote server; and responsive to submitting the first augmented scene or the indications of the plurality of selected furnishing units to the remote server, provide the first user a first reward.

* * * * *